(12) United States Patent
Ando et al.

(10) Patent No.: US 6,651,135 B2
(45) Date of Patent: *Nov. 18, 2003

(54) INFORMATION RECORDING DEVICE AND A METHOD OF RECORDING INFORMATION BY SETTING THE RECORDING AREA BASED ON CONTIGUOUS DATA AREA

(75) Inventors: Hideo Ando, Hino (JP); Seigo Ito, Yokohama (JP); Hideki Takahashi, Kashiwa (JP); Hiroaki Unno, Ichikawa (JP); Hideki Sogabe, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/955,102

(22) Filed: Sep. 19, 2001

(65) Prior Publication Data

US 2002/0035705 A1 Mar. 21, 2002

Related U.S. Application Data

(62) Division of application No. 09/666,460, filed on Sep. 21, 2000, which is a continuation of application No. PCT/JP99/05096, filed on Sep. 20, 1999.

(30) Foreign Application Priority Data

| Sep. 18, 1998 | (JP) | ............................................. | 10-265270 |
| Sep. 30, 1998 | (JP) | ............................................. | 10-292819 |
| Sep. 30, 1998 | (JP) | ............................................. | 10-292821 |
| Sep. 30, 1998 | (JP) | ............................................. | 10-292823 |
| Sep. 30, 1998 | (JP) | ............................................. | 10-292826 |
| Sep. 30, 1998 | (JP) | ............................................. | 10-292827 |

(51) Int. Cl.[7] .............................................. G06F 12/00

(52) U.S. Cl. ............................ 711/112; 711/4; 711/203; 714/8

(58) Field of Search ............................. 714/8; 711/112, 711/203, 4

(56) References Cited

U.S. PATENT DOCUMENTS

| 5,596,564 A | 1/1997 | Fukushima et al. ........... 386/70 |
| 5,642,338 A | 6/1997 | Fukushima et al. ........... 386/96 |

(List continued on next page.)

FOREIGN PATENT DOCUMENTS

| EP | 709843 | 5/1996 |
| GB | 2312059 | 10/1997 |

(List continued on next page.)

OTHER PUBLICATIONS

Explanation of Circumstances concerning Accelerated Examination for Japanese Patent Application No. 10–265270 filed Jul. 8, 2002 (with English Translation).

(List continued on next page.)

*Primary Examiner*—Reginald G. Bragdon
(74) *Attorney, Agent, or Firm*—Oblon, Spivak, McClelland, Maier & Neustadt, P.C.

(57) ABSTRACT

An information storage medium is designed to assure stable continuous recording without adverse effect, even when many defective areas are present on the information storage medium. To record information onto the information storage medium, a file unit is defined as a first unit. A contiguous data area unit to be treated as a continuous recording area is defined as a second unit. Furthermore, recording is done in the contiguous data area units and a collection of the contiguous data area units is organized into the file unit. In addition, an information recording place is provided in such a manner that the contiguous data area unit is so set that it extends over the recording area of another file already recorded on the information storage medium and a defective area on the information storage medium.

4 Claims, 80 Drawing Sheets

U.S. PATENT DOCUMENTS

| | | | |
|---|---|---|---|
| 5,798,995 A | | 8/1998 | Fukushima et al. ............ 386/98 |
| 6,098,185 A | * | 8/2000 | Wilson ......................... 360/25 |
| 6,212,647 B1 | * | 4/2001 | Sims et al. .................. 711/112 |
| 6,282,365 B1 | | 8/2001 | Gotoh et al. ................... 386/95 |
| 6,292,625 B1 | | 9/2001 | Gotoh et al. ................... 386/95 |
| 6,314,235 B1 | | 11/2001 | Gotoh et al. ................... 386/95 |

FOREIGN PATENT DOCUMENTS

| | | | |
|---|---|---|---|
| JP | 61-260339 | | 11/1986 |
| JP | 1-184763 | | 7/1989 |
| JP | 2-5150 | | 1/1990 |
| JP | 4-219836 | | 8/1992 |
| JP | 5-109205 | | 4/1993 |
| JP | 7-170492 | | 7/1995 |
| JP | 7-226902 | | 8/1995 |
| JP | 8-212707 | | 8/1996 |
| JP | 9-50675 | | 2/1997 |
| JP | 9-251721 | | 9/1997 |
| JP | 10-31881 | | 2/1998 |
| JP | 10-125006 | | 5/1998 |
| JP | 11-162119 | | 6/1999 |
| JP | 11-250587 | | 9/1999 |
| JP | 11-296999 | | 10/1999 |
| JP | 11-306545 | | 11/1999 |
| WO | 95/24038 | * | 9/1995 |
| WO | WO98/14938 | | 4/1998 |

OTHER PUBLICATIONS

Explanation of Circumstances concerning Accelerated Examination for Japanese Patent Application No. 10–292823 filed Jul. 15, 2002 (with English Translation).

Explanation of Circumstances concerning Accelerated Examination for Japanese Patent Application No. 2001–250153 filed Jul. 15, 2002 (with English Translation).

Explanation of Circumstances concerning Accelerated Examination for Japanese Patent Application No. 2001–250154 filed Jul. 15, 2002 (with English Translation).

Explanation of Circumstances concerning Accelerated Examination for Japanese Patent Application No. 2001–250472 filed Jul. 15, 2002 (with English Translation).

Explanation of Circumstances concerning Accelerated Examination for Japanese Patent Application No. 2001–253327 filed Jul. 15, 2002 (with English Translation).

Explanation of Circumstances concerning Accelerated Examination for Japanese Patent Application No. 2001–257983 filed Jul. 15, 2002 (with English Translation).

Explanation of Circumstances concerning Accelerated Examination for Japanese Patent Application No. 2001–257984 filed Jul. 15, 2002 (with English Translation).

Explanation of Circumstances concerning Accelerated Examination for Japanese Patent Application No. 2001–250473 filed Jul. 15, 2002 (with English Translation).

* cited by examiner

CONFIGURATION OF PC SYSTEM USING INFORMATION REPRODUCING DEVICE

| RADIUS POSITION (mm) 601 | AREA NAME 602 | ZONE NAME 603 | PHYSICAL SECTOR NUMBER 604 |
|---|---|---|---|
| 22.59~24.00<br>24.00<br>24.00~24.18 | LEAD-IN AREA 607 | EMBOSS DATA ZONE 611<br>MIRROR ZONE 612<br>REWRITABLE DATA ZONE 613 | 27AB0~2FFFF<br><br>30000~30FFF |
| 24.18~25.40 | DATA AREA (REWRITABLE DATA ZONE) 608 | ZONE 00 620 | 31000~37D5F |
| 25.40~26.79 | | ZONE 01 621 | 37D60~4021F |
| 26.79~28.19 | | ZONE 02 622 | 40220~48E3F |
| 28.19~29.59 | | ZONE 03 623 | 48E40~521BF |
| 29.59~30.99 | | ZONE 04 624 | 521C0~5BC9F |
| 30.99~32.38 | | ZONE 05 625 | 5BCA0~65EDF |
| 32.38~33.78 | | ZONE 06 626 | 65EE0~7087F |
| 33.78~35.18 | | ZONE 07 627 | 70880~7B97F |
| 35.18~36.57 | | ZONE 08 628 | 7B980~871DF |
| ⋮ | | ⋮ | ⋮ |
| 43.56~44.96 | | ZONE 14 634 | C7A60~D5EFF |
| 44.96~46.35 | | ZONE 15 635 | D5F00~E4AFF |
| 46.35~47.75 | | ZONE 16 636 | E4B00~F3E5F |
| 47.75~49.15 | | ZONE 17 637 | F3E60~10391F |
| 49.15~50.55 | | ZONE 18 638 | 103920~113B3F |
| 50.55~51.94 | | ZONE 19 639 | 113B40~1244BF |
| 51.94~53.34 | | ZONE 20 640 | 1244C0~13559F |
| 53.34~54.74 | | ZONE 21 641 | 1355A0~146DDF |
| 54.74~56.13 | | ZONE 22 642 | 146DE0~158D7F |
| 56.13~57.53 | | ZONE 23 643 | 158D80~16B47F |
| 57.53~58.60 | LEAD-OUT AREA 609 | REWRITABLE DATA ZONE 645 | 16B480~17966F |

SCHEMATIC LAYOUT OF RECORD ON DVD-RAM

FIG. 2

| NAME 603 | DESCRIPTION OF EACH ZONE 651 | |
|---|---|---|
| EMBOSSED DATA ZONE 611 | BLANK ZONE 652 | |
| | REFERENCE SIGNAL ZONE 653 | |
| | BLANK ZONE 654 | |
| | CONTROL DATA ZONE 655 | BOOK TYPE PART VERSION 671<br>DISK SIZE MINIMUM READ RATE 672<br>DISK STRUCTURE 673<br>RECORDING DENSITY 674<br>DATA AREA ALLOCATION 675<br>BCA DESCRIPTIVE STATEMENT 676<br>SPEED (LINEAR VELOCITY CONDITION FOR SPECIFYING EXPOSURE) 677<br>READING POWER 678<br>PEAK POWER 679<br>BASE POWER 680<br>RESERVED 681<br>INFORMATION ON MANUFACTURE OF INFORMATION STORAGE MEDIUM 682<br>RESERVED 683 |
| | BLANK ZONE 656 | |
| MIRROR ZONE 612 | CONNECTION ZONE 657 | |
| REWRITABLE DATA ZONE 613 | GUARD TRACK ZONE 658 | |
| | DISK TEST ZONE 659 | |
| | DRIVE TEST ZONE 660 | |
| | GUARD TRACK ZONE 661 | |
| | DISK ID ZONE 662 | |
| | DMA1 & DMA2 663 | |

DATA STRUCTURE OF LEAD-IN AREA ON DVD-RAM DISK

F I G. 3

| ZONE NAME 603 | DESCRIPTION OF EACH ZONE 651 |
|---|---|
| REWRITABLE DATA ZONE 645 | DMA3 & DMA4 691<br>DISK ID ZONE 692<br>GUARD TRACK ZONE 693<br>DRIVE TEST ZONE 694<br>DISK TEST ZONE 695<br>GUARD TRACK ZONE 696 |

STRUCTURE OF LEAD-OUT AREA ON DVD-RAM DISK

F I G. 4

| ZONE NUMBER 773 | SECTOR NUMBER FOR GUARD AREA 771 | NUMBER | GROUP | | | SECTOR NUMBER FOR GUARD AREA 772 | LOGICAL SECTOR NUMBER 774 FOR 1ST SECTOR IN EACH GROUP 774 |
|---|---|---|---|---|---|---|---|
| | | | USER AREA 723 | | SPARE AREA 724 | | |
| | | | SECTOR NUMBER | NO. OF SECTORS | SECTOR NUMBER | | |
| 00 | – | 00 | 31000~377DF | 26592 | 377E0~37D2F | 37D30~37D5F | 0 |
| 01 | 37D60~37D8F | 00 | 37D90~3FB2F | 32160 | 3FB30~401EF | 401F0~4021F | 26592 |
| 02 | 40220~4024F | 00 | 40250~486EF | 33952 | 486F0~48E0F | 48E10~48E3F | 58752 |
| 03 | 48E40~48E6F | 00 | 48E70~51A0F | 35744 | 51A10~5218F | 52190~521BF | 92704 |
| 04 | 521C0~521EF | 00 | 521F0~5B48F | 37536 | 5B490~5BC6F | 5BC70~5BC9F | 128448 |
| : | : | : | : | : | : | : | : |
| 20 | 1244C0~12450F | 00 | 124510~13476F | 66144 | 134770~13554F | 135550~13559F | 943552 |
| 21 | 1355A0~1355EF | 00 | 1355F0~145F4F | 67936 | 145F50~146D8F | 146D90~146DDF | 1009696 |
| 22 | 146DE0~146E2F | 00 | 146E30~157E8F | 69728 | 157E90~158D2F | 158D30~158D7F | 1077632 |
| 23 | 158D80~158DCF | 00 | 158DD0~16A57F | 71600 | 16A580~16B47F | – | 1147360 |

RELATIONSHIP BETWEEN PHYSICAL SECTOR NUMBERS AND LOGICAL SECTOR NUMBERS (ARRANGEMENT OF PHYSICAL SECTOR NUMBERS IN DVD-RAM DISK DATA AREA)

F I G. 5

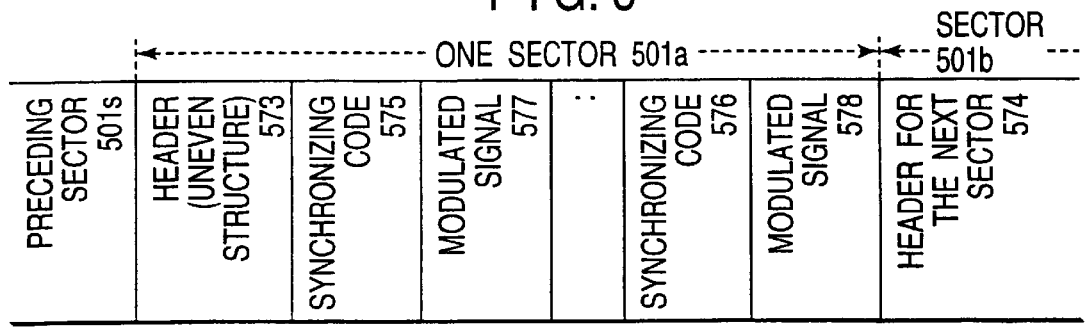

SIGNAL STRUCTURE IN SECTOR RECORDED IN DATA AREA

F I G. 6

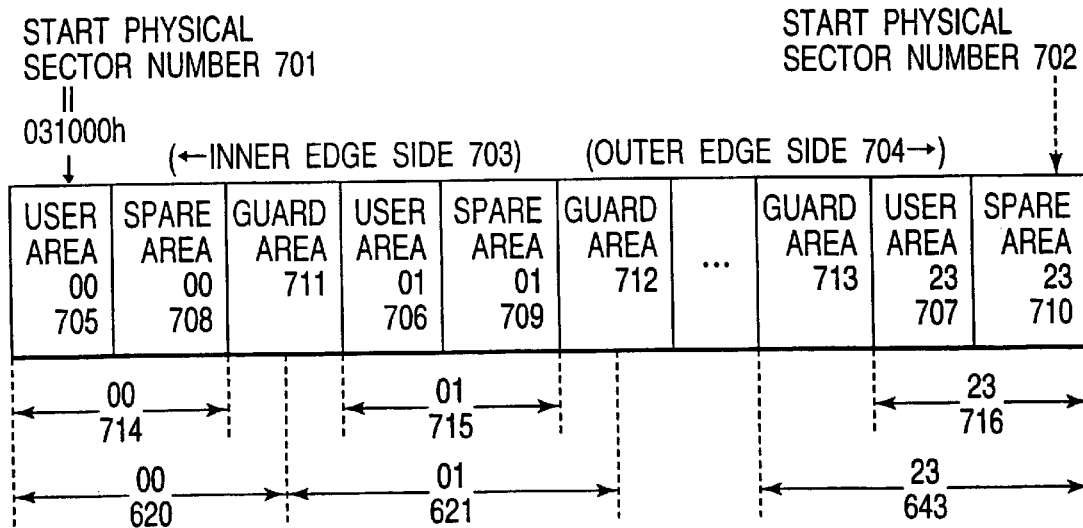
FIG. 7 RECORDING UNIT OF DATA AREA RECORDING INFORMATION
FIG. 8 RELATIONSHIP BETWEEN ZONES AND GROUPS IN DATA AREA
FIG. 9 METHOD OF SETTING LOGICAL SECTORS ON DVD-RAM DISK CONFIGURATION OF INFORMATION RECORDING
AND REPRODUCING SECTION (PHYSICAL SYSTEM BLOCK)

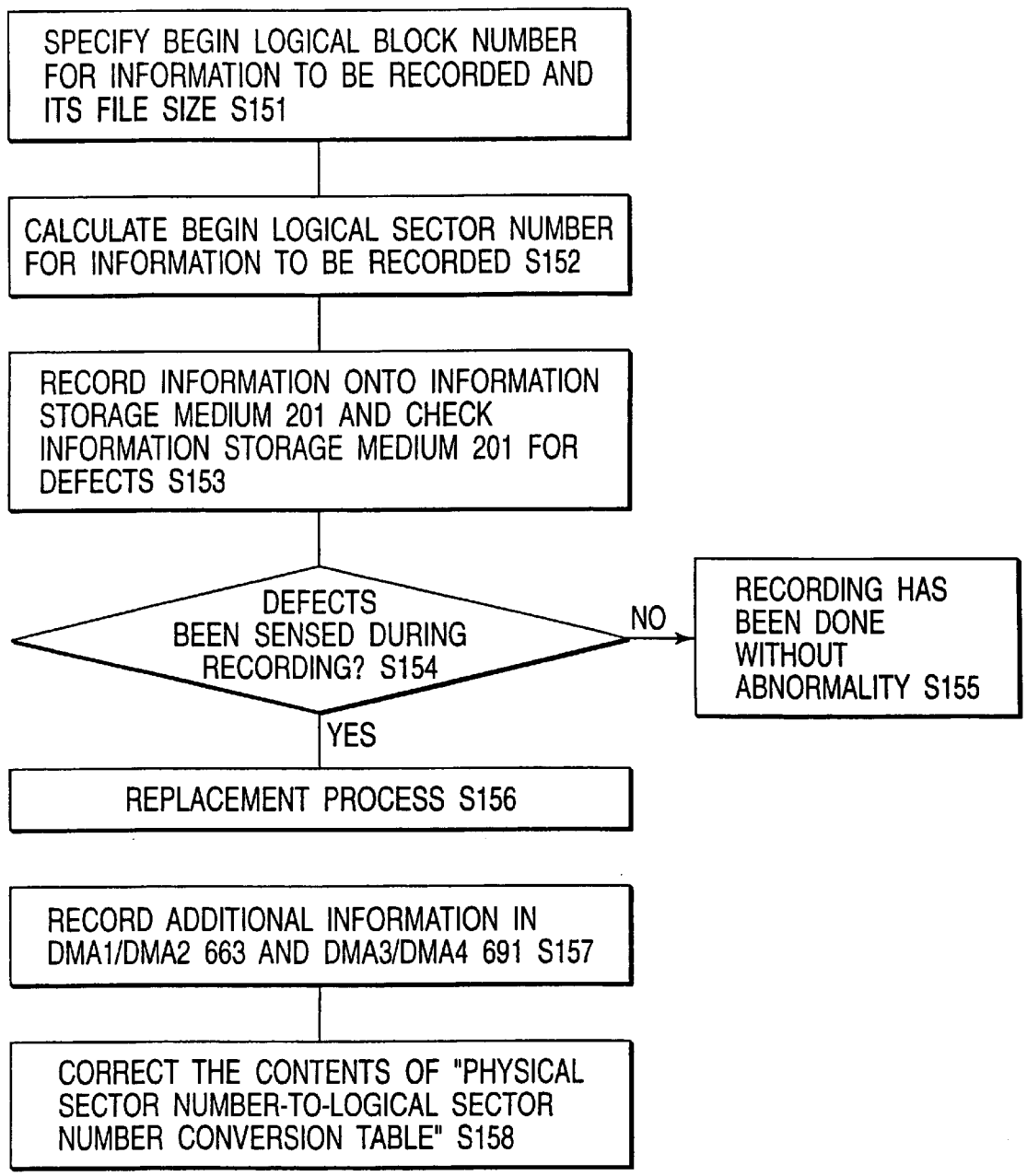
EXPLANATION OF THE OPERATION OF PROCESSING DEFECTS
IN INFORMATION RECORDING AND REPRODUCING DEVICE
F I G. 13

| LSN | LBN | STRUCTURE 441 | CORRECTED STATEMENT 442 | DESCRIPTION 443 |
|---|---|---|---|---|
| 0-15 | | | RESERVED 459 (ALL 00h BYTE) | |
| 16 | | VOLUME ACKNOWLEDGE SEQUENCE 444 | START EXTENT AREA CORRECTION 445 | VRS START POSITION |
| 17 | | | VOLUME STRUCTURE DESCRIPTION 446 | DISC CONTENT EXPLANATION |
| 18 | | | BOOT DESCRIPTION 447 | BOOT START POSITION |
| 19 | | | TERMINATE EXTENT AREA DESCRIPTION 448 | VRS END POSITION |
| ~31 | | | RESERVED 460 (ALL 00h BYTE) | |
| 32~ | | MAIN VOLUME DESCRIPTIVE SEQUENCE 449 | OMITTED | |
| 34 | | | PARTITION DESCRIPTION 450 PARTITION CONTENT USE 451 UNALLOCATED SPACE TABLE 452 AD (50) UNALLOCATED SPACE BIT MAP 453 AD (0) | RECORDING POSITION OF SPACE TABLE RECORDING POSITION OF SPACE BIT MAP |
| 35 | | | LOGICAL VOLUME DESCRIPTION 454 LOGICAL VOLUME CONTROL USE 455 LAD (100) | RECORDING POSITION OF FILE SET DESCRIPTION |
| ~47 | | | OMITTED | |
| ~63 | | | OMITTED | |
| -255 | | | RESERVED 461 (ALL 00h BYTE) | |
| 256 | | 1ST ANCHOR POINTER 456 | ANCHOR VOLUME DESCRIPTIVE POINTER 458 | |
| -271 | | | RESERVED 462 (ALL 00h BYTE) | |
| 272 ~ 321 | 0 ~ 49 | | SPACE BIT MAP DESCRIPTION 470 | MAPPING OF RECORDED AND UNRECORDED IN SPACE BIT MAP |
| 322 ~ 371 | 50 ~ 99 | | USE (AD(*), AD(*)..., AD(*)) 471 | LIST OF UNRECORDED EXTENTS IN SPACE TABLE |
| 372 | 100 | | FILE SET DESCRIPTION 472 ROOT DIRECTORY 473 LAD (102) 474 | RECORDING POSITION OF ROOT DIRECTORY FE |
| 373 | 101 | | OMITTED | OMITTED |
| 374 | 102 | | ROOT DIRECTORY AFE (AD(103)) 475 | FIDS RECORDING POSITION |

FIG. 14

| | | | | |
|---|---|---|---|---|
| 375 | 103 | FILE STRUCTURE 486 | A FID (LAD(104), LAD(110)) 476 | B, D: FE POSITION |
| 376 | 104 | | PARENT DESCRIPTIVE BFE (AD(105)) 477 | FIDS RECORDING POSITION |
| 377 | 105 | | FID (LAD(106)) 478 OF B | FE POSITION OF C |
| 378 | 106 | | FE (AD(107) AD(108) AD(109)) 479 | FILE DATA POSITION |
| 382 | 110 | | DIRECTORY-D FE (AD(111)) 480 | FIDS RECORDING POSITION |
| 383 | 111 | | D FID (LAD(112), LAD(NONE)) 481 | E,F: FE POSITION |
| 384 | 112 | | SUBDIRECTORY-F FE (AD(113)) 482 | FIDS RECORDING POSITION |
| 385 | 113 | | FID (LAD() LAD(114) LAD(118) 483 | H,I: FE POSITION |
| 386 | 114 | | FE (AD(115) AD(116) AD(117)) 484 | FILE DATA POSITION |
| 390 | 118 | | I FE (AD(119), AD(120)) 485 | FILE DATA POSITION |
| 379- | 107- | FILE DATA 487 | INFORMATION ON FILE DATA C 488 | |
| 387- | 115- | | INFORMATION ON FILE DATA H 489 | |
| 391- | 119- | | INFORMATION ON FILE DATA I 490 | |
| LLSN-271 ~LLSN-257 | | | RESERVED 463 (ALL 00h BYTE) | |
| LLSN-256 | | 2ND ANCHOR POINT 457 | ANCHOR VOLUME DESCRIPTION 458 | |
| LLSN-255 ~LLSN-224 | | | RESERVED 464 (ALL 00h BYTE) | |
| LLSN-223 ~ LLSN-208 | | RESERVED VOLUME DESCRIPTIVE SEQUENCE 467 | PARTITION DESCRIPTION 450 PARTITION CONTENT USE 451 UNALLOCATED SPACE TABLE 452 UNALLOCATED SPACE BIT MAP 453 LOGICAL VOLUME DESCRIPTION 454 LOGICAL VOLUME CONTROL USE 455 | BACKUP OF MAIN VOLUME DESCRIPTIVE SEQUENCE |
| LLSN-207 ~LLSN | | | RESERVED 465 (ALL 00h BYTE) | |

\*LSN ··· LOGICAL SECTOR NUMBER 491
\*LSN ··· LOGICAL BLOCK NUMBER 492
\*LLSN ··· LAST LOGICAL SECTOR NUMBER 493

EXAMPLE OF RECORDING FILE SYSTEM ON INFORMATION STORAGE MEDIUM ACCORDING TO UDF (CORRESPONDING TO AN EXAMPLE OF FILE SYSTEM STRUCTURE OF FIG.22)

FIG. 15

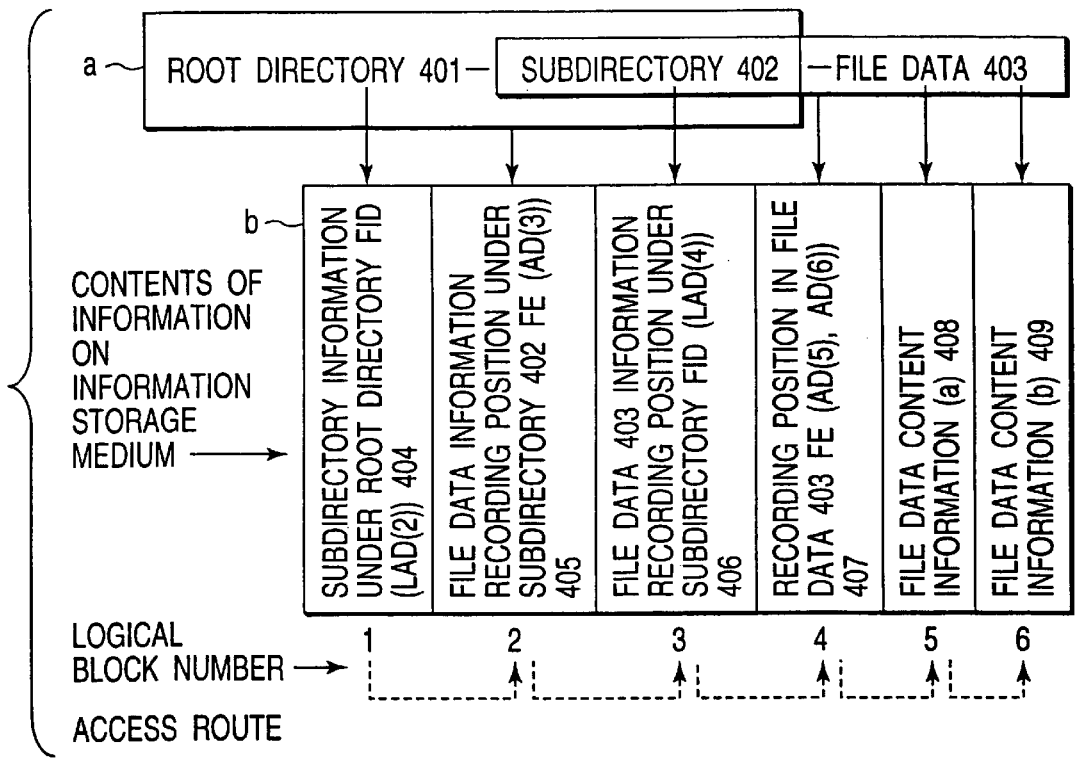

FIG. 16

LAD (LOGICAL BLOCK NUMBER) ··· METHOD OF DESCRIBING
‖ THE POSITIONS OF EXTENTS
ON INFORMATION STORAGE MEDIUM

| LENGTH OF EXTENT 410 (NO. OF LOGICAL BLOCKS) [EXPRESSED IN 4 BYTES] | POSITION OF EXTENT 411 (LOGICAL BLOCK NUMBER) [EXPRESSED IN 4 BYTES] | IMPLEMENTATION USE 412 (INFORMATION USED IN CALCULATION) [EXPRESSED IN 8 BYTES] |
|---|---|---|

LONG ALLOCATION DESCRIPTIVE STATEMENT (POSITION OF EXTENT), (CONTENTS OF LARGE-SIZED DESCRIPTIVE STATEMENT)

FIG. 17

▲USE (AD(*), AD(*), ···, AD(*))
··· DESCRIPTIVE STATEMENT FOR SEARCHING FOR UNRECORDED EXTENT
  AND USED AS SPACE TABLE

| DESCRIPTIVE STATEMENT TAG (= 263), DESCRIPTOR FOR CONTENTS OF DESCRIPTION 413 [16 BYTES] | ICB TAG INDICATING FILE TYPE (TYPE = 1) 414 [20 BYTES] | ALLOCATION DESCRIPTIVE STATEMENT, TOTAL LENGTH OF COLUMN (NO. OF BYTES) 415 [4 BYTES] | ALLOCATION DESCRIPTIVE STATEMENT WRITE POSITIONS OF INDIVIDUAL EXTENTS ON INFORMATION STORAGE MEDIUM (LOGICAL BLOCK NUMBERS ON INFORMATION STORAGE MEDIUM) SIDE BY SIDE (AD(*), AD(*), ···, AD(*)) 416 |
|---|---|---|---|

*FILE TYPE = 1 IN ICB TAG ··· UNLOCATED SPACE ENTRY
  *FILE TYPE = 4 IN ICB TAG ··· DIRECTORY
  *FILE TYPE = 5 IN ICB TAG ··· FILE DATA

CONTENTS OF DESCRIPTION OF UNLOCATED SPACE ENTRY
(DESCRIPTIVE STATEMENT FOR DIRECT REGISTRATION RELATED TO
POSITIONS OF UNRECORDED EXTENTS ON INFORMATION STORAGE MEDIUM)

FIG. 19

RECORDING POSITION ON INFORMATION STORAGE MEDIUM OF FILE SPECIFIED
BY FE (AD(*), AD(*), ⋯, AD(*))
‖

| DESCRIPTIVE STATEMENT TAG (= 261) (DESCRIPTOR FOR CONTENTS OF DESCRIPTION) 417 [16 BYTES] | ICB TAG (INDICATING FILE TYPE) (TYPE = 415) 418 [20 BYTES] | PERMISSION (PERMISSION INFORMATION ABOUT RECORDING, REPRODUCING, DELETING FOR EACH USER) 419 [32 BYTES] | ALLOCATION DESCRIPTIVE STATEMENT (RECORDING POSITIONS OF FILES ON INFORMATION STORAGE MEDIUM) (LOGICAL BLOCK NUMBER ON INFORMATION STORAGE MEDIUM) (AD(*), AD(*), ⋯, AD(*)) 420 |
|---|---|---|---|

*FILE TYPE = 1 IN ICB TAG ⋯ UNLOCATED SPACE ENTRY
*FILE TYPE = 4 IN ICB TAG ⋯ DIRECTORY
*FILE TYPE = 5 IN ICB TAG ⋯ FILE DATA

EXCERPT OF DESCRIPTION OF FILE ENTRY (DESCRIPTIVE STATEMENT
ABOUT REGISTRATION OF INFORMATION ABOUT FILE ATTRIBUTES AND
THAT OF RECORDING POSITIONS OF FILES)

FIG. 20A

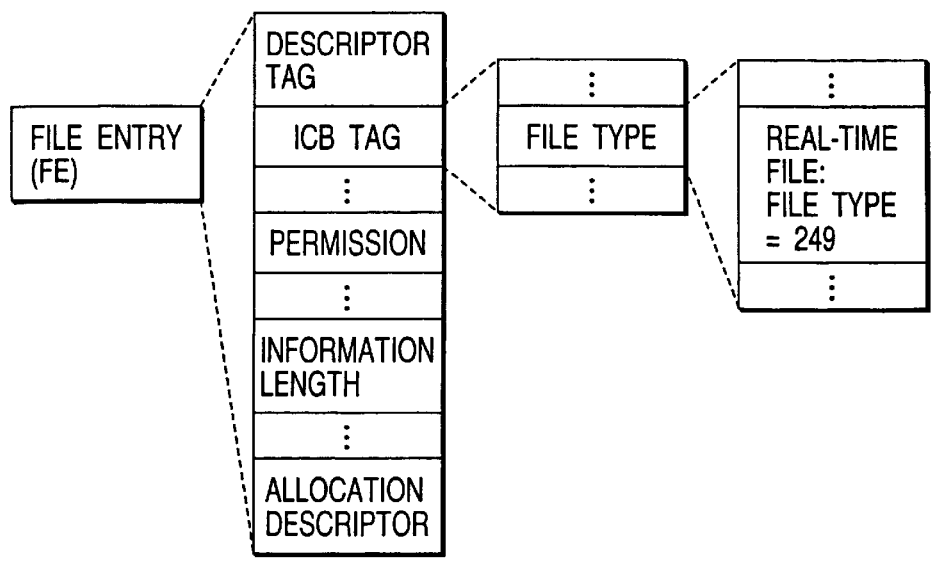

FIG. 20B

FID (LAD(LOGICAL BLOCK NUMBER))
··· INFORMATION ON FILE
  (INCLUDING ROOT DIRECTORY, SUBDIRECTORY, FILE DATA)

| DESCRIPTOR TAG (= 257) (IDENTIFIER FOR DESCRIPTION) 421 [16 BYTES] | FILE PROPERTY (SHOWING TYPE OF FILE) 422 [1 BYTE] | INFORMATION CONTROL BLOCK (RECORDING POSITION OF CORRESPONDING FE) 423 (LAD(*)) | FILE IDENTIFIER (DIRECTORY NAME OR FILE DATA NAME) 424 | PADDING (DUMMY AREA) (000h) 437 |
|---|---|---|---|---|

*FILE PROPERTY (FILE TYPE) ··· ONE OF PARENT DIRECTORY, DIRECTORY, FILE DATA, AND FILE DELETE FLAG

EXCERPT FROM DESCRIPTION OF FILE IDENTIFICATION DESCRIPTIVE STATEMENT (FID) (DESCRIPTIVE STATEMENT ABOUT RECORDING POSITION OF FE CORRESPONDING TO NAME OF FILE)

FIG. 21

EXAMPLE OF FILE SYSTEM STRUCTURE

DATA STRUCTURE IN AV FILE RECORDED ON INFORMATION STORAGE MEDIUM

| AV FILE 1401 ||||||||||
|---|---|---|---|---|---|---|---|---|---|
| VOB #1 3161 |||||||| VOB #2 3162 ||
| AV ADD-RESS 0 | AV ADD-RESS g- | AV ADD-RESS g | AV ADD-RESS f-e-1 | AV ADD-RESS f-e | AV ADD-RESS h-1 | AV ADD-RESS h | AV ADD-RESS f-e+ d-c-1 | AV ADD-RESS f-e+ d-c | AV ADD-RESS f-e+ d-c+b -a-1 |
| #δ 3169 |||| #γ 3168 |||| #α 3166 || a ⟵

↓ DELETING PART OF THE CENTRAL PORTION OF VOB #1 ↓

| AV FILE 1401 ||||||||||
|---|---|---|---|---|---|---|---|---|---|
| VOB #1 3161 || UNUSED VOB #A 3173 ||| VOB #3 3171 || VOB #2 3162 |||
| AV ADD-RESS 0 | AV ADD-RESS g-i | AV ADD-RESS g | AV ADD-RESS f-e-1 | AV ADD-RESS f-e | AV ADD-RESS h-1 | AV ADD-RESS h | AV ADD-RESS f-e+ d-c-1 | AV ADD-RESS f-e+ d-c | AV ADD-RESS f-e+ d-c+b -a-1 |
| EXTENT #δ 3169 |||| EXTENT #γ 3168 |||| EXTENT #α 3166 || b ⟵

- EMBODIMENTS OF THE PRESENT INVENTION XX-PS, LBN/ODD, LBN/ODD-PS
- RECORDING/REPRODUCING APPLICATION SIDE MANAGES UNUSED AREAS IN AV FILE
- HANDLING METHOD IN DELETING PART OF AV FILE

FIG. 30

DATA STRUCTURE OF VIDEO OBJECT CONTROL INFORMATION

| | | |
|---|---|---|
| VODI GENERAL INFORMATION 3180 | INFORMATION ON YEAR/MONTH/DAY THAT VIDEO OBJECT CONTROL INFORMATION WAS CHANGED LAST 3201 | — |
| SEARCH POINTER FOR VOBI #1 3183 | NO. OF VIDEO OBJECTS 3202 | EXAMPLE OF b IN FIG.30 → 3 |
| SEARCH POINTER FOR VOBI #1 3184 | NO. OF PIECES OF INFORMATION ON UNUSED VIDEO OBJECTS 3203 | EXAMPLE OF b IN FIG.30 → 1 |
| SEARCH POINTER FOR VOBI #1 3185 | VIDEO OBJECT TYPE 3206 ("1" MEANS RECORDED VOB, "0" MEANS UNUSED VOB) | EXAMPLE OF b IN FIG. 30 → h |
| SEARCH POINTER FOR UNUSED VOB #A 3188 | AV ADDRESS FOR BEGIN POSITION OF VOB #3 3207 | EXAMPLE OF b IN FIG. 30 → 1 |
| VIDEO OBJECT INFORMATION #1 3191 | DATA SIZE OF VOB #3 3208 (WRITTEN IN SECTORS) | EXAMPLE OF b IN FIG. 30 → f-e+d-c-h |
| VIDEO OBJECT INFORMATION #3 3192 | INFORMATION ON VOBU IN VOB #3 3209 | — |
| VIDEO OBJECT INFORMATION #2 3193 | TYPE OF VIDEO OBJECT TYPE 3211 ("I" MEANS RECORDED VOB, "0" MEANS UNUSED VOB) | EXAMPLE OF b IN FIG. 30 → o |
| INFORMATION ON UNUSED VOB #A 3196 | AV AT THE BEGIN POSITION OF UNUSED VOG #A 3212 | EXAMPLE OF b IN FIG. 30 → g |
| | DATA SIZE OF UNUSED VOB #A 3212 (WRITTEN IN SECTORS) 3213 | EXAMPLE OF b IN FIG.30 → h-g |

FIG. 31

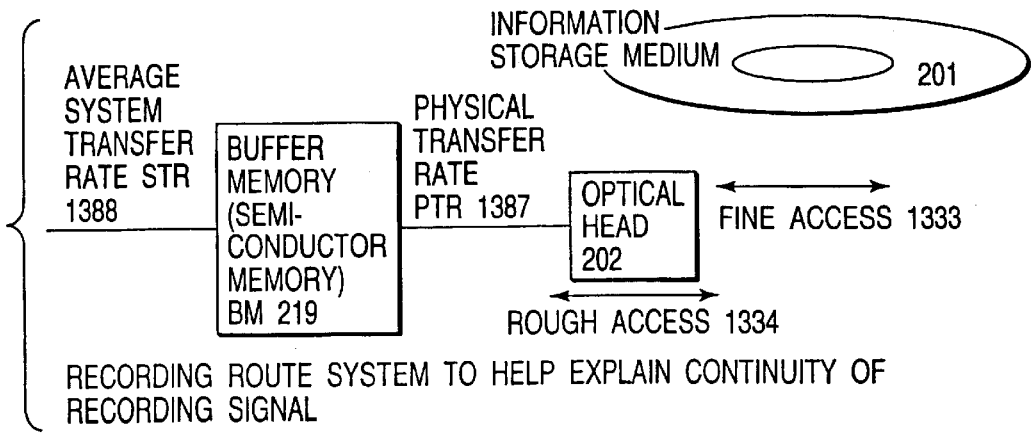

FIG. 32

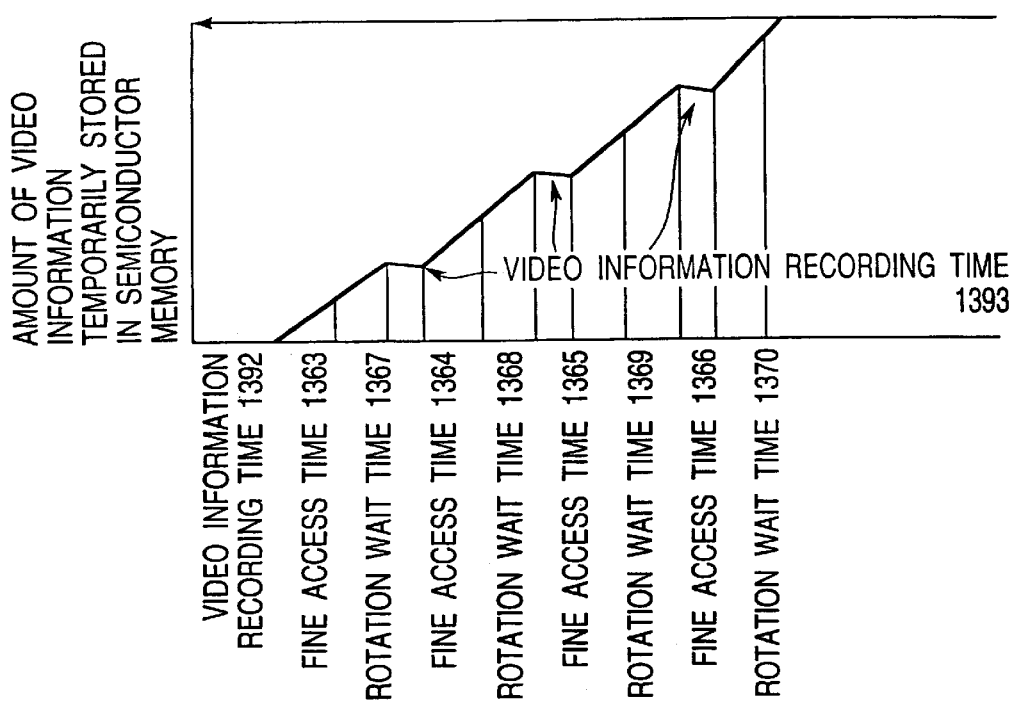
STATE OF THE AMOUNT OF INFORMATION STORED IN SEMICONDUCTOR MEMORY WHEN THE FREQUENCY OF ACCESS IS THE HIGHEST
F I G. 33
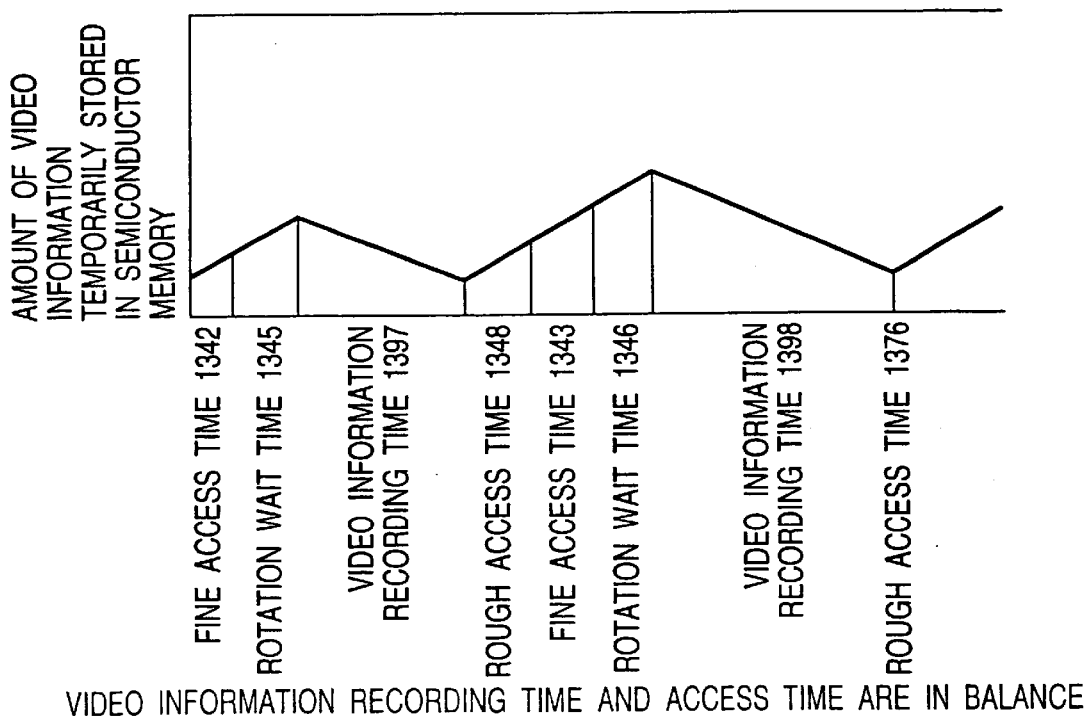
VIDEO INFORMATION RECORDING TIME AND ACCESS TIME ARE IN BALANCE
F I G. 34

COMPARISON BETWEEN SKIPPING REPLACEMENT PROCESS AND LINEAR REPLACEMENT PROCESS ABOUT THE RELATIONSHIP BETWEEN DEFECT MANAGEMENT INFORMATION AND DEFECT/REPLACEMENT PROCESS STORED ON INFORMATION STORAGE MEDIUM

RELATIONSHIP BETWEEN DEFECT MANAGEMENT INFORMATION AND DEFECT/REPLACEMENT PROCESS STORED ON INFORMATION STORAGE MEDIUM (COMPARISON BETWEEN SKIPPING REPLACEMENT AND LINEAR REPLACEMENT)
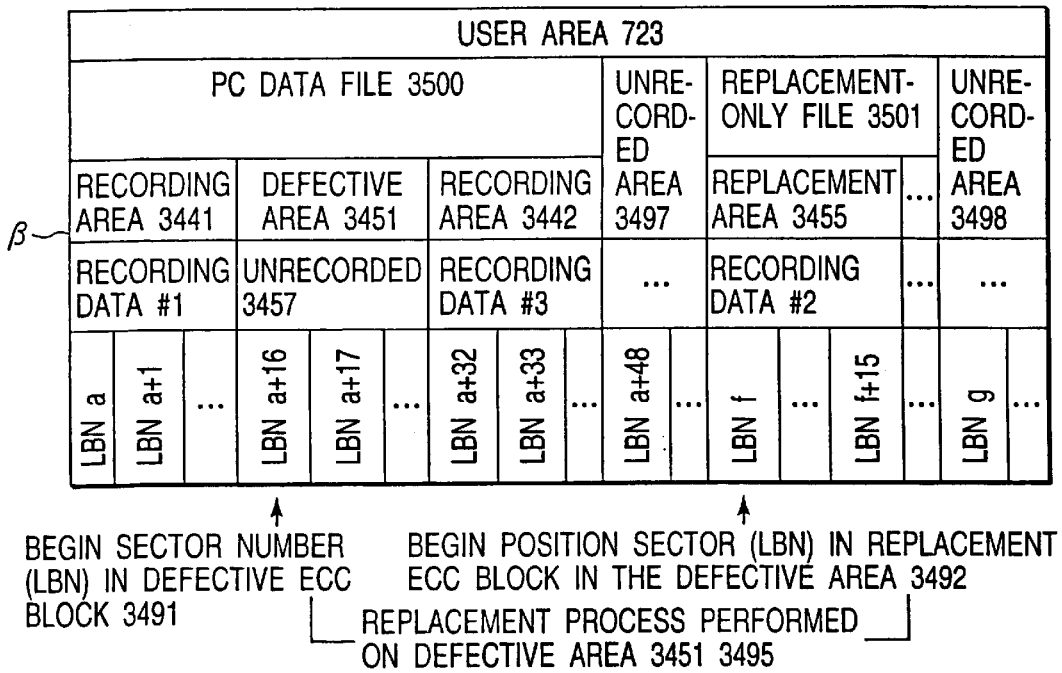
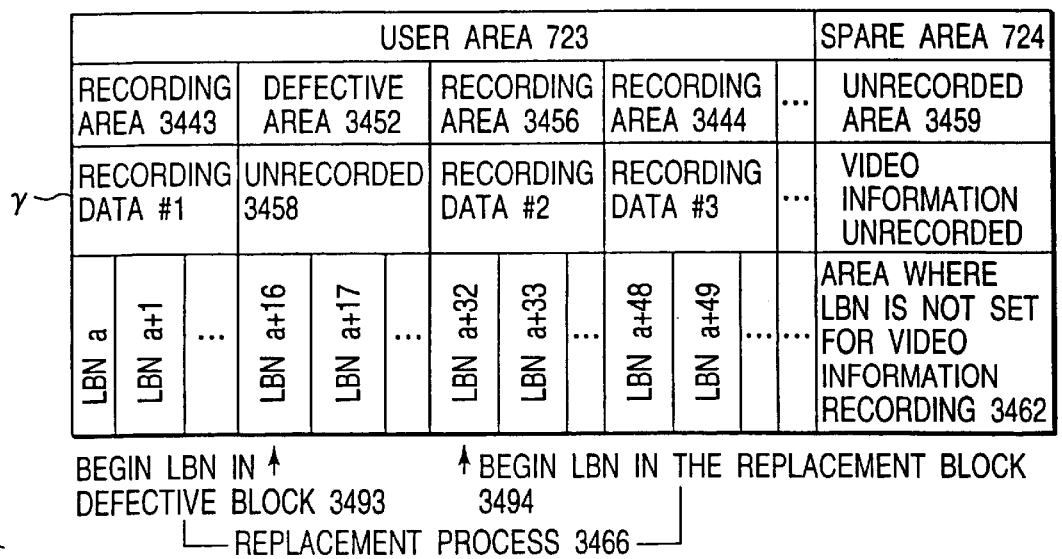
FIG. 39

THE CONTENTS OF CDA BOUNDARY POSITION INFORMATION AND THE PLACE RECORDED IN THE BOUNDARY POSITION INFORMATION IN LBN/UDF-CDAFix

EXPLANATORY DIAGRAM OF ANOTHER EMBODIMENT RELATED TO A RECORDING METHOD AVOIDING DEFECTIVE AREA ACCORDING TO THE PRESENT INVENTION

CONCEPTUAL MODEL OF RECORDING ROUTE SYSTEM TAKING INTO ACCOUNT COMMAND INTERFACE TO INFORMATION RECORDING AND REPRODUCING DEVICE

PROBLEM OF CONVENTIONAL WRITE COMMAND WITH INFORMATION RECORDING AND REPRODUCING DEVICE

| PC-SIDE MEMORY 112 | VIDEO INFORMATION STORED IN PC-SIDE MEMORY 3301 | STATE WHERE VIDEO INFORMATION HAS NOT BEEN INPUTTED IN PC MEMORY 3305 | |
|---|---|---|---|
| | ↓ WRITING (a, b-a) | | |
| INFORMATION RECORDING AND REPRODUCING DEVICE MEMORY 219 | EMPTY AREA TO WHICH NOTHING HAS NOT BEEN TRANSFERRED YET 3311 | EMPTY AREA TO WHICH NOTHING HAS NOT BEEN TRANSFERRED YET 3312 | EMPTY AREA TO WHICH NOTHING HAS NOT BEEN TRANSFERRED YET 3313 |
| RECORDING PLACE ON INFORMATION STORAGE MEDIUM (201) | UNRECORDED AREA 3323 | UNRECORDED AREA 3324 | UNRECORDED AREA 3325 |
| LBN VALUE | a | b | c |

FIG. 53A

DETAILED FLOWCHART RELATED TO THE RECORDING PROCEDURE
SHOWN IN FIG.ST02

RECEIVE AV FILE UNUSED AREA SIZE TO BE RECORDED ON INFORMATION STORAGE MEDIUM ⋯ SET UNRECORDED AREA COMMAND ST2-01

ACQUIRE INFORMATION ABOUT DEFECT DISTRIBUTION ON INFORMATION STORAGE MEDIUM ⋯ GET PERFORMANCE COMMAND ST2-02

ACQUIRE INFORMATION ABOUT ZONE BOUNDARY POSITION ON INFORMATION STORAGE MEDIUM ⋯ GET PERFORMANCE COMMAND ST2-03

ACQUIRE INFORMATION ABOUT RECORDING POSITIONS OF ALL THE FILES ALREADY RECORDED ON INFORMATION STORAGE MEDIUM ST2-04

SET CDA POSITION ON INFORMATION STORAGE MEDIUM FOR VIDEO INFORMATION RECORDING ST2-05

RECORD EXTENT POSITION INFORMATION ON INFORMATION STORAGE MEDIUM ON THE BASIS OF THE SET CDA POSITION INFORMATION ST2-06

UPDATE THE ALREADY RECORDED POSITION INFORMATION ON INFORMATION STORAGE MEDIUM ON THE BASIS OF THE EXTENT POSITION INFORMATION ST2-07

INFORM INFORMATION RECORDING AND REPRODUCING DEVICE (ODD) 3 SIDE OF EXTENT POSITION INFORMATION TO BE RECORDED SET IN ST2-06 ⋯ SEND PRESENT EXTENT ALLOCATION MAP COMMAND ST2-08

FIG. 56

DETAILED FLOWCHART RELATED TO THE RECORDING PROCEDURE SHOWN IN ST03

SEARCH AV FILE TO BE RECORDED ON INFORMATION STORAGE MEDIUM FOR UNUSED AREA START POSITION ··· MAKING USE OF INFORMATION LENGTH 3517 (FIG.44) ST3-01

RECORDING/REPRODUCING APPLICATION 1 SIDE ISSUES WRITE FILE COMMAND RELATED TO VIDEO INFORMATION ST3-02

DECLARE VIDEO INFORMATION RECORDING START BY SETTING AV WRITE START FLAG IN GET FREE SLOT_ID COMMAND, INSTRUCT ODD3 TO ISSUE SLOT_ID, AND RECEIVE SLOT_ID ISSUED FROM ODD3 ST3-03

ISSUE AV WRITE COMMAND TO ODD3 CONSECUTIVELY AND TRANSFER CONTINUOUSLY VIDEO INFORMATION TO BE RECORDED ON INFORMATION STORAGE MEDIUM ST3-04

ISSUE GET WRITE STATUS COMMAND FOR EACH CDA IN SUCH A MANNER THAT IT IS INSERTED INTO AV WRITE COMMAND ISSUED TO ODD3 AND CAUSE ODD3 TO REPORT THE RECORDING STATE ST3-05

JUDGE WHETHER MANY DEFECTS HAVE OCCURRED ON INFORMATION STORAGE MEDIUM AND BUFFER MEMORY 219 IN ODD3 IS ABOUT TO OVERFLOW ST3-06 — NO

YES

ISSUE DISCARD PRECEDING COMMAND COMMAND TO CANCEL PART OF ALREADY ISSUED AV WRITE COMMAND AND THEN ISSUE AV WRITE COMMAND AGAIN TO TRANSFER A SMALL AMOUNT OF VIDEO INFORMATION ST3-07

RETURN TO ST3-05 AND CARRY OUT REPEATEDLY THE PROCESS OF RECORDING VIDEO INFORMATION ST3-08

DECLARE VIDEO INFORMATION END BY SETTING AV WRITE END FLAG IN GET FREE SLOT_ID COMMAND AFTER RECEPTION OF CLOSE HANDLE COMMAND AND DISCARD EXISTING SLOT_ID ST3-09

FIG 57

DETAILED FLOWCHART RELATED TO THE RECORDING PROCEDURE SHOWN IN ST04

ODD3 SIDE RECORDS DEFECT INFORMATION FOUND IN THE PRESENT VIDEO INFORMATION RECORDING INTO TERTIARY DEFECT LIST 3414 (FIG.37) IN DMA AREA ON THE BASIS OF VIDEO INFORMATION RECORDING END DECLARATION BY THE SETTING OF AV WRITE END FLAG IN GET FREE SLOT_ID COMMAND ST4-01

CARRY OUT THE MANAGEMENT INFORMATION REWRITING PROCESS ON VIDEO-RECORDING VIDEO MANAGEMENT DATA FILE (RWVIDEO_CONTROL IFO FILE IN FIG.25) ST4-02

RECORDING/REPRODUCING APPLICATION 1 SIDE SETS SIZE OF UNUSED AREA TO BE LEFT IN AV FILE ··· SET UNRECORDED AREA COMMAND ST4-03

REWRITE EXTENT INFORMATION WRITTEN IN FILE ENTRY FOR AV FILE ON THE BASIS OF THE RESULT OF THE PRESENT VIDEO INFORMATION RECORDING AND THE RESULT OF THE SET UNRECORDED AREA COMMAND ST4-04

REWRITE INFORMATION LENGTH 3517 (FIG.44) INFORMATION WRITTEN IN FILE ENTRY FOR AV FILE ON THE BASIS OF THE RESULT OF THE PRESENT VIDEO INFORMATION RECORDING AND THE RESULT OF THE SET UNRECORDED AREA COMMAND ST4-05

REWRITE INFORMATION IN UNLOCATED SPACE TABLE 452 OR UNLOCATED SPACE BIT MAP 453 (FIGS.14 AND 15), UNRECORDED AREA INFORMATION ON UDF ST4-06

FIG. 58

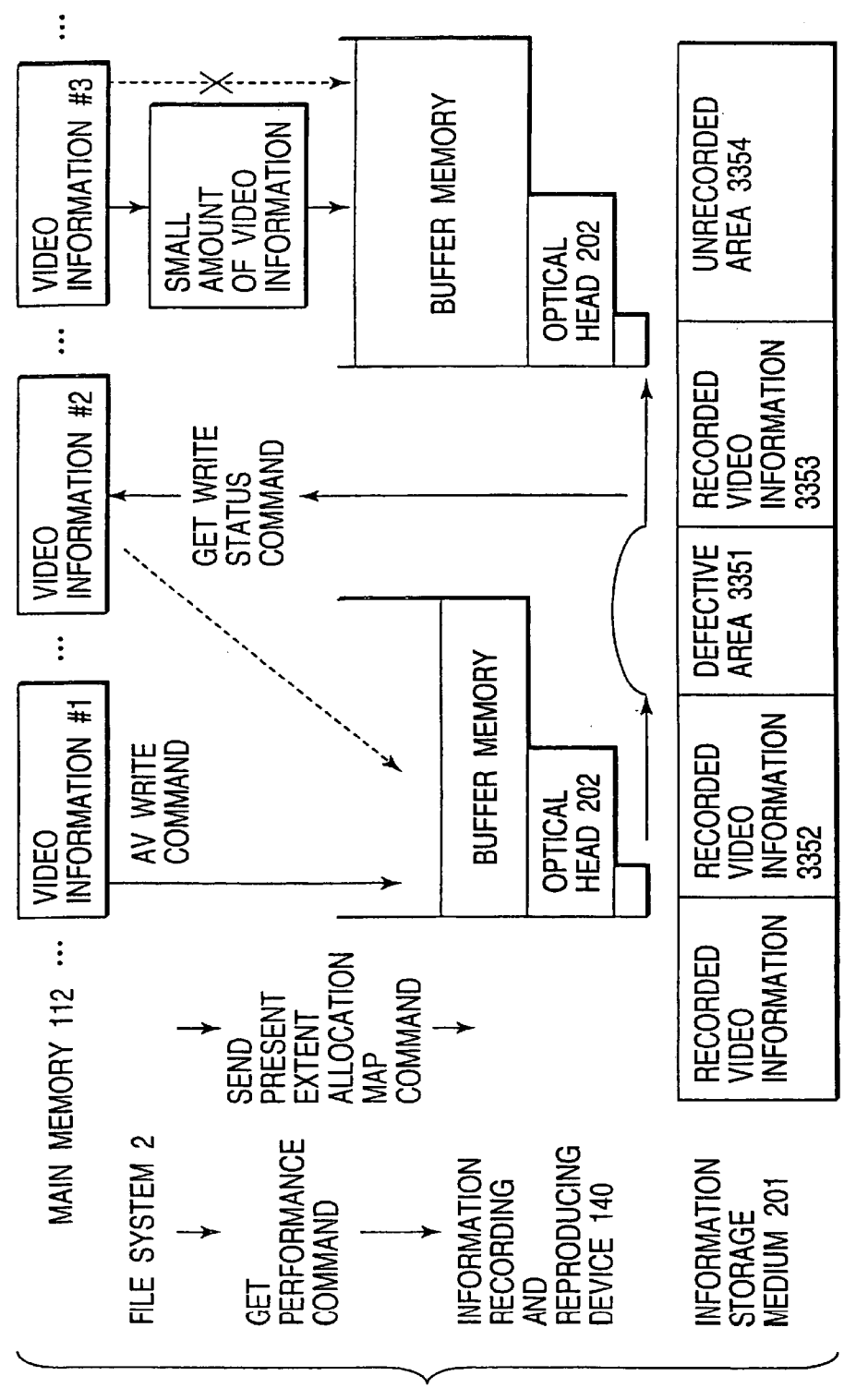
F I G. 61

METHOD OF RECORDING ONTO INFORMATION STORAGE MEDIUM
CORRESPONDING TO LBN/UDF AND LBN/XXX

A SERIES OF COMMANDS FIRST GIVEN TO INFORMATION RECORDING
AND REPRODUCING DEVICE
EXAMPLE OF DESCRIPTION: AV WRITE (START LBN, SIZE; RELEVANT CDA
END LBN, NEXT CDA START LBN, NEXT CDA
END LBN)

(1) SEND PRESENT EXTENT ALLOCATION MAP
(a, c-a;d, f-d;g···)
(2) AV WRITE (a, b-a;c-1;d, f-1)
(3) AV WRITE (b, c-b;c-1;d, f-1)
(4) GET WRITE STATUS (a, c-a)
(5) AV WRITE (d, e-d;f-1;g, h-1)
(6) AV WRITE (e, f-1;f-1;g, h-1)
(7) GET WRITE STATUS (d, f-d)
(8) AV WRITE (g, r-g;h-1;p, q-1)

| | | | | | | | |
|---|---|---|---|---|---|---|---|
| PC-SIDE MEMORY 112 | | VIDEO INFORMATION STORED IN PC-SIDE MEMORY 3377 | | | STATE WHERE VIDEO INFORMATION HAS NOT BEEN INPUTTED IN PC MEMORY 3391 | | |
| | | ↓ AV WRITE | | | | | |
| INFORMATION RECORDING AND REPRODUCING DEVICE MEMORY 219 | EMPTY AREA TO WHICH NOTHING HAS NOT BEEN TRANSFERRED YET 3381 | EMPTY AREA TO WHICH NOTHING HAS NOT BEEN TRANSFERRED YET 3382 | EMPTY AREA TO WHICH NOTHING HAS NOT BEEN TRANSFERRED YET 3383 | EMPTY AREA TO WHICH NOTHING HAS NOT BEEN TRANSFERRED YET 3384 | EMPTY AREA TO WHICH NOTHING HAS NOT BEEN TRANSFERRED YET 3385 | | |
| RECORDING INFORMATION ON INFORMATION STORAGE MEDIUM (201) | UNUSED STATE 3371 | UNUSED STATE 3372 | UNUSED STATE 3373 | UNUSED STATE 3374 | UNUSED STATE 3375 | | |
| CDA | CDA#1 | | CDA#2 | | CDA#3 | | |
| LBN VALUE | a | b | c | d | e | f | g |

(4) ADJUST THE AMOUNT OF VIDEO INFORMATION TRANSFERRED TO CDA #3 ACCORDING TO THE NUMBER OF DEFECTS IN CDA #1 OBTAINED FROM REPORT OF THE RESULT OF GET WRITE STATUS (a, c-a)
··· SEND COMMAND WHILE INFORMATION RECORDING AND REPRODUCING DEVICE IS CARRYING OUT THE RECORDING PROCESS IN CDA #2

(9) DISCARD PRECEDING COMMAND
{AV WRITE (g, r-g;h-1;p, q-1)}

(10) AV WRITE (g+j-1, r-g;h-1;p, q-1)

NODE: SHIFT THE RECORDING START POSITION "g → g+j-i" BACKWARD

FIG. 66

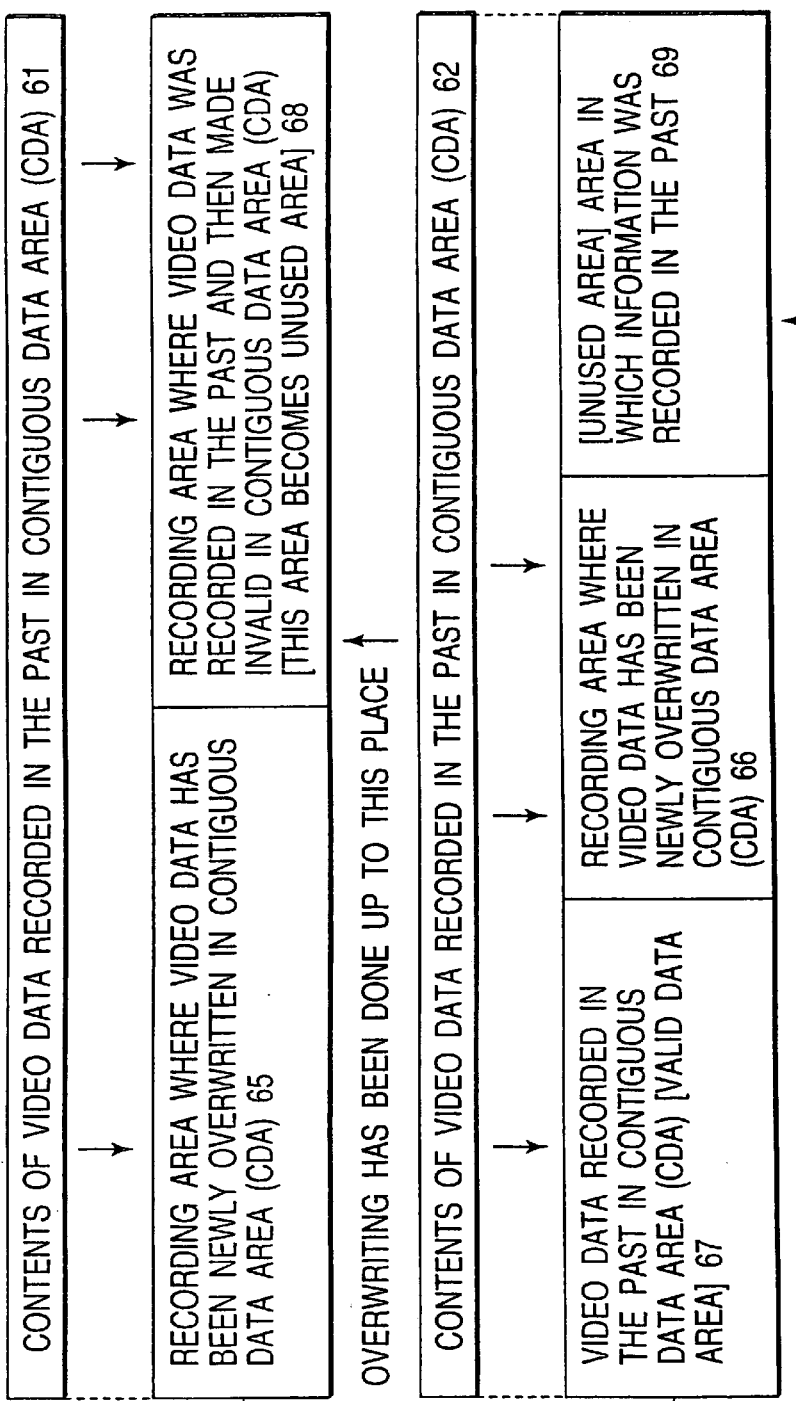
F I G. 74

FLOWCHART SHOWING THE PROCESS OF RECORDING INFORMATION

| DO INITIAL SETTING OF SIZE OF CAD #1 3106 ON RECORDING/REPRODUCING APPLICATION SIDE ST21 |
|---|
| INQUIRE RECOMMENDED [SPARE AREA SIZE]/[CD SIZE] VALUE FROM ODD (INFORMATION RECORDING AND REPRODUCING DEVICE) 3 ST22 |
| DO INITIAL SETTING OF AV EXTENT #1 3101 (SETTING OF SPARE AREA SIZE #1) ··· THE SETTING OF SPARE AREA SIZE #1 3111 IS DONE ON "RECORDING/REPRODUCING 1 SIDE" OR "FILE SYSTEM 2 SIDE" ST23 |
| TRANSFER VIDEO DATA 3125 TO ODD3 SIDE ON 1ST AV WRITE COMMAND ST24 |
| CARRY OUT SKIPPING PROCESS IN ODD3 WHEN FINDING DEFECTIVE AREA 138 IN RECORDING ONTO INFORMATION STORAGE MEDIUM ST25 |
| TRANSFER VIDEO DATA 3126 TO ODD3 SIDE ON 2ND AV WRITE COMMAND ··· KNOW THE LAST RECORDING IN AV EXTENT #1 3101 IN 2ND AV WRITE COMMAND (USING END FLAG OF CONTIGUOUS DATA AREA FLAG) ST26 |
| ORGANIZE INFORMATION IN THE LAST AV EXTENT #1 3103 ON FILE SYSTEM 2 SIDE AND STORE IT TEMPORARILY IN BUFFER MEMORY ON FILE SYSTEM 2 SIDE ST27 |
| DO INITIAL SETTING OF SIZE OF CDA #2 3102 ON RECORDING/REPRODUCING APPLICATION 1 SIDE ST28 |
| DO INITIAL SETTING OF SIZE OF AV EXTENT #2 3102 (SETTING SPARE AREA SIZE #2) ··· SET SPARE AREA SIZE #2 3112 ON "RECORDING/REPRODUCING APPLICATION 1 SIDE" OR "FILE SYSTEM 2 SIDE" ST29 |
| TRANSFER VIDEO DATA 3127 TO ODD3 SIDE ON 3RD AV WRITE COMMAND ST30 |
| CARRY OUT SKIPPING PROCESS IN ODD3 WHEN FINDING DEFECTIVE AREA 3139 IN RECORDING ONTO INFORMATION STORAGE MEDIUM ST31 |
| USER PRESSES VIDEO-RECORDING END BUTTON ST32 |
| DETERMINE UNUSED AREA SIZE 3136 ACCORDING TO CDA MINIMUM SIZE 11 PREDETERMINED ON RECORDING/REPRODUCING APPLICATION SIDE ST33 |

FIG. 77

REEXAMINE SIZE 3113 OF SPARE AREA #2 ACCORDING TO REAL DATA SIZE 3109 OF CDA #2 ST34

TRANSFER VIDEO DATA 3128 TO ODD3 SIDE ON 4TH AV WRITE COMMAND ··· AT THE SAME TIME, SECURE UNTRANSFERRED AREA IN LBN SPACE FROM UNUSED AREA INFORMATION (NUMBER OF BYTES RESERVE AND SPARE KEEP LENGTH) ··· KNOW THE LAST RECORDING IN AV EXTENT #2 3104 IN 4TH AV WRITE COMMAND (USING END FLAG OF CONTIGUOUS DATA AREA FLAG) ST35

ORGANIZE INFORMATION IN THE LAST AV EXTENT #2 3104 ON FILE SYSTEM 2 SIDE AND STORE IT TEMPORARILY IN BUFFER MEMORY ON FILE SYSTEM 2 SIDE ST36

WRITE ADDITIONALLY THE INFORMATION NECESSARY FOR THE DIRECTORY MANAGEMENT AREA OF FILE SYSTEM 2 ST37

WRITE ADDITIONALLY THE INFORMATION NECESSARY FOR MANAGEMENT AREA OF RECORDING/REPRODUCING APPLICATION 1 SIDE ST38

FIG. 78

FLOWCHART SHOWING THE PROCESS OR CREATING REPLACEMENT-ONLY FILE

- INSTALL INFORMATION STORAGE MEDIUM ON INFORMATION RECORDING AND REPRODUCING DEVICE ST41
- FILE SYSTEM 2 ISSUES COMMAND (GET SPACE AREA SPACE COMMAND) TO INFORMATION RECORDING AND REPRODUCING DEVICE 3 SIDE AND CAUSES THE LATTER TO DETERMINE THE EMPTY AREA SIZE IN SPARE AREA FROM DMA INFORMATION 663, 691 ON INFORMATION STORAGE MEDIUM ST53
- INFORMATION RECORDING AND REPRODUCING DEVICE 3 DETERMINES THE EMPTY AREA SIZE IN SPARE AREA FROM DMA INFORMATION 663, 691 ON INFORMATION STORAGE MEDIUM AND REPORTS THE RESULT TO FILE SYSTEM 2 SIDE ST54

SUFFICIENT EMPTY REPLACEMENT AREA LEFT IN SPARE AREA ON INFORMATION STORAGE MEDIUM? ST43 — YES / NO

REPLACEMENT-ONLY FILE 3501 ALREADY PRESENT IN USER AREA? ST55 (JUDGING PROCESS AT FILE SYSTEM) — NO / YES

INFORMATION RECORDING AND REPRODUCING DEVICE 3 SIDE MANAGES DEFECTS ON INFORMATION STORAGE MEDIUM AND FILE SYSTEM 2 SIDE INSTRUCTS INFORMATION RECORDING AND REPRODUCING DEVICE 3 SIDE TO RECORD DEFECT MANAGEMENT INFORMATION IN DMA AREAS 663, 691 ON INFORMATION STORAGE MEDIUM ST52 (PROCESS OF ISSUING SET DEFECT MANAGEMENT COMMAND)

AVAILABLE STORAGE CAPACITY SUFFICIENTLY LEFT IN EXISTING REPLACEMENT-ONLY FILE? ST56 (JUDGING PROCESS AT FILE SYSTEM) — NO / YES

FILE SYSTEM 2 SIDE DOES NOT CREATE NEW REPLACEMENT-ONLY FILE 3501 ST57

AVAILABLE STORAGE CAPACITY ENOUGH TO STORE REPLACEMENT-ONLY FILE LEFT ON INFORMATION STORAGE MEDIUM? ST556 (JUDGING PROCESS AT FILE SYSTEM) — YES / NO

ERROR PROCESS ST 558 (SUCH AS OUTPUTTING MESSAGE TO PROMPT USER TO REPLACE MEDIUM)

FILE SYSTEM 2 SIDE CREATES NEW REPLACEMENT-ONLY FILE 3501 AND RESISTER THE NEW FILE (FOR REPLACEMENT ONLY) ST58

FIG. 79

FLOWCHART SHOWING REPLACEMENT PROCESS USING REPLACEMENT-ONLY FILE

INSTALL INFORMATION STORAGE MEDIUM ON INFORMATION RECORDING AND REPRODUCING DEVICE ST41

FILE SYSTEM 2 ISSUES COMMAND (GET SPACE AREA SPACE COMMAND) TO INFORMATION RECORDING AND REPRODUCING DEVICE 3 SIDE AND CAUSES THE LATTER TO DETERMINE THE EMPTY AREA SIZE IN SPARE AREA FROM DMA INFORMATION 663, 691 ON INFORMATION STORAGE MEDIUM ST53

INFORMATION RECORDING AND REPRODUCING DEVICE 3 DETERMINES THE EMPTY AREA SIZE IN SPARE AREA FROM DMA INFORMATION 663, 691 ON INFORMATION STORAGE MEDIUM AND REPORTS THE RESULT TO FILE SYSTEM 2 SIDE ST54

SUFFICIENT EMPTY REPLACEMENT AREA LEFT IN SPARE AREA ON INFORMATION STORAGE MEDIUM? ST43

NO

FILE SYSTEM 2 INSTRUCTS INFORMATION RECORDING AND REPRODUCING DEVICE 3 TO RECORD COMPUTER INFORMATION (PC INFORMATION) ST59 (ISSUING WRITE COMMAND)

INFORMATION RECORDING AND REPRODUCING DEVICE 3 RECORDS PC INFORMATION IN THE PALCE ON INFORMATION STORAGE MEDIUM SPECIFIED BY FILE SYSTEM 2 AND, WHEN HAVING ENCOUNTERED DEFECTIVE ECC BLOCK, STORES TEMPORARILY 1) BEGIN LBN INFORMATION ON DEFECTIVE ECC BLOCK AND 2) INFORMATION TO BE RECORDED IN THE DEFECTIVE ECC BLOCK IN BUFFER MEMORY 219 OF INFORMATION RECORDING AND REPRODUCING DEVICE ST60

FILE SYSTEM 2 REQUEST DEFECT POSITION INFORMATION FROM INFORMATION RECORDING AND REPRODUCING DEVICE 3 AFTER A SERIES OF RECORDING PROCESSES ST61 (ISSUING GET DEFECT LIST COMMAND)

YES

INFORMATION RECORDING AND REPRODUCING DEVICE 3 SIDE MANAGES DEFECTS ON INFORMATION STORAGE MEDIUM AND FILE SYSTEM 2 SIDE INSTRUCTS INFORMATION RECORDING AND REPRODUCING DEVICE 3 SIDE TO RECORD DEFECT MANAGEMENT INFORMATION IN DMA AREAS 663, 691 ON INFORMATION STORAGE MEDIUM ST52 (PROCESS OF ISSUING SET DEFECT MANAGEMENT COMMAND)

INFORMATION RECORDING AND REPRODUCING DEVICE 3 INFORMS FILE SYSTEM OF (1) NUMBER OF DEFECTIVE ECC BLOCKS AND (2) BEGIN LBN INFORMATION ON EACH ECC BLOCK AS REPORT OF DEFECT INFORMATION ST62

EXPLANATORY DIAGRAM OF ANOTHER EMBODIMENT OF THE VIDEO INFORMATION RECORDING METHOD

| AV FILE 3620 ||||||||||||
|---|---|---|---|---|---|---|---|---|---|---|---|
| VOB #1 3616 | | | VOB #1 3617 | | | | VOB #2 3618 | | | | |
| AV Ad 0 | ... | AV Ad a-1 | AV Ad a | ... | AV Ad a+b-b-1 | | AV Ad a+c-b | ... | AV Ad a+c-b+g-f-1 | | |
| RECORDING AREA | UN-RECORDED | | RECORDING AREA | UN-RECORDED | UN-RECORDED | | RECORDING AREA | | UN-RECORDED AREA | | |
| RECORDING AREA EXTENT 3605 | DEFECTIVE AREA EXTENT 3609 | | RECORDING AREA EXTENT 3606 | UNUSED AREA EXTENT 3611 | UNUSED AREA EXTENT 3612 | | RECORDING AREA EXTENT 3607 | | UN-RECORDED AREA EXTENT 3613 | | |
| LBN h | ... | LBN h+a-1 | LBN h+a | ... | LBN h+b | ... | LBN h+c-1 | ... | LBN h+d-1 | LBN h+e | ... | LBN h+f | ... | LBN h+g-1 | LBN h+g | ... | LBN h+j-1 |
| PSN k | ... | PSN k+1-1 | PSN k+a | ... | PSN k+b | ... | PSN k+c-1 | ... | PSN k+d-1 | PSN k+e | ... | PSN k+f | ... | PSN k+g-1 | PSN k+g | ... | PSN k+j-1 |
| CDA #α 3601 |||||||| CDA #β 3602 ||||
| USER AREA 723 ||||||||||||

FILE ENTRY: AD (a,h: RECORDED), AD (b-a, h+a: DEFECTIVE), AD (d-c, h+c: UNUSED), AD (f-e, h+e: UNUSED), AD (g-f, h+f: RECORDED), AD (j-g, h+g: UNUSED) CONTENTS OF ALLOCATION DECRYPTION AD (EXTENT SIZE, EXTENT BEGIN POSITION: EXTENT ATTRIBUTE)

FIG. 82

```
[FILE BODY] {
<ALLOCATION DESCRIPTOR> (EXTENT LENGTH IS AN INTEGRAL MULTIPLE
OF LOGICAL SECTOR) 0 + <ALLOCATION DESCRIPTOR> 0+1
}
[FILE TAIL] {
<ALLOCATION DESCRIPTOR> (UNRECORDED SECTION AND ALLOCATION) 0+
}
```

FIG. 87

INFORMATION RECORDING DEVICE AND A METHOD OF RECORDING INFORMATION BY SETTING THE RECORDING AREA BASED ON CONTIGUOUS DATA AREA

CROSS-REFERENCE TO RELATED APPLICATIONS

This application is a Divisional Application of Ser. No. 09/666,460 filed on Sep. 21, 2000 which is a Continuation of application No. PCT/JP99/05096 filed Sep. 20, 1999 which was not published in English.

This application is based upon and claims the benefit of priority from the prior Japanese Patent Applications No. 10-265270, filed Sep. 18, 1998; No. 10-292819, filed Sep. 30, 1998; No. 10-292821, filed Sep. 30, 1998; No. 10-292823, filed Sep. 30, 1998; No. 10-292826, filed Sep. 30, 1998; and No. 10-292827, filed Sep. 30, 1998, the entire contents of which are incorporated herein by reference.

BACKGROUND OF THE INVENTION

This invention relates to an information recording method, an information recording device, an information reproducing device, and an information storage medium which are suitable for recording various types of information, including video information and/or audio information, and further computer data, onto a recording medium.

In the information recording method and device, various types of information are recorded continuously onto an information storage medium without logical intermission. In the information storage medium, the recorded information includes information about a data structure that enables the recorded information to be managed effectively and reproduced continuously.

There are laser disks (LDS) and digital video (DVD) disks used as information storage mediums on which video information or audio information has been recorded. The information storage mediums, however, are only for playback use and have no defective area thereon.

There are DVD-RAM disks used as mediums for storing computer information. This type of medium enables additional recording. In addition, a method of replacing a defective area occurring on the information storage medium has been established.

One known method of replacing a defective area occurring in recording computer information on a RAM disk is a linear replacement process.

This process is a method of, when a defect has occurred, securing a replacement area in a spare area secured in another area physically separate from a user area and setting a logical block number (LBN) in the replacement area. In this method, when a defective area has occurred in the middle of recording or reproducing information onto or from a disk, the optical head has to record the data in the spare area in a physically separate position and thereafter return to the position where it interrupted the recording and resume recording the subsequent data. This results in the frequent movement of the optical head.

In the computer system, the control hierarchy is divided into a video recording and reproducing application software (hereinafter, abbreviated as recording/reproducing application) layer, a file system layer, and an optical disk drive (ODD) layer in the section for processing information and recording and reproducing information.

Commands acting as interfaces have been defined between the layers. Addresses dealt with at each layer differ from one level of hierarchy to another. Specifically, the recording/reproducing application layer deals with audio and video addresses (commonly known as AV addresses), the file system layer deals with logical sector numbers (LSN) or logical block numbers (LBN) on the basis of AV addresses, and the optical disk drive layer deals with physical sector numbers (PSN) on the basis of logical sector numbers (LSN) or logical block numbers (LBN).

Now, consider a case where video information or audio information according to the recording format of a DVD video disk is recorded on a DVD-RAM disk. As described above, when the linear replacement process is performed as a method of processing (replacing) a defect, each time a defective ECC block is encountered in recording, the head has to move back and fourth between the user area explained later and the spare area.

Such frequent access of the optical head in recording permits the amount of video information stored in the buffer memory to exceed the memory capacity because of the transfer speed and data amount of the input data, the access time in recording, the buffer memory capacity, and others, which makes continuous recording impossible.

Although it is hoped that video information to be recorded is managed in the video recording and reproducing application software layer without the burden of managing defects on the information storage medium, if many defective areas have occurred on the information storage medium, a conventional method permits the influence of defects in the information storage medium to extend even to the video recording and reproducing application software layer, which makes stable video information management difficult.

Furthermore, in the case of recordable and reproducible disks, there has been a desire that they should be used for not only AV data but also various types of information recording.

(1) It is, accordingly, an object of the present invention to provide an information recording method, an information recording device, an information reproducing device, and an information storage medium which have specific recording units set therein and enable environmental setting to achieve stable video information management (specifically, a video information recording, reproducing, and editing method in a system) even if a defective area or another data area exists in the specific recording units. According to the present invention, there are also provided an information recording device and an information reproducing device which have a most suitable system for realizing the above environment.

(2) Another object of the present invention is to provide an information recording method, an information recording device, an information reproducing device, and an information storage medium which improve the method of managing AV file identification information to make it easier to identify and manage different types of data.

(3) Another object of the present invention is to provide an information recording method, an information recording device, an information reproducing device, and an information storage medium which maintain the boundary between specific data block units (for example, ECC units) using unused extents, thereby facilitating the error correction management of data and the additional recording process and management of subsequent data, when AV data is recorded.

(4) Another object of the present invention is to provide an information recording method, an information recording device, an information reproducing device, and an information storage medium which not only search in advance for a place where AV data is to be recorded to prevent data from being recorded in another data area or a defective area, but also have the function of securing a recording area to prevent errors in recording.

(5) Another object of the present invention is to provide an information recording method, an information recording device, an information reproducing device, and an information storage medium which always write data in, for example, error correction codes (ECC) block units in recording data in such a manner that they perform reading control at the beginning of writing, search for the recorded state of the error correction codes, and write data while maintaining the block units of the error correction codes, thereby improving the data writing efficiency and assuring the reliability of the error correcting process of data.

(6) Another object of the present invention is to provide an information recording method, an information recording device, an information reproducing device, and an information storage medium which are additionally provided with a file partial delete command, thereby enabling editing to be done more easily.

BRIEF SUMMARY OF THE INVENTION

The foregoing objects are accomplished as follows:

(A) According to the present invention, there is provided an information recording method or apparatus which uses a head for recording information onto at least an information storage medium, a head moving mechanism for moving the head to the information storage medium, and a control section for controlling the moving position of the head by controlling the head moving mechanism to record information onto the information storage medium, the information recording method or apparatus characterized by defining a file unit as a first unit to record information onto the information storage medium and further defining a contiguous data area unit serving as a continuous recording area as a second unit to decrease the frequency of accessing of the optical head and thereby enable apparently continuous recording on the information storage medium, doing recording in the contiguous data area units and organizing a collection of contiguous data area units into the file unit, and providing an information recording place in such a manner that the contiguous data area unit is so set that it extends over the recording area of another file already recorded on the information storage medium and a defective area on the information storage medium. There is further provided a recording medium with such a recording place.

(B) According to the present invention, there is provided an information recording method or apparatus characterized in that file entry information is recorded in the data area on the information recording medium and identification information about a file to be entered is recorded in the file entry information. There is further provided a storage medium on which such information has been recorded.

(C) According to the present invention, there is provided an information recording method or apparatus characterized by having a first recording unit to be recorded on the information storage medium and a second recording unit larger than the first recording unit, defining an unused area at the end of the recording area in the second recording units, and recording information using the unused area in the next recording. Alternatively, there is provided a storage medium on which information has been recorded in such a manner.

(D) According to the present invention, there is provided an information recording method or apparatus characterized by searching for an unused area on the information storage medium, creating and allocating position information in extent units serving as units of continuous recording to the searched area, and recording the extent position information in a management area. There is further provided a storage medium on which such information has been recorded.

(E) According to the present invention, there is provided an information recording method or apparatus characterized by recording information in error correction code units and, when the end of the recording information has extended to the middle of an error correction code unit, supplementing the deficiency in the recording information with padding to keep the error correction code unit. There is further provided a storage medium on which such data has been recorded.

(F) According to the present invention, there is provided an information recording method or apparatus characterized by reading the error correction code unit in the already written recording information at the beginning of writing and, when the end of the recording information has extended to the middle of an error correction code unit between an unused area and an already used area, writing additional data to keep the error correction code unit and thereafter writing data in error correction code units. There is further provided a storage medium on which such data has been recorded.

(G) According to the present invention, there is provided an information recording method characterized by comprising a first recording process layer for controlling an information recording and reproducing device that records information onto an information storage medium, a second recording layer which is a file system part that controls locations in which information is to be recorded and which controls the first recording process layer, and a third recording process layer acting as an application layer that gives a command to the second recording process layer, in such a manner that these layers are constructed so as to form control data groups for recording or reproducing information in information recording file units onto or from the information recording medium, and by having a command to cause the third recording process layer to instruct the second recording process layer to delete only part of the file unit. Alternatively, there is provided an apparatus characterized by comprising the above layers. Still alternatively, there is provided a storage medium which is accessed in such a manner.

Also provided is an information storage medium having a lead-in area; a data area; and a lead-out area, wherein the information storage medium is configured to store control information an AV file and file management information for managing at least the AV file and for including file entry information in the data area. AV data is stored in the AV file the file management information manages a position of the AV file, the file entry information includes a file type of the AV file and an allocation descriptor indicating a position of an extent, an application layer sets an information processing method with respect to the AV file, a file system layer and a disk drive or a physical layer are defined, the application layer uses an AV address as address information, the file system layer uses a logical block number and a logical sector number as address information, the disk drive layer or the physical layer uses a physical sector number as address information, the logical block number and the logical sector number are associated with each other, and the logical sector number and the physical sector number are associated with each other, the AV data in the AV file is distributed physically in each of extents, the distributed AV data is managed using the AV address in a contiguous order, the start address of the AV file is set as "0", the control information manages a video object including the AV data by using the AV address, and the control information includes a plurality of program chain information which control a reproducing order of the video object, the plurality of program chain information include a plurality of cell information defined by a plurality of cells each of the cells represents a play back period of the video object through each of the cell information and the difference cells belonging to the difference program chains, respectively, partially refer to the portion of the video object representing the playback period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is an explanatory diagram of the layout of the general contents of record on in a DVD-RAM disk;

FIG. 3 is an explanatory diagram showing the structure of the lead-in area on a DVD-RAM disk;

FIG. 4 is an explanatory diagram showing the structure of the lead-out area on a DVD-RAM disk;

FIG. 5 is an explanatory diagram showing the relationship between physical sector numbers and logical sector numbers;

FIG. 6 is an explanatory diagram showing the signal structure in a sector to be recorded in a data area;

FIG. 7 is an explanatory diagram showing the recording unit for information to be recorded in a data area;

FIG. 8 is an explanatory diagram showing the relationship between zones and groups;

FIG. 9 is a diagram to help explain a method of setting logical sectors on a DVD-RAM disk;

FIG. 13 is a diagram to help explain the operation of processing defects at the information recording and reproducing section;

FIG. 14 shows an example of a file system recorded on an information storage medium according to UDF;

FIG. 15 shows the remaining part of FIG. 14;

FIG. 16 roughly shows the basic relationship between the structure of the hierarchical file system and the contents of information recorded on the information storage medium;

FIG. 17 shows an example of the contents of a long allocation descriptor;

FIG. 19 is an explanatory diagram of the contents of an unlocated space entry;

FIGS. 20A and 20B are explanatory diagrams showing part of the contents of file entry;

FIG. 21 is an explanatory diagram showing part of the contents of a file identification descriptor;

FIG. 30 is a diagram to help explain a method of handling data when part of the AV file is deleted in a case where the unused area in the AV file is managed on the video recording/reproducing application side in each embodiment of the present invention;

FIG. 31 is an explanatory diagram showing the data structure in the video object control information;

FIG. 32 is a conceptual diagram of a recording system to help explain the continuity of recording signals;

FIG. 33 is a diagram to help explain the state of the amount of information stored in the semiconductor memory when the frequency of access is the highest in the recording system;

FIG. 34 is a diagram to help explain the state of the amount of information stored in the semiconductor memory when there is a balance between the video information recording time and the access time in the recording system;

FIG. 39 is an explanatory diagram for comparison between skipping replacement and linear replacement in management based on the defect management information of FIG. 38;

FIGS. 53A, 53B, and 53C are diagrams to help explain the problems of write commands;

FIG. 56 shows the details of step ST02 of FIG. 54;

FIG. 57 shows the details of step ST03 of FIG. 54;

FIG. 58 shows the details of step ST04 of FIG. 54;

FIG. 61 is a conceptual diagram to help explain a method of recording video information continuously according to the present invention;

FIG. 62 is an explanatory diagram of commands used in recording information onto an information storage medium according to an embodiment of the present invention;

FIG. 63 is a diagram to help explain a method of recording information onto an information storage medium according to an embodiment of the present invention;

FIG. 66 is an explanatory diagram of commands used in recording information onto an information storage medium according to an embodiment of the present invention;

FIG. 74 is a diagram to help explain a case where new information is recorded in such a manner that it is overwritten as far as the middle of the existing contiguous data area in the information recording method according to the present invention;

FIG. 77 is a diagram to help explain the process of recording video data in the embodiment of the information recording method according to the present invention;

FIG. 78 is a diagram to help explain the process of recording video data in the embodiment of the information recording method according to the present invention;

FIG. 79 is a flowchart to help explain the process of creating a replacement-only file in the information recording method according to the present invention;

FIG. 80 is a flowchart to help explain a replacing process using a replacement-only file in the information recording method according to the present invention;

FIG. 82 shows still another embodiment of the information recording method according to the present invention;

FIG. 87 is an explanatory diagram showing an example of description of the file structure using extents in a file descriptive statement related to the information recording method according to the present invention.

DETAILED DESCRIPTION OF THE INVENTION

Hereinafter, referring to the accompanying drawings, embodiments of the present invention will be explained.

Table 1 and Table 2 shown at the end of the specification list not only the functions necessary in recording audio and video (hereinafter, abbreviated as AV) information onto an information storage medium but also the expectable effects unique to the present invention.

Table 3 shows the relationship between the application, file system, and optical disk drive classified in Table 1 and Table 2. The optical disk drive is abbreviated as the ODD (Optical Disk Drive). The ODD in Table 3 is the same as the information recording and reproducing device 140 in, for example, a personal computer (abbreviated as PC) system explained later. The programs of the file system and video recording and reproducing application software (abbreviated as recording/reproducing application) are generally stored in the hard disk drive (abbreviated as HDD) 121 in, for example, the PC system explained later. The file system is transferred to a main memory 112 at the time of start-up of a personal computer (PC) system 110. When the video recording and reproducing application software program is used, the recording/reproducing application program is transferred to the main memory 112.

First, the PC system will be explained by reference to FIG. 1. The reason is that the objects of the present invention are realized using all or part of the elements constituting the personal computer.

Figure 1:
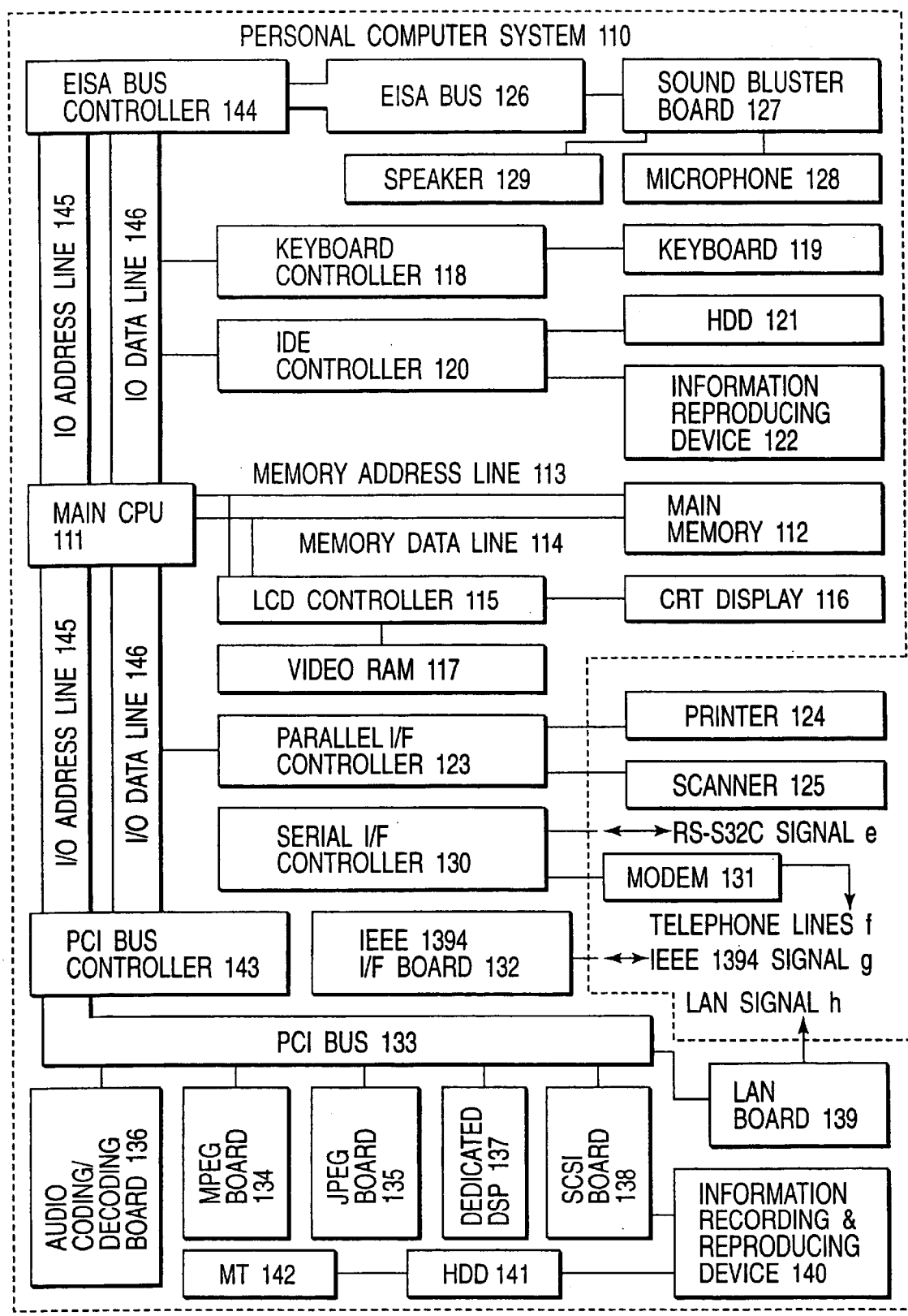
FIG. 1 is an explanatory diagram showing the configuration of a personal computer.

FIG. 1 shows the configuration of the PC system using an information reproducing device.

5A . . . Explanation of the internal structure of the personal computer 5A-1 . . . Explanation of the data/address lines connected directly to the main CPU A main CPU 111 in the personal computer 110 includes memory data lines 114 that provide direct input and output of information with the main memory 112 and memory address lines 113 that specify the address for a piece of information recorded in the main memory 112. According to the program loaded into the main memory 112, the CPU 111 executes processes. Furthermore, the main CPU 111 transfers information via input/output (I/O) data lines 146 to various types of controllers. By address specification via I/O address lines 145, the main CPU 111 specifies not only an information transfer destination controller but also the contents of the information to be transferred.

5A-2 . . . Explanation of cathode-ray yube (CRT) display control and keyboard control A liquid-crystal device (LCD) controller 115 that performs display content control of a CRT display 116 exchanges information with the main CPU 111 via the memory data lines 114. There is further provided a video RAM 117 as a memory dedicated to the CRT display 116 to realize high resolution and a wide variety of colors in representation. An LCD controller 115 is capable of taking in the information directly from the main memory 112 via the memory data lines 114 and displaying the information on the CRT display 116. The numeral keypad information inputted from a keyboard 119 is converted by a keyboard controller 118. The converted information is inputted to the main CPU 111 via I/O data lines 146.

5A-3 . . . Explanation of a built-in hard disk drive (HDD)/the control system of the information reproducing device An IDE interface is often used in an optical information reproducing device 122 or in an HDD 121 built in the personal computer 110 or a CD-ROM drive/DVD-ROM drive. The playback information from the HDD 121 or information reproducing device 122 or the recording information to the HDD 121 is transferred to the 110 data lines 146 via an IDE controller 120.

When the HDD 121 is used as a boot disk, the main CPU 111 accesses the HDD 121 at the start-up of the personal computer system 110 and transfers the necessary information from the HDD 121 to the main memory 112.

6A-4 . . . Explanation of a serial/parallel interface (I/F) with the outside world Serial lines and parallel lines are provided for information transfer with external units for the personal computer system 110.

A parallel I/F controller 123, represented by "CENTRO", that controls the parallel lines is used when, for example, a printer 124 or a scanner 125 are driven directly without using a network. The information transferred from the scanner 125 is transferred to the I/O data lines 146 via the parallel I/F controller 123. The information transferred over the I/O data lines 146 is transferred to the printer 124 via the parallel I/F controller 123.

For example, when the information in a video RAM 117 displayed on the CRT display 116 or a specific piece of information in the main memory 112 is printed out, these pieces of information are transferred to the I/O data lines 146 via the main CPU 111 and thereafter are protocol-converted by the parallel I/F controller 123. The converted pieces of information are outputted to the printer 124.

As for serial information outputted to the outside world, the information transferred over the I/O data lines 146 is protocol-converted by a serial I/F controller 130, which then outputs the resulting signal as, for example, RS-232C signal e.

5A-5 . . . Explanation of bus lines for expanding functions

The personal computer system 110 has various types of bus lines for expanding functions. A desktop personal computer often has a PCI bus 133 and an EISA bus 126 as bus lines. Each bus line is connected via a PCI bus controller 143 or an EISA bus controller 144 to the I/O data lines 146 and I/O address lines 145. Various boards connected to the bus lines are divided into boards only for EISA bus 126 and boards only for PCI bus 133. Since the PCI bus 133 is relatively suitable for high-speed transfer, the number of boards connected to the PCI bus 133 is larger in the figure. However, use of boards only for EISA bus 126 enables a LAN board 139 or an SCSI board 138 to be connected to the EISA bus 126.

5A-6 . . . Explanation of a schematic function of each the boards connected to bus lines (Sound bluster board 127) . . . An audio signal inputted from a microphone 128 is converted by a sound bluster board 127 into digital information. The digital information passes through the EISA bus 126 and 110 data lines 146 and is inputted to the main memory 112, HDD 121, and information recording and reproducing device 140, which process the information. When wanting to listen to music or speech, the user specifies the file name recorded in the HDD 121, an HDD 141, the information reproducing device 122, or the information recording and reproducing device 140. Then, the digital sound source signal is transferred via the I/O data lines 146 and EISA bus 126 to the sound bluster board 127, which converts the signal into an analog signal and outputs the resulting signal at a speaker 129.

(Dedicated DSP 137) . . . When a special process needs to be executed at high speed, a DSP 137 board only for the process can be connected to bus lines.

(SCSI interface) . . . A SCSI interface is frequently used for the input and output of information with an external storage device. The SCSI board 138 performs protocol conversion or transfer information format conversion in order to transfer the SCSI format information inputted and outputted from and to an external storage device, such as an information backup MT (magnetic tape) 142, an external stand-alone HDD 141, or the information recording and reproducing device 140, to the PCI bus 133 or EISA bus 126.

(Board only for information compression and expansion) . . . Multimedia information, including sound, still pictures, and moving pictures, is subjected to information compression. The compressed information is recorded in the HDDs 121, 141, and information recording and reproducing device 140 (information reproducing device 122). The information recorded in the HDDs 121, 141, information recording reproducing device 122 is expanded. The expanded information and reproducing device 140, and information is displayed on the CRT display 116 or is used to drive the speaker 129. In addition, the audio signal inputted from the microphone 128 is subjected to information compression. The compressed information is recorded in the HDDs 121, 141, or information recording and reproducing device 140.

Various types of dedicated boards are responsible for the function of compressing and expanding information. An audio coding/decoding board 136 compresses and expands music and speech signals. An MPEG board 134 compresses and expands moving pictures (video pictures). A JPEG board 135 compresses and expands still pictures.

5B . . . Explanation of connection of the personal computer with an external network 5B-1 . . . Explanation of network connection using telephone lines When the information needs to be transferred via a telephone line f to the outside world, a modem 131 is used. Specifically, to connect to the desired called party by telephone, an NCU (Network Control Unit) (not shown) transmits the called-party's telephone number to the telephone exchange via the telephone line f. After the telephone line has been connected, the serial I/F controller 130 causes transfer information format conversion and protocol conversion of the information on the I/O data lines 146. The resulting digital signal, or RS-232C signal, is converted by the modem 131 into an analog signal, which is transferred to the telephone line f.

5B-2 . . . Explanation of network connection using IEEE 1394

When multimedia information, including sound, still pictures, and moving pictures, is transferred to an external device (not shown), the IEEE 1394 interface is suitable for this purpose.

If the necessary information about moving pictures or sound cannot be sent in a specific period of time, the movement of the picture will be awkward or the sound will break off. To solve the problem, IEEE 1394 has employed an isochronous transfer method where data transfer is completed at intervals of 125 $\mu$s. In IEEE 1394, although the isochronous transfer is allowed to mix with normal asynchronous transfer, the upper limit of the asynchronous transfer time in one cycle is a maximum of 63.5 $\mu$s. The reason for this is that, if the asynchronous transfer time were too long, isochronous transfer could not be guaranteed. In IEEE 1394, SCSI commands (instruction set) can be used as they are.

An IEEE 1394 I/F board 132 subjects the information transmitted over the PCI bus 133 to information format conversion for isochronous transfer, protocol conversion, automatic setting in topology, such as setting nodes, and other processes.

As described above, the IEEE 1394 I/F board 132 not only transfers the information in the personal computer system 110 as an IEEE 1394 signal g to the outside world but also converts the IEEE 1394 signal g sent from the outside world and transfers the resulting signal to the PCI bus 133.

5B-3 . . . Explanation of Network Connection using LAN

In local area information communication in a specific area, such as a company, a government office, or a school, LAN signals are inputted and outputted using LAN cables (not shown).

Communication protocols using LANs include TCP/TP and NetBEUI. Each type of protocol has its own data packet structure (or information format structure). The LAN board 139 causes the information format conversion of the information transferred over the PCI bus 133 and carries out the procedure process of communication with the outside world according to each type of protocol.

As an example, explanation will be given about the procedure for a case where a specific piece of file information recorded in the HDD 121 is converted into a LAN signal h and the LAN signal is transferred to an external personal computer, EWS, or a network server (not shown) and about the information transfer route. Under the control of the IDE controller 120, the file directory recorded in the HDD 121 is outputted. The main CPU 111 records the resulting file list into the main memory 112 and displays the same list on the CRT display 116. When the user enters the file name the user wants to transfer from the keyboard 119, its contents are recognized by the main CPU 111 via the keyboard controller 118. When the main CPU 111 informs the IDE controller 120 of the file name to be transferred, the HDD judges the information recorded location therein and accesses the location. Then, the HDD transfers the playback information via the IDE controller 120 to the I/O data lines 146. After the file information has been inputted from the I/O data lines 146 to the PCI bus controller 143, the file information is transferred via the PCI bus 133 to the LAN board 139. After the LAN board 139 has established a session with the transfer destination through a series of communication procedures, it takes in the file information from the PCI bus 133, converts the information into pieces of information with a data packet structure, and then transfers the resulting signals as LAN signals h to the outside world.

5C . . . Explanation of information transfer from the information reproducing device or information recording and reproducing device (optical disk device)

5C-1 . . . Explanation of standard interface and information transfer route

When the information reproducing device 122, a playback-only optical disk, such as a CD-ROM or a DVD-ROM, or the information recording and reproducing device, a recordable and reproducible optical disk, such as a DVD-RAM, a PD, or an MD, is incorporated into the personal computer 110, IDE, SCSI, and IEEE 1394 are available as standard interfaces.

In general, the PCI bus controller 143 or the EISA bus controller 144 has DMA therein. Control of DMA enables information to be transferred directly between individual blocks without the intervention of the main CPU 111.

For example, when the information in the information recording and reproducing device 140 is transferred to the MPEG board 134, the main CPU 111 only gives a transfer instruction to the PCI bus controller 143 and leaves the information transfer management to the DMA in the PCI bus controller. As a result, in parallel with actual information transfer, the main CPU can execute another process without bothering with the information transfer process.

Similarly, when the information recorded in the information reproducing device 122 is transferred to the HDD 141, the main CPU 111 only gives a transfer instruction to the PCI bus controller 143 or IDE controller 120 and leaves the remaining information transfer management to the defect management area (DMA) in the PCI bus controller 143 or the DMA in the IDE controller 120.

5C-2 . . . Explanation of the function of authentication

Although the DMA in the PCI bus controller 143, the DMA in the EISA bus controller 144, or the DMA in the IDE controller 120 manages the information transfer process related to the information recording and reproducing device 140 or information reproducing device 122 as described above, the authentication function section of the information recording and reproducing device 140 or information reproducing device 122 executes actual transfer processes.

In a DVD system, such as a DVD video, DVD-ROM, or DVD-R, video and audio bit streams are recorded in the MPEG-2 program stream format. The audio streams, video streams, sub-picture streams, private streams, and others are recorded in a mixed manner. In reproducing the information, the information recording and reproducing device 140 separates and extracts the audio streams, video streams, sub-picture streams, private streams, and others from a program stream and transfers the extracted streams via the PCI bus 133 directly to the audio coding/decoding board 136, MPEG board 134, or JPEG board 135 without the intervention of the main CPU 111.

Similarly, the information reproducing device 122 separates and extracts various types of stream information from the reproduced program stream and transfers each piece of stream information via the I/O data lines 146 and PCI bus 133 directly (without the intervention of the main CPU 111) to the audio coding/decoding board 136, MPEG board 134, or JPEG board 135.

Each of the audio coding/decoding board 136, MPEG board 134, and JPEG board 135 includes the authentication function as the information recording and reproducing device 140 and information reproducing device 122 do. Before information transfer, the work of authentication is done via the PCI bus 133(and the I/O data lines 146) between the information recording and reproducing device 140 and information reproducing device 122 and the audio coding/decoding board 136, MPEG board 134, and JPEG board 135. After the mutual authentication has been completed, the video stream information reproduced at the information recording and reproducing device 140 or information reproducing device 122 is transferred only to the MPEG board 134. Similarly, the audio stream information is transferred only to the audio coding/decoding board 136. The still picture stream is sent to the JPEG board 135 and the private stream and text information are sent to the main CPU 111.

Table 4 shows the classification of embodiments of the present invention.

There are nine embodiments of the present invention which realize the functions (effects) needed in recording AV information shown in Table 1 and Table 2.

Symbols used to distinguish between the embodiments include XX, XX-PS, LBN/ODD, LBN/ODD-PS, LBN/UDF, LBN/UDF-PS, LBN/UDF-CDAFi, LBN/XXX, and LBN/XXX-PS. In Table 4, the characteristic function of each embodiment is summarized.

The leftmost column lists a case where logical block numbers (LBN) are not set for a defective location and a spare area and a case where logical block numbers are set for the latter. When logical block numbers are not set for a defective location and a spare area, the defect management information is written in the defect management information area (DMA).

The top row lists a case where an extra spare area is not secured beforehand in creating a contiguous data area (CDA) and a case where an extra spare area is secured. The rightmost column lists a management location and management method of an unused area in an AV file.

Table 5 lists the effects produced when the individual embodiments are used.

Before explanation of concrete embodiments of the present invention, an embodiment where a DVD-RAM disk is used as an information storage medium and a universal disk format (UDF) is used as a file system will be explained.

First, a DVD-RAM disk will be explained before explanation of concrete embodiments of the present invention.

FIG. 2 is a diagram to help explain the layout of the schematic recorded contents of a DVD-RAM disk. The lead-in area 607 on the disk inner edge side is composed of an embossed data zone 611 where the optical reflecting surface is uneven, a mirror zone 612 where the surface is a flat mirror, and a rewritable data zone 613 where information can be rewritten. The embossed data zone 611 includes a reference signal zone 653 representing a reference signal and a control data zone 655 as shown in The mirror zone includes a connection zone 657.

The rewritable data zone 613 includes a disk test zone 659, a drive test zone 660, a disk identification zone 662 with the disk ID (identifier), and a defect management area (DMA1 and DMA2) 663.

FIG. 4 shows a lead-out area 609 on the disk outer edge side. The lead-out area 609 is composed of a rewritable data zone 645 including a defect management area (DMA3 and DMA4) 691, a disk identification zone 692 with the disk ID (identifier), a drive test zone 694, and a disk test zone 695.

The data area 608 between the lead-in area 607 and lead-out area 609 is divided into 24 tree-ring-like zone (00) 620 to zone (23) 643. When the disk is rotated, each zone has a constant rotational speed. The rotational speed, however, differs from zone to zone. In addition, the number of sectors constituting each zone differs from one zone to another. Specifically, zone (00) 620 and others on the disk inner edge side are faster in the rotational speed and smaller in the number of sectors. On the other hand, zone (23) 643 and others on the disk outer edge side are slower in the rotational speed and larger in the number of sectors. Such a layout realizes high-speed access as seen in the rotation with a constant angular velocity (CAV) in each zone. From the viewpoint of the zones as a whole, such high-density recording by rotation with a constant linear velocity (CLV) is realized.

FIGS. 3 and 4 are diagrams to help explain the details of the lead-in area 607 and lead-out area 609 in the layout of FIG. 2.

In the control data zone 655 of the embossed data zone 611, the following have been recorded: a book type and part version 671 indicating the type of DVD standards applied (e.g., DVD-ROM, DVD-RAM, or DVD-R) and a part version), a disk size and minimum read-out rate 672 indicating the disk size and minimum read-out rate, a disk structure 673 indicating a disk structure, such as a single-layer ROM disk, a single-layer RAM disk, or a two-layer ROM disk, recording density 674 indicating the recording density, a data area location 675 representing the location where data has been recorded, a burst cutting area (BCA) descriptor 676 in which the serial number and others unique to each information storage medium have been recorded in a non-rewritable manner, velocity 677 indicating the linear velocity condition for specifying the exposure in recording, read power 678 representing the exposure for the information storage medium in playback, peak power 679 representing the maximum exposure to the information storage medium to create a recording mark in recording, base power 680 representing the maximum exposure to the information storage medium in deletion, and information about the manufacture of the medium.

In other words, information on the whole information storage medium, such as physical sector numbers representing the recording start and recording end locations, information including recording power, recording pulse width, delete power, playback power, and linear velocity in recording and deleting, information about recording, reproducing, and deleting characteristics, and information about the manufacture of the information storage medium, such as the serial number of each disk, have been recorded beforehand in the control data zone 655.

The rewritable data zones 613, 645 of the lead-in area 607 and lead-out area 609 are provided with disk identification zones 662, 692 for each disk, trial recording zones (drive test zones 660, 694 and disk test zones 659, 695 for checking the conditions for recording and deleting), and management information recording areas (defect management areas DMA1 & DMA2 663 and DMA3 & DMA4 691) pertaining to a defective area in the data area, respectively. Use of these zones enables best recording to be done on each disk.

FIG. 5 is a diagram to help explain the details of the data area 608 in the layout of FIG. 2.

Twenty-four groups are allocated to every 24 zones. Each group includes a pair of a user area 723 used for data recording and a spare area 724 used for a replacing process. The pair of a user area 723 and a spare area 724 is separated by guard areas 771, 772 zone by zone. Moreover, the user area 723 and spare area 724 in each group fit in zones with the same rotational speed. Smaller group numbers belong to the high-speed rotation zone and larger group numbers belong to the low-speed rotation zone.

Although the groups in the low-speed rotation zone have more sectors than those in the high-speed rotation zone, the low-speed rotation zone has a larger radius of gyration and therefore the physical recording density on the disk becomes almost uniform all over the zone (or the groups).

In each group, the user area 723 is positioned at a smaller sector number (or on the inner edge side of the disk) and the spare area 724 is positioned at a larger sector number (or on the outer edge side of the disk).

Next, explanation will be given about the recording signal structure of information recorded on a DVD-RAM disk serving as an information storage medium and about a method of creating the recording signal structure. Here, the contents of information recorded on the medium themselves are called "information" and the structure or expression after information with the same contents has been scrambled or modulated, or the connection between state "1" and state "0" after the signal mode has been converted, is expressed as "signal." In this way, "information" and "signal" are used to discriminate between them suitably.

FIG. 6 is a diagram to help explain the structure of a sector included in the data area part of FIG. 5. One sector 501a of FIG. 6 corresponds to one of the sector numbers of FIG. 5 and contains 2048 bytes as shown in FIG. 7. Each sector includes headers 573, 574 recorded beforehand in an uneven manner, such as an embossed manner, on the recording surface of the information storage medium (DVD-RAM disk) (not shown) at its head and further includes synchronous codes 575, 576 and modulated signals 577, 578 alternately.

Next, a method of processing error correction code (ECC) blocks in a DVD-RAM disk will be explained.

FIG. 7 is a diagram to help explain the recording units of information (or the units of error correction code) included in the data area 608 of FIG. 2.

In FAT (file allocation table) widely used in a file system for information storage mediums (hard disks HDD or magneto-optical disks MO) for personal computers, information is recorded onto an information storage medium in the smallest units of 256 bytes or 512 bytes.

In contrast, such an information storage medium as a CD-ROM, DVD-ROM, or DVD-RAM uses UDF (Universal Disk Format), explained in detail later, as a file system and records information on an information storage medium in the smallest units of 2048 bytes. The smallest unit is called a sector. Specifically, in an information storage medium using UDF, information is recorded in units of 2048 bytes in each sector 501 as shown in FIG. 7.

Since a CD-ROM and a DVD-ROM are handled in a bare manner without using a cartridge, the surface of the information storage medium is liable to be damaged or dust tends to adhere to the surface on the user side. The effect of dust stuck to or a flaw in the surface of the information storage medium might prevent a specific sector (for example, sector 501c in FIG. 7) from being reproduced from (or recorded onto).

DVD has employed an error correction method (ECC using product code) taking such a situation into account. Specifically, 16 sectors (in FIG. 7, 16 sectors from sector 501*a* to sector 501*p*) constitute one ECC block 502, which is provided with a powerful error correction function. As a result, for example, even if such an error has occurred in ECC block 502 as prevents sector 501*c* from being reproduced from, the error is corrected and all the information in ECC block 502 can be reproduced correctly.

FIG. 8 shows the relationship between zones and groups (see FIG. 5) in the data area 608 of FIG. 2.

The individual zones in FIG. 2, zone (00) 620 to zone (23) 643, are positioned physically on the recording surface of a DVD-RAM disk. As written in the column for physical sector number 604 of FIG. 2 and in FIG. 8, the physical sector number of the first physical sector (start physical sector 701) in the user area (00) 705 in the data area 608 is set to 031000h (h: means hexadecimal representation). The physical sector number increases as the location is closer to the outer edge 704. Consecutive physical sector numbers are allocated, regardless of user area (00) 705, user area (01) 709, user area (23) 707, spare area (00) 708, spare area (01) 709, spare area (23) 710, and guard areas 711, 712, 713. Consequently, the continuity of physical sector numbers holds over zone 620 to zone 643.

In contrast, group 714 is composed of a pair of user area 705 and spare area 708, group 715 is composed of a pair of user area 706 and spare area 709, and group 716 is composed of a pair of user area 707 and spare area 710. Guard area 711 is inserted between groups 714 and 715. Guard areas 712, 713 are inserted between groups 715 and 716. As a result, the physical numbers extending over the groups 714, 715, 716 are discontinuous. For example, because guard area 711 exists between groups 714 and 715, the physical sector numbers between groups 714 and 715 are discontinuous.

When a DVD-RAM disk with the configuration of FIG. 8 is used in an information recording and reproducing device with an information recording and reproducing section (physical system block) explained later, the rotational speed of the DVD-RAM disk can be switched, while an optical head 202 is passing over guard areas 711, 712, 713. For example, while the optical head 202 is passing over guard area 711, seeking from group (00) 714 to group (01) 715, the rotational speed of the DVD-RAM disk is switched.

FIG. 9 is a diagram to help explain a method of setting logical sector numbers in the data area 608 of FIG. 2. The smallest unit of logical sector coincides with the smallest unit of physical unit and contains 2048 bytes. Each logical sector is allocated to the corresponding physical sector location according to the following rule.

As shown in FIG. 8, because the guard areas 711, 712, 713 are provided physically on the recording surface of the DVD-RAM, the physical sector numbers extending over the groups 714, 715, 716 are discontinuous. The logical sector numbers, however, are set in such a manner that they succeed one another consecutively, extending over group (00) 714, group (01) 715, and group (23) 716. In the arrangement of group (01) 715 to group (23) 716, smaller group numbers (smaller physical sector numbers) are positioned on the inner edge side of the DVD-RAM disk (on the lead-in area 607 side) and larger group numbers (larger physical sector numbers) are located on the outer edge side of the DVD-RAM disk (on the lead-out area 609 side).

In the arrangement, when there is no defect in the recording surface of the DVD-RAM disk, the individual logical sectors are allocated to all the physical sectors in user area (00) 705 to user area (23) 707 of FIG. 8 with a one-to-one correspondence. The logical sector number of the sector at the location of the start physical sector number 701 whose physical sector number is 031000h is set to 0h (refer to the column for the logical sector number 774 of the first sector in each group of FIG. 5).

As described above, where there is no defect in the recording surface, no logical sector number has been set for each sector in spare area (00) 708 to spare area (23) 710 beforehand.

At the time of a certify process, the process of sensing the location of a defect in the recording surface, carried out before recording on the DVD-RAM disk, or of playback, or when a defective sector has been found in user area (00) 705 to user area (23) 707 in recording, as many logical sector numbers as are equal to the number of sectors substituted are set for the corresponding sectors in spare area (00) 708 to spare area (23) 710 as a result of the switching process.

Next, several methods of processing a defect occurred in the user area will be explained. Before that, the defect management area necessary to process a defect (the defect management area (DMA1 to DMA 4 663, 691) in FIG. 3 or 4) and its related matters will be explained.

(Defect Management Area)

A defect management area (DMA1 to DMA4 663, 691) includes information on the structure of a data area and defect management and contains 32 sectors. Two defect management areas (DMA1, DMA2 663) are located in the lead-in area 607 on the DVD-RAM disk the other two defect management areas (DMA3, DMA4 691) are positioned in the lead-out area 609 on the DVD-RAM disk. Spare sectors are added behind each of the defect management areas (DMA1 to DMA4 663, 691), if necessary.

Each of the defect management areas (DMA1 to DMA4 663, 691) is divided into two blocks. The first block of each of the defect management areas (DMA1 to DMA4 663, 691) includes a DVD-RAM disk definition structure (DDS) and a primary defect list (PDL). The second block of each of the defect management areas (DMA1 to DMA4 663, 691) includes a secondary defect list (SDL). The four primary defect lists (PDL) of the four defect management areas (DMA1 to DMA4 663, 691) have the same contents and their four secondary defect lists (SDL) also have the same contents.

Although the four disk definition structures (DDS) of the four defect management areas (DMA1 to DMA4 663, 691) have basically the same contents, the four defect management areas differ in the pointers to their PDL and SDL.

Here, a DDS/PDL block means the first block including DDS and PDL. An SDL block means the second block including SDL.

The contents of each of the defect management areas (DMA1 to DMA4 663, 691) after the DVD-RAM disk has been initialized are as follows:

(1) The first sector of each DDS/PDL block includes DDS.

(2) The second sector of each DDS/PDL block includes PDL.

(3) The first sector of each SDL block includes SDL.

The block length of a primary defect list PDL and that of the secondary defect list are determined by the number of entries. The unused sectors in each of the defect management areas (DMA1 to DMA4 663, 691) are written with the data 0FFh until they are filled with the data 0FFh. Moreover, all the spare sectors are written with 00h until they are filled with 00h.

(Disk Definition Information)

The disk definition structure is composed of a table with a length of one sector. The DDS includes a method of initializing a disk and the contents that determine the start address of PDL and that of SDL. The DDS is recorded in the first sector of each defect management area (DMA) at the end of initializing the disk.

(Spare Sector)

A defective sector in each data area 608 is replaced with (switched to) a good sector by a specific defect management method (verification, slipping replacement, skipping replacement, and linear replacement explained layer). The locations of the spare sectors for replacement are included in spare area (00) 708 to spare area (23) 710 of each group. The physical sectors in each spare area are written in the column for the spare area 724 of FIG. 5.

A defective sector is processed by a slipping replacement algorithm, a skipping replacement algorithm, or a linear replacement algorithm. The total of entries listed in the PDL and SDL by these algorithms is set at a specific number, for example, 4092 or less.

(Initialization and Certification)

Before the user information is recorded in the data area 608 on the DVD-RAM disk, the data area 608 is often initialized to certify the defect state of all the sectors in the data area 608. According to the number of consecutive defective sectors, the slipping replacement algorithm or linear replacement algorithm supplements the defective sectors in the user area 723 with spare sectors in the spare area 724. When all the spare sectors in the zones on the DVD-RAM have been used up in the middle of certification, the DVD-RAM disk is judged to be defective. Thereafter, the DVD-RAM disk is not supposed to be used.

The parameters in all the disk definition structures DDS are recorded in the four DDS sectors. The primary defect list PDL and secondary defect list SDL are recorded in the four defect management areas (DMA1 to DMA4 663, 691). In the first initialization, the update counter in the SDL is set to 00h and all the reserved blocks are written with 00h until they are filled with 00h.

When the disk 10 is used to store computer data, the initialization and certification are performed. When it is used for video recording, video recording might be done without performing initialization and certification.

Figure 10:
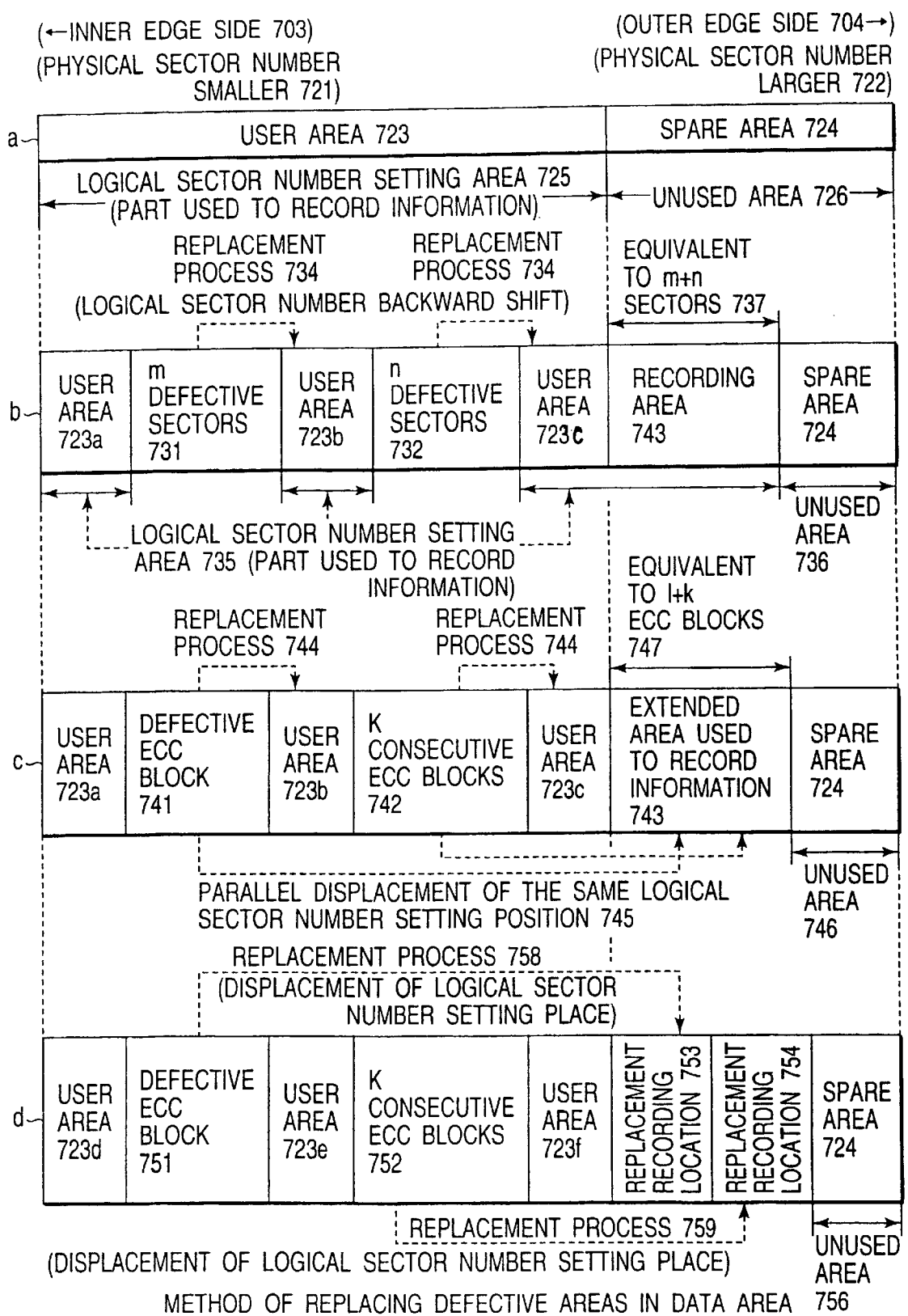
FIG. 10 is a diagram to help explain a method of replacing a defective area in the data area.

In FIG. 10, a and b indicate diagrams to help explain the slipping replacement algorithm in the data area 608 of FIG. 2.

Immediately after the manufacture of DVD-RAM disks (when no user information has been recorded on disks), or when user information is recorded for the first time (that is, when information is not recorded over an already recorded location, but is recorded in an unrecorded area for the first time), the slipping replacement algorithm is applied as a defect processing method.

Specifically, the found defective data sectors (for example, m defective sectors 731) are replaced with good sectors (user area 723b) first encountered after the defective sectors (replacement algorithm 734). As a result, slipping is done by m sectors toward the end of the relevant group (backward shift in the logical sector numbers). Similarly, thereafter, when n defective sectors 732 are found, the defective sectors are replaced with good sectors (user area 723c) first encountered after the defective sectors. The locations at which logical sector numbers are set are shifted backward. As a result of the replacement, logical sector numbers are allocated to m+n sectors 737, beginning at the start of the spare area 724, thereby forming a user information recordable area. Consequently, the unused area 726 in the spare area 724 is decreased by m+n sectors.

At this time, the addresses for the defective sectors are written in the primary defect list (PDL) and the user information is prohibited from being recorded in the defective sectors. If no defective sector has been found during certification, nothing will be written in the PDL. Similarly, if a defective sector has been also found in the recording area 743 in the spare area 724, the address for the spare sector will be also written in the PDL.

As a result of the slipping replacement algorithm, the user areas 723a to 723c without defective sectors and the recording area 743 in the spare area 724 become the information recording part (logical sector number setting area 735) of the group, to which consecutive logical sector numbers are allocated.

In FIG. 10, c indicates a diagram to help explain the skipping replacement algorithm, another replacement algorithm, in the data area 608 of FIG. 2.

The skipping replacement algorithm is a processing method suitable for defect processing in a case where user information, such as video information or audio information, needs to be recorded seamlessly without a break. The skipping replacement algorithm is executed in units of 16 sectors, that is, in ECC blocks (that is, in units of 32 kilobytes since one sector contains 2 kilobytes).

For example, if one defective ECC block 741 has been found after the user area 723a composed of good ECC blocks, the data to be recorded in the defective ECC block 741 will be recorded in an ECC block in a good user area 723b just behind instead (replacement algorithm 744). Similarly, if k consecutive defective ECC blocks 742 have been found, the data to be recorded in these defective blocks 742 will be recorded in k consecutive ECC blocks in a good user area 723c just behind instead.

In this way, when an 1+k number of defective ECC blocks have been found in the user area in the relevant group, (1+k) ECC blocks eat into the spare area 724 and the extended area 743 used to record information in the spare area 724 becomes a user information recordable area, to which a logical sector number is allocated. As a result, the unused area 746 in the spare area 724 decreases by (1+k) ECC blocks, with the result that the remaining unused area 746 become smaller.

As a result of the replacement, the user areas 723a to 723c are free from defective ECC blocks and the extended area used for information recording becomes the information recording part (logical sector number setting area) in the group. The logical sector number setting method is characterized in that the user areas 723a to 723c are free from defective ECC blocks are such that their logical sector numbers allocated beforehand in the initial setting (before the replacement process) remain unchanged.

As a result, a logical sector number allocated beforehand to each physical sector in the defective ECC block 741 in the initial setting is moved as it is and set in the first physical sector in the extended area 743 used for information recording. The logical sector numbers allocated to the individual physical sectors in the k consecutive defective ECC blocks 742 in the initial setting are moved in parallel as they are and set in the relevant physical sectors in the extended area 743 used for information recording.

In the skipping replacement algorithm, even if the DVD-RAM disk has not been certified beforehand, the replacement process can be performed on the defective sectors found in the course of recording the user information.

In FIG. 10, d indicates a diagram to help explain the linear replacement algorithm, still another replacement algorithm, in the data area 608 of FIG. 2.

The linear replacement algorithm is executed in units of 16 sectors, that is, in ECC blocks (or in units of 32 kilobytes). In the linear replacement algorithm, the defective ECC block 751 is replaced with a usable good spare block (the first alternative recording part 753 in the spare area 724) first encountered in the relevant group (replacement process 758). In the replacement process, not only the user information to be recorded in the defective ECC block 751 is recorded in the alternative recording part 753 in the spare area 724, but also the logical sector number setting location is also recorded as it is in the alternative recording part 753. Similarly, the user information and logical sector number setting location to be recorded in k consecutive defective ECC blocks 752 are moved to an alternative recording part 754 in the spare area 724.

In the linear replacement algorithm and skipping replacement algorithm, the address for the defective block and the address for the last replacement block are written into the SDL. When the replacement blocks listed in the SDL (secondary defect list) have turned out to be defective blocks, entries are made in the SDL using a direct pointer method. In the direct pointer method, the address for the replacement block is changed from the address for the defective block to a new one, thereby amending the entries in the SDL. To update the secondary defect list SDL, the update counter in the SDL is incremented by one.

(Writing)

When data is written in a sector in a group, the defective sectors listed in the primary defect list (PDL) are skipped. Then, by the aforementioned slipping replacement algorithm, the data to be written in the defective sector is written into a data sector encountered next. If the block to be written into has been listed in the secondary defect list (SDL), the data to be written into the block will be written into the spare block specified by the SDL according to the aforementioned linear replacement algorithm or skipping replacement algorithm.

In the environment of a personal computer, the linear replacement algorithm is used to record personal computer files and the skipping replacement algorithm is used to record AV files.

(Primary Defect List PDL)

Although the primary defect list (PDL) is always recorded in a DVD-RAM disk, the contents of the list may be empty.

The PDL includes the addresses for all the defective sectors determined in the initialization. These addresses are listed in ascending order. The PDL is recorded in the necessary minimum number of sectors. The PDL starts at the first user byte in the first sector. All the unused bytes in the last sector in the PDL are set to 0FFh. In the PDL, the following information is written:

Byte Location: Contents of PDL 0 00h: PDL identifier 1 01h: PDL identifier

2 The number of addresses in PDL: MSB

3 The number of addresses in PDL: LSB

4 Address for the first defective sector (sector number: MSB)

5 Address for the first defective sector (sector number)

6 Address for the first defective sector (sector number)

7 Address for the first defective sector (sector number: LSB)

. . .

x-3 Address for the last defective sector (sector number: MSB)

x-2 Address for the last defective sector (sector number)

x-1 Address for the last defective sector (sector number)

x Address for the last defective sector (sector number)

* NOTE: When the second byte and third bytes are set to 00h, the third byte is at the end of the PDL.

In the case of a primary defect list (PDL) for multi-sectors, an address list of defective sectors follows the first byte in the second or later sectors. Namely, the PDL identifier and the number of PDL addresses exist only in the first sector. When the PDL is empty, the second byte and third byte are set to 00h and the fourth byte to the $2047^{th}$ byte are set to FFh.

The unused sectors in the DDS/PDL block are written with FFh.

(Secondary Defect List SDL)

The secondary defect list (SDL) is created at the initializing stage and used after a Certify operation. In initialization, the SDL is recorded onto all the disks.

The SDL includes entries in the form of the addresses for defective data blocks and the addresses for spare blocks to be replaced with the defective blocks. Eight bytes are allocated to each entry in the SDL. Specifically, of the eight bytes, four bytes are allocated to the addresses for defective blocks and the remaining four bytes are allocated to the addresses for replacement blocks.

The address list includes the first address for the defective blocks and that for their replacement blocks. The addresses for the defective blocks are assigned in ascending order.

The SDL is recorded in the necessary minimum number of sectors. The SDL starts at the first user data byte in the first sector. All the unused bytes in the last sector in the SDL are set to 0FFh. The pieces of information after that are recorded in each of the four SDLs.

When the replacement blocks listed in the SDL have turned out to be defective blocks, entries are made in the SDL using a direct pointer method. In the direct pointer method, the address for the replacement block is changed from the address for the defective block to a new one, thereby amending the entries in the SDL in which the replaced defective block has been registered. At that time, the number of entries in the SDL is not be changed by the degraded sectors.

In the SDL, the following information is written:

Byte Location: Contents of SDL 0 (00): SDL identifier 1 (01): SDL identifier 2 (00)

3 (01)

4 Update counter: MSB

5 Update counter

6 Update counter

7 Update counter: LSB

8–26 Spares (00h)

27–29 Flags indicating that all the spare sectors in the zone have been used up

30 The number of entries in the SDL: MSB

31 The number of entries in the SDL: LSB

32 The address for the first defective block (sector number: MSB)

33 The address for the first defective block (sector number)

34 The address for the first defective block (sector number)

35 The address for the first defective block (sector number: LSB)

36 The address for the first replacement block (sector number: MSB)

37 The address for the first replacement block (sector number)

38 The address for the first replacement block (sector number)

39 The address for the first replacement block (sector number: LSB)

. . . . . .

y-7 The address for the last defective block (sector number: MSB)

y-6 The address for the last defective block (sector number)

y-5 The address for the last defective block (sector number)

y-4 The address for the last defective block (sector number: LSB)

y-3 The address for the last replacement block (sector number: MSB)

y-2 The address for the last replacement block (sector number)

y-1 The address for the last replacement block (sector number)

y The address for the last replacement block (sector number: LSB)

* NOTE: Each entry at the $30^{th}$ and $31^{st}$ byte has an eight-byte length. In the case of a secondary defect list (SDL) for multi-sectors, an address list of defective sectors and replacement blocks follows the first byte in the second or later sectors. Namely, the $0^{th}$ byte to $31^{st}$ byte in the SDL exist only in the first sector. The unused sectors in the SDL block are written with FFh.

Here, a device for recording or reproducing information onto or from the information storage medium (disk) will be explained.

Figure 11:
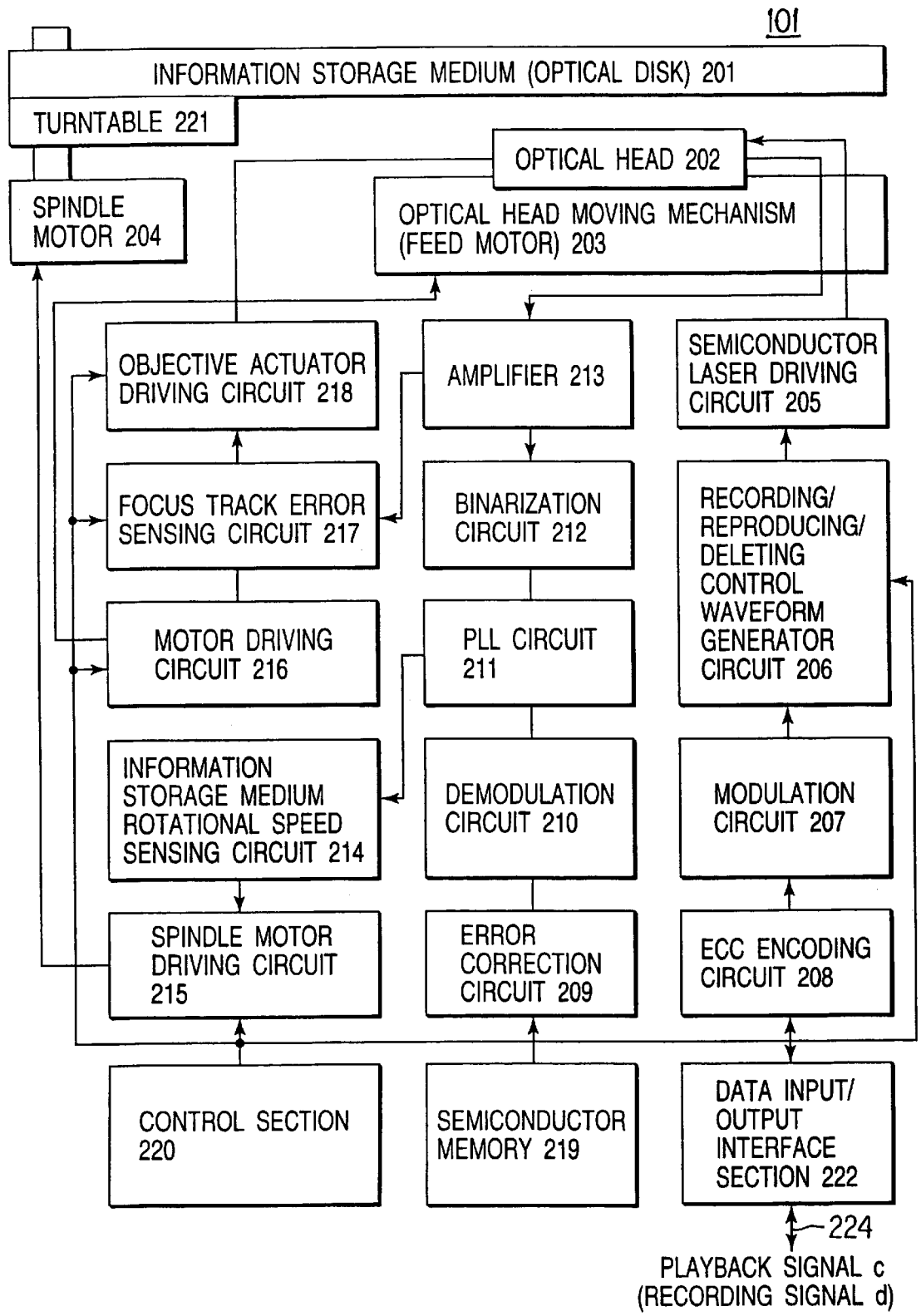
FIG. 11 is an explanatory diagram showing the configuration of the information recording and reproducing section.

FIG. 11 is a black diagram showing an example of the configuration of the information recording and reproducing section (physical system block) of an information recording and reproducing device.

Explanation of the basic functions of the information recording and reproducing section The information recording and reproducing section records new information or rewrites the information (or deletes the information) at a specific position on an information storage medium (optical disk) 201, using a condensed spot of a laser beam. The section further reproduces the already recorded information at a specific position on the information storage medium 201, using the condensed spot of the laser beam.

Explanation of means for achieving the basic functions of the information storage section To achieve the basic functions, the recording and reproducing section causes the condensed spot to trace (or follow) the track on the information storage medium 201. The section changes the amount (or intensity) of light of the condensed spot projected on the information storage medium 201, thereby switching between the recording, reproducing, and deleting of information. In addition, the section converts an externally supplied recording signal d into a signal most suitable for recording in a high density at a low error rate.

Explanation of the structure of the mechanical part and the operation of the sensing part <Basic structure of optical head 202 and signal sensing circuit>

<Sensing a signal by optical head 202>

The optical head 202 is basically composed of a semiconductor laser element serving as a light source, a photodetector, and an objective. The laser light emitted from the semiconductor laser element is gathered by the objective onto the information storage medium (optical disk) 201. The laser light reflected from the reflecting film or reflective recording film of the information storage medium 201 is photoelectrically converted by the photodetector.

The sense current obtained by the photodetector is converted by an amplifier 213 into a voltage, which is a sense signal. The sense signal is processed at a focus/track error sensing circuit 217 or a binarization circuit 212.

In general, the photodetector is divided into light sensing areas and senses a change in the amount of light projected onto each light sensing area. The focus/track error sensing circuit 217 performs addition or subtraction on each sense signal, thereby sensing a shift in focus and a shift in track. After a shift in focus and a shift in track have been virtually eliminated, the photodetector senses a change in the amount of reflected light from the reflecting film or reflective recording film of the information storage medium, thereby reproducing the signal on the information storage medium 201.

<Method of sensing a shift in focus>

Methods of sensing the amount of a shift in focus include the following:

(Astigmatism method) . . . A method of placing an optical element (not shown) for causing astigmatism in an optical path where the laser light reflected by the reflecting film or reflective recording film of the information storage medium 201 is sensed and of sensing a change in the shape of the laser light projected on the photodetector. The light sensing area is quadrisected diagonally. The focus/track error sensing circuit 217 finds out the sum of the sense signals from the sensing areas on each diagonal and calculates the difference between the sums, thereby obtaining a focus error sense signal.

(Knife edge method) . . . A method of placing a knife edge for asymmetrically shutting off part of the laser light reflected by the information storage medium 201. The light sensing area is bisected. The difference between the sense signals obtained from the respective sensing areas is calculated, thereby obtaining a focus error sense signal.

Generally, either the astigmatism method or knife edge method is used.

<Method of sensing a shift in track>

The information storage medium 201 has a spiral or concentric track, on which information is recorded. A condensed spot is caused to trace the track, thereby reproducing, recording, or deleting the information. To cause the condensed spot to trace the track stably, it is necessary to optically sense a relative positional gap between the track and condensed spot.

Methods of sensing a shift in track include the following:

(Phase difference sensing method) . . . A method of sensing a change in the intensity distribution on the photodetector of the laser light reflected by the reflecting film or reflective recording film of the information storage medium (optical disk) 201. The light sensing area is quadrisected diagonally. The focus/track error sensing circuit 217 finds out the sum of the sense signals from the sensing areas on each diagonal and calculates the difference between the sums, thereby obtaining a track error sense signal.

(Push-pull method) . . . A method of sensing a change in the intensity distribution on the photodetector of the laser light reflected by the information storage medium 201. The light sensing area is bisected. The difference between the sense signals obtained from the respective sensing areas is calculated, thereby obtaining a track error sense signal.

(Twin-spot method) . . . A method of placing a diffraction grating and the like in a light guiding system between the semiconductor laser element and the information storage medium 201, dividing the light into wave surfaces, and sensing changes in the amount of reflected light of the ± first-order diffraction light projected on the information storage medium 201. In addition to the light sensing area for sensing playback signals, there are provided light sensing areas that sense the amount of reflected light of the + first-order diffraction light and the amount of reflected light of the − first-order diffraction light separately. The difference between the respective sense signals is calculated, thereby obtaining a track error signal.

<Objective actuator structure>

The objective (not shown) that condenses the laser light emitted from the semiconductor laser element on the information storage medium 201 is designed to be movable in the directions of two axes according to the output current of an objective actuator driving circuit 218. The objective moves in the following two directions: it moves in the direction perpendicular to the information storage medium 201 to correct a shift in focus; and it moves across the radius of the information storage medium 201 to correct a shift in track.

The moving mechanism (not shown) of the objective is called an objective actuator. The following are often used for the objective actuator structure:

(Shaft sliding method) . . . A method of allowing a blade integral with the objective to move along the center shaft. In this method, the blade moves along the center shaft, thereby correcting a shift in focus. The blade rotates on the center shaft, thereby correcting a shift in track.

(Four-wire method) . . . A method of moving a blade integral with the objective in the directions of two axes making use of elastic deformation of the wires, the blade being connected to a fixed system with four wires.

Both of the above methods have a structure that has a permanent magnet and a coil and moves the blade by causing current to flow through the coil connected to the blade.

<Rotational control system of information storage medium 201>

The information storage medium (optical disk) 201 is mounted on a turntable 221, which is rotated by the driving force of a spindle motor 204.

The number of revolutions of the information storage medium 201 is sensed from the playback signal obtained from the information storage medium 201. Specifically, the sense signal (analog signal) of the output of the amplifier 213 is converted by the binarization circuit 212 into a digital signal. From the digital signal, a PLL circuit 211 generates a constant period signal (reference clock signal). Using the signal, an information storage medium rotational speed sensing circuit 214 senses the number of revolutions of the information storage medium 201 and outputs the value.

A correspondence table of the number of revolutions of the information storage medium corresponding to the positions on the radius on the information storage medium 201 to be reproduced from or recorded onto/deleted from has been recorded beforehand in a semiconductor memory 219. Once the reproduce position or record/delete position has been determined, a control section 220 refers to the semiconductor memory 219, sets the target number of revolutions of the information storage medium 201, and informs an spindle motor driving circuit 215 of the value.

The spindle motor driving circuit 215 calculates the difference between the target number of revolutions and the output signal (the present number of revolutions) of the information storage medium rotational speed sensing circuit 214, supplies a driving current to the spindle motor 204 according to the result, and performs control so that the number of revolutions of the spindle motor 204 becomes constant. The output signal of the information storage medium rotational speed sensing circuit 214 is a pulse signal having a frequency corresponding to the number of revolutions of the information storage medium 201. The spindle motor driving circuit 215 performs control (frequency control and phase control) of both the frequency of the pulse signal and the pulse phase.

<Optical head moving mechanism>

The mechanism has an optical head moving mechanism (feed motor) 203 for moving the optical head 202 across the radius of the information storage medium 201.

A rod-like guide shaft is often used as a guide mechanism for moving the optical head 202. The guide mechanism moves the optical head 202 making use of friction between the guide shaft and the bush provided on part of the optical head 202. Instead, bearings may be used which decrease friction force using a rotary motion.

Although a method of transmitting the driving force to move the optical head 202 is not shown, it is such that a rotary motor with a pinion (rotating gear) is provided on the fixed system, a rack, a linear gear that engages with the pinion, is provided on one side of the optical head 202, and the rotary motion of the rotary motor is converted into a linear motion of the optical head 202. Another driving force transmitting method is such that a permanent magnet is provided on the fixed system, current is caused to flow the coil mounted on the optical head 202, and the optical head is moved linearly.

Both of the rotary motor and linear motor methods basically cause current to flow through the feed motor, thereby producing driving force for driving the optical head 202. The driving current is supplied from a motor driving circuit 216.

<Function of each circuit>

<Condensed spot trace control>

To correct a shift in focus or a shift in track, there is provided an objective actuator driving circuit 218 that supplies a driving current to the objective actuator (not shown) in the optical head 202 according to the output signal (sense signal) of the focus/track error sensing circuit 217. To make the movement of the objective respond at high speed as far as a high-frequency region, the driving circuit 218 includes a phase compensating circuit for improving characteristics according to the frequency characteristic of the objective actuator.

Under the control of the control section 220, the objective actuator driving circuit 218 carries out the following:

(a) The process of turning on and off the operation of correcting a shift in focus and track (focus/track loop).

(b) The process of moving the objective in the vertical direction (focus direction) of the information storage medium 201 (executed when the focus/track loop is off).

(c) The process of slightly moving the objective across the radius of the information storage medium 201 (in the direction in which the spot traverses the track), thereby moving the condensed spot to an adjacent track. Kick pulses are used.

<Laser light amount control>
<Switching between reproduce and record/delete>

Switching between reproduce and record/delete is done by changing the amount of light of the condensed spot projected on the information storage medium 201.

In the case of an information storage medium using a phase change method, the following relations generally holds:

(the amount of light in recording)>(the amount of light in deleting)>(the amount of light in reproducing)  (1)

In the case of an information storage medium using a magneto-optical method, the following relationship generally holds:

(the amount of light in recording)≈(the amount of light in deleting)>(the amount of light in reproducing)  (2)

In the magneto-optical method, the polarity of an external magnetic field (not shown) applied to the information storage medium 201 is changed in recording/deleting, thereby controlling the processes of recording and deleting.

In reproducing information, a constant amount of light is projected continuously on the information storage medium 201.

To record new information, a pulse-like intermittent amount of light is added to the amount of light in reproducing. When the semiconductor laser element emits pulses with a large amount of light, the reflective recording film of the information storage medium is changed optically or in shape, thereby forming a recording mark. To write information over an already recorded area, the semiconductor laser element is caused to emit pulses in a similar manner.

To delete the already recorded information, light with a constant amount of light greater than in reproducing is projected continuously. When the information is deleted continuously, the amount of light projected is returned to that in reproducing at specific intervals of time, such as at intervals of each sector and the information is reproduced intermittently in parallel with the deleting process. By reproducing the track numbers and addresses of the tracks deleted intermittently, the deleting process is executed, while a check is being made to see if there is no error in the deleted tracks.

<Laser light-emitting control>

Although not shown, the optical head 202 includes a photodetector for sensing the amount of light emitted by the semiconductor laser element. A laser driving circuit 205 calculates the difference between the output of the photodetector (the sense signal of the amount of light emitted by the semiconductor laser element) and the light-emission reference signal supplied from a record/reproduce/delete control waveform generator circuit 206 and, on the basis of the result, performs feedback control of the driving current to the semiconductor laser.

<Various operations related to the control system of the mechanical part>
<Start-up control>

After the information storage medium (optical disk) 201 has been put on the turntable 221 and start-up control has been started, processes are carried out through the following procedure:

(1) The control section 220 informs the spindle motor driving circuit 215 of the target number of revolutions.

Then, the spindle motor driving circuit 215 supplies a driving current to the spindle motor 204. The spindle motor 204 then starts to rotate.

(2) At the same time, the control circuit 220 sends a command (execute instruction) to the feed motor driving circuit 216. The feed motor driving circuit 216 then supplies a driving current to the optical head driving mechanism (feed motor) 203, which moves the optical head 202 to the innermost edge position of the information storage medium 201. As a result, a check is made to see if the optical head 202 has exceeded the area in which the information has been recorded on the information storage medium 201 and reached a further inner edge portion. inner edge portion.

(3) When the spindle motor 204 has reached the target number of revolutions, its status (situation report) is sent to the control section 220.

(4) The semiconductor laser driving circuit 205 supplies current to the semiconductor laser element in the optical head 202 according to the reproduce light-amount signal sent from the control section 220 to the record/reproduce/delete control waveform generator circuit 206, which starts laser light emission.

The optimum amount of light projected in reproducing differs, depending on the type of the information storage medium (optical disk) 201. At start-up, the value of current supplied to the semiconductor laser element is set to the value corresponding to the smallest one of the amounts of light projected.

(5) The objective actuator driving circuit 218 controls the objective according to the command from the control section 220 in such a manner that it moves the objective (not shown) in the optical head 202 farthest from the information storage medium 201 and then brings the objective closer to the information storage medium 201 gradually.

(6) At the same time, the focus/track error sensing circuit 217 monitors the amount of shift in focus and, when the objective comes closer to the position at which the objective is in focus, sends the status to tell the control section 220 that the objective has come closer to the focal point.

(7) Receiving the notice, the control section 220 sends a command to the objective actuator driving circuit 218 to turn on the focus loop.

(8) With the locus loop on, the control section 220 sends a command the feed motor driving circuit 216, which then moves the optical head 202 toward the outer edge of the information storage medium 201 gradually.

(9) At the same time, the control section monitors the playback signal from the optical head 202 and, when the optical head 202 has reached the recording area on the information storage medium 201, stops the movement of the optical head 202, and sends a command to the object lens actuator driving circuit 218 to turn on the track loop.

(10) Then, "the optimum amount of light in reproducing" and "the optimum amount of light in recording/deleting recorded" recorded on the inner edge part of the information storage medium 201 are reproduced and the resulting information is recorded in the semiconductor memory 219 via the control section 220.

(11) The control section further sends a signal corresponding to "the optimum amount of light in reproducing" to the record/reproduce/delete control waveform generator circuit 206 and sets again the amount of light emitted by the semiconductor laser element in reproducing.

(12) Then, according to "the optimum amount of light in recording/deleting" recorded on the information storage medium 201, the amount of light emitted by the semiconductor laser element in recording/deleting is set.

<Access control>

Information as to at what location the information recorded on the information storage medium to be accessed has been recorded on the information storage medium and as to what contents the information has differs, depending on the type of the information storage medium 201. For example, on a DVD disk, such information is recorded in the directory management area or in a navigation pack on the information storage medium 201.

The directory management area is generally recorded in a lump in the inner edge area or outer edge area of the information storage medium 201. A navigation pack is included in a data unit called VOBU (video object unit) in VOBS (video object set) complying with the data structure of PS (program stream) in MPEG 2. In the navigation pack, information as to where the next picture is recorded is recorded.

To reproduce or record/delete a specific piece of information, the information in the above area is reproduced and the access destination is determined from the obtained information.

<Rough access control>

The control section calculates the position of the radium at the access destination and determines the distance between the present position of the optical head 202 and the calculated position.

Information about the speed curve by which the optical head 202 can arrive at the destination in the shortest time has been recorded in the semiconductor memory 219 beforehand. The control section 220 reads the information and controls the movement of the optical head 202 as follows.

After the control section 220 has sent a command to the objective actuator driving circuit 218 to turn off the track loop, it controls the feed motor driving circuit 216 to cause the optical head 202 to start moving.

When the condensed spot traverses the track on the information storage medium 201, the focus/track error sensing circuit 217 generates a track error sense signal. Using the track error sense signal, the relative speed of the condensed spot to the information storage medium 201 can be sensed.

The feed motor driving circuit 216 calculates the relative speed of the condensed spot from the focus/track error sensing circuit 217 and the target speed information constantly sent from the control section 220 and, on the basis of the result, moves the optical head 202, while applying feedback control to the driving current to the optical head driving mechanism (feed motor) 203.

As described in item <Optical head moving mechanism>, friction force is always acting between the guide shaft and bush or bearings. Although kinetic friction acts when the optical head 202 is moving at high speed, statical friction acts at the beginning of movement and just before it comes to a stop because the optical head 202 moves at low speed. When the static friction acts (especially, just before the head stops), the friction force increases relatively. To cope with an increase in the friction force, the amplification factor (gain) of the control system is increased by a command from the control section 220 to increase the current supplied to the optical head driving mechanism (feed motor) 203.

<Fine access control>

After the optical head 202 has reached the target position, the control section 220 sends a command to the objective actuator driving circuit 218, thereby turning on the track loop.

While tracing the track on the information storage medium 201, the condensed spot reproduces the addresses or track numbers at that part.

From the addresses or track numbers, the position of the present condensed spot is determined. The number of erroneous tracks from the target position to be reached is calculated at the control section 220, which informs the objective actuator driving circuit 218 of the number of tracks across which the condensed spot has to move.

When the objective actuator driving circuit 218 generates a set of kick pulses, the objective moves slightly along the radius of the information storage medium 201 and the condensed spot moves to the adjacent track.

The objective actuator driving circuit 218 turns off the track loop temporarily and generates as many kick pulses as meet the information from the control circuit 220 and thereafter turns on the track loop again.

After the fine access has been completed, the control section 220 reproduces the information (address or track number) at the position where the condensed spot is tracing and makes sure that the target track is being accessed.

<Continuous recording/reproducing/deleting Control>

The track error sense signal outputted from the focus/track error sensing circuit 217 is inputted to the feed motor driving circuit 216. At the time of "start-up control" or "access control," the control section 220 prevents the feed driving circuit 216 from using the track error sense signal.

After having confirmed that the condensed spot has reached the target track as a result of the access, the control section 220 sends a command to supply part of the track error sense signal as a driving current via the motor driving circuit 216 to the optical head driving mechanism (feed motor) 203. This control is continued during the time when reproducing or recording/deleting is being done continuously.

The information storage medium 201 is put in such a manner that its center position is off-centered slightly from the center position of the turntable 221. When part of the track error sense signal is supplied as a driving current, the whole optical head 202 moves slightly according to the eccentricity.

When reproducing or recording/deleting is done continuously for a long time, the position of the condensed spot moves gradually toward the outer edge or inner edge. When part of the track error sense signal is supplied as a driving current to the optical head moving mechanism (feed motor) 203, the optical head 202 moves gradually toward the outer edge or inner edge accordingly.

By easing the objective actuator of the burden of correcting a shift in the track, the track loop can be stabilized.

<End Control>

To end the operation after a series of processes has been completed, processing is done through the following procedure:

(1) The control section 220 sends a command to turn off the track loop to the objective actuator driving circuit 218.

(2) The control section 220 sends a command to turn off the focus loop to the objective actuator driving circuit 218.

(3) The control section 220 sends a command to stop the semiconductor laser element from emitting light to the record/reproduce/delete control waveform generator circuit 206.

(4) The spindle motor driving circuit 215 is informed that the reference number of revolutions is 0.

<Flow of recording signal/playback signal to the information storage medium>

<Flow of signal in reproducing>

<Binarization/PLL circuit>

As described in item <Signal sensing by optical head 202>, a change in the amount of reflected light from the reflecting film or reflective recording film of the information storage medium (optical disk) 201 is sensed, thereby reproducing the signal on the information storage medium 201. The signal obtained by the amplifier 213 has an analog waveform. The binarization circuit 212 uses a comparator to convert the analog signal into a binary digital signal composed of "1" and "0."

From the playback signal obtained at the binarization circuit 212, the PLL 211 extract a reference signal for playback of information. Specifically, the PLL circuit 211 includes an oscillator capable of varying frequency and compares the frequency and phase of the pulse signal (reference clock) outputted from the oscillator with those of the output signal of the binarization circuit 212. The result of the comparison is fed back to the output of the oscillator, thereby producing the reference signal for reproducing information.

<Demodulation of signal>

A demodulation circuit 210 includes a conversion table showing the relationship between the modulated signals and the demodulated signals. Referring to the conversion table in synchronization with the reference clock obtained at the PLL circuit 211, the demodulation circuit 210 returns the input signal (modulated signal) to the original signal (demodulated signal). The demodulated signal is stored in the semiconductor memory 219.

<Error correcting process>

An error correction circuit 209 senses errors in the signal stored in the semiconductor memory 219 using internal code PI and external code PO and sets the pointer flags for the error positions. Thereafter, while reading out the signals from the semiconductor memory 219, the error correction circuit corrects the signals at the error positions one after another according to the error pointer flags, and then records post-error-correction information in the semiconductor memory 219 again.

When the information reproduced from the information storage medium 201 is outputted as playback signal c to the outside world, the internal code PI and external code PO are removed from the post-error-correction information recorded in the semiconductor memory. The resulting information is transferred via a bus line 224 to a data I/O interface 222. The data I/O interface 222 outputs the signal sent from the error correction circuit 209 as playback signal c.

<Signal form recorded on the information storage medium 201>

The signals recorded on the information storage medium are required to fulfill the following:

(a) They must be capable of correcting errors in the recorded information due to defects in the information storage medium.

(b) The direct-current components of their playback signals must be made "0" to simplify the reproducing circuit.

(c) They must be recorded in such a manner that the information is recorded as densely on the information storage medium 201 as possible.

To meet the requirements, the information recording and reproducing section (physical system block) achieves "addition of an error correction function" and "signal conversion of recorded information (modulation/demodulation of signal)."

<Flow of signal in recording>

<Error correction code ECC adding process>

An error correction code ECC adding process will be explained. Information d to be recorded on the information storage medium 201 is inputted in the form of a row signal to the data I/O interface 222. The recording signal d is recorded as it is in the semiconductor memory 219. Thereafter, an ECC encoder 208 executes the following ECC additional process.

Hereinafter, a concrete example of an ECC adding method using a product code will be explained.

In the semiconductor memory 219, recording signal d is arranged row by row at intervals of 172 bytes and 192 rows forms one ECC block (172-byte row×192-byte column gives 32 kilobytes of information). For the raw signal (recording signal d) in one ECC block composed of "172-byte row× 192-byte column," 10-byte internal code PI is calculated at intervals of a 172-byte row and the result is recorded in the semiconductor memory 219 additionally. In addition, 16-byte external code PO is calculated at intervals of one column in bytes and the result is recorded in the semiconductor memory 219 additionally.

Then, using a total of 23366 bytes (=(12+1)×(172+10)) consisting of 12 rows including a 10-byte internal code PI(12×(172+10) bytes) and one row of external code PO (1×(172+10) bytes) as a unit, the information subjected to the error correction code ECC adding process is recorded in a sector on the information storage medium 201.

After internal code PI and external code PO have been added, the ECC encoder 208 transfers the information to the semiconductor memory temporarily. When information is recorded on the information storage medium 201, the signal is transferred in units of a sector of 2336 bytes to the semiconductor memory 219.

<Signal modulation>

Signal conversion, or conversion of signal form, is caused in a modulation circuit 207 to bring the direct-current component (SDV: Digital Sum Value or Digital Sum Variation) of the playback signal closer to "0" and record information on the information storage medium 211 at high density. Each of the modulation circuit 207 and demodulation circuit 210 includes a conversion table showing the relationship between the original signal and the modulated signal.

The modulation circuit 207 segments the signal transferred from the ECC encoder 208 in units of bits according to a specific modulation method and converts them into another signal (code) referring to the conversion table. For example, when 8/16 modulation (RLL (2, 10) code) is used as a modulation method, two types of conversion table exist. Reference is made switching between the two conversion tables in such a manner that the direct-current component (DSV) after the modulation gets closer to "0."

<Recording waveform generation>

When a recording mark is recorded on the information storage medium (optical disk) 201, the following are generally used as a recording method:

(Mark length recording method) "1" is placed at the beginning and end of the recording mark.

(Mark-to-mark recording method) The center position of the recording mark coincides with the position of "1."

To use mark length recording, it is necessary to form a relative long recording mark. In this case, when a large amount of light for recording continues to be projected on the information storage medium 201 for longer than a specific period of time, the heat-accumulating effect of the reflective recording film of the information storage medium 201 causes only the rear of the mark to get wider, forming a raindrop-like recording mark. To avoid this drawback, when a long recording mark is formed, the recording laser driving signal is divided into recording pulses or the recording waveform of the recording laser is changed.

According to the recording signal sent from the modulation circuit 207, the record/reproduce/delete control waveform generator circuit 206 creates the aforementioned waveform and sends a driving signal with the recording waveform to the semiconductor laser driving circuit 205.

Here, the flow of signals between blocks in the recording and reproducing device will be summarized as follows:

(1) Input of a raw signal to be recorded to the information recording and reproducing device The configuration of the information recording and reproducing section (physical system block) is exemplified. In the information recording and reproducing section, the sections related to the processes of recording and reproducing information onto and from the information storage medium (optical disk) 201 in the information recording and reproducing device are put together. The recording signal d sent from a host computer, such as PC (personal computer) or EWS (engineering workstation) is inputted to an information recording and reproducing section (physical system block) 101 by way of the data I/O interface 222.

(2) Process of dividing recording signal d at intervals of 2048 bytes

The data I/O interface 222 divides the recording signal d time-sequentially at intervals of 2048 bytes and adds a data ID and thereafter carries out a scrambling process. The resulting signal is sent to the ECC encoder 208.

(3) Creating an ECC block

The ECC encoder 208 forms a block of "172 bytes×192 columns" by putting together 16 groups of the signals obtained by scrambling the recording signals and then adds internal code PI (internal parity code) and external code PO (external parity code).

(4) Interleaving process

Thereafter, the ECC encoder 208 carries out the interleaving process of external code PO.

(5) Signal modulation process

The modulation circuit 207 modulates the signal obtained by interleaving external code PO and then adds a synchronizing code.

(6) Recording waveform creating process

According to the resulting signal, the record/reproduce/delete control waveform generator circuit 206 creates a recording waveform and sends the waveform to the laser driving circuit 205.

Because the information storage medium (DVD-RAM disk) 201 has employed the "mark length recording" method, the rising timing and falling timing of the recording pulse coincide with the timing of "1" of the modulated signal.

(7) The process of recording information on the information storage medium (optical disk) 10

The amount of light of the laser light projected from the optical head 202 and condensed on the recording film of the information storage medium (optical disk) 201 is varied intermittently, thereby forming a recording mark at the recording film of the information storage medium (optical disk) 201.

Figure 12:
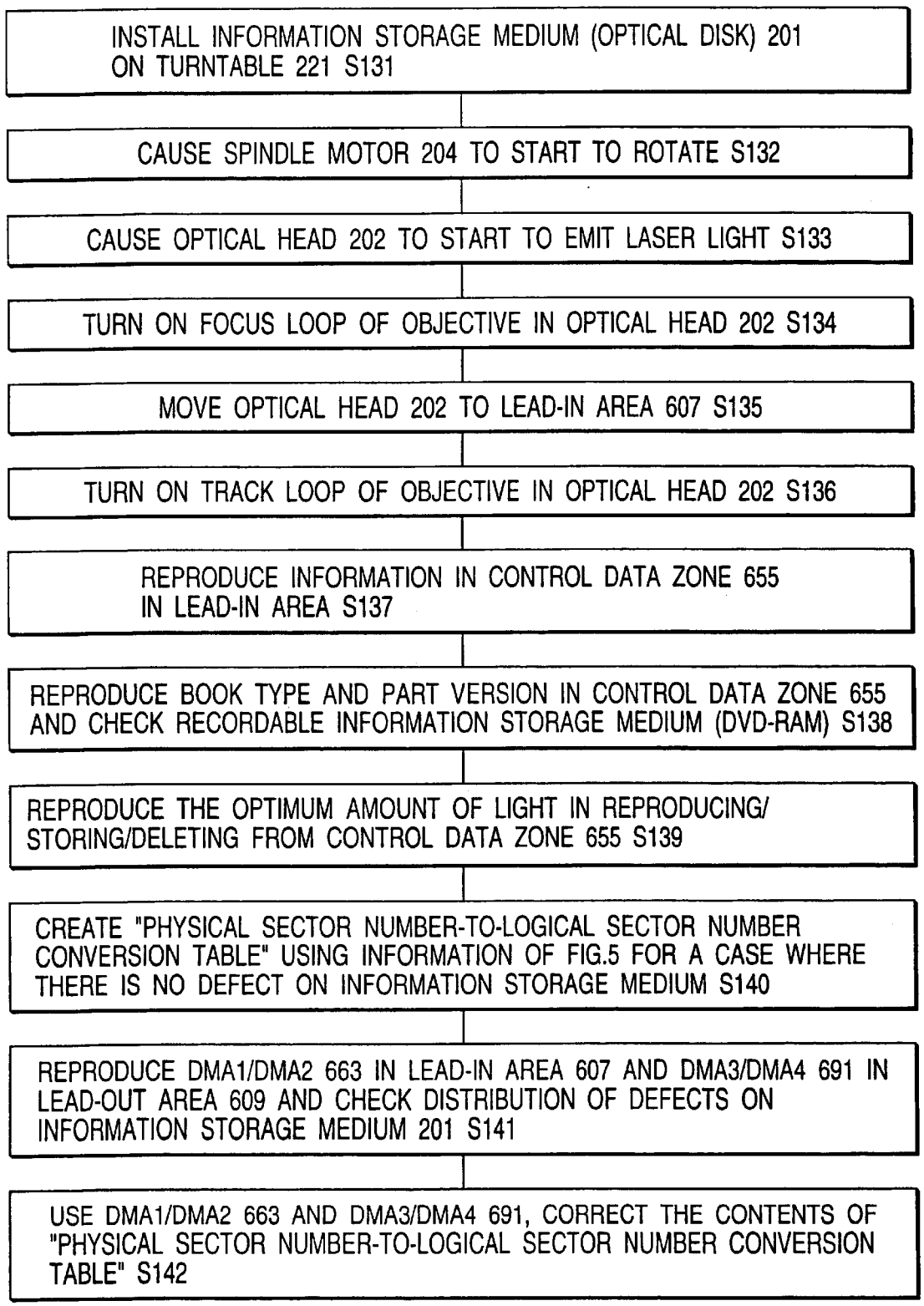
FIG. 12 is a diagram to help explain the operation of setting logical block numbers at the information recording and reproducing section.

FIG. 12 is a flowchart to help explain an example of the operation of setting logical block numbers for a DVD-RAM disk or the like. Explanation will be given by reference to FIG. 11, too.

When the information storage medium (optical disk) 201 is put on the turntable 221 (step ST131), the control section starts to rotate the spindle motor 204 (step ST132).

After the information storage medium (optical disk) 201 has started rotating, the optical head 202 starts to emit laser light (step ST133) and the objective focus servo loop in the optical head 202 is turned on (step ST134).

After laser light has been emitted, the control section 220 causes the feed motor 203 to operate, thereby moving the optical head 202 to the lead-in area 607 of the information storage medium (optical disk) 201 now rotating (step ST135). Then, the objective track servo loop in the optical head 202 is turned on (step ST136).

After the track servo has become active, the optical head 202 reproduces the information in the control data zone 655 (see FIG. 3) in the lead-in area 607 on the information storage medium (optical disk) 201 (step ST137). Reproducing the book type and part version 671 in the control zone 655, the optical head has confirmed that the information storage medium (optical disk) 201 now being rotated is a recordable medium (DVD-RAM disk or DVD-R disk) (step ST138). Here, the medium 201 is assumed to be a DVD-RAM disk.

After it is confirmed that the information storage medium (optical disk) 201 is a DVD-RAM disk, information about the optimum amount of light for reproducing, recording, or deleting (such as the light-emitting power and light-emitting period or duty ratio or the like of the semiconductor laser) is reproduced from the control zone 655 to be reproduced (step ST139).

Thereafter, the control section 220 creates a conversion table (see FIG. 5) for physical sector numbers and logical sector numbers, provided that there is no defect in the DVD-RAM now being rotated (step ST140).

After the conversion table has been created, the control section 220 reproduces the defect management area DMA1/DMA2 663 in the lead-in area 607 and the defect management area DMA3/DMA4 691 in the lead-out area 609 on the information storage medium (optical disk) 201 and checks the distribution of defects in the information storage medium (optical disk) 201 at that point of time (step ST141).

Once having known the distribution of defects in the information storage medium (optical disk) 201 from the defect distribution check, the control section 220 corrects the conversion table created on the assumption that there is no defect at step ST140, according to the actual distribution of defects (step ST142). Specifically, in each of the parts where it has become clear that there is a defect, the logical sector number LSN corresponding to the physical sector number PSN is shifted.

FIG. 13 is a flowchart to help explain an example of the operation of processing defects in a DVD-RAM disk or the like (the process on the drive side). The flowchart of FIG. 13 will be explained by reference to FIG. 11, too. First, for example, the begin logical block number LBN of the information to be recorded on the medium (for example, DVD-RAM disk) now installed in the drive and the file size of the information to be recorded are specified to the MPU in the control section 220 (step ST151).

Then, the MPU of the control section 220 calculates the begin logical sector number LSN for the information to be recorded from the specified begin logical block number LBN (step ST152). From the calculated begin logical sector number LSN and specified file size, the write logical sector number to the information storage medium (optical disk) 201 is determined.

Next, the MPU of the control section 220 not only writes a recording information file in the specified address on the DVD-RAM disk 201 but also checks for a defect in the disk 201 (step ST153).

When no defect has been found in the course of writing the file, this means that the recording information file has been recorded in a specific logical sector number with no abnormality (that is, without the occurrence of errors) and the recording process is completed properly (step ST155).

On the other hand, if a defect has been found in the course of writing the file, a specific replacement process, for example, a linear replacement algorithm, will be executed (step ST156).

After the replacement process, the newly sensed defect is registered additionally in DMA1/DMA2 663 of the lead-in area 607 and DMA3/DMA4 691 of the lead-out area 607 on the disk (see FIGS. 3 and 4) (step ST157). After the defect has been registered additionally in DMA1/DMA2 663 and DMA3/DMA4 691 on the information storage medium (optical disk) 201, the contents of the conversion table created at step ST140 of FIG. 12 are corrected on the basis of what has been registered in DMA1/DMA2 663 and DMA3/DMA4 691 (step ST158).

Next, UDF, a type of file system, will be explained by reference to FIGS. 14 and 15.

(A-1)

UDF is the abbreviation for universal disk format and shows "the rule for file management method" mainly in disk information storage mediums. CD-ROM, CD-R, CD-RW, DVD-Video, DVD-ROM, DVD-R, and DVD-RAM have employed the UDF format standardized in ISO 9660.

The file management method is based on a hierarchical file system where a root directory is provided as a parent and files are managed in tree form. Although the UDF format complying with the DVD-RAM standard (file system specifications) will be chiefly explained, most part of the explanation also coincides with the contents of the DVD-ROM standard.

(A-2) . . . Summary of UDF (A-2-1) Contents of file information recorded on information storage medium When information is recorded on an information storage medium, a block of information is called "file data." Recording is done in units of file data. To distinguish between one file data item from another, each file data item is assigned a unique file name. Grouping file data items that have the common contents of information facilitates file management and file retrieval. Such a group of file data items is called "directory" or "folder." Each directory is assigned a unique directory name (folder name). The directories may be collected into a high-order directory (high-order folder) as a group at a higher level of hierarchy. Here, the filed data and directory are generically called a file.

To record information, all the information about the following is recorded on an information storage medium:

Contents of file data items themselves

File name corresponding to the file data

Storage location of the file data (under which directory recording is done)

In addition, all the following information about each directory (folder) is also recorded on the information storage medium:

Directory name (folder name)

Location (location of a higher-order directory (higher-order folder) acting as its parent) to which each directory (folder) belongs (A-2-2) Information recording form on information storage medium All the recording area on an information storage medium is divided into logical sectors using the smallest unit of 2048 bytes. All the logical sectors are assigned logical sector numbers in sequence. When information is recorded on the information storage medium, information is recorded in logical sectors. The recording locations on the information storage medium are managed by the logical sector numbers of the logical sectors in which the information has been recorded.

As shown in FIGS. 14 and 15, logical sectors in which information about a file structure 486 and file data 487 have been recorded are particularly called "logical blocks" and assigned logical block numbers (LBN) interlocking with logical sector numbers (LSN). (A logical block has 2048 bytes long as a logical sector does.)

(A-2-3) Simplified example of hierarchical file system

In FIG. 16, the letter a indicates a simplified example of a hierarchical file system.

The file management system of almost every OS, including UNIX, MacOS, MS-DOS, and Windows, has a tree-like hierarchical structure as shown by a in FIG. 16.

For each disk drive (or each partition unit when a single HDD is divided into partitions), one root directly 401 acting as a parent for the whole drive exists. A subdirectory 402 belongs to the root directory. In the subdirectory 402, file data 403 exists.

There may be a case where file data 403 exists directly under the root directory 401 or where subdirectories 402 are connected in series to form a complex hierarchical structure.

(A-2-4) Contents of file management information recorded on the information dtorage medium The file management information is recorded in logical blocks. The contents recorded in each logical block include mainly the following items marked with *:

* Statement indicating information on files (FID as a file identification descriptor: file identification descriptor) . . . The types of files and file names (including root directory name, subdirectory name, and file data name) are written in the statement. In the FID, the contents of the data in the file following it and the statement indicating the location where the contents of the directory (that is, the location where the FE (file entry) explained below corresponding to the corresponding file) are written.

* Description of the location where the contents of a file are recorded (FE as file entry) The contents of the file data and the location (logical block number) on an information storage medium on which information about the contents of directories (such as subdirectories) have been recorded are written.

FIG. 21 shows an extract from the contents of the description of a file identification descriptor (explained later). Its detailed explanation will be given in "(B-4) Description of file identifier".

In a DVD-RAM, a logical block (sector size) contains 2048 bytes. A collection of logical blocks is called an extent. An extent is either one logical block or logical blocks assigned consecutive logical address numbers (LBN). To access the file data recorded on an information storage medium, pieces of information are read one by one according to the access route of FIG. 16 and access to the addresses (AD (*), LAD (*)) shown in the pieces of information is repeated, thereby accessing the desired file data.

Figure 18A:
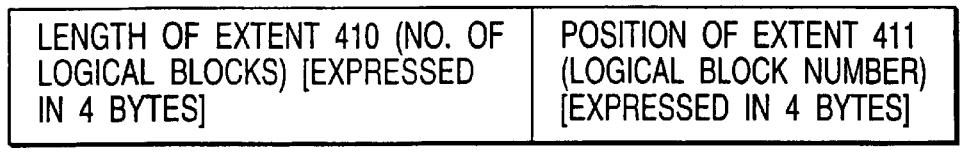
FIG. 18A shows an example of the contents of a short allocation descriptor.

Next, the statement indicating a recording location on the information storage medium uses a long allocation descriptor of FIG. 17 and a short allocation descriptor of FIG. 18A. FIG. 17 gives a general idea showing the basis relationship between a hierarchical file system structure and the contents of the information recorded on the information storage medium.

Their detailed explanation will be given in "(B-1-2) Long allocation descriptor" and "(B-1-3) Short allocation descriptor."

The contents of the information with the file system structure indicated by a of FIG. 16 recorded on the information storage medium are as shown by b of FIG. 16. The contents of the record indicated by a of FIG. 16 are as follows.

* The contents of the root directory 401 are written in the logical block with logical block number "1."

... Since in the example of a of FIG. 16, the root directory 401 includes only the subdirectory 402, information about the subdirectory 402 is written as the contents of the root directory 401 in the file identification descriptor statement 404.

Although not shown, information on the root directory 401 itself is also written in the file identification descriptor statement in the same logical block.

... The location (the second logical block in the example of b of FIG. 16) where a file entry statement 405 showing where the contents of the subdirectory 402 have been recorded has been recorded is written (LAD (2)) in a long allocation descriptor statement in the file identification descriptor statement 404 in the subdirectory.

* A file entry statement 405 showing the location where the contents of the subdirectory 402 have been recorded is recorded in the logical block with logical block number "2."

... Since in the example of a of FIG. 16, the subdirectory 402 includes only the file data 403, the contents of the subdirectory 402 virtually indicate the location where a file identification descriptor statement 406 in which information about the file data 403 has been written.

In the short allocation (short allocation) descriptor statement in the file entry statement, the fact (AD (3)) that the contents of the subdirectory 402 have been recorded in the third logical block is written.

* The contents of the subdirectory 402 are recorded in the logical block with logical block number "3."

... Since in the example of a of FIG. 16, the subdirectory 402 includes only the file data 403, information about the file data 403 is written as the contents of the subdirectory 402 in the file identification descriptor statement 406. Although not shown, information on the subdirectory 402 itself is also written in the file identification descriptor statement in the same logical block.

... The location (the fourth logical block in the example of b of FIG. 16) where a file entry statement 407 showing where the contents of the file data 403 have been recorded has been recorded is written (LAD (4)) in a long allocation descriptor statement in the file identification descriptor statement 404 related to the file data 403.

* A file entry statement 407 showing the location where the contents 408, 409 of the file data 403 have been recorded is recorded in the logical block with logical block number "4."

... In the short allocation descriptor statement in the file entry statement 407, the fact that the contents 408, 409 of the file data 403 have been recorded in the fifth and sixth logical blocks is written ((AD (5), AD (6)).

* The contents (a) 408 of the file data 403 are recorded in the logical block with logical block number "5."

* The contents (b) 409 of the file data 403 are recorded in the logical block with logical block number "6."

(A-2-5)

A method of accessing the file data according to the information indicated by b of FIG. 16

As briefly explained in "(A-2-4) Contents of file system information recorded on the information storage medium," the logical block numbers in which the subsequent information has been written are written in the file identification descriptors 404, 406 and file entries 405, 407. As the file data is reached by way of subdirectories, going down the hierarchy from the root directory, the contents of the file data are accessed by reproducing the pieces of information in the logical blocks on the information storage medium one by one according to the logical block numbers written in the file identification descriptor and file entry.

Specifically, To access file data item 403 for the information indicated by b of FIG. 16, the information in the first logical block is read for the first time.

Since the file data 403 exists in the subdirectory 402, after the information in the first logical block is searched for the file identification descriptor 404 in the subdirectory 402 and LAD (2) is read, the information in the second logical block is read according to LAD (2). Since only one file entry statement has been written in the second logical block, AD (3) in the second logical block is read and control proceeds to the third logical block. In the third logical block, the file identification descriptor 406 in which information about the file data 403 has been written is searched for and LAD (4) is read. According to LAD (4), control moves to the fourth logical block. Since only one file entry statement 407 has been written in the fourth logical block, AD (5) and AD (6) are read and the logical block numbers (the fifth and sixth ones) where the contents of the file data 403 have been recorded are found.

The contents of AD (*) and LAD (*) will be explained in detail in "(B) Concrete explanation of the contents of each statement (descriptor) in UDF."

(A-3) Characteristics of UDF (A-3-1) Explanation of the Characteristic of UDF

Hereinafter, the characteristics of UDF will be explained in comparison with FAT used in HDD, FDD, or MO.

(1) UDF uses larger minimum units (including the smallest logical block size and smallest logical sector size) and is suitable for recording video information or music information that is large in the amount of information to be recorded.

... The size of a UDF logical sector (block) is as large as 2048 bytes, whereas the size of a FAT logical sector is 512 bytes.

(2) While FAT causes a table for managing the allocation of files to an information storage medium (file allocation table) to be recorded collectively in a local part of the information storage medium, UDF allows the file management information to be recorded in a distributed manner in any location on the disk.

... In UDF, the locations where the file management information and file data are recorded on the disk are written in logical sector (block) numbers in an allocation descriptor.

* Since FAT provides centralized management in the file management area (file allocation table), it is suitable for applications that requires the file structure to be changed frequently (mainly use for frequent rewriting) (because the management information is written in the intensive locations, it can be rewritten easily). Since the location where the file management information (file allocation table) is recorded has been determined beforehand, it is a precondition that the recording medium has a high reliability (or few defective areas).

* Since in UDF, the file management information is placed in a distributed manner, there are few great changes in the file structure. UDF is suitable for applications that add a new file structure later (mainly additional recording use) in the lower part of the hierarchy (mainly the part below the root directory) (because in the case of additional recording, few changes are made to the original file management information). Moreover, since the locations where the distributed file management information is recorded can be specified arbitrarily, recording can be done, avoiding congenital defective parts.

Since the file management information can be recorded in any location, all the file management information may be gathered and recorded in one place, producing the effect of FAT. Therefore, UDF can be considered to be a highly versatile file system.

(B) Concrete explanation of each statement (descriptor) in UDF (B-1) Statement of logical block number (B-1-1) Allocation descriptor As described in "(A-2-4) Contents of file system information recorded on the information storage medium," a statement included in part of a file identification descriptor or a file entry and indicating the location (logical block number) where the subsequent information has been recorded is called an allocation descriptor. Allocation descriptors include long allocation descriptors and short allocation descriptors explained below.

(B-1-2) Long allocation descriptors

As shown in FIG. 17, a long allocation descriptor is composed of the following:
* The length of an extent 410 . . . The number of logical blocks is expressed in four bytes.
* The location of an extent 411 . . . The corresponding logical block number is expressed in four bytes.
* Implementation use 412 . . . The information used in operation is expressed in eight bytes.

In the explanation, a long allocation descriptor is abbreviated as "LAD (logical block number)."

(B-1-3) Short allocation descriptors

As shown in FIG. 18A, a short allocation descriptor is composed of only the following:
* The length of an extent 410 . . . The number of logical blocks is expressed in four bytes.
* The location of an extent 411 . . . The corresponding logical block number is expressed in four bytes.

In the explanation, a short allocation descriptor is abbreviated as "AD (logical block number)."

Figure 18B:
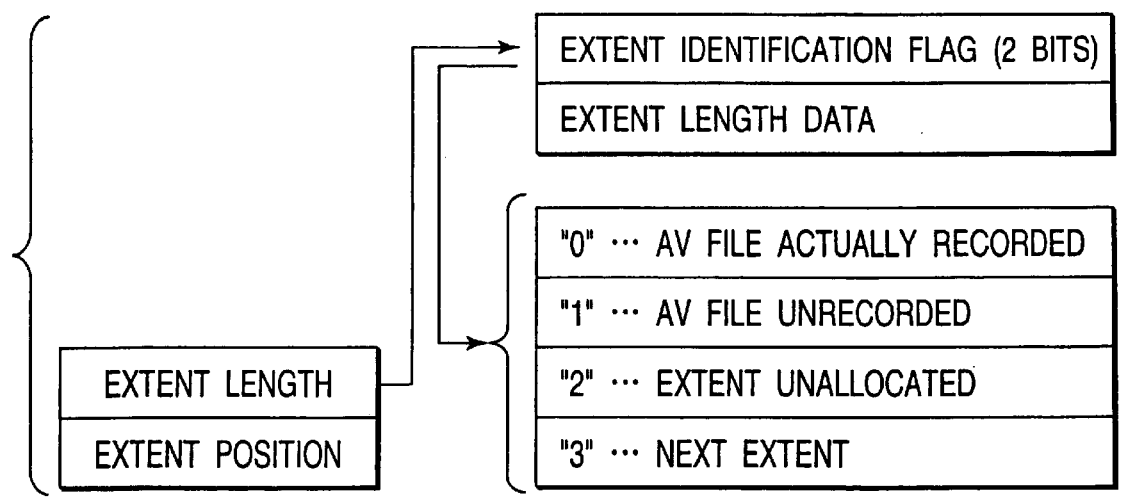
FIG. 18B shows an example of the contents of the extent length.

FIG. 18B shows an example of description in the extent length 410. For example, the first two bits may indicate the attribute of the extent.

When the first two bits are "0," this means an extent created by actually recording AV file data in the data area. When the first two bits are "1," this means an unused extent secured in the data area in which AV file data is to be recorded. When the first two bits are "2," this means that any extent has been neither recorded nor secured. When the first two bits are "3," this means that the extent is an extent following the allocation descriptor. These pieces of information may be used in the long allocation descriptor of FIG. 17.

(B-2) Unlocated space entry

Unlocated space entry is used in a space table (see FIGS. 14 and 15), a statement that writes, for example, "the extent distribution of unrecorded state" on the information storage medium for each extent in short allocation descriptors as shown in FIG. 19 and arranges them. The concrete contents written in an unlocated space entry are as follows:
* Descriptor tag 413 . . . Represents the descriptor for the description, particularly "263" in this case.
* ICB tag 414 . . . Represents the file type.

When the file type=1 in the ICB tag, this means an unlocated space entry. When the file type=4, this means that the file is a directory. When the file type=5, this means that it is explained that the file is a sequence of bytes that may be accessed at random.
* The total length of a string of allocation descriptors 415 . . . The total number of bytes is expressed in four bytes.

(B-3) File entry

This is almost the same as the statement explained in "(A-2-4) Contents of file system information recorded on the information storage medium".

As shown in FIG. 20A, the following are written in the file entry:
* Descriptor tag 417 . . . Represents the descriptor for the description, particularly "261" in this case.
* ICB tag 418 . . . Represents the file type→the contents are the same as in (B-2).
* Permissions 419 . . . Represents record/reproduce/delete permission information by user. Used mainly to maintain the security of the file. When the user is allowed to access the information, he or she can access it.
* Allocation descriptor 420 Writes the locations where the contents of the relevant file have been recorded by arranging short allocation descriptors for each extent.

FIG. 20B shows the file entry information in a hierarchical manner to summarize the above explanation. In the file entry (FE), at least the ICB tag and allocation descriptor are written. Moreover, the permission information and further information on the information length may be written. (See c in FIG. 44 explained later.)

In the field of the ICB tag, a field in which file types are to be written is further provided. In the file type field, a field in which identification of a real-time file, or an AV file, is to be written is secured. In the case of real-time file, file type=249 is written in this field.

When a volume set is composed of a single volume, a short allocation statement (see FIG. 18) is used in the allocation descriptor.

(B-4) File identification descriptor

This is almost the same as the statement explained in "(A-2-4) Contents of file system information recorded on the information storage medium". As shown in FIG. 21, the following are written in the file identification descriptor:
* Descriptor tag 411 . . . Represents the descriptor for the description, particularly "257" in this case.
* File characteristic 422 . . . Represents the type of file and means any one of parent directory, directory, file data, and file delete flag.
* Information control block 423 . . . The FE location corresponding to the file is written in long allocation descriptors.
* File identifier 424 . . . Directory name or file name.
* Padding . . . Dummy area added to adjust the total length of the file identification descriptor and usually filled with "0."

(C) Example of description of a file structure recorded on the information storage medium according to UDF The contents of "(A-2) Summary of UDF" will be described in detail using a concrete example.

Figure 22:
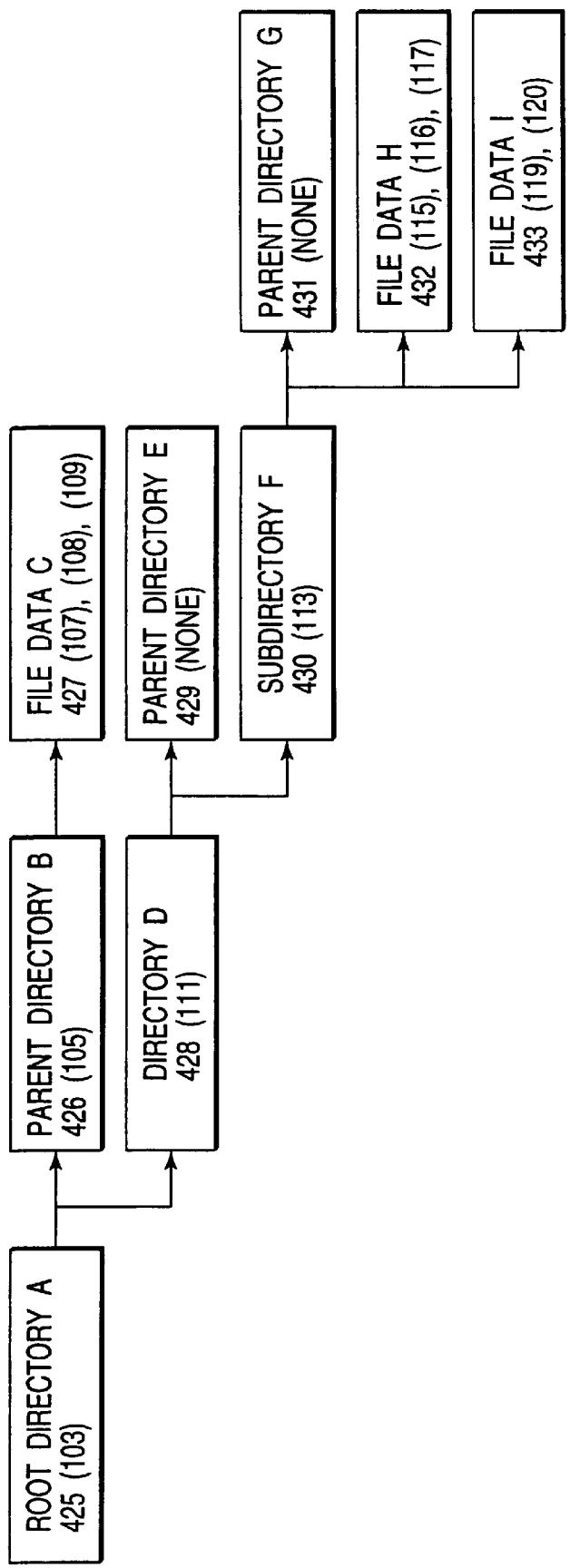
FIG. 22 shows an example of the structure of the file system.

FIG. 22 shows a more common file system structure for a of FIG. 16. The numerals in the parentheses represent logical block numbers on the information storage medium on which information about the contents of the directories or the contents of the file data have been recorded.

An example of recording information about the file system structure of FIG. 22 according to the UDF format is shown in the file structure 486 of FIGS. 14 and 15.

Methods of managing unrecorded locations on the information storage medium includes the following two methods:

* Space bit map (space bit map) method

. . . Either a "recorded" flag or an "unrecorded" flag is set in a bit map manner for all the logical blocks in the recording area on the information storage medium using space bit map descriptors 470.

* Space table (space table) method

. . . All the unrecorded logical block numbers are written in the form of a list of short allocation descriptors using a method of writing an unlocated space entry 471.

In the explanation of the present embodiment, although the two methods have been shown intentionally in FIGS. 14 and 15, actually however, the two methods are hardly used (recorded on the information storage medium) at the same time and only one of them is used.

An outline of the contents of the chief descriptors written in FIGS. 14 and 15 is as follows.

Beginning Extended area descriptor 445 . . . Represents the start position of a volume recognition sequence.

Boot descriptor 447 . . . Writes the contents of the process in booting.

Terminating Extended area descriptor 448 . . . Represents the end position of the volume recognition sequence.

Partition (division) descriptor 450 . . . Represents partition information (such as size). As a general rule, a DVD-RAM has a partition (part (division)) per volume.

Logical volume descriptor 454 . . . Writes the contents of a logical volume.

Anchor volume descriptor 458 . . . Indicates the locations where the main volume descriptor sequences 449 and 467 are recorded in the recording area of the information storage medium.

Reserved (a1100h bytes) 459 to 465 . . . Provides an adjusting area which is filled with "0" to secure logical sector numbers to record specific descriptors.

Reserved volume descriptor sequence 467 . . . Backup area for the information recorded in the main volume descriptor sequence 449.

(D) A method of accessing the file data in reproduction

Explanation will be given about a method of accessing the information storage medium to reproduce the contents of, for example, file data H432 (see FIG. 22) using the file system information shown in FIGS. 14 and 15.

(1) The information in the boot descriptor 447 in the volume acknowledge sequence 444 area serving as the boot area at the time of starting the information recording and reproducing device or installing the information storage medium is reproduced.

(2) The process in booting is started according to the contents of the boot descriptor 447. When no process in booting is specified, the information in the logical volume descriptor (logical volume descriptor) 454 in the main volume description sequence (main volume descriptor sequence) 449 area is first reproduced.

(3) Logical volume contents use 455 has been written in the logical volume descriptor 454. In the logical volume contents use, the logical block number indicating the location where a file set descriptor 472 has been recorded has been written in the form of a long allocation descriptor (see FIG. 17). (In the example of FIGS. 14 and 15, it has been written in the 100$^{th}$ logical block counting from LAD (100).)

(4) The 100$^{th}$ logical block (or logical sector number 372) is accessed and the file set descriptor 472 is reproduced. In the root directory ICB 473 in the file set descriptor, the location (logical block number) where the file entry for the root directory A425 has been recorded has been written in the form of a long allocation descriptor (see FIG. 17). (In the example of FIGS. 14 and 15, it has been written in the 102$^{nd}$ logical block counting from LAD (102).)

According to LAD (102) in the root directory ICB473, (5) According to LAD (102) in the root directory ICB 473, the 102$^{nd}$ logical block is accessed. Then, the file entry 475 for the root directory A425 is reproduced and the location (logical block number) where information about the contents of the root directory A425 has been recorded is read (AD (103)).

(6) The 103$^{rd}$ logical block is accessed and information about the contents of the root directory A425 is reproduced.

Because the file data H432 exists under the directory D428 system, the file identification descriptor for the directory D428 is searched for and the logical block number (LAD (110) although not shown in FIGS. 14 and 15) where the file entry for the directory D428 has been recorded is read.

(7) The 110$^{th}$ logical block is accessed and the file entry 480 for the directory D428 is reproduced. Then, the location (logical block number) where information about the contents of the directory D428 has been recorded is read (AD (111)).

(8) The 111$^{th}$ logical block is accessed and information about the contents of the directory D428 is reproduced.

Because the file data H432 exists directly under the directory F430, the file identification descriptor for the subdirectory F430 is searched for and the logical block number (LAD (112) although not shown in FIGS. 14 and 15) where the file entry for the subdirectory F430 has been recorded is read.

(9) The 112$^{th}$ logical block is accessed and the file entry 482 for the subdirectory F430 is reproduced. Then, the location (logical block number) where information about the contents of the subdirectory F430 has been recorded is read (AD (113)).

(10) The 113$^{th}$ logical block is accessed and information about the contents of the subdirectory F430 is reproduced. Then, the file identification descriptor for the file data H432 is searched for. From the descriptor, the logical block number (LAD (114) although not shown in FIGS. 14 and 15) where the file entry for the subdirectory H432 has been recorded is read.

(11) The 114$^{th}$ logical block is accessed and the file entry 484 for the file data H432 is reproduced. Then, the location where the contents of the file data H432 has been recorded is read.

(12) The information is read from the information storage medium in the order in which the logical block numbers have been written in the file entry 484 for the file data H432, thereby reading the contents of the file data H432.

(E) Method of changing the contents of specific file data

A processing method including a case where the contents of, for example, file data H432 are changed will be explained using the file system information shown in FIGS. 14 and 15.

(1) The difference between the volume of the contents of data before and after the file data H432 is changed is calculated. The resulting value is divided by 2048 bytes, thereby calculating beforehand how many additional logical blocks are needed or how many logical blocks are unnecessary.

(2) The information in the boot descriptor 447 in the volume recognition sequence 444 area serving as the boot area at the time of starting the information recording and reproducing device or installing the information storage medium is reproduced. The process in booting is started according to the contents of the boot descriptor 447.

When no process in booting is specified, control proceeds as follows.

(3) The partition (part (division)) descriptor 450 in the main volume descriptor sequence 449 area is reproduced and the information in the partition (division) contents use 451 written in the descriptor is read. The location where the space table or space bit map has been recorded is shown in the partition (division) contents use 451 (also referred to as partition (division) header descriptor).

The location of the space table is written in the column of the unallocated space table 452 in the form of a short allocation descriptor (AD (50) in the example of FIGS. 14 and 15).

The location of the space bit map table is written in the column of the unallocated space bit map 453 in the form of a short allocation descriptor (AD (0) in the example of FIGS. 14 and 15).

(4) The logical block number (0) where the space bit map read in (3) has been written is accessed. The space bit map information is read from the space bit map descriptor 470. Then, unregistered logical blocks are searched for and use of as many logical blocks as equal the result of calculation in item (1) is registered (the process of rewriting the space bit map descriptor 460 information). Alternatively, (4') The logical block number (50) where the space table read in (3) has been written is accessed. Then, USE(AD(*), AD(*), . . . , AD(*)) 471 in the space table is searched for unregistered logical blocks and use of as many logical blocks as equal the result of calculation in item (1) is registered (the process of rewriting the space table information).

* Actually, either process (4) or process (4') is carried out.

(5) Next, the information in the logical volume descriptor 454 in the main volume descriptor sequence 449 area is reproduced.

(6) The logical volume content use 455 has been written in the logical volume descriptor 454. In the descriptor, the logical block number indicating the location where the file set descriptor 472 has been recorded has been written in the form of a long allocation descriptor (FIG. 17). (In the example of FIGS. 14 and 15, the descriptor has been recorded in the 100$^{th}$ logical block counting from LAD (100).)

(7) The 100$^{th}$ logical block (or logical sector number 400) is accessed and the file set descriptor 472 is reproduced. In the root directory ICB473 in the descriptor, the location (logical block number) where the file entry for the root directory A425 has been recorded has been written in the form of a long allocation descriptor (see FIG. 16) (in the example of FIGS. 14 and 15, the file entry has been recorded in the 102$^{nd}$ logical block counting from LAD (102)).

(8) According to LAD (102) in the root directory ICB473, the 102$^{nd}$ logical block is accessed. Then, the file entry 475 for the root directory A425 is reproduced and the location (logical block number) where information about the contents of the root directory A425 has been recorded is read (AD (103)).

(9) The 103$^{rd}$ logical block is accessed and information about the contents of the root directory A425 is reproduced.

Because the file data A432 exists under the directory D428 system, the file identification descriptor for the directory D428 is searched for and the logical block number (LAD (110) although not shown in FIGS. 14 and 15) where the file entry for the directory D428 has been recorded is read.

(10) The 110$^{th}$ logical block is accessed. Then, the file entry 480 for the directory D428 is reproduced and the location (logical block number) where information about the contents of the directory D428 has been recorded is read (AD (111)).

(11) The 111$^{th}$ logical block is accessed and information about the contents of the directory D428 is reproduced.

Because the file data H432 exists directly under the directory F430, the file identification descriptor for the subdirectory F430 is searched for and the logical block number (LAD (112) although not shown in FIGS. 14 and 15) where the file entry for the subdirectory F430 has been recorded is read.

(12) The 112$^{th}$ logical block is accessed and the file entry 482 for the subdirectory F430 is reproduced. Then, the location (logical block number) where information about the contents of the subdirectory F430 has been recorded is read (AD (113)).

(13) The 113$^{th}$ logical block is accessed and information about the contents of the subdirectory F430 is reproduced. Then, the file identification descriptor for the file data H432 is searched for. From the descriptor, the logical block number (LAD (114) although not shown in FIGS. 14 and 15) where the file entry for the subdirectory H432 has been recorded is read.

(14) The 114$^{th}$ logical block is accessed and the file entry 484 for the file data H432 is reproduced. Then, the location where the contents of the file data H432 has been recorded is read.

(15) The contents 489 of the modified file data H432 are recorded, taking into account the logical block numbers registered additionally in either (4) or (4').

(F) A method of deleting specific file data/directory

As an example, a method of deleting file data H432 or subdirectory F430 will be explained.

(1) The information in the boot descriptor 447 in the volume recognition sequence 444 area serving as the boot area at the time of starting the information recording and reproducing device or installing the information storage medium is reproduced.

(2) The process in booting is started according to the contents of the boot descriptor 447. When no process in booting is specified, the information in the logical volume descriptor 454 in the main volume description sequence 449 area is first reproduced.

(3) Logical volume contents use 455 has been written in the logical volume descriptor 454. In the logical volume contents use, the logical block number indicating the location where the file set descriptor 472 has been recorded has been written in the form of a long allocation descriptor (see FIG. 17) (in the example of FIGS. 14 and 15, it has been written in the 100$^{th}$ logical block counting from LAD (100)).

(4) The 100$^{th}$ logical block (or logical sector number 400) is accessed and the file set descriptor 472 is reproduced. In the root directory ICB 473 in the file set descriptor, the location (logical block number) where the file entry for the root directory A425 has been recorded has been written in the form of a long allocation descriptor (see FIG. 17) (in the example of FIGS. 14 and 15, it has been written in the 102$^{nd}$ logical block counting from LAD (102)).

(5) According to LAD (102) in the root directory ICB 473, the 102$^{nd}$ logical block is accessed. Then, the file entry 475 for the root directory A425 is reproduced and the location (logical block number) where information about the contents of the root directory A425 has been recorded is read (AD (103)).

(6) The 103$^{rd}$ logical block is accessed and information about the contents of the root directory A425 is reproduced.

Because the file data H432 exists under the directory D428 system, the file identification descriptor for the directory D428 is searched for and the logical block number (LAD (110) although not shown in FIGS. 14 and 15) where the file entry for the directory D428 has been recorded is read.

(7) The 110$^{th}$ logical block is accessed and the file entry 480 for the directory D428 is reproduced. Then, the location (logical block number) where information about the contents of the directory D428 has been recorded is read (AD (111)).

(8) The 111$^{th}$ logical block is accessed and information about the contents of the directory D428 is reproduced.

Because the file data H432 exists directly under the directory F430, the file identification descriptor for the subdirectory F430 is searched for.

<To delete subdirectory F430, the process as described below is carried out>

"File delete flag" is set in the file characteristic 422 (see FIG. 21) in the file identification descriptor for the subdirectory F430.

The logical block number (LAD (112) although not shown in FIGS. 14 and 15) where the file entry for the subdirectory F430 has been recorded is read.

(9) The 112$^{th}$ logical block is accessed and the file entry 482 for the subdirectory F430 is reproduced. Then, the location (logical block number) where information about the contents of the subdirectory F430 has been recorded is read (AD (113)).

(10) The 113$^{th}$ logical block is accessed and information about the contents of the subdirectory F430 is reproduced. Then, the file identification descriptor for the file data H432 is searched for.

<To delete subdirectory H432, the process as described below is carried out>

"File delete flag" is set in the file characteristic 422 (see FIG. 21) in the file identification descriptor for the subdirectory F432. From the descriptor, the logical block number (LAD (114) although not shown in FIGS. 14 and 15) where the file entry for the subdirectory H432 has been recorded is read.

(11) The 114$^{th}$ logical block is accessed and the file entry 484 for the file data H432 is reproduced. Then, the location where the contents of the file data H432 has been recorded is read.

<To delete file H432, the process as described below is carried out>

The logical blocks in which the contents of data 489 of the file data H432 have been recorded are released (or the logical blocks are registered in the unrecorded state).

(12) The partition (division) descriptor 450 in the main volume descriptor sequence 449 area is reproduced and the information in the partition (division) contents use 451 written in the descriptor is read. The location where the space table or space bit map has been recorded is shown in the partition (division) contents use 451 (also referred to as partition (division) header descriptor).

The location of the space table is written in the column of the unallocated space table 452 in the form of a short allocation descriptor (AD (50)) in the example of FIGS. 14 and 15).

The location of the space bit map table is written in the column of the unallocated space bit map 453 in the form of a short allocation descriptor (AD (0)) in the example of FIGS. 14 and 15).

(13) The logical block number (0) where the space bit map read in item (12) has been written is accessed. The "logical block numbers to be released" obtained as the result of item (11) are rewritten into a space bit map descriptor 470. Alternatively, (13') The logical block number (50) where the space table read in item (12) has been written is accessed. Then, the "logical block numbers to be released" obtained as the result of item (11) are rewritten into a space table.

* Actually, either item (13) or process (13') is carried out.

<To delete file H432, the process as described below is carried out>

(12) The location where the contents of the file data H432 have been recorded is read following the same procedures in item (10) and item (11).

(13) Next, the partition (division) descriptor 450 in the main volume descriptor sequence 449 area is reproduced and the information in the partition (division) contents use 451 written in the descriptor is read. The location where the space table or space bit map has been recorded is shown in the partition (division) contents use 451.

The location of the space table is written in the column of the unallocated space table 452 in the form of a short allocation descriptor (AD (50)) in the example of FIGS. 14 and 15).

The location of the space bit map table is written in the column of the unallocated space bit map 453 in the form of a short allocation descriptor (AD (0)) in the example of FIGS. 14 and 15).

(14) The logical block number (0) where the space bit map read in item (13) has been written is accessed. The "logical block numbers to be released" obtained as the results of item (11) and item (12) are rewritten into a space bit map descriptor 470. Alternatively, (14') The logical block number (50) where the space table read in item (13) has been written is accessed. Then, the "logical block numbers to be released" obtained as the results of item (11) and item (12) are rewritten into a space table.

* Actually, either item (14) or process (14') is carried out.

(G) The process of adding file data/directory

As a example, explanation will be given about an accessing and adding method in adding new file data or directories under the subdirectory F430.

(1) To add file data, the volume of the contents of the file data to be added is checked. The resulting value is divided by 2048 bytes, thereby calculating beforehand the number of logical blocks needed to add file data.

(2) The information in the boot descriptor 447 in the volume recognition sequence 444 area serving as the boot area at the time of starting the information recording and reproducing device or installing the information storage medium is reproduced. The process in booting is started according to the contents of the boot descriptor 447. When no process in booting is specified, control proceeds as follows.

(3) The partition (division) descriptor 450 in the main volume descriptor sequence 449 area is reproduced and then the information in the partition (division) contents use 451 written in the descriptor is read. The location where the space table or space bit map has been recorded is shown in the partition (division) contents use 451 (also referred to as partition (division) header descriptor).

The location of the space table is written in the column of the unallocated space table 452 in the form of a short allocation descriptor (AD (50)) in the example of FIGS. 14 and 15).

The location of the space bit map table is written in the column of the unallocated space bit map 453 in the form of a short allocation descriptor (AD (0)) in the example of FIGS. 14 and 15).

(4) The logical block number (0) where the space bit map read in item (3) has been written is accessed. The space bit map information is read from the space bit map descriptor 470. Then, unregistered logical blocks are searched for and use of as many logical blocks as equal the result of calculation in item (1) is registered (the process of rewriting the space bit map descriptor 460 information). Alternatively, (4') The logical block number (50) where the space table read in item (3) has been written is accessed. Then, USE (AD(*), AD(*), . . . , AD(*)) 471 in the space table is searched for unregistered logical blocks and use of as many logical blocks as equal the result of calculation in item (1) is registered.

* Actually, either process (4) or process (4') is carried out. (The process of rewriting the space table information)

(5) Next, the information in the logical volume descriptor 454 in the main volume descriptor sequence 449 area is reproduced.

(6) The logical volume content use 455 has been written in the logical volume descriptor 454. In the descriptor, the logical block number indicating the location where the file set descriptor 472 has been recorded has been written in the form of a long allocation descriptor (see FIG. 17). (In the example of FIGS. 14 and 15, the descriptor has been recorded in the $100^{th}$ logical block counting from LAD (100).)

(7) The $100^{th}$ logical block (or logical sector number 400) is accessed and the file set descriptor 472 is reproduced. In the root directory ICB473 in the descriptor, the location (logical block number) where the file entry for the root directory A425 has been recorded has been written in the form of a long allocation descriptor (see FIG. 17) (in the example of FIGS. 14 and 15, the file entry has been recorded in the $102^{nd}$ logical block counting from LAD (102)).

(8) According to LAD (102) in the root directory ICB473, the $102^{nd}$ logical block is accessed. Then, the file entry 475 for the root directory A425 is reproduced and the location (logical block number) where information about the contents of the root directory A425 has been recorded is read (AD (103)).

(9) The $103^{rd}$ logical block is accessed and information about the contents of the root directory A425 is reproduced.

The file identification descriptor for the directory D428 is searched for and the logical block number (LAD (110) although not shown in FIGS. 14 and 15) where the file entry for the directory D428 has been recorded is read.

(10) The $110^{th}$ logical block is accessed. Then, the file entry 480 for the directory D428 is reproduced and the location (logical block number) where information about the contents of the directory D428 has been recorded is read (AD (111)).

(11) The $111^{th}$ logical block is accessed and information about the contents of the directory D428 is reproduced.

The file identification descriptor for the subdirectory F430 is searched for and the logical block number (LAD (112) although not shown in FIGS. 14 and 15) where the file entry for the subdirectory F430 has been recorded is read.

(12) The $112^{th}$ logical block is accessed and the file entry 482 for the subdirectory F430 is reproduced. Then, the location (logical block number) where information about the contents of the subdirectory F430 has been recorded is read (AD (113)).

(13) The $113^{th}$ logical block is accessed and the file identification descriptor for the file data or directory to be added newly to information about the contents of the subdirectory F430 is registered.

(14) The location where the logic block number has been registered in item (4) or (4') is accessed and the file data or directory to be newly added is recorded.

(15) The location for the logical block number shown in the short allocation descriptor in the file entry in (14) is accessed. Then, the file identification descriptor for the parent directory related to the directory to be added or the contents of the file data to be added is recorded.

The contents (data structure) of the information recorded on an information storage medium (optical disk 1001) on and from which video information and audio information of FIG. 23 can be recorded or reproduced will be explained below by reference to FIGS. 24 and 25.

A schematic data structure of the information recorded on the information storage medium 1001 is such that, as indicated by b in FIG. 23, the information is divided as follows starting from the inner edge side 1006:

A lead-in area 1002 having an embossed data zone whose reflecting surface is uneven, a mirror zone whose surface is flat (mirror-like), and a rewritable data zone where information is rewritable, volume and file management information 1003 in which information about files of or the entire amount of audio and video data recorded in a rewritable table data zone that allows the user to record or rewrite data is to be recorded, a data area 1004 composed of a rewritable table data zone that enables the user to record or rewrite data, and a lead-out area 1005 composed of a rewritable table data zone where information is rewritable.

In the embossed data zone of the lead-in area 1002, the following have been recorded beforehand:

Information about an entire information storage medium, including disk type, such as DVD-ROM, DVD-RAM, or DVD-R, disk size, recording density, and physical sector numbers indicating the recording start/recording end locations.

Information about recording, reproducing, and deleting characteristics, including recording power, recording pulse width, deleting power, reproducing power, and linear velocity in recording and deleting.

Information about the manufacture of each information storage medium, such as serial number.

Each of the rewritable table data zone of the lead-in area 1002 and the rewritable table data zone of the lead-out area 1005 has the following:

Disk name recording zone unique to each information storage medium.

Trial recording zone (for checking recording and deleting conditions).

Management information recording zone for defective areas in the data area 1004.

An information recording and reproducing device can record data in the above zones.

Figure 23:
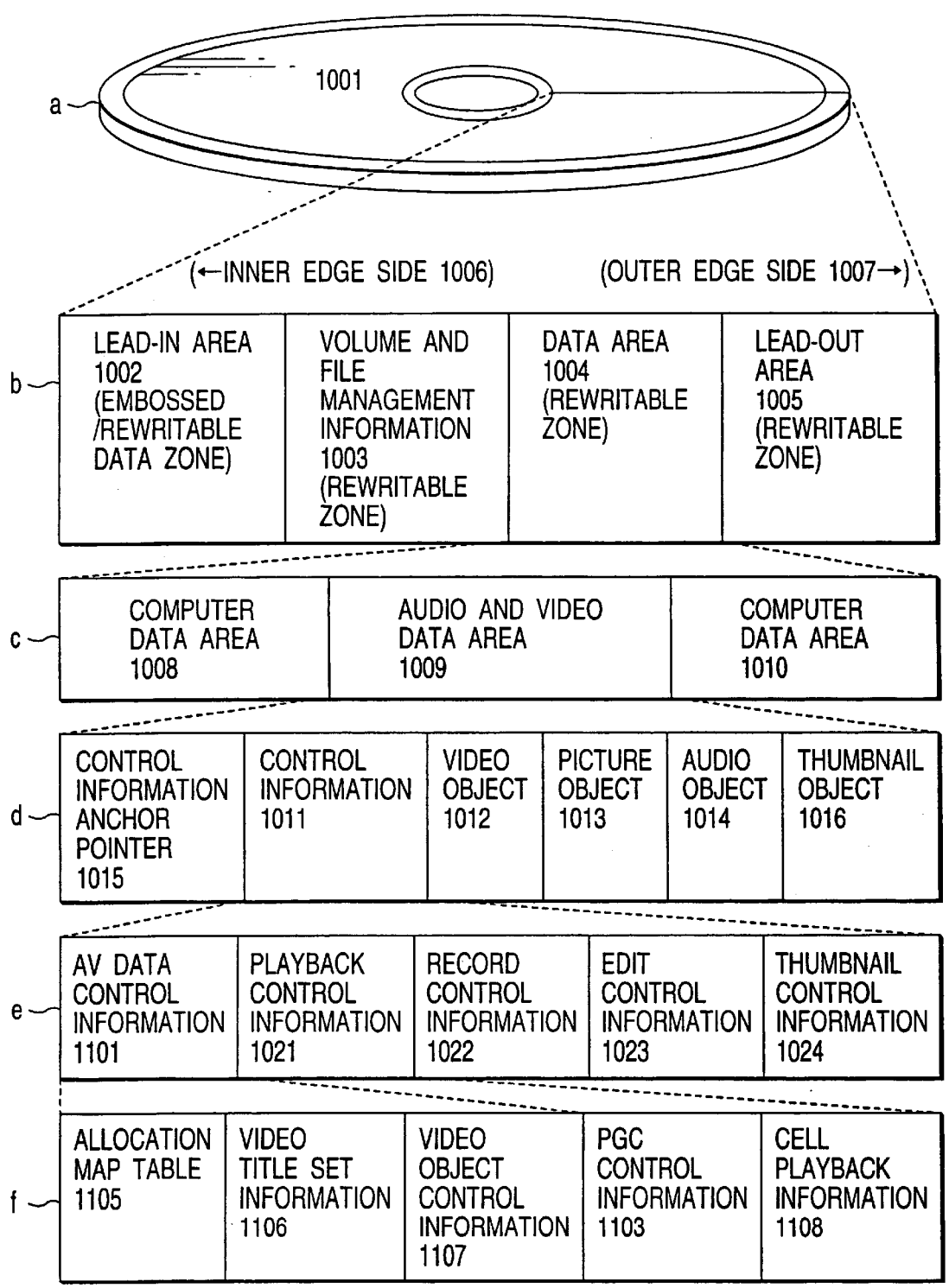
FIG. 23 is an explanatory diagram showing the data structure on a video recordable/reproducible information storage medium.

In the data area 1004 sandwiched between the lead-in area 1002 and lead-out area 1005, computer data and audio & video data can be recorded in a mixed manner as indicated by c in FIG. 23. The order in which the computer data and audio & video data are recorded and the recording information size of each of them are arbitrary. Areas in which the computer data is recorded are called computer data areas 1008, 1010 and an area in which the audio & video data is recorded is called audio & video data area 1009.

The data structure of the information recorded in the audio & video data area 1009 is composed of the following as shown by d in FIG. 23:

Anchor pointer information 1015 for control information→Information indicating the begin position (begin address) where control information 1011 has been recorded in the audio & video data area 1009.

Control information 1011→Control information necessary to carry out each of video recording (audio recording), reproducing, editing, and retrieving.

Video objects 1012→Video recording information about the contents of video data.

Picture objects 1013→Still picture information about still pictures or slide pictures.

Audio objects 1014→Audio recording information about the contents of audio data.

Thumbnail objects 1016→Information including thumbnails used in searching for the desired place in the video data or in editing.

The video objects 1012, picture objects 1013, audio objects 1014, and thumbnail objects 1016 in FIG. 23, d mean groups of information classified by contents (the contents of data). Therefore, All the video information recorded in the audio & video data area 1009 is included in the video objects 1012; all the still picture information is included in the picture objects 1013; all the audio and audio information is included in the audio objects 1014; and all the thumbnail information used in managing and retrieving video information is included in the thumbnail objects 1016.

Figure 24:
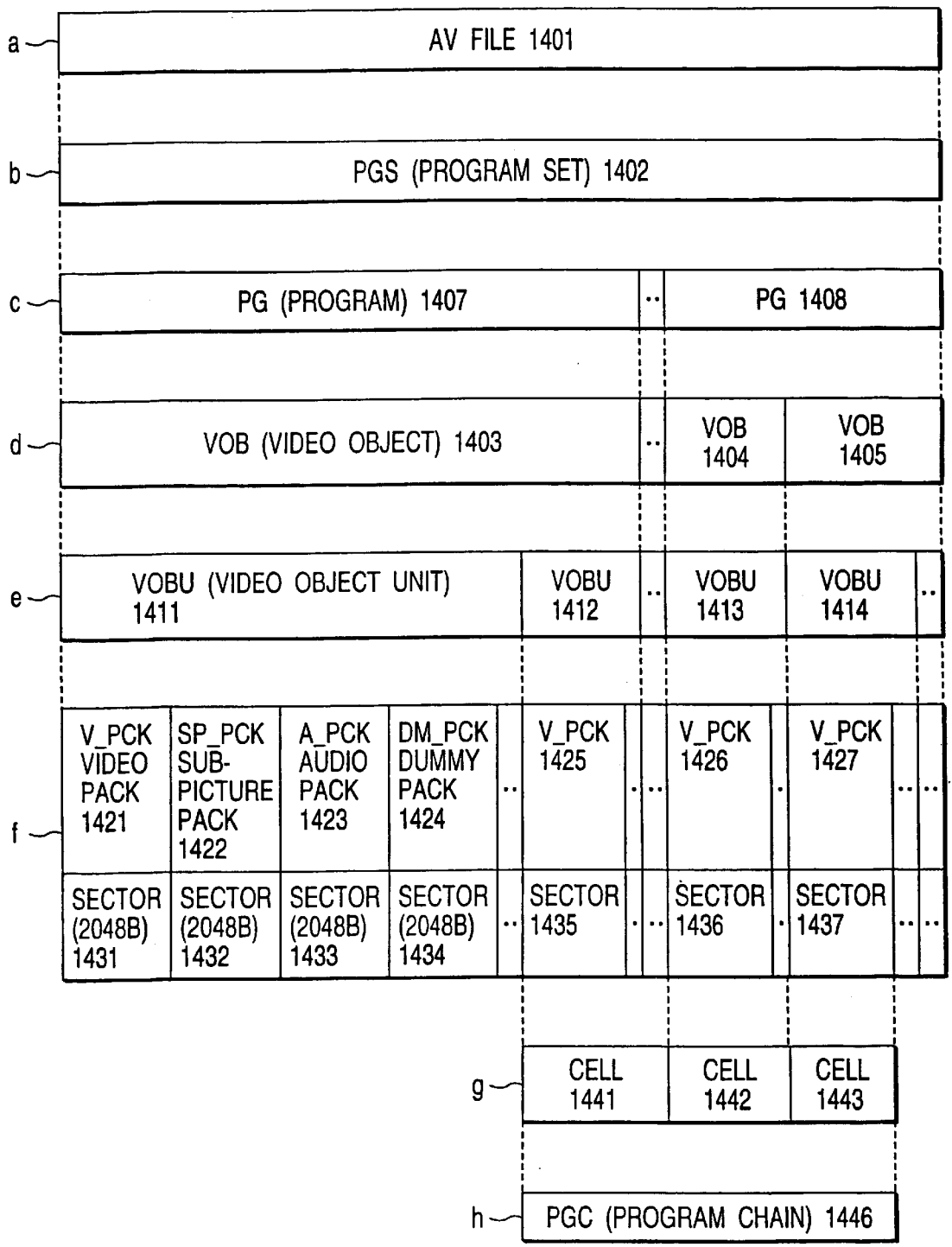
FIG. 24 is an explanatory diagram showing the data structure in an AV file recorded on an information storage medium.

VOB1403 of FIG. 24 shows a block of information recorded in the AV file 1401, which is defined differently from the video objects 1012 indicated by d in FIG. 23. Because similar terms are used to mean totally different things, care should be taken.

The contents of control information 1011 include the following:

AV data control information 1101: Management information about the management of the data structure in video objects 1012 or recording locations on the optical disk 1001, an information storage medium.

Playback control information 1021: Control information necessary for playback.

Recording control information (recording (video recording) control information) 1022: Control information necessary for recording (video recording and audio recording).

Edit control information 1023: Control information necessary for editing.

Thumbnail control information 1024: Management information about thumbnails (thumbnail objects) for searching for or editing the desired place in the video data.

The data structure in AV data control information 1101 indicated by e in FIG. 23 is composed of the following:

Allocation map table (allocation map table) 1105: Information about address setting and identification of recorded and unrecorded areas according to the actual layout on an information storage medium (optical disk 1001).

Video title set information 1106: Indicates the contents of the entire information in AV file 1401 as shown in FIG. 24 and includes information about a relation between the individual video objects (VOB), grouping information about a plurality of VOBs for management and retrieval, and a time map table.

Video object control information 1107: Indicates information about each of the VOBs in AV file 1401 as shown by c in FIG. 24 and includes attribute (characteristic) information about each VOB and information about each VOBU in VOB.

Program chain control information (PGC control information) 1103: Information about video information playback program (sequence).

Self-playback information (cell playback information) 1108: Information about the data structure in video information basic units at the time of playback.

The above is a general view of FIG. 23 up to f and some supplementary explanation of each piece of information will be given below.

In the volume and file manager information 1003, the following are recorded:

Information about the whole volume.

The number of files of PC data included and the number of files related to AV data.

Recording layer information.

As the recording layer information, the following are particularly recorded:

The number of component layers (examples: a RAM/ROM two-layer disk is counted as two layers, a ROM two-layer disk is counted as two layers, an n number of single-sided disks are counted as n layers).

A logical sector number range table allocated to each layer (the capacity for each layer).

Characteristic of each layer (examples: DVD-RAM disk, the RAM section of RAM/ROM two-layer disk, CD-ROM, and CD-R).

Logical sector number range table allocated to each zone in the RAM area for each layer (including information about the capacity of an area where rewriting is possible layer by layer).

ID information unique to each layer (to find disk replacement in a multiple disk pack).

Consecutive logical sector numbers are set even in a multiple disk pack or RAM/ROM two-layer disk, thereby enabling the pack or disk to be used as a large volume space.

In the playback control information 1021, the following are recorded:

Information about a playback sequence to combining PGCs into one.

Information indicating spurious recording positions regarding an information storage medium as VTR or DVC in connection with the above (the sequence in which all the recorded cells are reproduced consecutively).

Information about simultaneous playback of screens with different pieces of video information.

Retrieval information ( . . . information in which a table listing the corresponding cell ID and the start time in the cell is recorded for each retrieval category and which enables the user to select a category and access the video information directly).

In the record control information 1022, program reservation video recording information and others are recorded.

In the edit control information 1023, the following are recorded:

Special editing information about each PGC ( . . . the corresponding time setting information and special editing contents are written as EDL information).

File conversion information ( . . . converts a specific part of the AV file into a file that enables special editing on the PC, such as an AVI file, and specifies the place in which the converted file is stored).

In the thumbnail control information 1024, the following is recorded:

Management information about thumbnail objects 1016 (the place where each thumbnail picture is recorded in the audio and video data area 1009, specifying information about the VOB or cell related to each thumbnail image, and information about places in the VOB or cell related to each thumbnail picture). (The VOB and cell will be explained in detail in an explanation of FIG. 24.)

All the information recorded in the data area 1004 indicated by b in FIG. 23 is recorded in files. The relationship between the individual data files is managed by a directory structure as shown in FIG. 25.

Under a root directory 1450, subdirectories 1451 are provided to facilitate classification according to the contents of a file. In the embodiment of FIG. 25, each data file related to the computer data recorded in the computer data areas 1008, 1010 indicated by c in FIG. 23 is recorded under a computer data storage subdirectory 1457 and the audio and video data recorded in the audio and video data area 1009 is recorded under a rewritable video title set (RWV_TS) 1452. When the video information recorded in a DVD video disk is copied as shown by a in FIG. 23, it is copied under a video title set (VIDEO_TS) 1455 and an audio title set (AUDIO_TS) 1456.

The control information 1011 indicated by d in FIG. 23 is recorded as recording/reproducing video management data in the form of a single file. In the embodiment of FIG. 25, the name of the file is RWVIDEO_CONTROL.IFO. The same information is recorded under the file name RWVIDEO_CONTROL.BUP as a backup copy. The RWVIDEO_CONTROL.IFO and RWVIDEO_CONTROL.BUP files are treated as conventional computer files.

Figure 25:
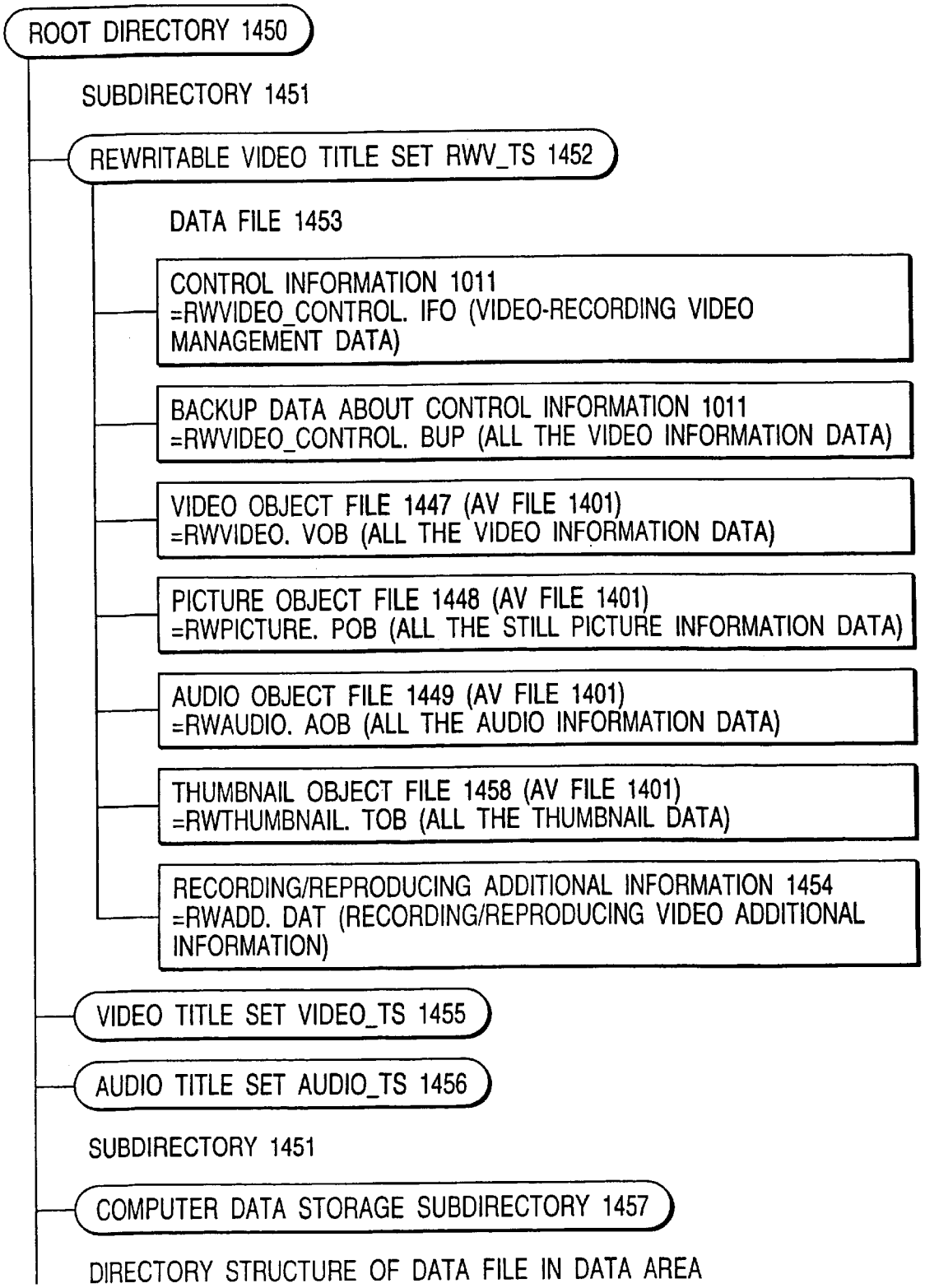
FIG. 25 is an explanatory diagram showing the directory structure of a data file in the data area.

In the embodiment of FIG. 25, all the video information data belonging to the video objects 1012 indicated by d in FIG. 23 is recorded collectively in the video object file 1447 whose file name is RWVIDEO.VOB. Specifically, all the video information data belonging to the video objects 1012 indicated by d in FIG. 23 is concatenated continuously in a single VTS (video title set 1402) and recorded continuously in a single file, the single video object file 1447 (that is, all the video information data is recorded collectively in a single file without dividing a file into PTT (Part_of_Title) 1407, 1408).

Furthermore, All the still picture information data belonging to the picture objects 1013 is recorded collectively in a picture object file 1448 whose file name is RWPICTURE.POB. The picture objects 1013 include pieces of still picture information. A digital camera has employed a method of recording a single still picture in the form of a different file. Differently from the recording method of the digital camera, the embodiment of the present invention is characterized in that all the still pictures included in the picture objects 1013 are concatenated continuously in the same manner as in FIG. 24 and recorded collectively in a single picture object file 1448 whose file name is RWPICTURE.POB.

Similarly, all the audio information belonging to the audio objects 1014 is recorded collectively in a single audio object file 1449 whose name is RWAUDIO.AOB and all the thumbnail information belonging to the thumbnail objects 1016 is recorded collectively in a thumbnail object file 1458 whose name is RWTHUMBNIL.TOB.

The video object file 1447, picture object file 1448, audio object file 1449, and thumbnail object file 1458 are all treated as AV files 1401.

Although not shown in FIG. 23, recording/reproducing additional information 1454 usable in video-recording or reproducing pictures can be recorded simultaneously. The information is recorded collectively in a single file, which is given the file name RWADD.DAT.

The data structure of an AV file is shown in FIG. 24. As indicated by b in FIG. 24, the whole AV file 1401 constitutes a single PGS (program set) 1402. The PGS (program set) 1402 is composed of a collection of VOB (video objects) 1403, 1404, 1405 separated in the order in which the pieces of information have been recorded in the contents of the audio and video data or the AV file 1401.

VOB (video objects) 1403, 1404, 1405 indicated by d in FIG. 24 are defined as a collection of audio and video data recorded in the AV file 1401 and differ in definition from the video objects 1012 indicated by d in FIG. 23 where classification items, including still picture information/audio information/thumbnail information, are given priority. Therefore, in the VOB (video objects) 1403, 1404, 1405 indicated by d in FIG. 24, not only the information classified as the video objects 1012 has been recorded, but also the information classified as the picture objects 1013, audio objects 1014, or thumbnail objects 16 as shown in FIG. 23 has been recorded.

On the basis of the contents of the information recorded in each of the VOBs 1403, 1404, 1405, related VOBs are put together into a group and the individual groups constitute PGs (programs) 1407, 1408. Namely, PGs 1407, 1408 are composed of sets of one or more VOBs. In the embodiment indicated by c in FIG. 24, VOB 1408 and VOB 1405 constitute PG (program) 1408. PG 1407 is composed of only one VOB.

The smallest basic units of video information are called VOBUs (video object units) 1411 to 1414. The data in the VOBs 1403 to 1405 are composed of collections of the VOBUs 1411 to 1414. MPEG 1 or MPEG 2 are often used as video information compression techniques in the video objects 1012. In MPEG, video information is divided into groups called GOPs at intervals of 0.5 second, thereby compressing the video information in GOPs. The video object units 1411 to 1414, video information compression units, are formed so as to have almost the same size as that of the GOPs in synchronization with the GOPs.

Furthermore, each of the video object units 1411 to 1414 is recorded in such a manner that it is divided into sectors 1431 to 1437, each sector containing 2048 bytes. In each of the sectors 1431 to 1437, recording is done in the form of a pack structure. In the respective sectors, the raw video information, sub-picture information, audio information, and dummy information are recorded in the form of packs, including V_PCK (video packs) 1421, 1425, 1426, 1426, SP_PCK (sub-picture pack) 1422, A_PCK (audio pack) 1423, and DM_PCK (dummy pack) 1424. Since each pack has a 14-byte pack header at its head, the amount of information recorded in each pack is 2034 bytes.

DM_PCK 1424 has been inserted beforehand for the purpose of, for example, adding additional recording information after video recording ( . . . for example, additional recording is put in an audio pack and the resulting pack is replaced with a dummy pack, or memo information is inserted in sub-picture information (a sub-picture pack) and the resulting pack is replaced with a dummy pack).

The recording area of a DVD-RAM, an example of the information storage medium 1001 indicated by a in FIG. 23 is divided into sectors. In each sector, 2048 bytes of data can be recorded. In the DVD-RAM disk, recording or reproducing is done in sectors (or in units of 2048 bytes). Therefore, when a DVD-RAM disk is used as an information storage medium (optical disk 1001), each pack is recorded in sectors 1431 to 1437 as indicated by f in FIG. 24.

As indicated by b and d in FIG. 24, a consecutive connection of all the VOBs 1403 to 1405 in the AV file 1401 constitutes a VTS (video title set) 1402. In the playback sequence written in the playback control information 1021, an arbitrary range in an arbitrary VOB can be specified and further playback can be performed in an arbitrary playback sequence. Video information basic units in playback are called cells 1441, 1442. 1443. The cells 1441, 1442. 1443 can specify an arbitrary range in an arbitrary VOB but cannot specify an arbitrary range extending over VOBs (that is, cannot set a range by connecting VOBs in a single cell).

In the embodiment indicated by g in FIG. 24, cell 1441 specifies a single VOBU 1412 in the VOB 1403, cell 1442 specified an entire VOB 1404, and cell 1443 specifies a range only in a specific pack (V_PCK 1427) in the VOB 1414.

Information representing a video information playback sequence is set by PGC (program chain) 1446. The playback sequence is written by a single cell specification or information about a connection of cells. For example, in the embodiment indicated by h in FIG. 24, PGC 1446 constitutes a playback program in the form of a connection of cell 1441, cell 1442, and cell 1443 (the relationship between cells and PGC will be explained in detail later).

Using FIGS. 26 and 27, the contents of playback control information 1021 will be explained.

Figure 26:
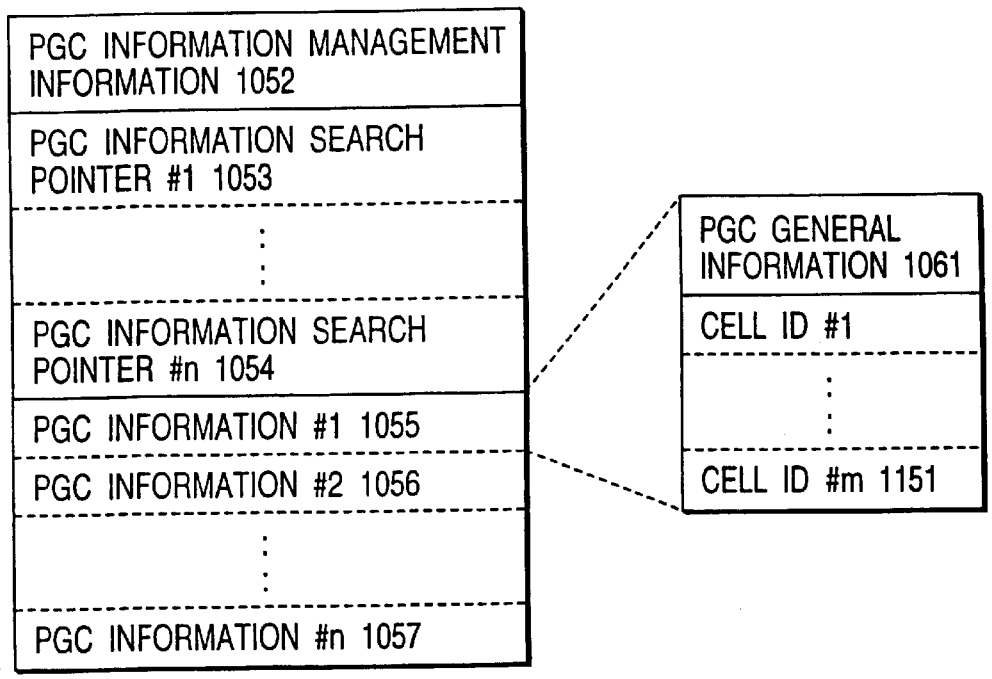
FIG. 26 is an explanatory diagram showing the data structure in the program chain control information.

PGC (program chain) control information 1103 in the playback control information 1021 has a data structure shown in FIG. 26 and the playback sequence is determined by PGC and cell. PGC shows a unit in executing a series of playback in the specified playback sequence of cells. A cell represents a playback section where playback data in each VOB is specified by a start address and an end address as shown by f in FIG. 24.

The PGC control information 1103 is composed of PGC information management information 1052, one or more PGC information search pointer (search pointer of PGC information) 1053, 1054, and pieces of PGC information 1055, 1056, 1057.

The PGC information management information 1052 includes information indicating the number of PGCs (the number of pieces of PGC information). The PGC search pointers point at the head of each pieces of PGC information, facilitating search. Each of the pieces of PGC information 1055, 1056, 1057 is composed of PGC general information 1061 and one or more pieces of cell playback information. The PGC general information 1061 includes information indicating the playback time of PGC and the number of cells (the number of pieces of cell playback information).

Figure 27:
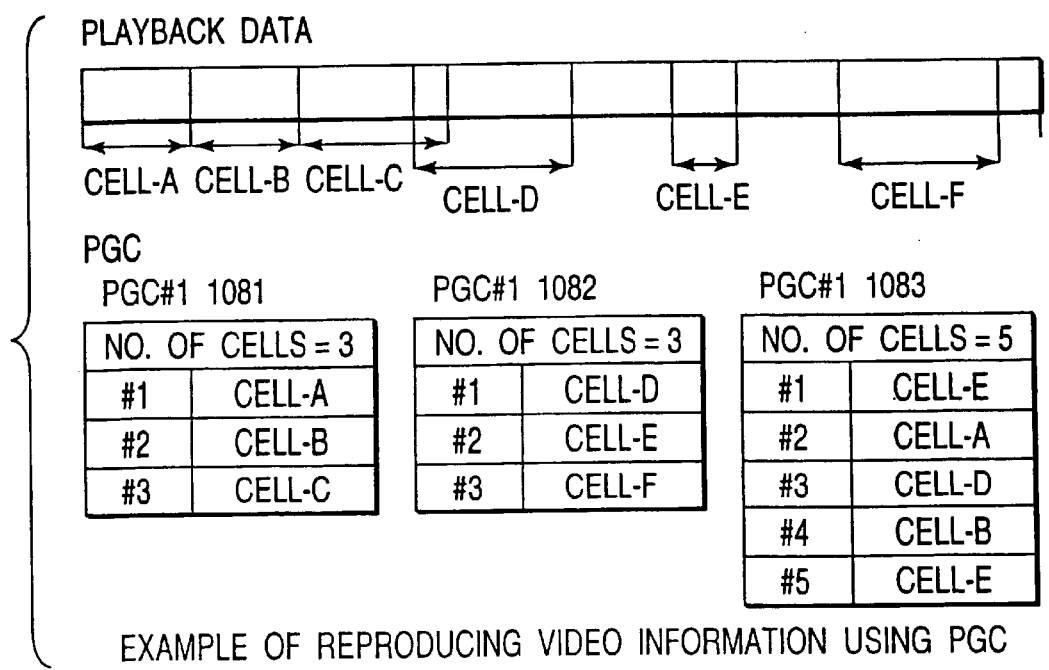
FIG. 27 is an explanatory diagram showing an example of reproducing the video information using program chains.

As shown in FIG. 27, a playback section from Cell-A to Cell-F is specified in cells of playback data. In each PGC, PGC information has been defined.

(1) PGC #1 shows an example of being composed of cells specifying a continuous playback section. Its playback sequence is as follows:

Cell-A→Cell-B→Cell-C.

(2) PGC #2 shows an example of being composed of cells specifying an intermittent playback section. Its playback sequence is as follows:

Cell-D→Cell-E→Cell-F.

(3) PGC #3 shows an example of being capable of skipped playback, regardless of the direction of playback or repetitive playback. Its playback sequence is as follows:

Cell-A→Cell-D→Cell-B→Cell-E.

Figure 28:
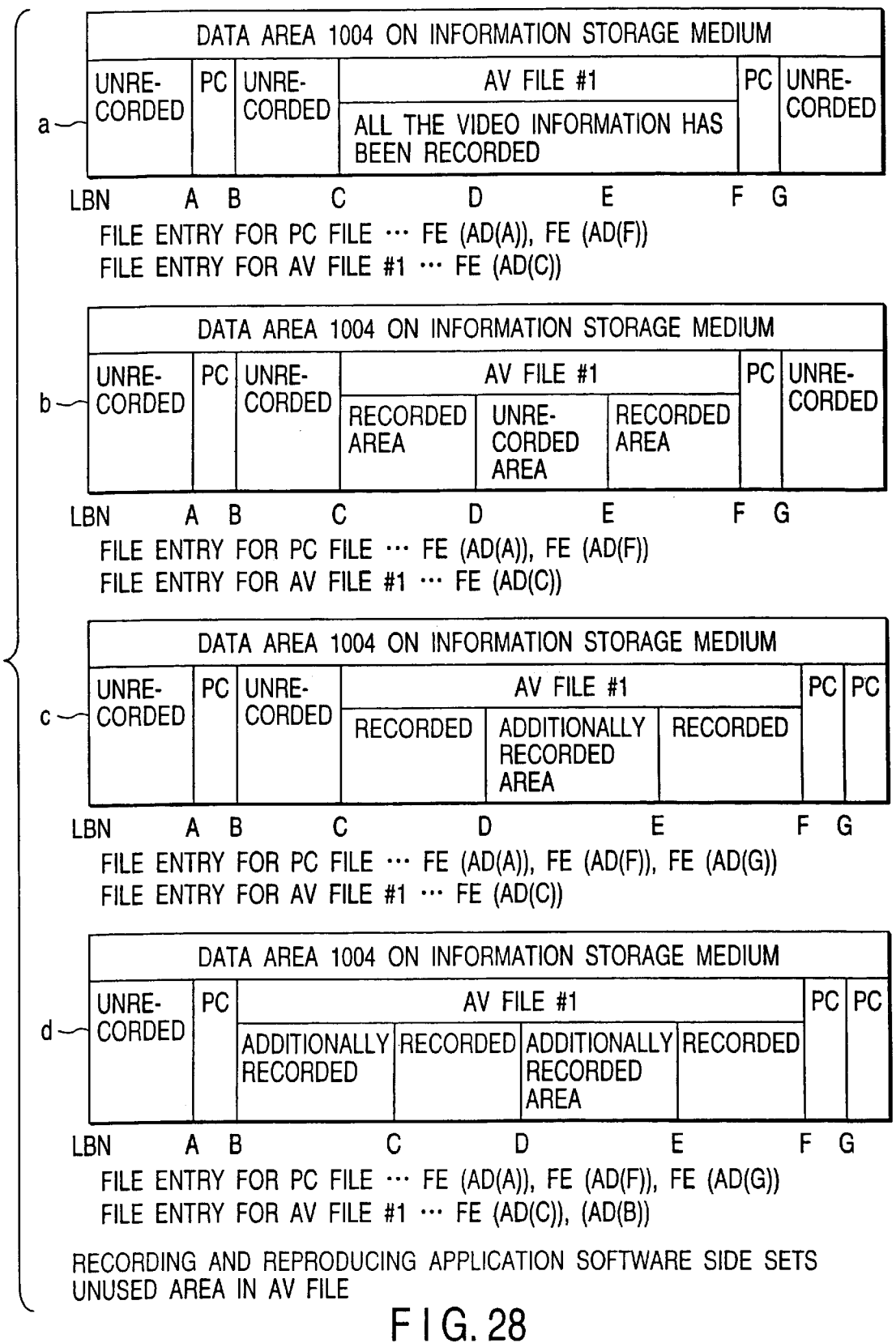
FIG. 28 is a diagram to help explain a method of setting video information recording locations when an unused area is set in an AV file on the video recording and reproducing application software side.

Explanation will be given about a method of setting video information recording locations in a case where unused areas are set in an AV file on the video recording/reproducing application software side in the embodiment of the present invention of FIG. 28. First, the state is assumed to be as shown by a in FIG. 28. When the data is deleted partly from D to E in LBN, the file size of the AV file remains unchanged as shown by b in FIG. 28, because AV file #1 has an unused area in the embodiment of the present invention.

Consequently, the file entry to the AV file stays at FE(AD (C)). Therefore, even when a new PC file is recorded, the PC file never gets into the location of the unused area of AV files #1. Next, when video information is recorded additionally in video recording, the additional recording information gets into the unused area ranging from D to E in LBN. The unused area turns to an additional recording area.

With the method of setting unused areas in an AV file according to the present invention, there is no need to change the file system information about UDF each time a small amount of data is deleted or additional recording is done in video recording, which facilitates the processing on the file system. When the amount of video information to be recorded increases, the AV file size becomes larger. The unused recording area in the range from B to C in LBN shown by c in FIG. 28 are absorbed by video file #1. While the video file has only one extent AD(C) indicated by c in FIG. 28, it also has another extent AD(A) indicated by d, resulting in file entry FE(AD(C), AD(B)).

Figure 29:
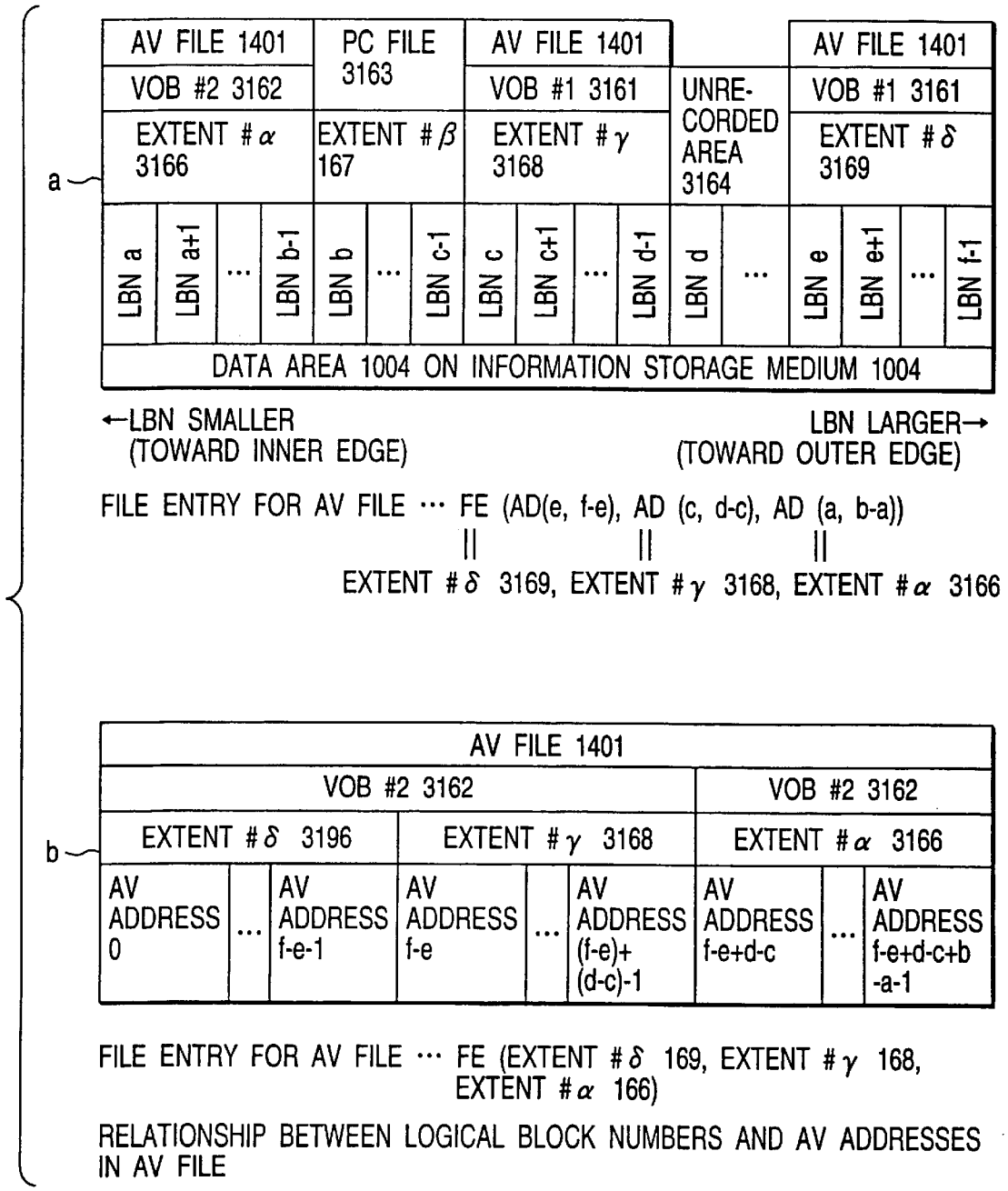
FIG. 29 shows the relationship between logical block numbers and AV addresses in an AV file.

FIG. 29 shows the relationship between LBN and AV addresses in an AV file in the present invention.

The information in AV file 1401 is recorded on the information storage medium in such a manner that it is interspersed physically on the storage medium. Now, consider a case where AV file 1401 is distributed and recorded in extent #α 3166, extent #γ 3168, and extent #δ 3169 and the order of entry on the file entry is extent #δ 3169, extent #γ 3168, and extent #α 3166 in this order. The AV addresses, the recording/reproducing application manages, are such that they connect consecutively the extents registered in the file entry, regardless of the recording positions on the information storage medium, and that younger entries are allocated smaller AV addresses in ascending order.

The AV addresses are managed using the extents. For example, it is assumed that the value of LBN of the first sector is "c" and the value of LBN of the last sector is "d−1 in extent #γ 3168 as indicated by a in FIG. 29." In this case, the AV address values of similar sectors are "f−e" and "(f−e)+(d−c)−1" respectively as shown by b in FIG. 29.

In the embodiment shown in Table 4, when part of AV file 1401 is deleted in XX, XX-PS, LBN/ODD, and LBN/ODD-PS, then that part turns to "unused VOB #A 3173" and is managed on the recording/reproducing application as shown in FIGS. 30 and 31 (specifically, no extent is released on the file system (or deleting is not done)).

FIG. 30 shows a case where the central part of VOB #1 is deleted. FIG. 31 shows the management state when VOB has been deleted as shown in FIG. 30. Specifically, an example of the number of pieces of VOB information, the number of pieces of unused VOB information, type, data size, and AV address for the begin position are shown. As shown in the column on the right side, the contents of management are rewritten. Therefore, in the case of playback, deleting, and additional writing, address management is performed by reference to the management information.

Unlike conventional computer information, it is essential for video information to guarantee its continuity in recording as shown in Table 1 and Table 2. Hereinafter, the reason for impeding continuity in recording and a method of guaranteeing continuity in recording will be explained.

FIG. 32 is a conceptual diagram of a recording route system to help explain continuity in recording.

The externally sent video information is stored temporarily in a buffer memory (semiconductor memory) BM219. When the operation of rough access 1334 and fine access 1333 causes the optical head 202 to reach the recording position on the information storage medium 201, the video information stored temporarily in the buffer memory (semiconductor memory) BM219 is recorded on the information storage medium by way of the optical head 202. The transfer rate of the video information sent from the buffer memory (semiconductor memory) BM219 to the optical head 202 is defined as physical transmission rate (PTR). The average value of the transfer rate of the video information transferred from the outside world to the buffer memory (semiconductor memory) BM219 is defined as system transmission rate (STR) 1388. Generally, the physical transmission rate PTR differs in value from the system transmission rate STR.

Recording video information in different places on the information storage medium 201 requires an access operation that moves the position of the condensed spot of the optical head 202. Rough access 1334 is performed to move the whole optical head 202 for large movements, whereas fine access 1333 is performed to move only the laser-light condensing objective (not shown) for slight movements.

FIGS. 33 and 34 show changes with time in the amount of video information temporarily stored in the buffer memory (semiconductor memory) BM219 in a case where the optical head 202 is caused to write video information on specific positions on the information storage medium, while accessing the video information transferred from the outside world. Since the physical transmission rate PTR is faster than the system transmission rate STR, the amount of video information temporarily stored in the buffer memory 219 continues decreasing in the periods of the video information recording times 1393, 1397, 1398. The amount of video information temporarily stored in the buffer memory 219 reduces to zero. At that time, the video information continuously transferred is recorded as it is on the information storage medium without being stored temporarily in the buffer memory 219. Thus, the amount of video information temporarily stored in the buffer memory 219 stays at zero.

Thereafter, when video information is recorded in a different position on the information storage medium, the accessing of the optical head 202 is effected before subsequent recording. The access period of the optical head requires three types of time: rough access times 1348, 1376, fine access times 1342, 2343, and rotation wait time of the information storage medium 201 1345, 1346. Because no recording is done on the information storage medium 201 in that period, the physical transmission rate PTR 1387 in that period is substantially "0." In contrast, because the average system transmission rate STR 1388 of the video information sent from the outside world to the buffer memory (semiconductor memory) BM219 is kept unchanged, the amount of video information temporarily stored in the buffer memory (semiconductor memory) BM219 increases steadily.

When the accessing of the optical head 202 has been completed and recording on the information storage medium 201 is started again (in the period of the video information recording time 1397, 1398), the amount of video information temporarily stored in the buffer memory (semiconductor memory) BM219 decrease again. The decrease gradient is determined by:

(average system transmission rate STR 1332)—(physical transmission rate PTR 1331).

Thereafter, when the optical head accesses a position near the recording position on the information storage medium, only the fine access times 1363, 1364, 1365, 1366 and rotation wait times 1367, 1368, 1369, 1370 are needed, because the optical head can access the position only by fine access.

The condition for enabling such continuous recording can be determined by "the upper limit of the number of accesses in a specific period." Although continuous recording has been explained above, the condition for enabling continuous playback is also determined by "the upper limit of the number of accesses in a specific period," because similar reasons to what has been described above.

The condition for the number of accesses that makes continuous recording completely impossible will be explained by reference to FIG. 33. When the frequency of access is the highest, the video information recording time 1398 is very short as shown in FIG. 33 and only the fine access times 1363, 1364, 1365, 1366 and rotation wait times 1367, 1368, 1369, 1370 follow one after another consecutively. In this case, however fast the physical transmission rate PTR 1387 may be, the continuity of recording cannot be secured. If the capacity of the buffer memory 219 is BM, the buffer memory 219 is filled with temporarily stored video information in the period of BM÷STR, which makes it impossible to store newly transferred video information temporarily in the buffer memory (semiconductor memory) 219. As a result, as much video information as has not been stored temporarily in the buffer memory (semiconductor memory) 219 cannot be recorded continuously.

As shown in FIG. 34, when the video information recording time is balanced against the access time and the temporarily stored video information in the buffer memory 219 is, on the whole, kept almost constant, the continuity of video information recording viewed from an external system is secured without any overflow of the temporarily stored video information in the buffer memory 219. Let each rough access time be SATi (seek access time of the objective), the average rough access time after an n number of accesses be SATa, the video information recording time for each access be DWTi (data write time), and the average video information recording time required to record video information on the information storage medium after each access obtained as the average value after an n number of accesses be DWTa. Moreover, let the rotation wait time for each time be MWTi (spindle motor wait time) and the average rotation wait time after an n number of accesses be MWTa.

The amount of video information data transferred from the outside world to the buffer memory 219 in all the access periods when an n number of accesses were performed is expressed as:

$$STR \times (\Sigma(SATi+JATi+MWTi)) \approx STR \times n \times (SATa+JATa+MWTa) \quad (1)$$

When the value and the amount of video information transferred from the buffer memory 219 to the information storage medium 201 in recording video information expressed as $$(PTR-STR) \times \Sigma DWTi \approx (PTR-STR) \times n \cdot DWTa \quad (2)$$

has the following relationship expressed as:

$$(PTR-STR) \times n \cdot DWTa \geq STR \times n \times (SATa+JATa+MWTa)$$

that is, $$(PTR-STR) \times DWTa \geq STR \times (SATa+JATa+MWTA) \quad (3)$$

the continuity of video information recording is secured viewed from the external system side.

If the average time required for one access is Ta, Ta is expressed as:

$$Ta = STATa + JATa + MWTa \quad (4)$$

Thus, expression (3) is rearranged as:

$$(PTR-STR) \times DWTa \geq STR \times Ta \quad (5)$$

The present invention is characterized in that restrictions are placed on the lower limit of the data size of continuous recording after one access to decrease the average number of accesses. A data area in which continous recording is done on the information storage medium after one access is defined as "a contiguous data area."

Expression (5) is rearranged as:

$$DWTa \geq STR \times Ta/(PTR-STR) \quad (6)$$

Since a contiguous data area size CDAS is determined as follows, $$CDAS = DWTa \times PTR \quad (7)$$

From expression (6) and equation (7), the following expression is obtained:

$$CDAS \geq STR \times PTR \times Ta/(PTR-STR) \quad (8)$$

From expression (8), the lower limit of the contiguous data area size that enables continuous recording is determined.

The time required for rough access or fine access differs greatly, depending on the performance of the information recording and reproducing device.

$$\text{Suppose } SATa \approx 200 \text{ ms} \quad (9)$$

As described above, calculations are done, provided that $MWTa \approx 18$ ms and $JATa \approx 5$ ms.

In the case of a 2.6-GB DVD-RAM, TR is:

$$TR = 11.08 \text{ Mbps} \quad (10)$$

When the average transmission rate of MPEG 2 is $$STR \approx 4 \text{ Mbps} \quad (11)$$

substituting the above value into expression (8) gives:

$$CADS \geq 1.4 \text{ Mbits} \quad (12)$$

By another estimate, suppose $$SATa + JATa + MWTa = 1.5 \text{ seconds} \quad (13)$$

Then, from expression (8), the result is:

$$CADS \geq 9.4 \text{ Mbits} \quad (14)$$

Since in the recording/reproducing DVD standard, the maximum transmission rate in MPEG 2 is so determined that it is equal or less than $$STR = 8 \text{ Mbps} \quad (15)$$

substituting the value of equation (15) into expression (8) gives:

$$CADS \geq 432 \text{ Mbits} \approx 5.4 \text{ Mbytes} \quad (16)$$

In the embodiment of the present invention shown in Table 4, the contiguous data area boundary position is managed on the recording/reproducing application in LBN/OD, LBN/ODD-PS, XX, and XX-PS. The allocation map table 1105 shown in FIG. 23 (f) is caused to have a data structure as shown in Table 6, thereby managing the boundary position information.

Using FIG. 10, the linear replacement and skipping replacement have been explained by comparison as a method of replacing a defective area occurred on the information storage medium. Here, explanation will focus on a comparison between methods of setting LBN (logical block numbers) in replacing processes.

As described earlier, all the recording area on the information storage medium is divided into sectors in units of 2048 bytes. All the sectors are allocated physical sector number (PSN) in advance. The PSNs are managed by the information recording and reproducing device as explained in Table 3.

Figure 35:
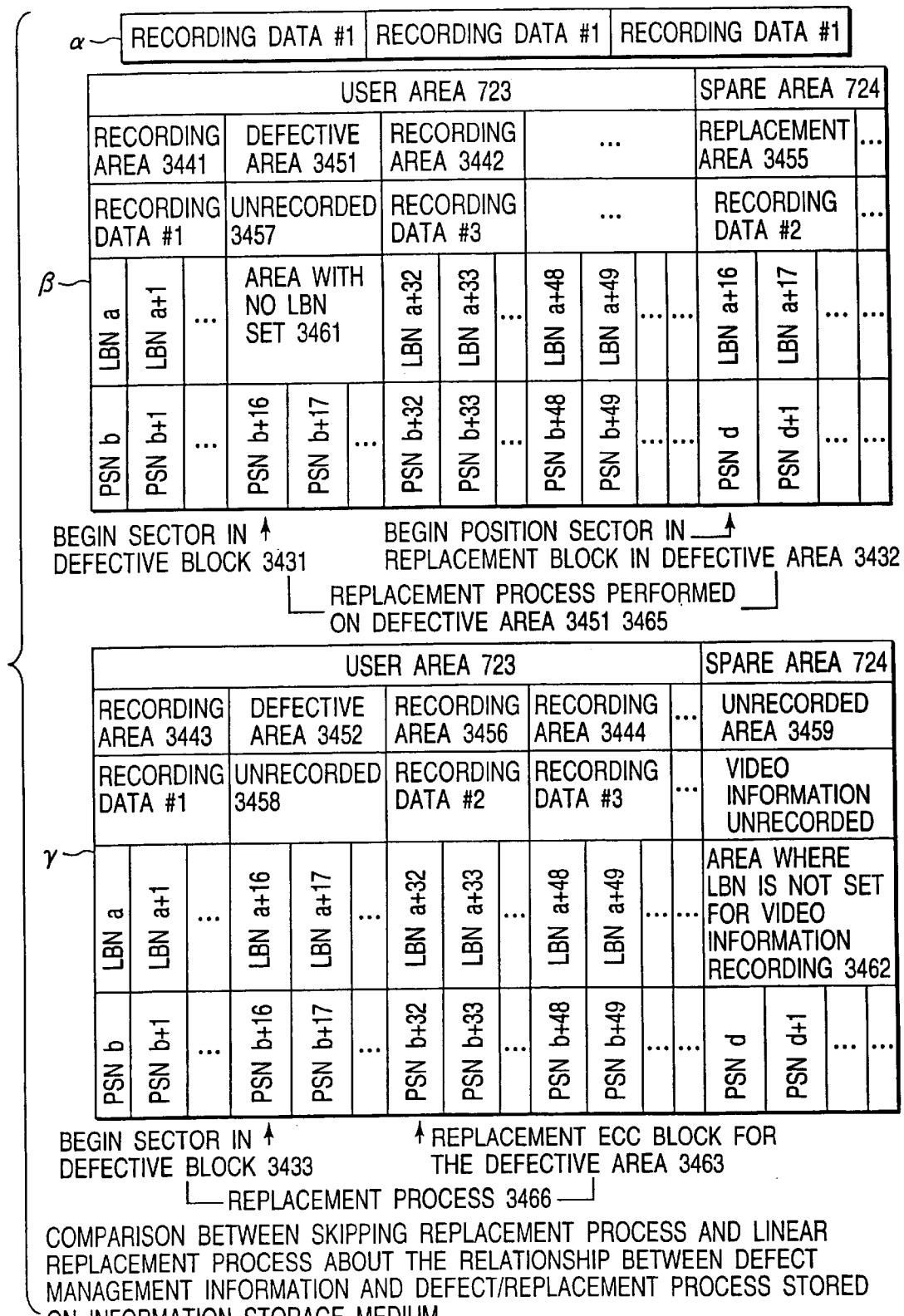
FIG. 35 is an explanatory diagram for comparison between skipping replacement and linear replacement when the information recording and reproducing device manages defect management information.

As indicated by β in FIG. 35, the place where a replacement area 3455 is set is limited to the inside of the spare area 724 in the linear replacement method, and cannot be set in an arbitrary place. When there is no defective area on the information storage medium, LBNs are allocated to all the sectors within the user area 723 and no LBN is allocated to the sectors in the spare area 724. When a defective area 3451 has occurred in ECC blocks, the setting of LBNs in that place (area 3451) is prevented, and the values of the LBNs are set in the sectors in the replacement area 3455. In the example of β in FIG.35, "b" is set as PSN of the begin sector in an recording area 3441 and "a" is set as LBN. Similarly, "b+32" is set as PSN of the begin sector of a recording area 3442 and "a+32" is set as LBN. When recording data #1, recording data #2, and recording data #3 exist as the data to be recorded on the information storage medium as indicated by α in FIG. 35, recording data #1 is recorded in a recording area 3441, and recording data #3 is recorded in a recording area 3442. When the area sandwiched between the recording areas 3441 and 3442 and PSN of whose begin sector starts at "b+16" is a defective area 3451, no data is recorded there and no LBN is set. Instead, not only recording data #2 is recorded in a replacement area 3455 PSN of whose begin sector in the spare area 724 starts at "d," but also LBN starting at the begin sector "a+16" is set.

Since the addresses the file system 2 manages are LBNs as shown in Table 3 and LBNs are set avoiding the defective area 3451 in the linear replacement method, the linear replacement method is characterized in that the file system 2 is allowed to be unaware of the defective area on the information storage medium. Conversely, this method has a disadvantage in that the file system 2 side cannot deal with the defective area 3441 on the information storage medium at all.

In contrast, the skipping replacement method according to the present invention is characterized in that LBN is set even for a defective area 3452 as indicated by γ in FIG. 35 and therefore the file system 2 side can deal with a defective area occurring on the information storage medium (put the defective area in the management range). In the example indicated by γ in FIG. 35, LBN of the begin sector in the defective area 3452 is set to "a+16." The present invention is further characterized in that a replacement area 3456 for the defective area 3452 can be set in any position in the user area 723. As a result, the replacement area 3456 is placed immediately behind the defective area 3452, which enables recording data #2 to have been recorded on the defective area 3452 to be recorded in the replacement area 3456.

Since in the linear replacement method indicated by β in FIG. 35, the optical head has to be moved to the spare area 724 to record recording data #2, the access time of the optical head is inevitable. In contrast, in the skipping replacement method, the accessing of the optical head is unnecessary and recording data #2 can be recorded immediately behind the defective area.

As indicated by γ in FIG. 35, in the skipping replacement method, the spare 724 is not used and is treated as an unrecorded area 3459.

Figure 36:
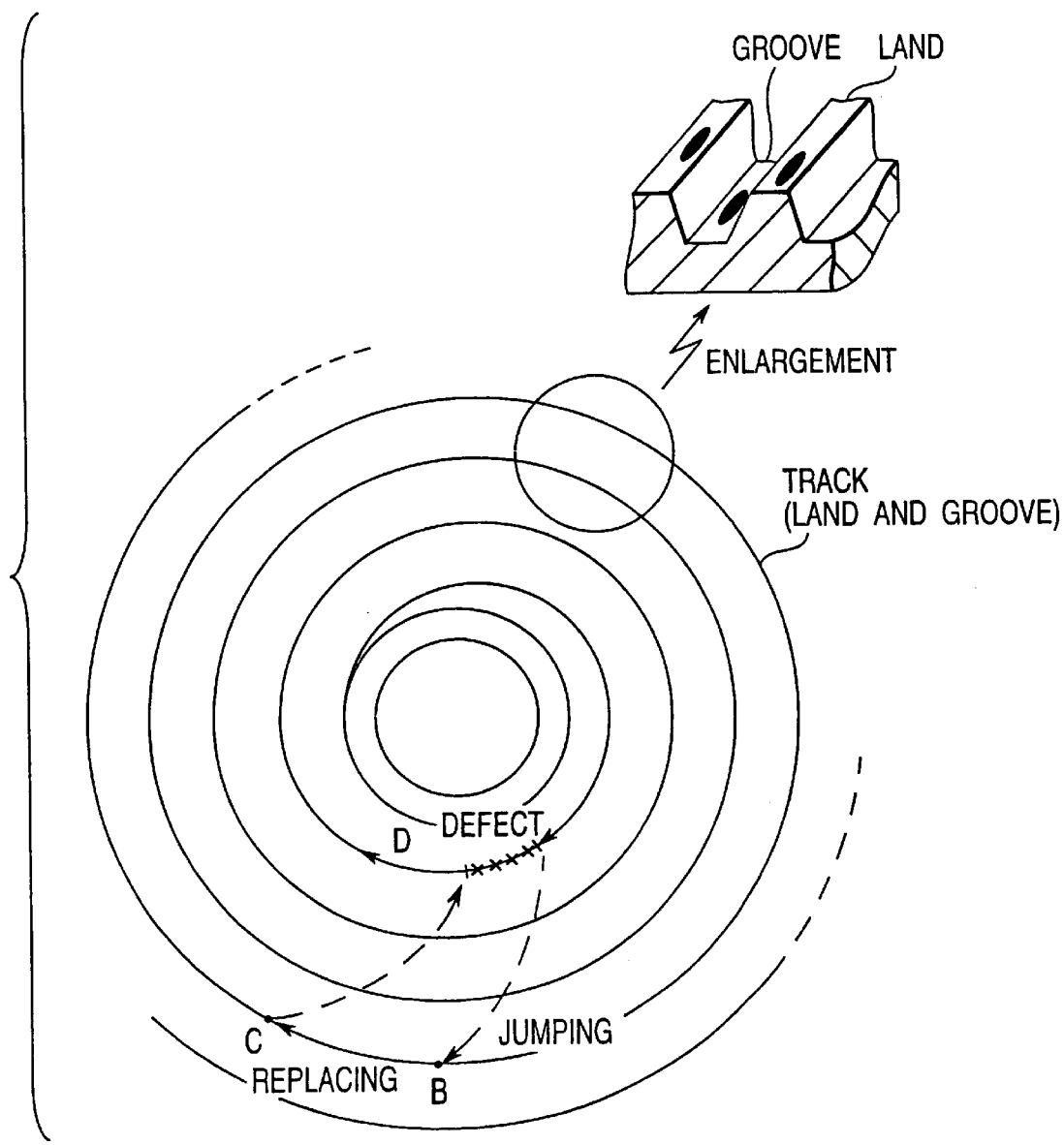
FIG. 36 is a diagram to help explain an example of the optical head (pickup) moving over tracks.

When a recording method as indicated by β in FIG. 35 is used, the physical movement of the optical head is made frequently as shown in FIG. 36.

Suppose a defective area is encountered when recording is done up to, for example, point D in the figure. In this case, the optical head has to jump to point B in a spare area for replacement, write the data there, and then jump to return to point C in the writing area next to the defective area. In this method, as the number of defective area increases, the movement of the optical head becomes more frequent when the transfer speed of the input data to be written is fast, the optical head could not follow the speed.

In contrast, the points of the embodiment shown in FIG. 35 and corresponding effects representing the principal characteristics of the present invention are described in the following items (A), (B), and (C):

(A) LBN is set even for the defective area 3452.

... Because LBN is not allocated directly to a defective area in the linear replacement method indicated by β in FIG. 35 and in the defect processing method shown in FIG. 10, the file system cannot recognize the exact defective area. When the number of defects occurring on the information storage medium is small, it is possible to leave defect management to the information recording and reproducing device 3 as shown by β in FIG. 35 or in FIG. 10. When a large number of defects that exceed the size of the spare area have occurred, the management of defects only by the information recording and reproducing device 3 would fail.

In contrast, when LBN is set for the defective area 3452 to enable the file system 2 side to recognize the place of the defective area 3452, the information recording and reproducing device 3 can cooperate with file system 2 to process defects, which enables video information to be recorded continuously without failure, even when a large number of defects have occurred on the information storage medium.

(B) The defective area occurred in the user area 723 and allocated LBN is allowed to remain on the LBN space.

... When either the linear replacement method indicated by β in FIG. 35 or the skipping replacement method is used as an LBN setting method and LBN is set in the spare area 724 (an extended area 743 used for information recording), a problem arises when the recorded information is deleted and new information is recorded (although no problem arises in initial recording).

Specifically, since all the addresses set on the LBN space are consecutive when viewed from the file system (the file system 2 is unaware that the LBN set in the spare area 724 has been placed in a position physically apart from the user area 723), the file system 2 tries to record information in the continuous range on the LBN space. Once LBN has been set in the spare area 724, the information recording and reproducing device 140 has to record information on the information storage medium under the control of the file system. As a result, the optical head has to move to the LBN set place on the spare area 724 and record information there, resulting in an increase in the access frequency of the optical head and therefore permitting the amount of video information temporarily stored in the semiconductor memory in the information recording and reproducing device to be saturated as shown in FIG. 33. As a result, continuous recording might be impossible.

In contrast, when LBN set as indicated by γ in FIG. 35 is always set in the user area, unnecessary access of the optical head can be limited in a case where another piece of information is recorded in the place where information has been deleted, which enables continuous recording of video information.

(C) The replacement area 3456 is set immediately behind the defective area 3452 occurred in the user area 723.

As described above, unlike the linear placement method indicated by β in FIG. 35, the skipping replacement method indicated by γ in FIG. 35 enables recording data #2 to be recorded immediately behind a defective area, with the result that unnecessary access of the optical head is limited and therefore continuous recording of video information is possible.

The data structure of the defect management information in the skipping replacement method will be explained.

Figure 37:
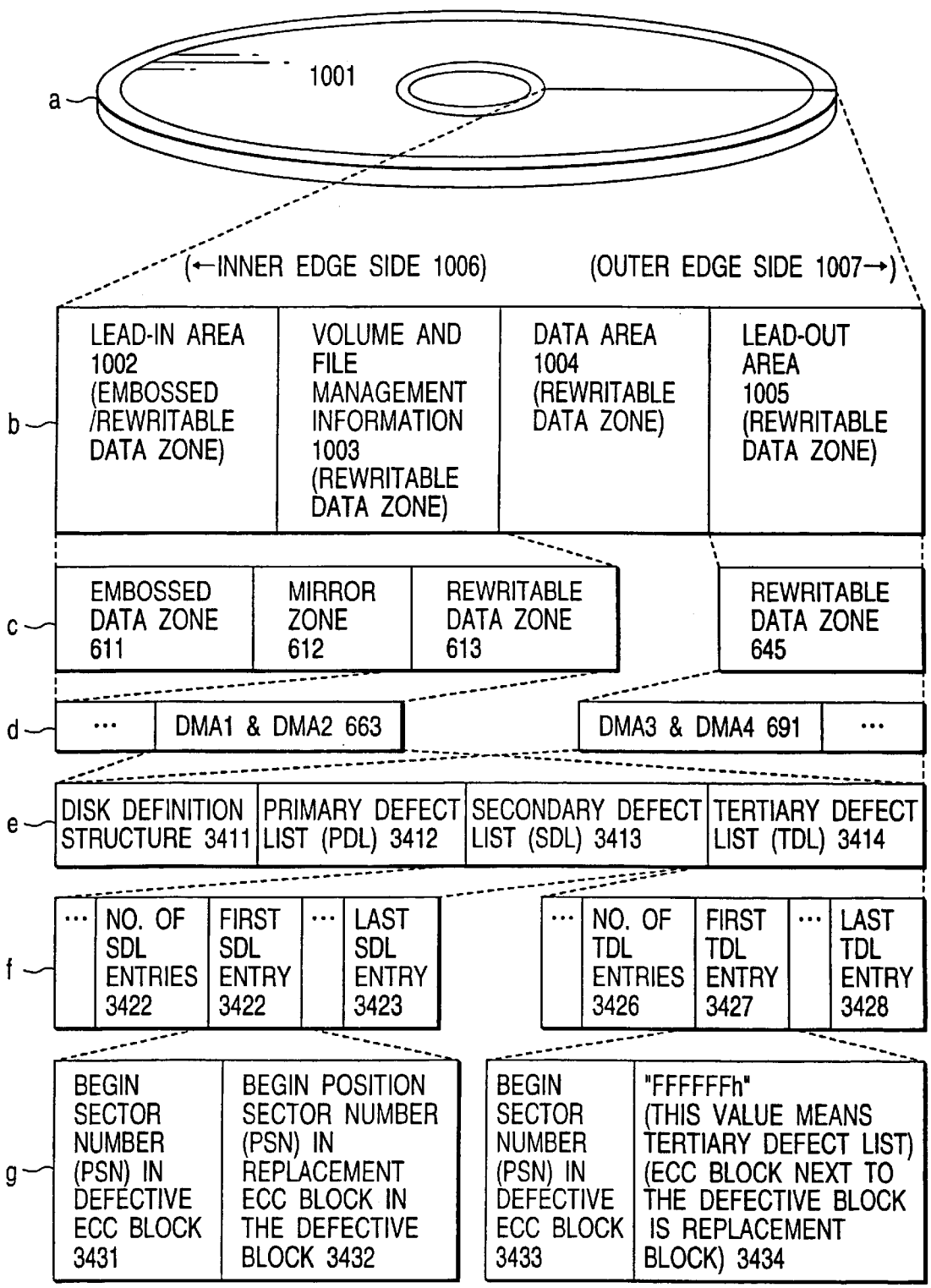
FIG. 37 is a diagram to help explain the data structure of defect management information on the information storage medium managed by the information recording and reproducing device in each embodiment of the present invention.

As a method of recording the defect management information in this case, the embodiment of the present invention has disclosed the following:

(1) A method of recording and managing the defect management information as PSN information on the information storage medium as shown in FIG. 37, causing the information recording and reproducing device 3 to read the PSN information and then convert it into LBN information, and thereafter informing the file system 2 side of the LBN information.

Figure 38:
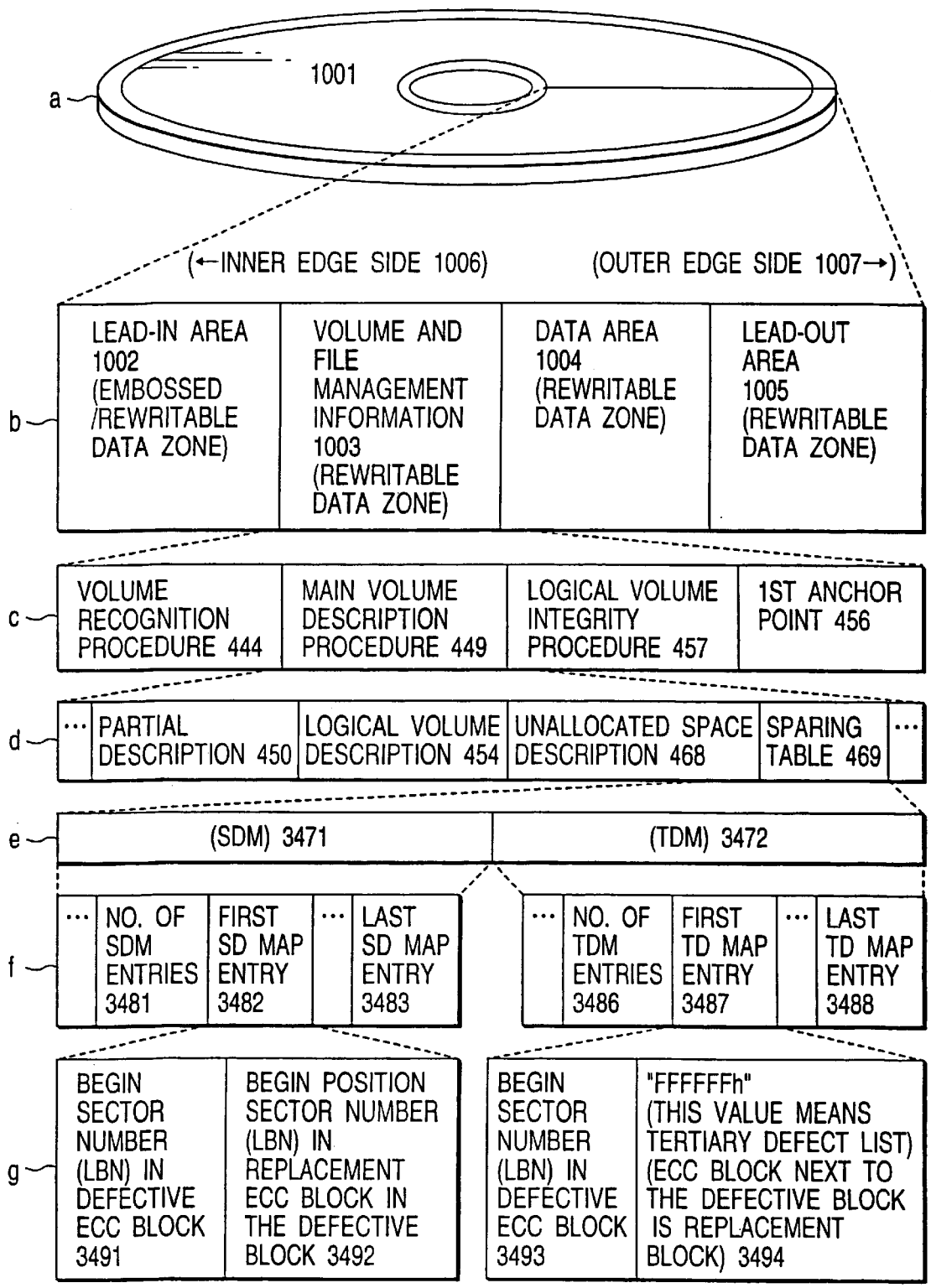
FIG. 38 is a diagram to help explain the data structure of defect management information on the information storage medium managed by the file system 2 in each embodiment of the present invention.

(2) A method of recording and managing the defect management information as LBN information on the information storage medium as shown in FIG. 38 and causing the file system side to reproduce information without the intervention of the information recording and reproducing device 3 (in this case, the file system side directly deals with the process of recording the defect management information on the information storage medium).

In the embodiment of the present invention shown in Table 4, XX, XX-PS, LBN/ODD, LBN/ODD-PS, LBN/XXX, and LBN/XXX-PS use the form of FIG. 37. LBN/UDF, LBN/UDF-PS, and LBN/UDF-CadFix use the form of FIG. 38.

As shown in FIGS. 3 and 4, the defect management information corresponding to the linear replacement method has been recorded as PSN information or secondary defect management information 3413 in the DMA areas 663, 691 in the rewritable data zones 613, 645 in the lead-in area 1002 and lead-out area 1005.

The embodiment of the present invention is characterized in that the secondary defect management information (SDL 3413) corresponding to PC data and the defect management information (TDL 3414) corresponding to AV data (video data) are recorded in such a manner that the former is distinguished from the latter.

Specifically, in the present invention, the defect management information corresponding to the skipping replacement method is defined as a tertiary defect list 3414. One replacement process (for example, the setting of the replacement area 3456 for the defective area 2452 indicated by γ in FIG. 35) is assigned TDL entry 3427 and TDL entry 3428.

A combination of the begin sector 3431 in a defect ECC block, defect area place information, and the begin position sector number 3432 in the replacement ECC block in the defect block indicating the replacement place has been registered in the linear replacement method.

In the skipping replacement method, since it is decided that the place of the replacement area 3456 should be immediately behind the defective area 3452, a combination of the begin sector number (PSN) 3434 in a defective ECC block and the location 3443 in which "FFFFFFh" has been recorded as skipping replacement identification information instead of replacement area location specification is used as the information in the TDL entries 3427, 3428. With this recording method, the defect management information compatible with the SDL entries 3422, 3423 corresponding to the linear replacement can be recorded on the information storage medium.

All the defect management information shown in FIG. 37 is managed on the information recording and reproducing device 3 side. TDL 3414 information or SDL 3413 information reproduced on the information recording and reproducing device 3 side are all recorded in PSN. As indicated by β and γ, a one-to-one correspondence between PSN and LBN holds for each of the defect processing methods. Specifically, after "PSN→LSN conversion" is caused using the relationship shown in FIG. 11, "LSN→LBN conversion" is caused using the relationship shown in FIGS. 14 and 15 and thereafter the defect management information is reported as LBN information to the file system 2 side.

The defect management of FIG. 37 is managed by the information recording and reproducing device, whereas the defect management information of FIG. 38 is managed by the file system 2 side and recorded on the information storage medium (optical disk 1001) in LBN information form.

The information is recorded in the main volume descriptor sequence 449 managed by UDF in the volume & file manager information 1003. The defect information is generically called a sparing table 469. The defect management information corresponding to the linear replacement is recorded in a secondary defect map 3471 and the defect management information corresponding to the skipping replacement is recorded in a tertiary defect map 3472. Either has SD map entries 3482, 3483 and TD map entries 3487, 3488 for each replacement process. The contents of information written in each map entry are the same as indicated by g in FIG. 37.

FIG. 39 shows comparison between skipping replacement and linear replacement in the relationship between the defect management information of FIG. 38 and the defect/replacement process recorded on the information storage medium.

The begin sector number 3493 in a defective ECC block in TDM 3472 specifies the defective area 3452 indicated by γ in FIG. 39 (managed in ECC blocks=units of 16 sectors). Because the replacement area 3456 in which the video information for that place is to be recorded is always immediately behind the defective area 3452; "FFFFh" 3494 has been written as shown by g in FIG. 38.

As shown in Table 7, other embodiments of the present invention that causes the file system 2 side to manage management information are as follows:

(1) A hidden file is created and defect map information is written in the file.

(2) A long allocation descriptor (explained in FIG. 17) is used in AV files and a defect flag is set in Implementation Use 412.

As explained above, although additional setting can be done in the replacement area 3456 in recording AV information, replacement is impossible when the spare area 24 has been used up, because the replacement area for defects in the PC information has been set in the spare area 724 indicated by β in FIG. 35 beforehand. To solve this problem, an embodiment of the present invention indicated by β in FIG. 39 is provided. The present invention is characterized in that, when the spare area 724 indicated by β in FIG. 35 has become full, a replacement-only file 3501 is set in the user area 723 as indicated by β in FIG. 39 in the embodiment of the present invention to secure an additional replacement area for a defective area in recording PC files.

Figure 40:
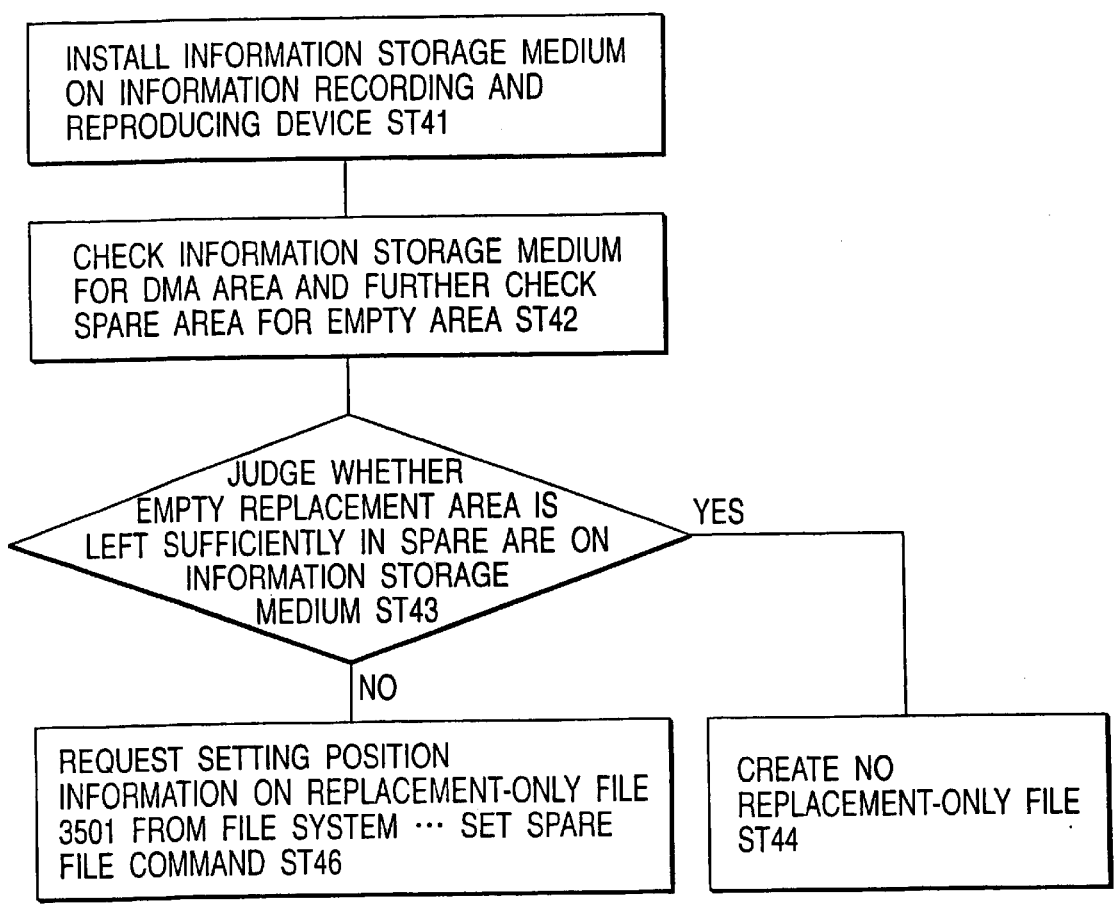
FIG. 40 is a flowchart to help explain the procedure for creating a replacement area setting file.

FIG. 40 is a flowchart to help explain the procedure for creating the replacement-only file 3501.

After an information storage medium has been installed on the information recording and reproducing device (ST41), the information recording and reproducing device checks the DMA areas 663, 691 (d in FIG. 37) on the information storage medium and then checks the spare area for the empty area size (ST42). If having judged that there is only a little room left (ST43), the information recording and reproducing device issues a GETSPRE file command to the file system 2 and asks it to create a replacement-only file 3501 (ST45). In response to this, the file system side creates a replacement-only file 3501 and add it as a hidden file to the directory of FIG. 25.

Figure 60:
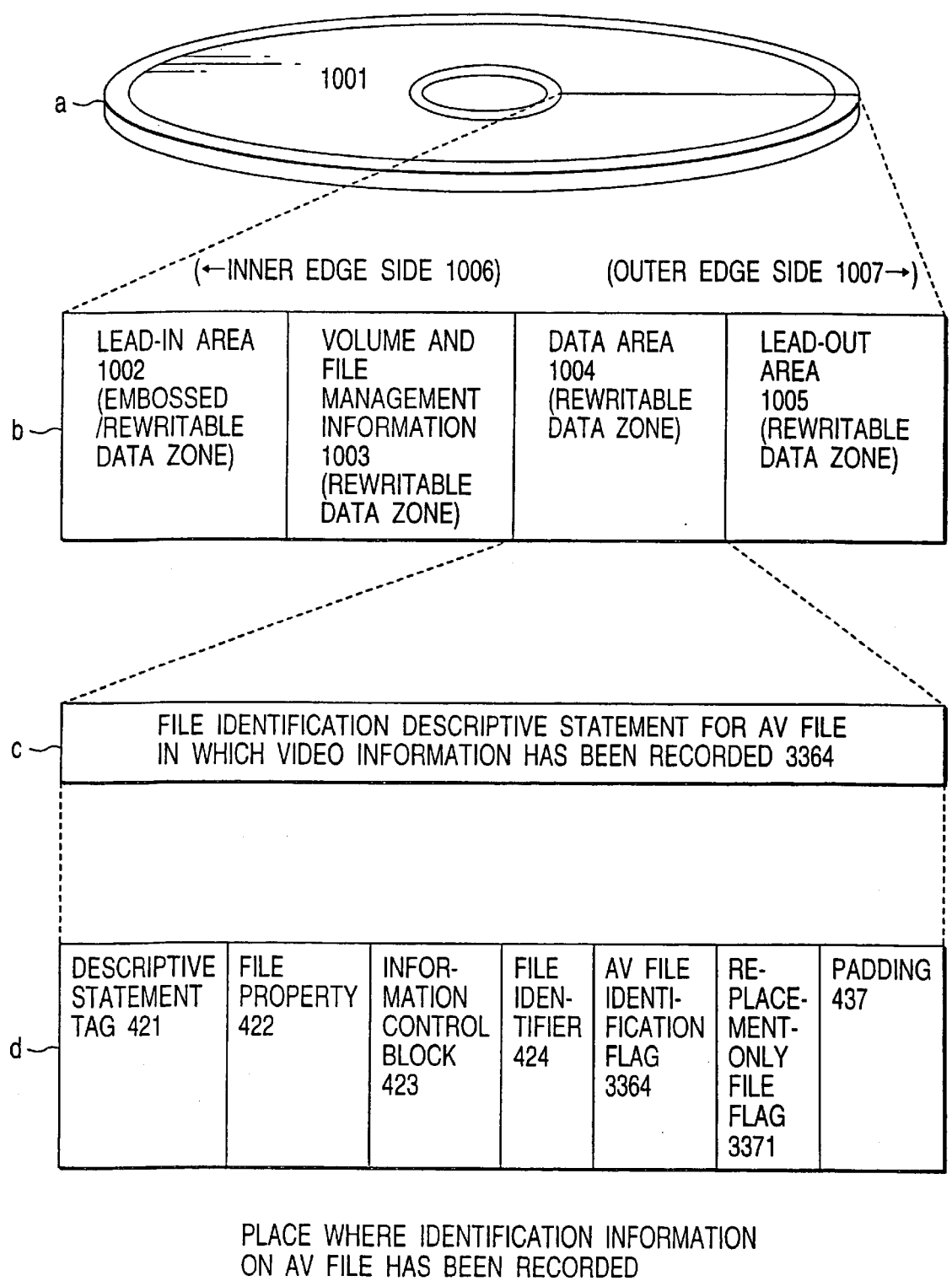
FIG. 60 is an explanatory diagram showing another example of the location where identification information about an AV file according to the present invention has been recorded.

The identification information for the replacement-only file 3501 is recorded as a replacement area setting file flag in a file identification descriptor 3364 as shown in a replacement-only file in FIG. 21 or indicated by d in FIG. 60 explained layer. In the case of the replacement-only file 3501, the bit for the replacement-only file flag 3371 is made "1." This method is determined by the UDF.

As another embodiment of the identification information about the replacement-only file 3501, a replacement-only file flag 3372 may be provided in the ICG tag 418 of the file entry 3520 as indicated by fin FIG. 59 explained later. Because the area is managed by the file system 2 side, the information recording and reproducing device has to issue a GETSPARE command to the file system 2 and be given setting location information about the replacement-only file 3501 (ST46). In recording PC information, the information recording and reproducing device replaces the defective area using information about the replacement-only file 3501 given from the file system 2 and records the result in the SDL indicated by a in FIG. 37.

As for the defect management information recorded in the SDL, the begin sector number 3491 in a defective ECC block in SDM 3471 indicated by g in FIG. 38 specifies the defective area 3451 (ECC block=16 sectors) indicated by β in FIG. 39, and the begin position sector number 3492 in a replacement ECC block in the defective block represents the replacement area 3455 in the replacement-only file 3501. As seen from β in FIG. 39, the LBN area in the replacement-only file 3501 is used in the same replacement as linear replacement using the spare area 724.

According to the above embodiment of the present invention, because the replacement area 3455 can be additionally set in any place in the user area 23, replacement areas can be increased as the number of defects occurred on the information storage medium increases.

As explained in FIGS. 32 to 34, to assure continuous recording of video information, recording and partial deleting have to be done in contiguous data areas. As indicated by a in FIG. 43, (when a small amount of video information 3513 is added to the already recorded video information 3511, contiguous data area #3 3507 is secured as indicated by b in FIG. 43 and the remaining part is managed as an unused area 3515. When a small amount of video information 3514 is further added, the information is recorded, starting at the begin position of the unused area 3515.

Figure 41:
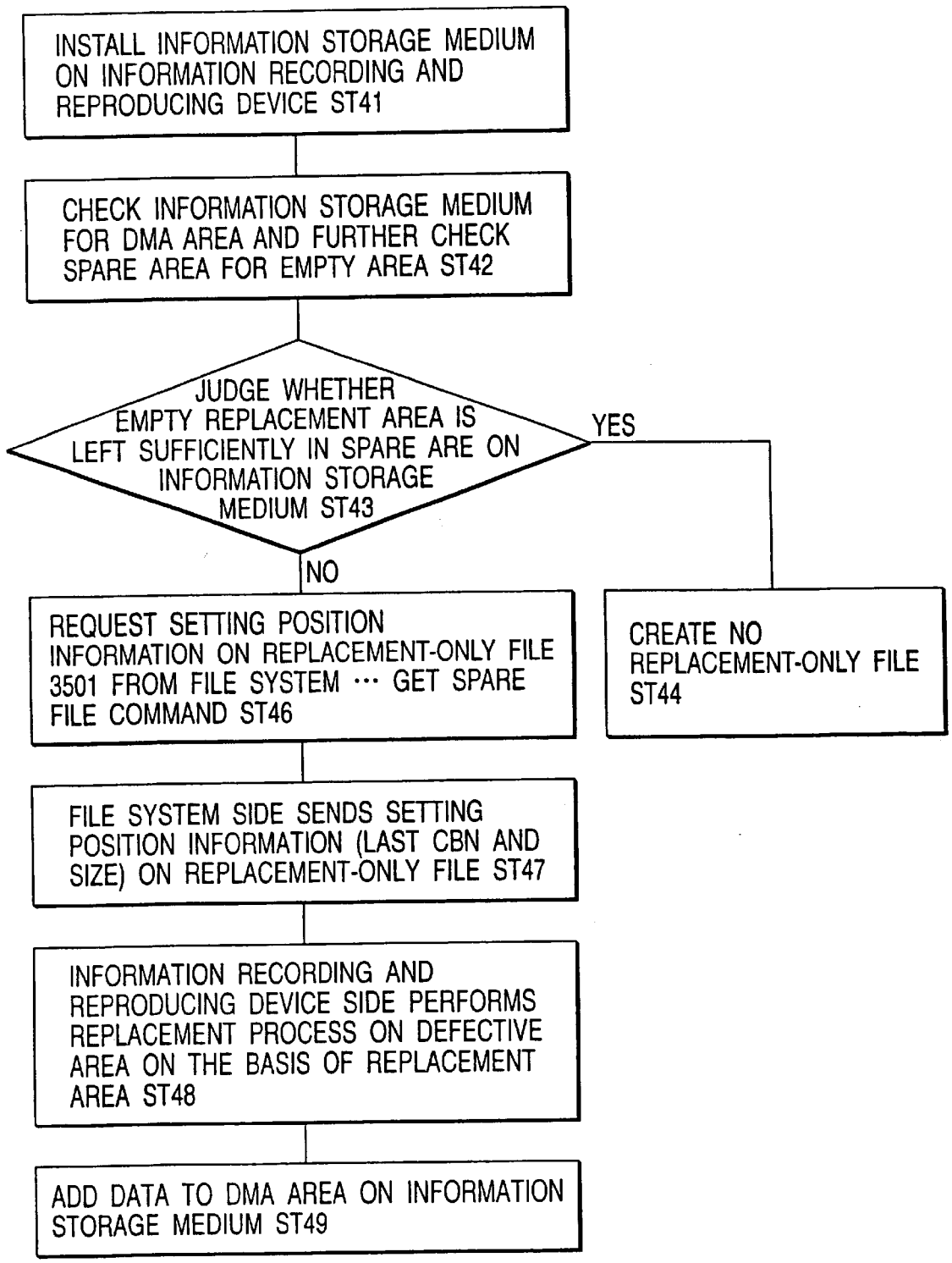
FIG. 41 is a flowchart to help explain a replacing process using the replacement area setting file.

FIG. 41 is a flowchart to help explain a replacing process using the replacement area setting file.

Figure 42:
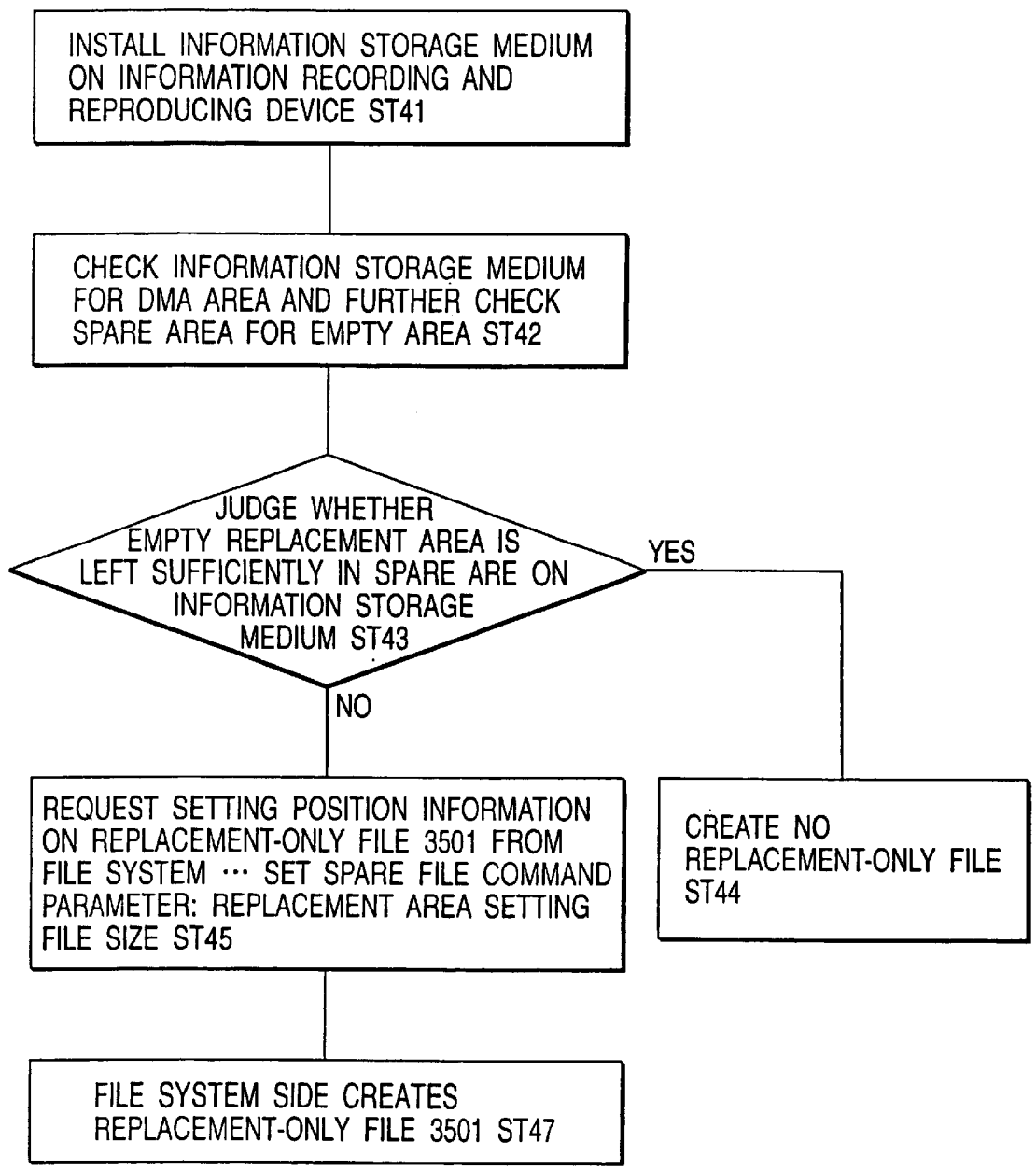
FIG. 42 is a flowchart to help explain the procedure for creating a replacement area setting file.

FIG. 42 is a flowchart to help explain the procedure for creating a replacement area setting file.

In a method of managing the begin position of the unused area 3516, information representing information length 3517 is used in the embodiments of LBN/ODD, LBN/ODD-PS, LBN/UDF, LBN/UDF-PS, LBN/UDF-CADFix, LBN/XXX, and LBN/XXX-PS in Table 4.

Figure 43:
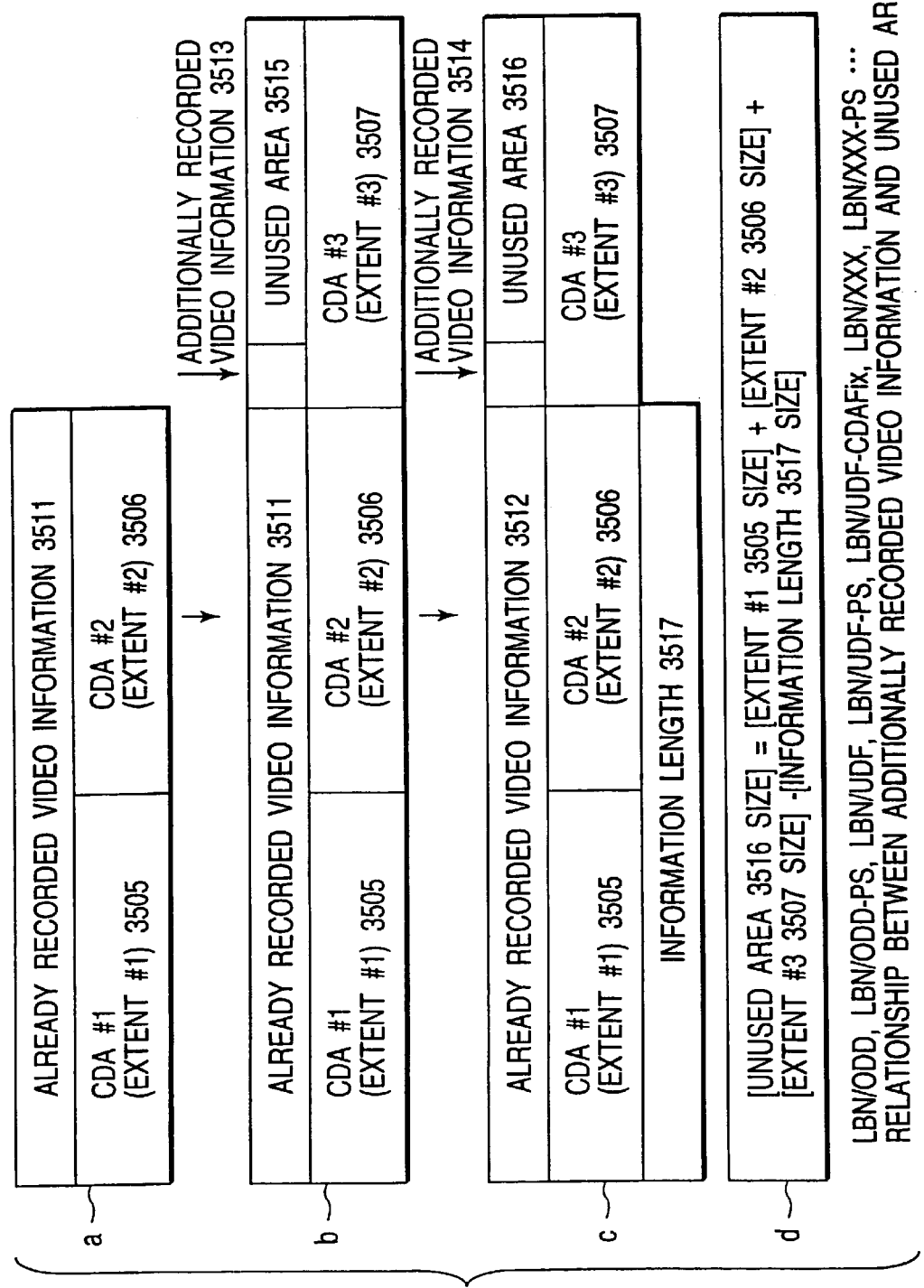
FIG. 43 is an explanatory diagram of additional recording video information and an unused area in the contiguous data area in each embodiment of the present invention.
Figure 44:
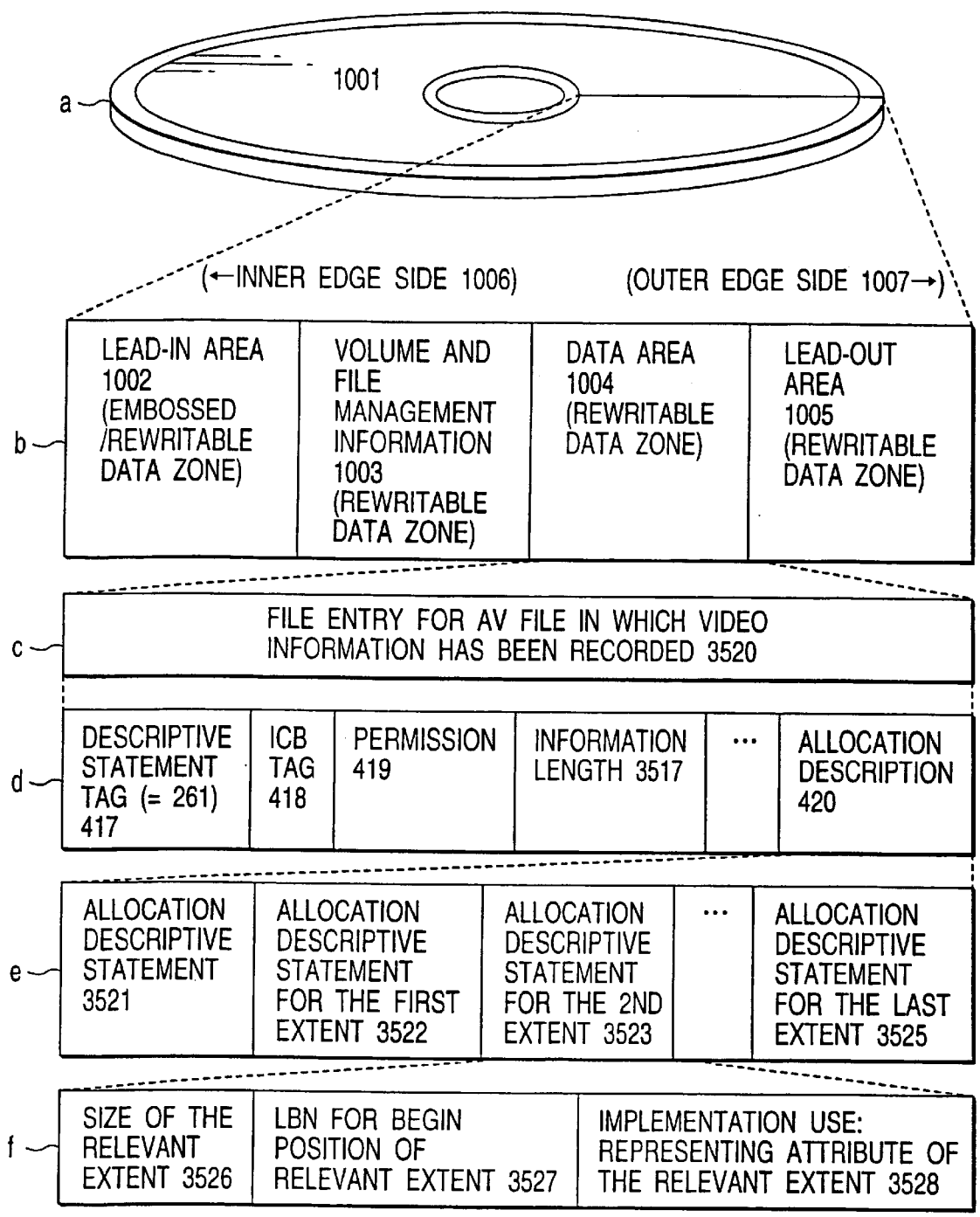
FIG. 44 is an explanatory diagram of the recording location of the information length specified for each file and the attribute writing location for each extent (implementation use)

The information length 3517 has been recorded in the file entry 3520 as shown in FIG. 44. The information length 3517 means the size of information actually recorded from the head of the AV file as indicated by c in FIG. 43.

In FIG. 43, the letter d indicates a representation of an unused (unrecorded) area. Specifically, an used area is represented by "unused area size=the size of extent #1+the size of extent #2+the size of extent #3−information length size."

As seen from this equation, the size of the whole file is expressed by the information length of a file entry and an extended file entry (unused area extent). This makes it easier to recognize the unused area extent.

Some embodiments of the present invention require contiguous data areas to be dealt with when part of an AV file is deleted. Of the embodiments shown in Table 4, in LBN/UDF and LBN/XXX, the position of the boundary between contiguous data areas is not secured when part of an AV file is deleted as shown in FIG. 45, and the part to be deleted is deleted completely.

Figure 45:
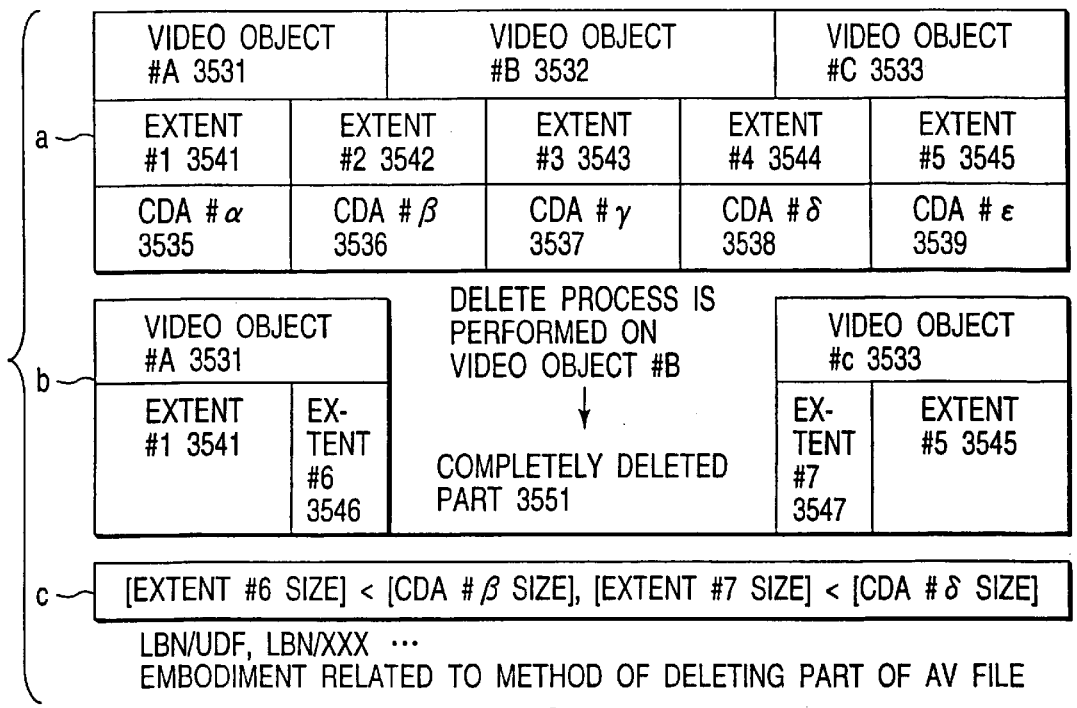
FIG. 45 is a diagram to help explain a method of deleting part of an AV file in each embodiment of the present invention.

When video object #B 3532, the part to be deleted, extends over part of extent #2 (CDA: contiguous data area #β and part of extent #4 (CDA #δ) as shown in FIG. 45, the size of extent #6 3546 and that of extent #7 3547 become smaller than the contiguous data area allowed minimum value after deletion, as indicated by b in FIG. 45.

Figure 46:
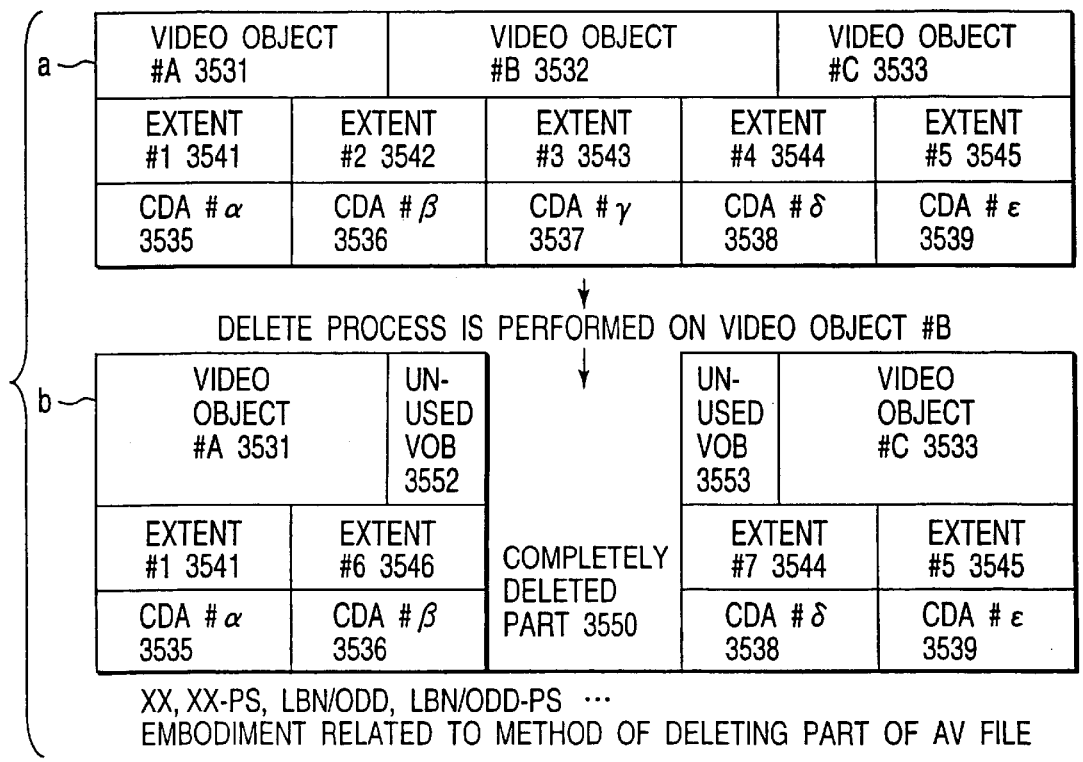
FIG. 46 is a diagram to help explain another method of deleting part of an AV file in each embodiment of the present invention.

In contrast, of the embodiments shown in Table 4, in XX, XX-PS, LBN/ODD, and LBN/ODD-PS, the recording/reproducing application 1 manages the boundary between contiguous data areas. Specifically, since information about the position of the boundary between contiguous data areas has been recorded in the allocation map table as shown in Table 6, when video object #B 3532 is deleted, the part extending over CDA #β 3536 and CDA #δ 3538 are newly defined as unused VOBs 3552, 2553 on the recording/reproducing application 1 side. As shown in FIGS. 30 and 31, they are registered additionally in the same form as that of information 3196 in unused VOB #A in the video object control information. This embodiment is shown in FIG. 46.

Figure 47:
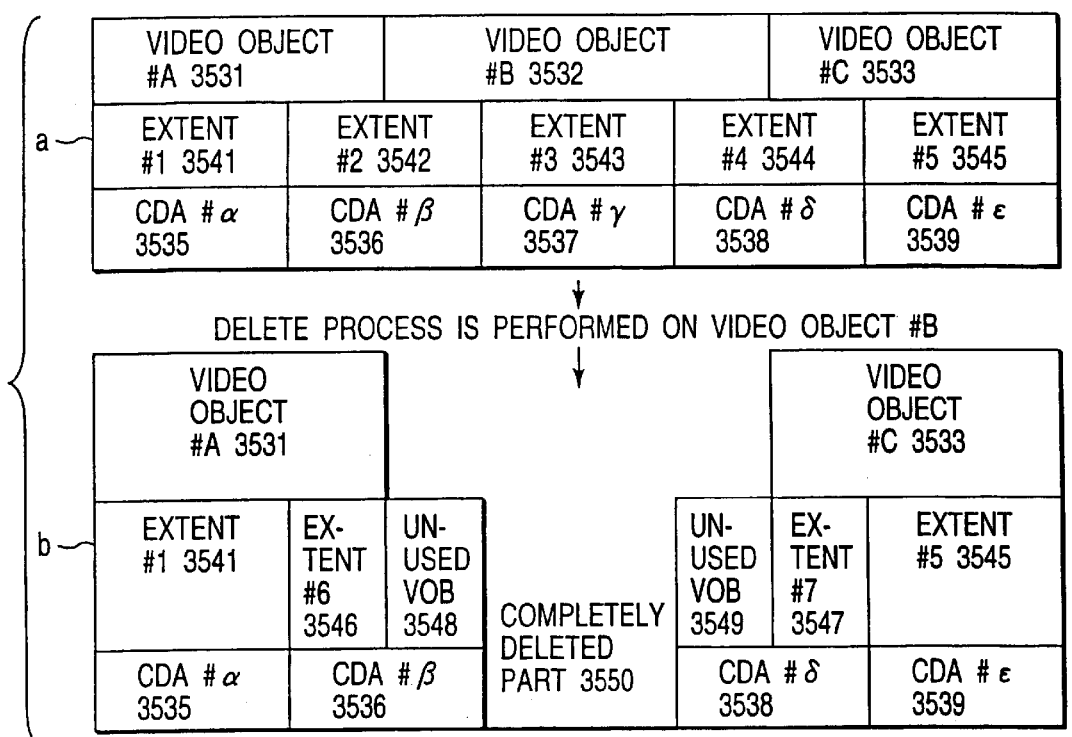
FIG. 47 is a diagram to help explain still another method of deleting part of an AV file in each embodiment of the present invention.
Figure 48:
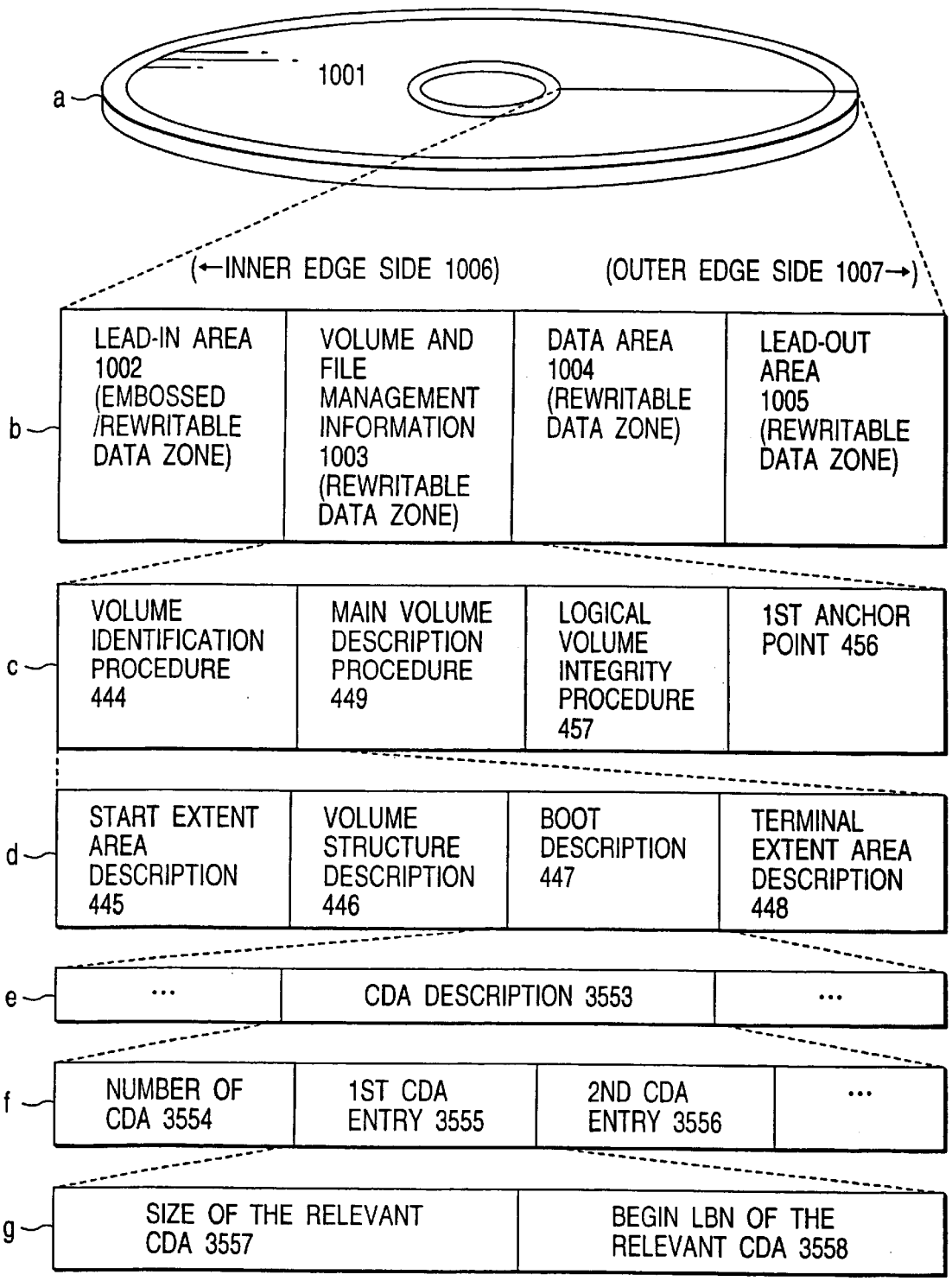
FIG. 48 is a diagram to help explain the contents of the contiguous data area boundary position information and its recording location in an embodiment of the present invention.

Of the embodiments listed in Table 4, in LBN/UDF-CDAFix, LBN/UDF-PS, and LBN-XXX-PS, the file system 2 side manages the position of the boundary between contiguous data areas. In LBN/UDF-CDAFix, CDA has been divided beforehand as shown in FIG. 47 in all the recording area on the information storage medium. The contiguous data area boundary position management information has been recorded in the boot descriptor 447, the boot area in the volume recognition sequence 444 in UDF as shown in FIG. 48. Each CDA is managed separately using separate CDA entries and its size 3557 and begin LBN 3558 have been recorded.

The embodiments LBN/UDF-PS and LBN/XXX-PS do not have such preliminary information and enable CDA areas to be set arbitrarily.

After the recording/reproducing application 1 side specifies the AV address for the begin position of video object #B 3532 to be deleted and its data size (see FIG. 47), the file system 2 side makes the partial delete place extending over CDA #β and CDA #δ unused extents 3548, 3549 and registers the unused extents 3548, 3549 in the file entry of an AV file. As for the identification information for the unused extents 3548, 3549, the allocation descriptor 420 in the file entry 3520 for video information (AV file) as shown in FIG. 17 or as indicated by f in FIG. 44 is made a long allocation descriptor and an "unused extent flag" is set as an attribute in Implementation Use 3528, 412.

When a DVD-RAM disk is used as an information storage medium, recording and partial deleting have to be done in units of EEC block 502 as shown in FIG. 7. Thus, the position of the boundary between ECC blocks has to be managed. In this case, when there is a gap between the position of the boundary between delete specified areas and the position of the boundary between EEC blocks, unused extents 3548, 3549 are set in fractional places as indicated by b in FIG. 47 and an attribute description place is provided as indicated by f in FIG. 44 and an "unused extent flag" is set there.

Therefore, although explained again, the real-time file (AV file) is composed of a real-time extent (recorded section) and an unused extent (empty extent). Information (management information) about the position of the recorded section and that of the unused extent are written in an allocation descriptor. The allocation descriptor manages AV files and unused area extents (extents set as unrecorded, although nothing has actually been recorded therein). As shown in FIG. 44 or by f in FIG. 83, this level of hierarchy includes information about the size of extents and the type of extents (recorded or unrecorded). This makes it easier to cope with various types of files, search for recorded area and unrecorded area, and calculate the capacity. The extent management information is written in the form explained in, for example, FIGS. 18A and 18B.

Whether recorded files are AV files can be determined by the identification information about file type written in the ICB (information control block) tag as described earlier.

As for the recorded area extent and the unused area extent in the AV file, the length of the allocation space is an integral multiple of an ECC block and the first logical sector number in the allocation space corresponds to an integral multiple of an ECC block.

To secure the CDA boundary position and the ECC block boundary position, the method of setting unused areas in additional recording/partial deleting has been explained by reference to FIGS. 43, 44, 45, 46, and 47.

Table 8 lists embodiments other than those described above. An embodiment indicated by circled 6 in Table 8 records unused area start LBN in Implementation Use, which differs a little from the embodiment of FIG. 44 which sets the "unused extent flag" in the same place.

Of the embodiments in Table 4, the difference between the extent setting method after video information recording in LBN/UDF and that in LBN/XXX will be explained by reference to FIG. 49 and FIGS. 50A and 50B. In both of LBN/UDF and LBN/XXX, the defect management information is recorded on the information storage medium when a defective area on the information storage medium has been found during video information recording. In LBN/UDF, the defect management information is recorded in TDM (TDM 3472 indicated by e in FIG. 38) managed by the file system 2. In LBN/UDF, since defects are managed on the file system 2, extent #4 3574 including defective area 3566 can be set (as indicted by e in FIG. 49). In LBN/XXX, the defect management information is recorded in TDL (TDL 3414 indicated by e in FIG. 37) managed by the information recording and reproducing device 3 and extents are set, avoiding the defective area 3566 (see FIG. 50A).

Figure 50A:
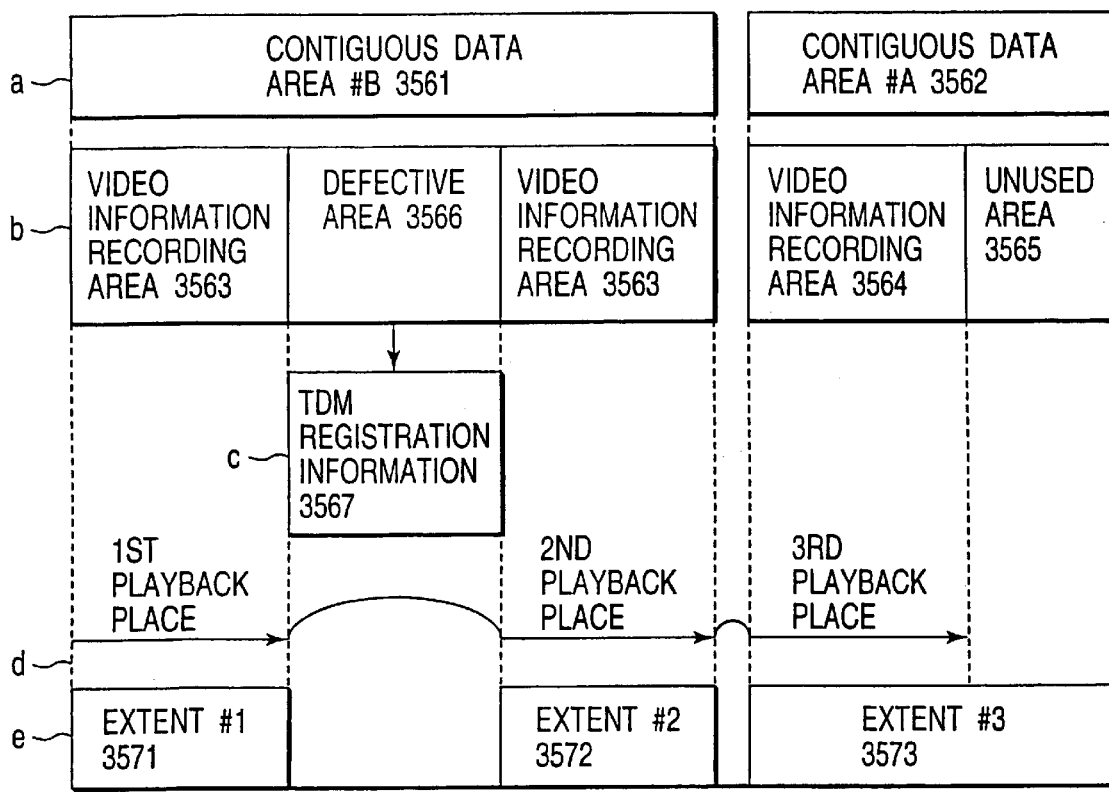
FIG. 50A is a diagram to help explain a method of recording data, avoiding a defective area, in an embodiment of the present invention.
Figure 50B:
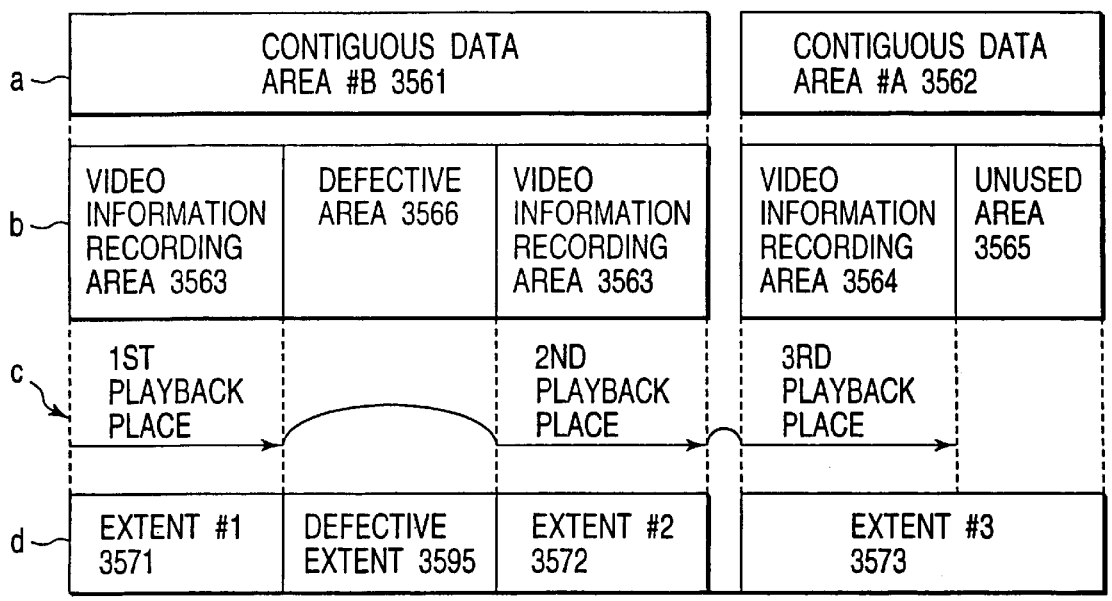
FIG. 50B is a diagram to help explain a method of recording data, avoiding a defective area in another embodiment of the present invention.

FIG. 50B shows another embodiment of FIG. 50A.

A method of managing the defective area 3566 shown in FIG. 50B uses the method written in the column marked with circled 2 in Table 7. Specifically, apart from extent #1 3571, extent #2 3572, and extent #3 3573 in which video information has been recorded, a defect extent 3595 is also set in the defective area 3566 and information on the defect extent is registered in the file entry of the AV file.

A method of writing the extent information in that case uses a long allocation descriptor. For the defect extent 3595, a "defect flag" is provided in Implementation Use 3528 (see FIG. 44) and the flag is set to "1."

Consider a case where an extent is set, avoiding the defective area 3566 as shown in FIG. 50A. After AV information has been recorded in the form shown in FIG. 49 or indicated by e in FIG. 50A, the following are done:

(1) After the completion of AV information recording, another PC file is recorded in the LBN place corresponding to the defective area 3566 (in this case, linear replacement is performed).

Figure 49:
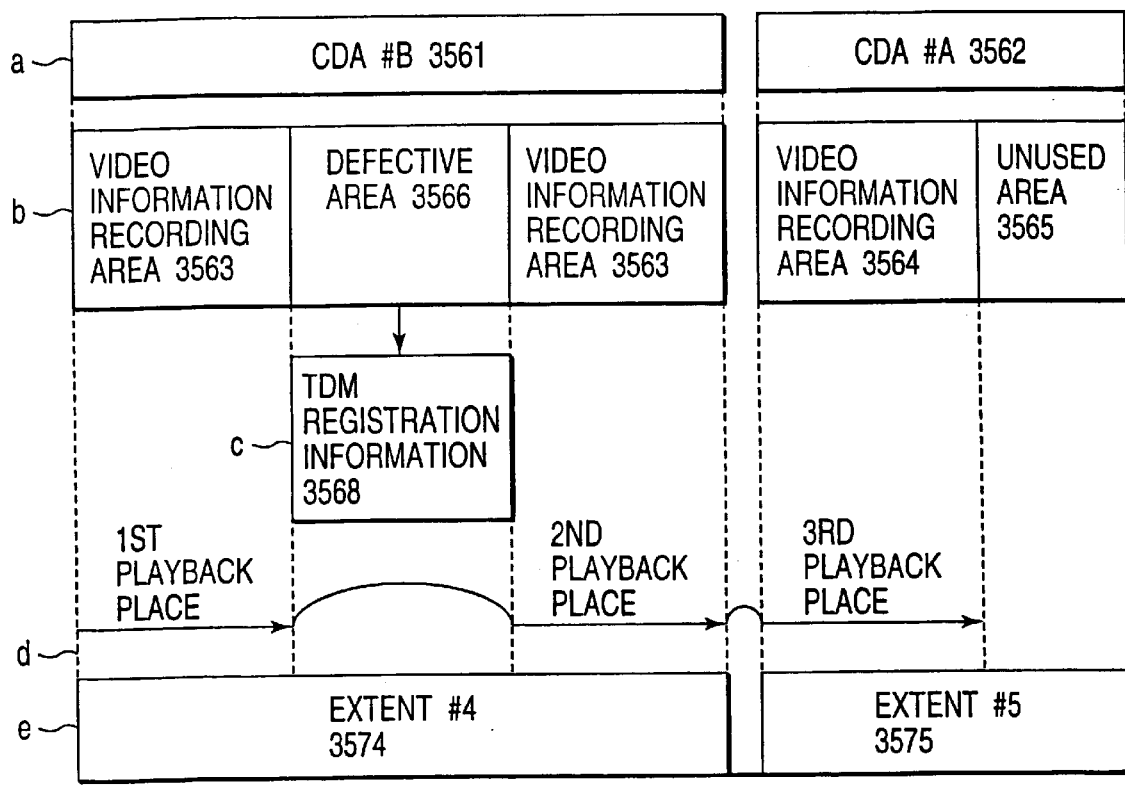
FIG. 49 is a diagram to help explain a method of recording data including a defective area in an embodiment of the present invention.

(2) To delete the AV file previously recorded, contiguous data area #B shown in FIG. 49 or indicated by a in FIG. 50A is deleted.

(3) The process of recording another AV information in the place of contiguous data area #B just deleted might take place. In this case, on the LBN space, a PC file has been already recorded in the LBN place corresponding to the defective area 3566.

Figure 51:
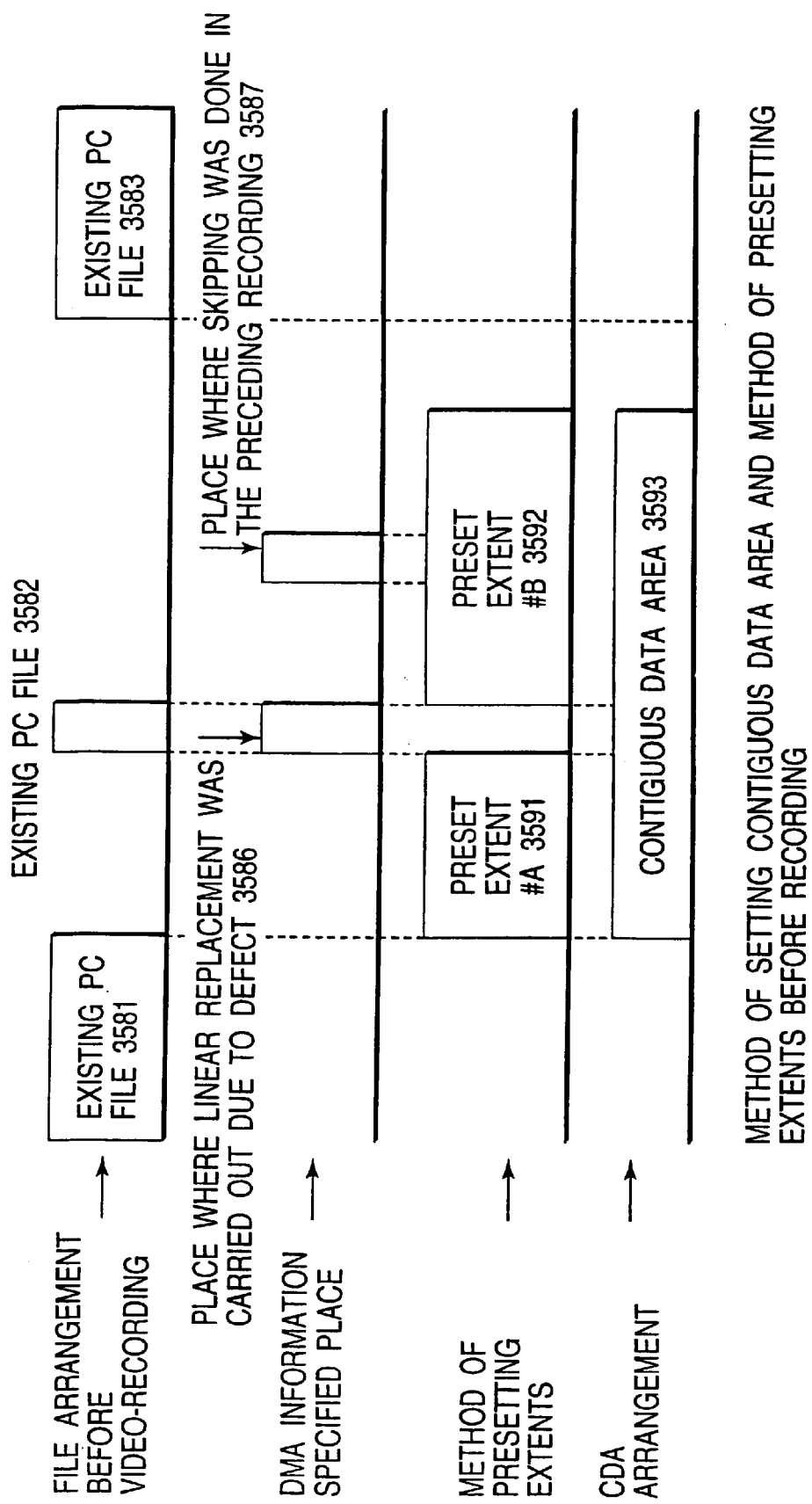
FIG. 51 is a diagram to help explain a method of setting a contiguous data area and a method of presetting an extent before recording in an embodiment of the present invention.

The embodiment LBN/XXX of the present invention is characterized in that a contiguous data area 3593 can be set in such a manner that it extends over an existing PC file 3582 as shown in FIG. 51. A concrete setting method will be explained later in detail in FIG. 56.

In the present invention, the setting conditions for the contiguous data area (CDA) 3593 are as follows:

(a) The total number Npc of the existing PC files 3582 that can exist in the contiguous data area 3593 or defect area subjected linear replacement has to satisfy equation (28) as shown on page 175.

(b) The total defect size Lskip requiring skipping replacement in the contiguous data area including the defective area 3586 subjected to skipping replacement has to satisfy equation (29) as shown on page 176.

(c) When the optical head accesses the recording area next to the contiguous data area, avoiding the existing PC file 3582 that can be present in the contiguous data area 3593 or the defective area 3586 subjected to replacement, rough access times 2348, 1376 have to be made unnecessary.

... The size of the existing PC file 3582 or the defective area 3586 subjected to replacement is set so small that rough access is not needed during the accessing of the optical head.

When AV information is recorded in the contiguous data area 3593, AV information about the following is not recorded on the information storage medium at all:

(1) The time required for the optical head to access the next recording area, avoiding the existing PC file 3582 that can be present in the contiguous data area 3593 or the defective area 3586 subjected to replacement.

(2) The period of time in which the skipping process is performed on a defective area 3587 subjected to skipping replacement in the preceding recording and the defective area newly found in the present recording.

Therefore, in the period of time, the amount of video information temporarily stored in the semiconductor memory in the information recording and reproducing device increases steadily as in the period of rough access time 1348, fine access time 1343, or rotation wait time 1346. Therefore, this period can be treated in the same manner as rough access time 1348, fine access time 1343, and rotation wait time 1346. The total size of the defective area 3587 subjected to skipping replacement in the preceding recording and the defective area newly found in the present recording and needing the skipping process is defined as Lskip.

The total time Tskip required for the optical head to pass through Lskip is:

$$Tskip = Lskip \div PTR \tag{21}$$

Taking this condition into account, expression (8) is rearranged as:

$$CDAS \geq STR \times PTR \times (Ta + Tskip)/(PTR - STR) \tag{22}$$

When the optical head accesses the next recording area, avoiding the existing PC file 3582 that can be present in the contiguous data area 3593 or the defective area 3586 subjected to replacement, it accesses the next recording area by track jumping. At this time, the size of the existing PC file 3582 and that of the defective area 3586 subjected to linear replacement are made smaller to the extent that rough access times 1348, 1376 are unnecessary.

In a general DVD-RAM drive, the moving distance of the objective in fine access is about ±200 μm. The track pitch (Pt) of the DVD-RAM disk is:

$$Pt = 0.74\ \mu m \tag{23}$$

The minimum data size (Dt) per track is:

$$Dt = 17 \times 2 \text{ kilobytes} = 34 \text{ kilobytes} \tag{24}$$

From these, the size of each of the existing PC file 3582 and the defective area 3586 subjected to linear replacement has to be equal to or less than the following:

$$200 \div 0.74 \times 34 = 9190 \text{ kilobytes} \tag{25}$$

Taking various margins into account, it is desirable that the actual allowed maximum size should be equal or less than ¼ of the value of equation (25), or 2300 kilobytes. When the above condition is satisfied, only the fine access time 1343 and rotation wait time 1346 have only to be taken into account in accessing the next recording area in the contiguous data area. If the fine access time required for one access is JATa, the rotation wait time 1346 is MWTa, and the total number of the existing PC files 3582 in the contiguous data area and the defective areas subjected to linear replacement is Npc, the total access time Tpc required to avoid the above areas is expressed as:

$$Tpc = Npc \times (JATa + MWTa) \tag{26}$$

Taking this time into account, expression (22) is rearranged as:

$$CDAS \geq STR \times PTR \times (Ta + Tskip + Tpc)/(PTR - STR) \tag{27}$$

Using the respective values of equations (10), (13), and (15) gives the following results, depending on the value of (Tskip+Tpc)/Ta:

When (Tskip+Tpc)/Ta=20%, this gives CDAS≧6.5 megabytes.

When (Tskip+Tpc)/Ta=10%, this gives CDAS≧5.9 megabytes.

When (Tskip+Tpc)/Ta=5%, this gives CDAS≧5.7 megabytes.

When (Tskip+Tpc)/Ta=3%, this gives CDAS≧5.6 megabytes.

When (Tskip+Tpc)/Ta=1%, this gives CDAS≧5.5 megabytes.

From expression (27) and equation (26), the following is derived:

$$Npc \leq \{[CDAS \times (PTR-STR)/(STR \times PTR)]-Ta-Tskip\}/(JATa+MWTa) \quad (28)$$

From expression (27) and equation (21), the following is derived:

$$Lskip \leq \{[CDAS \times (PTR-STR)/(STR \times PTR)]-Ta-Tpc\} \times PTR \quad (29)$$

Using expression (28), the values of equations (10), (13), and (15), and MWTa≈18 ms, and JATa≈5 ms gives the following results, depending on the value of (Tskip+Tpc)/Ta and the value of Tskip:

When (Tskip+Tpc)/Ta=10% and Tskip=0, this gives Npc≦6.

When (Tskip+Tpc)/Ta=5% and Tskip=0, this gives Npc≦3.

When (Tskip+Tpc)/Ta=3% and Tskip=0, this gives Npc≦1.

When (Tskip+Tpc)/Ta=1% and Tskip=0, this gives Npc≦0.

Using expression (29), the values of equations (10), (13), and (15) gives the following results, depending on the value of (Tskip+Tskip)/Ta and the value of Tpc:

When (Tskip+Tskip)/Ta=10% and Tpc=0, this gives Lskip≦208 kilobytes.

When (Tskip+Tskip)/Ta=5% and Tpc=0, this gives Lskip≦104 kilobytes.

When (Tskip+Tskip)/Ta=3% and Tpc=0, this gives Lskip≦62 kilobytes.

When (Tskip+Tskip)/Ta=1% and Tpc=0, this gives Lskip≦0 kilobytes.

FIG. 32 is a conceptual diagram of a recording route system to help explain continuity in recording.

In the above explanation, the conceptual diagram of the AV information recording route system of FIG. 32 has been used. As long as the basic concept is examined, there is no problem in using FIG. 32. For more detailed examination, a conceptual model for the recording route system shown in FIG. 52 will be used.

When recording is done with the PC system shown in FIG. 1, the AV information inputted from the outside world is converted by the MPEG board 134 into a digital compressed signal, which is temporarily recorded in the main memory 112. Under the control of the main CPU 111, the compressed signal is transferred to the information recording and reproducing device 140 side of FIG. 1. The information recording and reproducing device 140 also have the buffer memory 219 in it and stores the transferred digital AV information temporarily in the buffer memory 219.

Figure 52:
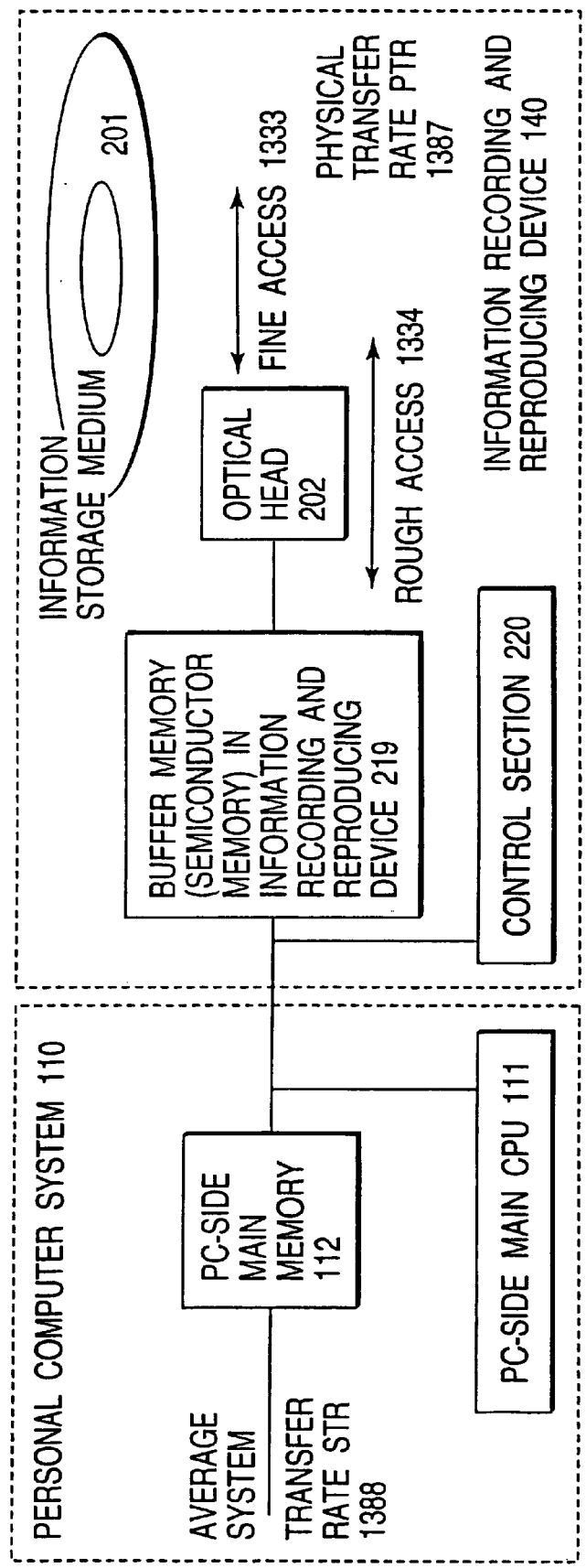
FIG. 52 schematically shows the configuration of an information recording and reproducing device according to the present invention.
Figure 53B:
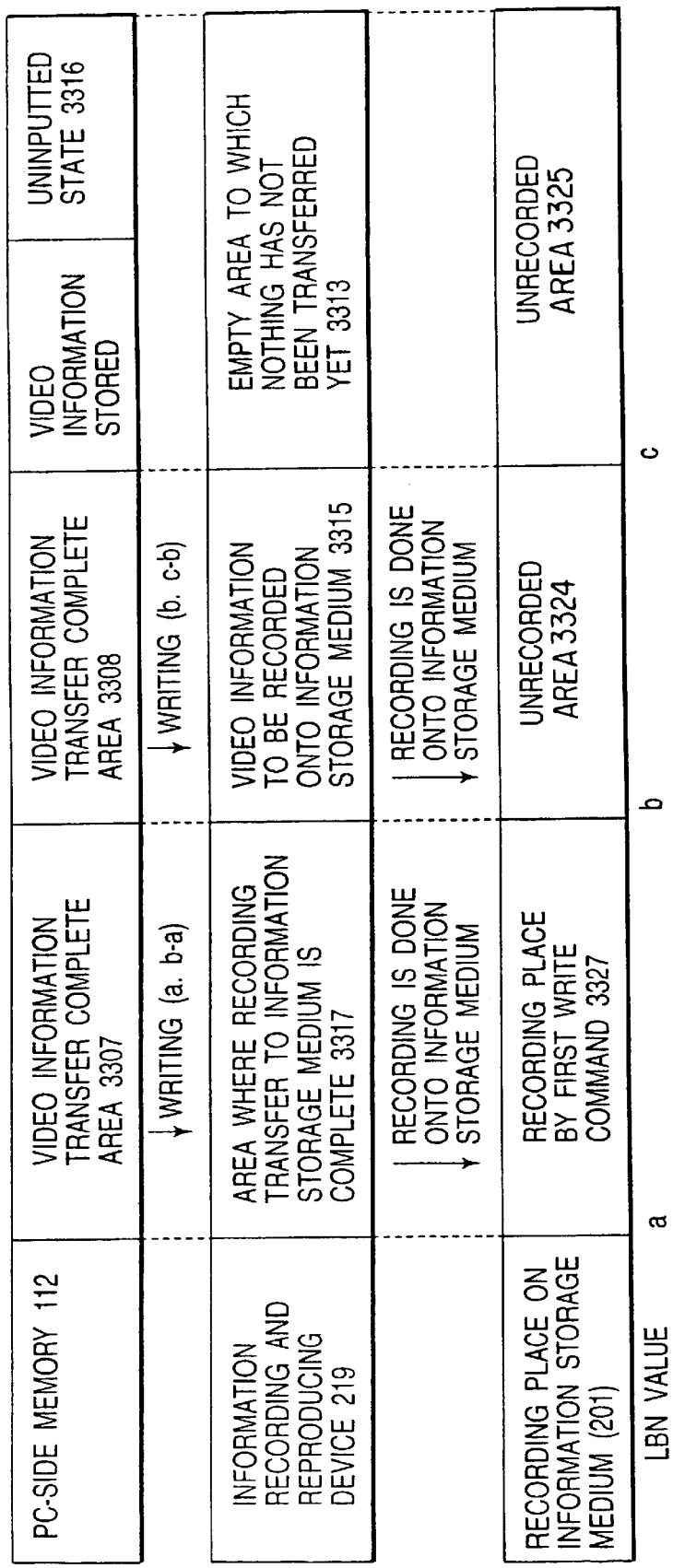
Figure 53C:
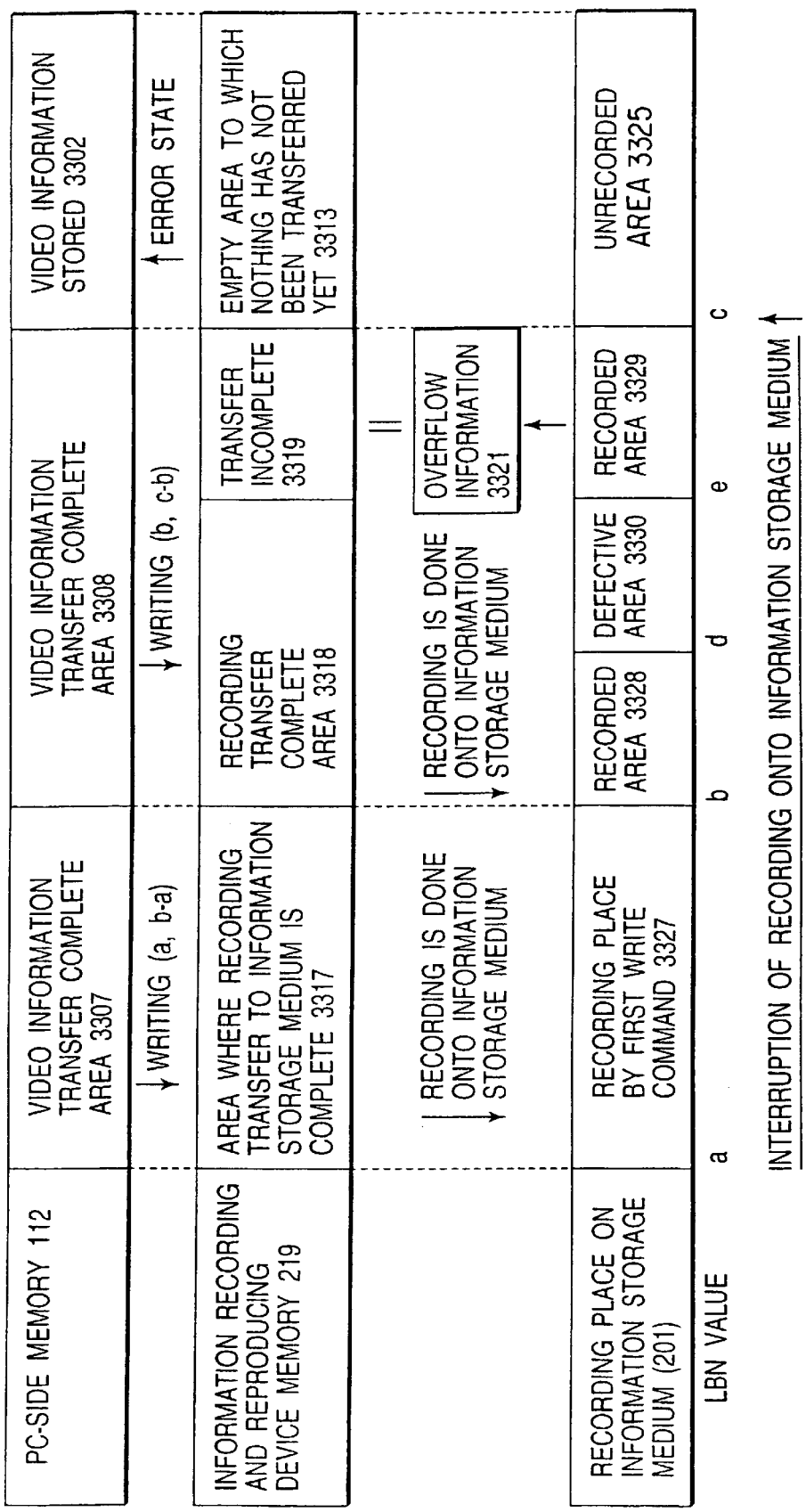

A concrete flow of information will be explained by reference to FIGS. 53A to 53C. In a conventional method, the video information 3301 stored in the main memory 112 on the PC side shown in FIG. 52 is transferred together with a write command to the information recording and reproducing device 140 side. The write command in the conventional method specifies LBN indicating the start position of recording and the size of the data to be transferred. After the transferred video information is stored temporarily in an empty area 3311 (FIG. 53A) to which no data has been transferred yet in the memory 219 of the information recording and reproducing device, it is recorded in a recording place 3327 by the first write command on the information storage medium as shown in FIG. 53B. By the next command, the video information is stored temporarily in an area for video information 3315 to be recorded on the information storage medium in the memory 219 of the information recording and reproducing device, and then the video data starts to be recorded in an unrecorded area 3324 on the information storage medium. When a defective area 3330 has occurred in the middle of recording as shown in FIG. 53C, part of the video information 3315 to be recorded does not fit in a specific range (the range of the unrecorded area 3324) on the information storage medium as a result of skipping replacement and overflow information 3321 occurs. At the same time, the information recording and reproducing device interrupts the recording process.

As described above, with the conventional command that gives LBN indicating the recording start position and the transfer information size, use of the skipping replacement algorithm interrupts the recording process.

Following is an explanation of a method of the present invention which enables AV information to be recorded continuously for a long time without interruption, even when a large number of defect have occurred on the information storage medium.

Figure 54:
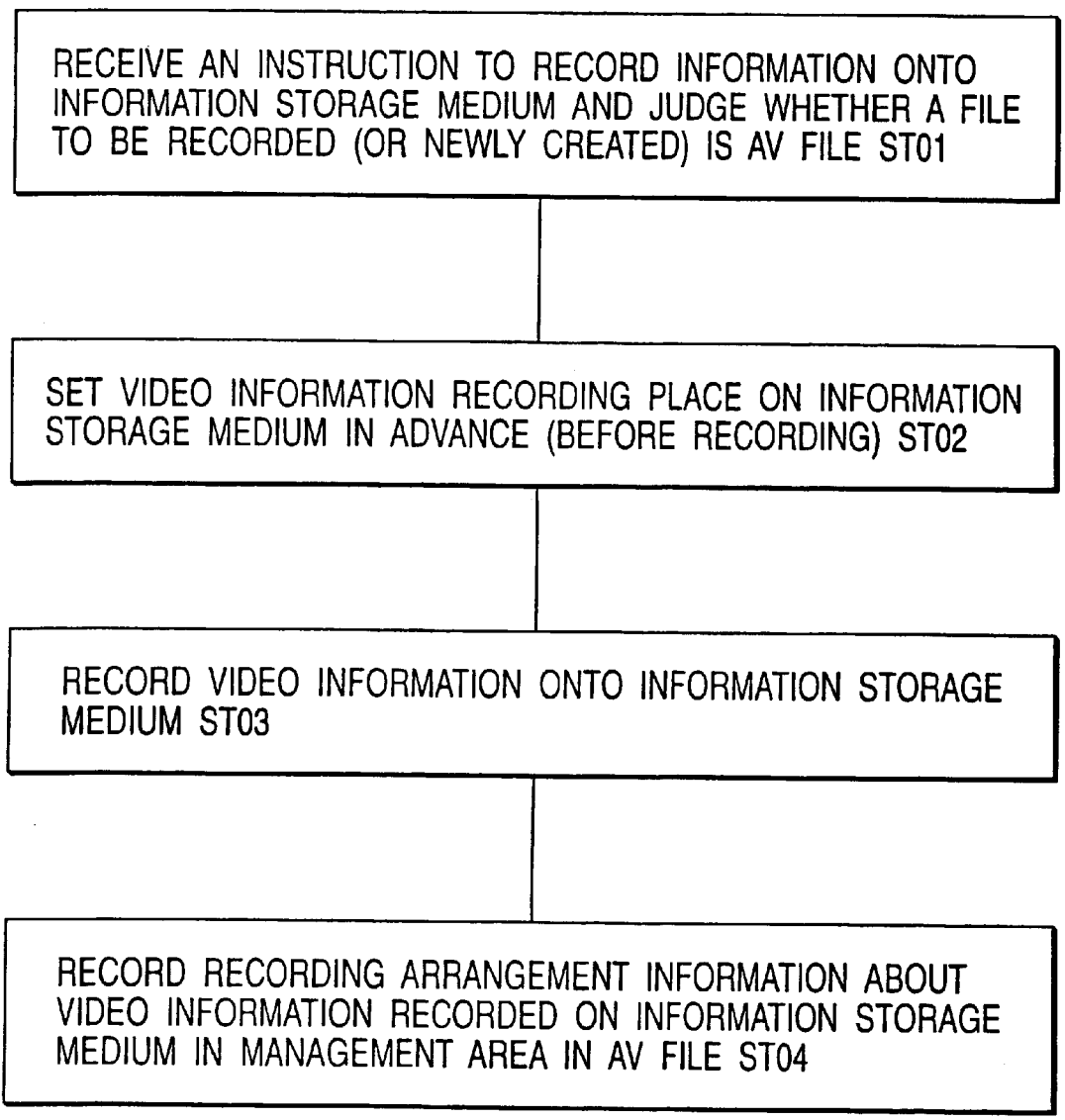
FIG. 54 schematically shows the procedure for recording video information by the information recording method of the present invention.

A method of recording AV information according to the present invention is characterized by comprising the following steps as shown in FIG. 54:

The step of judging whether the file to be recorded is an AV file (ST01).

The step of setting the video information recording place on the information storage medium in advance (ST02).

The step of recording AV information on the information storage medium (ST03).

The step of recording the information layout information actually recorded on the information storage medium in the management area on the information storage medium (ST04).

These steps are mainly controlled by the file system 2.

Figure 55:
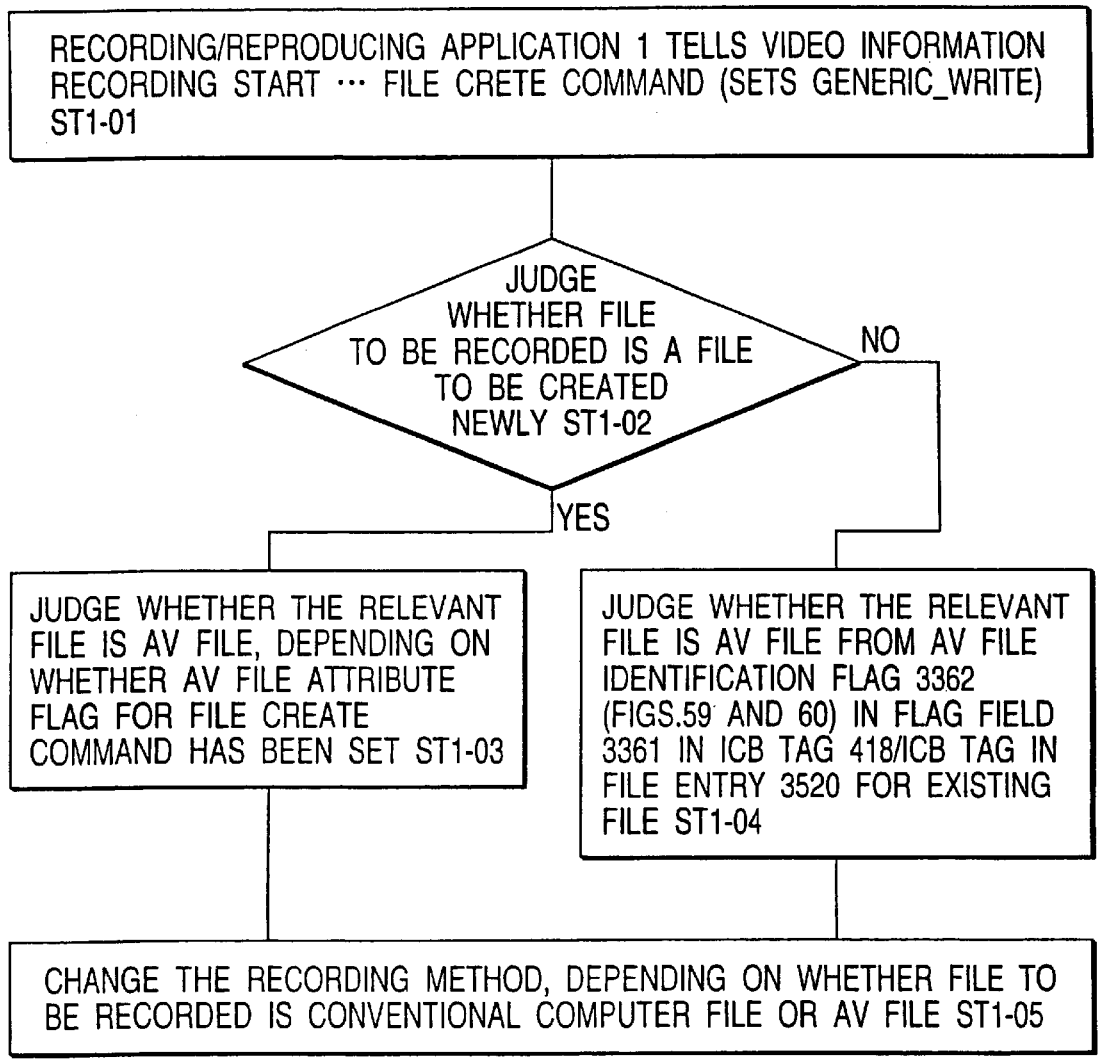
FIG. 55 shows the details of step ST01 of FIG. 54.

FIG. 55 shows the contents of step ST01 of FIG. 54 in further detail. FIG. 56 shows the contents of step ST02 of FIG. 54 in further detail. FIG. 57 shows the contents of step ST03 of FIG. 54 in further detail. FIG. 58 shows the contents of step ST04 of FIG. 54 in further detail.

All processes on the information storage medium, including the recording of information, the playback of information, and the partial deleting of the information in an AV file, are started only after the recording/reproducing application 1 in Table 3 has told the file system 2 in the OS an outline of the process.

The recording/reproducing application 1 side informs the file system 2 of the outline of the process by issuing a SDK API command 4. Receiving the SDK API command 4, the file system 2 side interprets the contents of the instructions concretely and issues a DDK interface command 5 to the information recording and reproducing device 3, thereby executing a concrete process.

Table 9 lists the API commands (SDK API command 4) necessary to execute the processes shown in FIG. 54 in the embodiments of the present invention LBN/UDF and LBN/XXX.

A new matter added and a new command in COMMAND TYPE 3405 in Table 9 are in the scope of the present invention. A series of processes carried out on the recording/reproducing application 1 using the API commands will be explained below.

<AV information recording process>

$1^{st}$ STEP: Issue a file create command to inform the OS side of the start of recording and the attribute of the target file (whether the file is an AV file or a PC file).

$2^{nd}$ STEP: Issue a set unrecorded area command to specify an estimated maximum size of AV information to be recorded on the information storage medium.

3$^{rd}$ STEP: Issue a write file command (to OS several times) to inform the OS/file system side of AV information transfer.

4$^{th}$ STEP: Issue a set unrecorded area command when the size of AV information to be recorded in the future is known after the series of AV information recording processes has been completed, in order to secure in advance the area in which the AV information is to be recorded next time.

In the information storage medium of the present invention, both AV information and PC information can be recorded on the same information storage medium. Thus, there may be a case where PC information is recorded in the empty area before the subsequent AV information is recorded, with the result that the empty area has run short when the subsequent AV information is recorded.

To avoid this, an unused area of a large size is set in an AV file and the subsequent AV information recording place is reserved in advance (the 4$^{th}$ STEP may not be executed).

5$^{th}$ STEP: Issue a close handle command to inform the OS/file system side of the end of the series of recording processes.

* The conventional PC information recording commands are also used as the write file command and close handle command, except that an AV file attribute flag is added to the file create command. Such setting makes it unnecessary to change the program as a result of changing the video information recording method in a higher layer closer to the API interface in the multilayer OS. This enables the existing OS software to be used as it is in the higher layer. On the file system side belonging to a lower-layer part of the OS close to the information recording and reproducing device, only the file system side judges whether the file to be dealt with by the method of FIG. 55 is an AV file or a PC file and selects a command to be used for the information recording and reproducing device.

* All addresses for recording places are set in AV addresses.

<AV/PC information playback process>

1$^{st}$ STEP: Issue a file create command to inform the OS side of the start of playback.

2$^{nd}$ STEP: Issue a read file command (to OS several times) to specify a series of playback processes.

3$^{rd}$ STEP: Issue a close handle command to inform the OS/file system side of the end of the series of playback processes.

* In playback, common processes are performed on both AV files and PC files.

* All addresses for playback places are set in AV addresses.

<Partial deleting process of AV files>

1$^{st}$ STEP: Issue a file create command to inform the OS side of the name of the file to be deleted partly.

2$^{nd}$ STEP: Issue a file partial delete command to specify the deleting of the specified range.

. . . In the file partial delete command, the AV address at which deleting to be started and the size of the data to be deleted are specified in parameters.

3$^{rd}$ STEP: Issue a close handle command to inform the OS/file system side of the end of the series of playback processes.

<Inquiring about the size of an unrecorded area in which AV information can be recorded on the information storage medium>

1$^{st}$ STEP: Issue a get AV free space size command to inquire about the size of an unrecorded area in which AV information can be recorded.

* Just issuing the get AV free space size command to the OS side enables the size of the unrecorded area to be obtained from the OS side.

<Defragmentation process>

1$^{st}$ STEP: Issue an AV Defragmentation command to instruct the OS side to execute an AV file Defragmentation process.

* The AV Defragmentation command alone can carry out the AV file Defragmentation process.

* In a concrete method of processing the AV Defragmentation command, small pieces of file information of the extent size interspersed on the information storage medium are moved extent by extent and the contiguous data area securing space in the unrecorded area is widened.

Table 10 shows a list of the DDK interface commands 5 issued by the file system 2 to the information recording and reproducing device 3 side after having interpreted the SDKAPI command concretely.

The commands excluding the READ command are either new commands provided in the present invention or the existing commands partially modified.

The information recording and reproducing device is connected to, for example, the IEEE 1394 and performs information transfer with a plurality of devices simultaneously. In explanation of Table 3 or FIG. 1, the information recording and reproducing device 3 or 140 is connected only to the single main CPU 111. In contrast, when the information recording and reproducing device is connected to the IEEE 1394 or the like, it is connected to the main CPU of each device. To prevent information from being transferred to the wrong device, S10T_ID, identification information for each device, is used. The S10T_ID is issued on the information recording and reproducing device 3 or 140 side. A GET FREE SLOT_ID command is issued on the file system 2 side and not only declares the start and end of AV information using an AV write start flag and an AV write end flag as parameters but also instructs the information recording and reproducing device to issue S10T_ID at the time of declaring the start of AV information.

The recording start position in the AV write command is set automatically as the current position (the subsequent AV information is recorded from the LBN position at which recording has been completed by the preceding AV write command). An AV write number is set in each AV write command. Using the AV write number, a DISCARD PRECEDING command (see Table 10) makes it possible to cancel the issue of the already issued AV write command recorded in the buffer memory 219 as a command cache of the information recording and reproducing device.

As shown in FIG. 61, there is a GET WRTE STATUS command that enables the file system 2 side to perform a suitable process before the amount of AV information temporarily stored in the buffer memory 219 of the information recording and reproducing device. The amount of room in the buffer memory 219 is reported as the return value 3344 of the GET WRITE STATUS command, which enables the file system 2 side to grasp the status of buffer memory 219.

In the embodiment of the present invention, the GET WRITE STATUS command is inserted each time as much AV information as equals records in a single contiguous data area is issued in an AV write command, which causes the check target size and check start LBN, the command parameters 3343 in the GET WRITE STATUS command, to match with the target contiguous data area. Because the defective area found in the target range is given as the begin LBN of each ECC block using the return value 3344, this information is used in setting an extent (ST4-04) after AV information has been recorded.

A SEND PRESENT EXTENT ALLOCATION MAP command is a command to inform the information recording and reproducing device of all the scheduled recording places as LBN information before AV information is recorded. The command has the number of extents in the scheduled recording places, the begin position (LBN) for each extent, and the size of each extent as command parameters. The scheduled recording places on the information storage medium are set on the basis of the zone boundary position information and the DMA information after LBN conversion, the return value of the GET PERFORMANCE issued beforehand.

Hereinafter, the processing method in each step shown in FIG. 54 will be explained in further detail.

Figure 59:
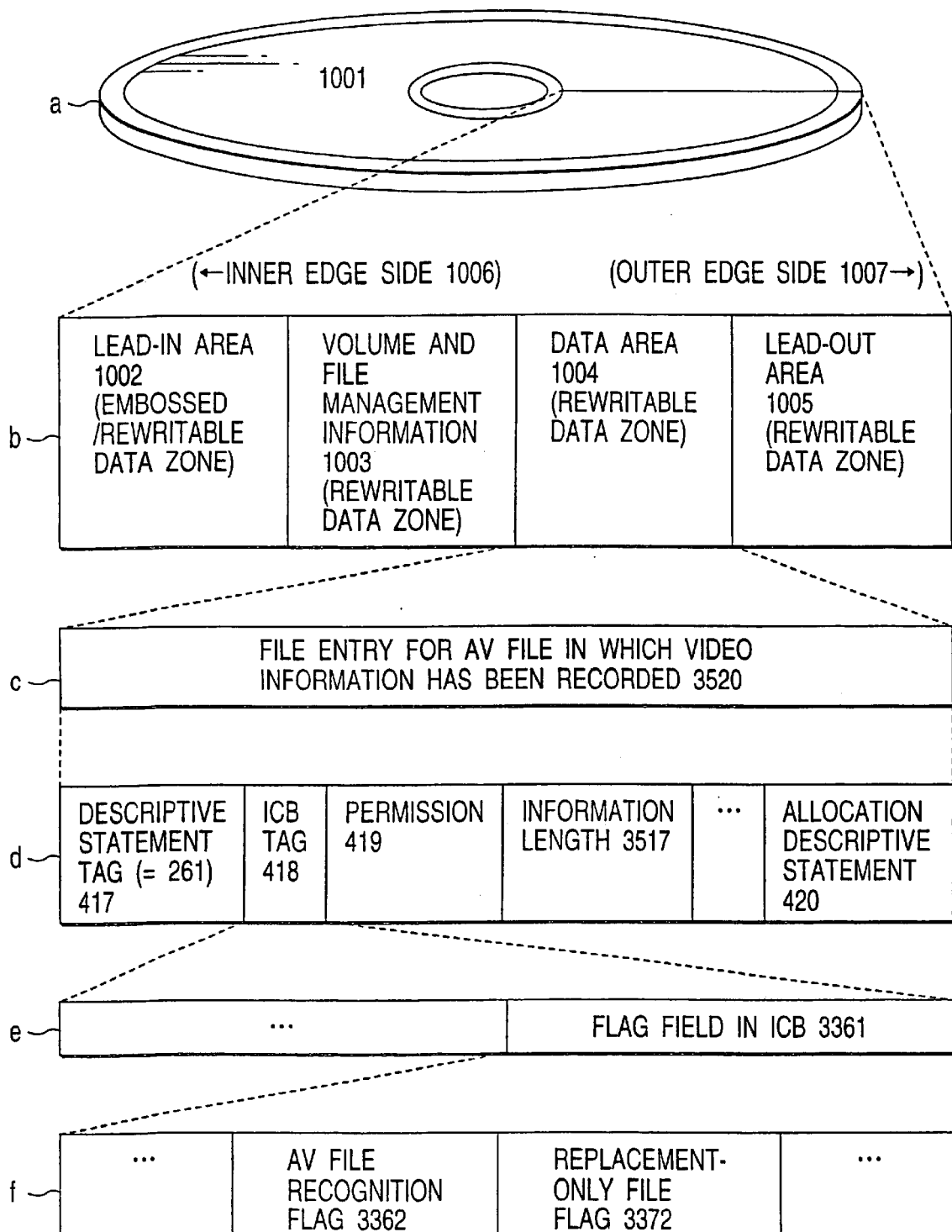
FIG. 59 is an explanatory diagram showing the location where identification information about an AV file according to the present invention has been recorded.

As for identification information about AV files, an AV file identification flag 3362, or an identification flag for what is called a real-time recording file, is set in a flags field in ICB tag 3361 in the ICB tag 418 of a file entry 3520 as shown in FIGS. 20A and 20B or indicated by f in FIG. 59. Setting the flag to "1" makes it possible to judge whether the file is an AV file.

In another embodiment of the present invention, an AV file identification flag 3364 may be set in the file identification descriptor 3364 as indicated by d in FIG. 60.

FIG. 55 is a concrete flowchart for the step of judging whether the file is an AV file shown in ST01 in FIG. 54.

Only when the recording/reproducing application 2 side issues a create file command, processing is started (ST1-01). The method of distinguishing an AV file varies depending on the condition (ST1-02) as follows:

* When a new AV file is created, the AV file is distinguished using the AV file attribute flag in the create file command (ST1-03).

* When AV information is added to the existing AV file, the AV file is distinguished using the attribute flag for the file already recorded on the information storage medium as shown in FIG. 59 or 60 (ST1-04).

Use of the method produces the effect of making it unnecessary to manage the attribute of each file (whether the file is an AV file or a PC file) on the application program 1 side (or of making a judgment on the file system 2 side automatically and switching the recording method) (ST1-05).

With such a method, when the file is a PC file, the conventional write command and linear replacement algorithm are executed. When the file is an AV file, the AV write command and skipping replacement algorithm are executed.

After having issued the file create command, the recording/reproducing application 1 side sets an estimated maximum value of the AV information scheduled recording size and issues a set unrecorded area command. On the basis of the distribution of defects obtained from the specification information and GET PERFORMANCE command and the zone boundary position information, the contiguous data area is set so as to suit the maximum information size to be recorded (ST02, and ST2-05, ST2-06, and ST2-07 in FIG. 56). Of course, before that, the size of an AV file unused area to be recorded on the information storage medium is recognized, information on the defective distribution is acquired, and information on the zone boundary position is acquired (ST2-01 to ST2-04).

When the embodiment of LBN/XXX in Table 4 is used, equation (25) and expression (27) are used as the setting condition.

On the basis of the result, information about the allocation descriptor in the file entry for the relevant AV file is recorded in advance (ST2-07). Executing this step produces the following effects:

(a) For example, when the information recording and reproducing device is connected to the IEEE 1394 or the like and records data with a plurality of devices simultaneously, it can prevent other information from being written in the position in which data is to be recorded.

(b) Even when the recording of AV information is interrupted in the course of continuous recording due to power failure, the information immediately before the interruption can be saved by tracing the scheduled recording positions in sequence after restart.

Thereafter, a send preset extent allocation map command is issued to inform the information recording and reproducing device side of the scheduled recording position information (ST2-08). Because the information recording and reproducing device is well aware of the recording positions on the information storage medium and the recording sequence by the advance notice, it can assure continuous recording without stopping the recording process, even when the skipping replacement algorithm is executed frequently due to defects on the information storage medium in recording AV information.

The details of the AV information continuous recording step shown in step ST03 of FIG. 54 will be explained by reference to FIG. 57.

Using information about information length 3517 shown in equation indicated by d in FIG. 43, the recording start position in the AV file is checked in advance (ST03-01). When the recording/reproducing application 1 issues a write file command (ST3-02), a GET FREE SLOT_ID command with an AV write start flag is issued to cause the information recording and reproducing device to issue SLOT_ID (ST3-03).

FIG. 61 pictorially shows the continuous recording method in ST3-04 and later. The pieces of video information #1, #2, and #3 stored in the main memory by the AV write command are transferred to the buffer memory 219 in the information recording and reproducing device periodically. The video information accumulated in the buffer memory 219 in the information recording and reproducing device is recorded on the information storage medium via the optical head 202. When a defective area 3351 has occurred on the information storage medium 201, the skipping replacement algorithm is executed. In the meantime, the video information is not recorded on the information storage medium 201, with the result that the amount of video information temporarily stored in the buffer memory 219 in the information recording and reproducing device increases. The file system 2 side issues a GET WRITE STATUS command at regular intervals of time and monitors the amount of video information temporarily stored in the buffer memory 219. When the amount of video information temporarily stored is going to be saturated, the file system side executes one of the following:

(1) Issue a DISCARD PRECEDING COMMAND command to delete part of the command cache in the information recording and reproducing device.

(2) Issue the next AV write command to limit (or decrease) the amount of video information to be transferred to the information recording and reproducing device.

(3) Delay the time at which the next AV write command is issued to the information recording and reproducing device and wait until the amount of video information temporarily stored in the buffer memory 219 in the information recording and reproducing device becomes smaller.

The above contents will be explained using concrete examples shown in FIGS. 62 to 69. The transition of recording information in three stages is shown in FIGS. 62 to 69. The first stage corresponds to the memory on the PC side, the second stage corresponds to the memory in the information recording and reproducing device, and the third step corresponds to the recording position on the information storage medium.

A SENT PRESET extent allocation map command preceded by circled 1 in FIG. 62 is issued according to step ST2-08 in FIG. 56. As shown in Table 10, since in this command, the extent begin position information and extent size information are set as command parameters, "a" and "d" and "g" . . . , the begin position LBN for extent=CDA, and "c−a" and "f−d" . . . , extent=CDA size, are added. Moreover, AV write commands preceded by circled 2 and circled 3 are issued so as to record video information in CDA #1 in two separate actions.

Next, to grasp the recorded state of CDA #1, a GET WRITE STATUS command preceded by circled 4 is issued.

To specify CDA #1 as a check target by the GET WRITE STATUS command, "a" is set as the begin LBN for the check target range, the set value of a parameter, and "c−a" is set as the check target range. Similarly, AV write commands preceded by circled 5 and circled 6 are issued so as to record video information in CDA #2 in two separate actions. Then, to grasp the recorded state of CDA #2, a GET WRITE STATUS command preceded by circled 7 is issued.

The command is sent to the information recording and reproducing device at a time and command cache is performed (ST3-05 in FIG. 57).

Figure 64:
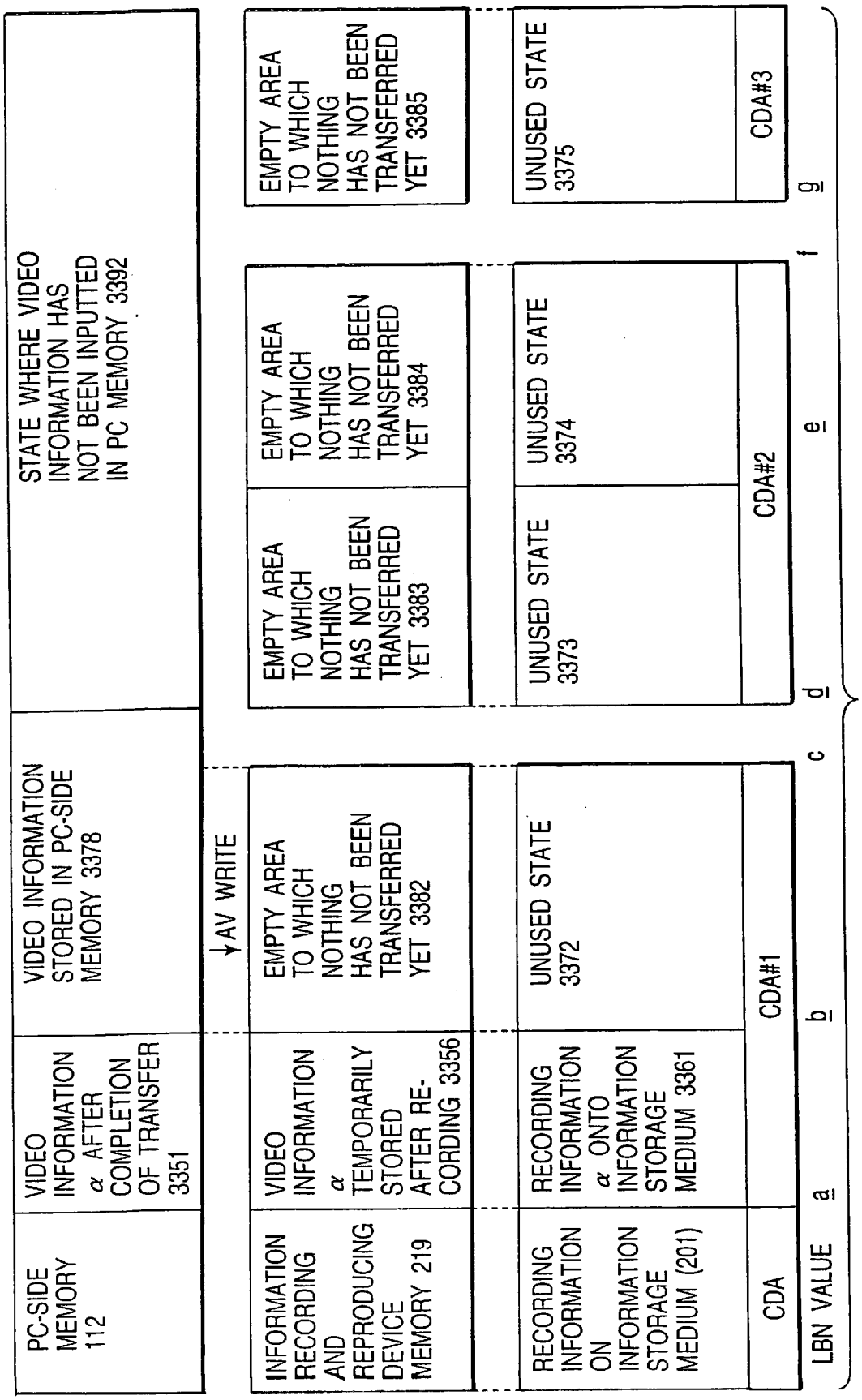
FIG. 64 is a diagram to help explain a method of recording information onto an information storage medium according to an embodiment of the present invention.
Figure 65:
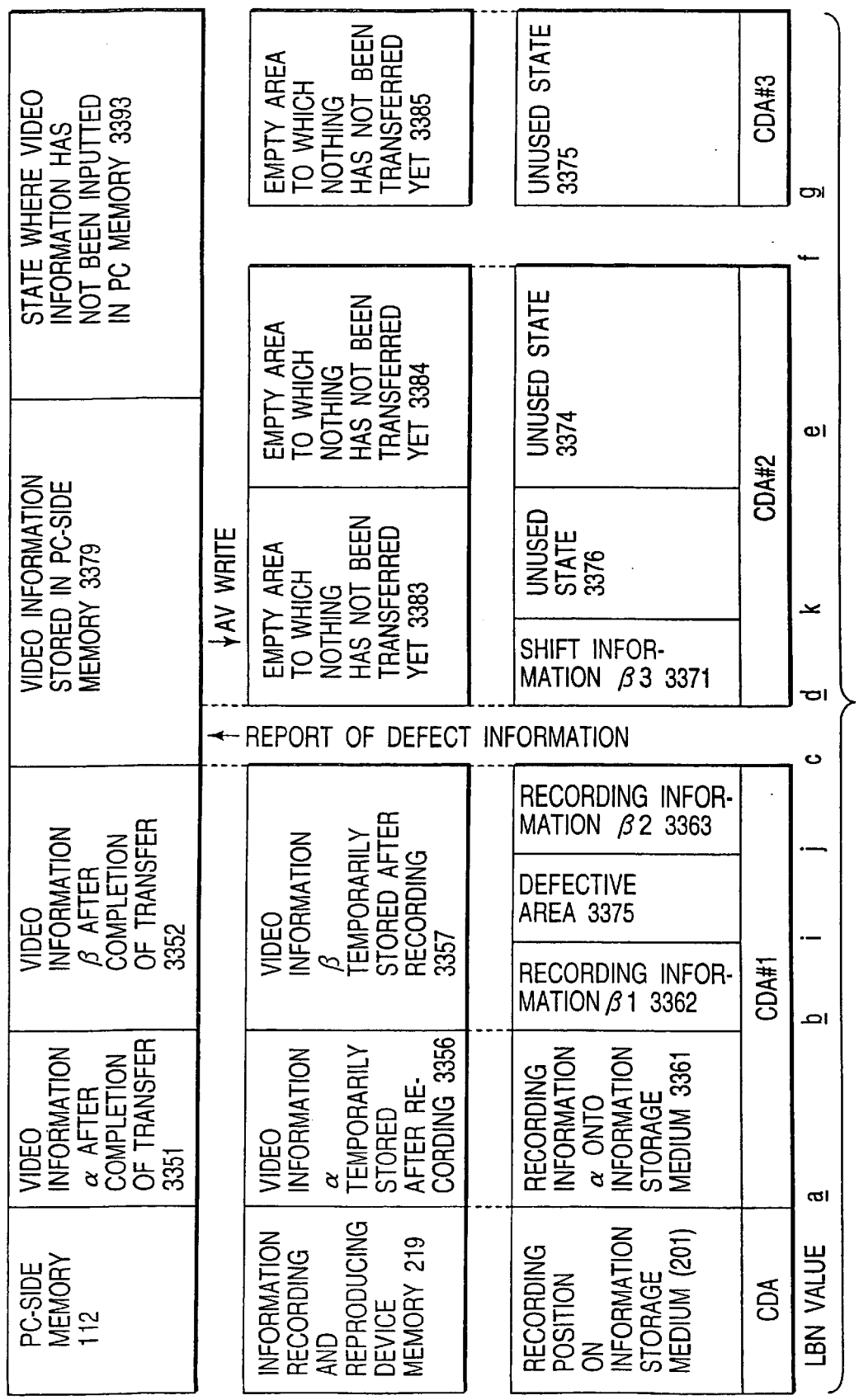
FIG. 65 is a diagram to help explain a method of recording information onto an information storage medium according to an embodiment of the present invention.

When there is no defect in the unused place 3371 on the information storage medium shown in FIG. 63, recording information α 3361 is recorded on the information storage medium as shown in FIG. 64. Next, when a defective area 3375 has occurred as shown in FIG. 65, the skipping replacement algorithm is executed. Part of the video information scheduled to be recorded in CDA #1 overflows. However, since the second present extent allocation map command has informed the information recording and reproducing device 3 side of the location in which information is to be recorded next, the overflowed information is stored in the location 3371, shift information β 3. Information about the defective area 3375 is reported as the return value 3344 of GET WRITE STATUS command preceded by circled 4 to the file system 2 side (see ST3-05 in FIG. 57, and FIGS. 62 and 66). The file system 2 judges whether the buffer memory 219 in the information recording and reproducing device (ODD) 3 is going to overflow (ST3-06 in FIG. 57). Then, in a concrete method shown in ST3-07 in FIG. 57, a DISCARD PRECEDiNG COMMAND command (indicated by circled 9 in FIG. 66) is used to cancel the AV write command (circled 8 in FIG. 62), a write command about the video information to be recorded in CDA #3 and then an AV write command (circled 10 in FIG. 66) is used to issue a command to limit (or decrease) the amount of video information to be transferred.

Figure 67:
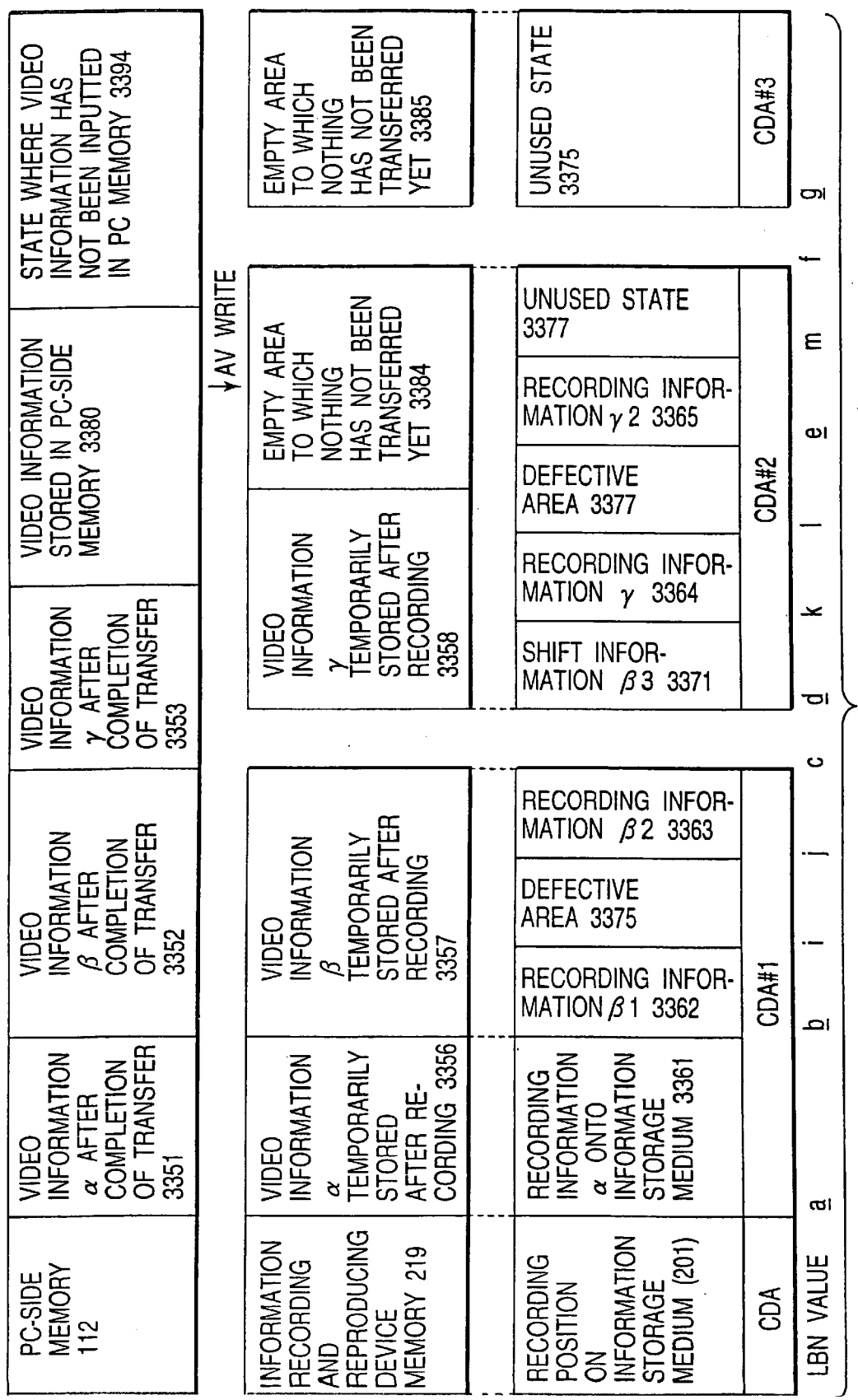
FIG. 67 is a diagram to help explain a method of recording information onto an information storage medium according to an embodiment of the present invention.

Because the feedback to CDA #2 is not in time, recording is done on the information storage medium as scheduled at the beginning as shown in FIG. 67.

Figure 68:
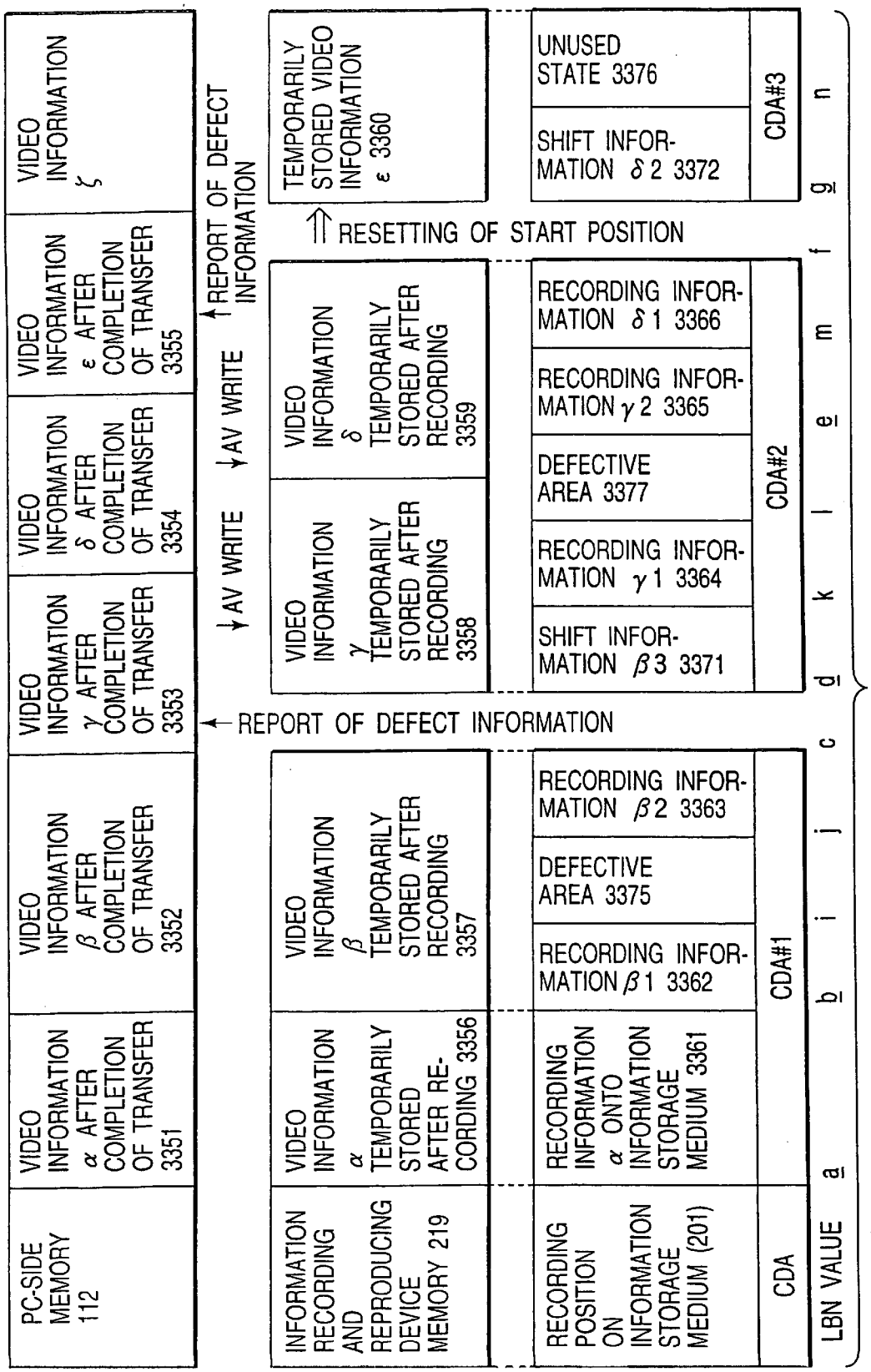
FIG. 68 is a diagram to help explain a method of recording information onto an information storage medium according to an embodiment of the present invention.

As shown in FIG. 68, the recording start position in the AV write command used here is not the current position. It is assumed that the file system 2 side specifies the recording start position. In this case, too, the recording start position in which recording is actually done is allowed to deviated substantially from the recording start position specified by the file system 2 side on the basis of the defective area found in recording the preceding video information.

After the series of recording processes has been completed, a Close Handle command issued from the recording/reproducing application causes the file system 2 to issue a GET FREE SLOT_ID command with an AV write end flag to the information recording and reproducing device 3 side. Receiving the command, the information recording and reproducing device 3 adds the defective information found in the series of recording processes to TDL3414 in FIG. 37.

As the postprocess in recording the video information, the size of the unused area left in the AV files is determined on the basis of the SET Unrecorded area command information (ST4-03 in FIG. 58) specified by the recording/reproducing application 1 side. Then, the rewriting of information length 3517 (ST4-05), the rewriting of the final extent information (ST4-04), and the rewriting of setting information about UDF are effected.

Next, the procedure for allocating extents in recording real-time files will be explained.

The extent allocation procedure is designed to prevent underflow from occurring the buffer during playback.

When the symbols below are defined, the procedures for extents can be explained using the symbols:

Ai: Preallocation area (area physically connected by ECC and searched for before recording).

Ei: Unused extent (empty extent).

RTi: Real-time extent.

$T_{Ri}$: Ai read time.

$T_{m,n}$: Access time from the end of area Am to the start position of area An.

$T_k$: the maximum time of one revolution period.

$t2_{i-2}$: Start time of reading from area Ai.

$t2_{i-1}$: End time of reading from area Ai.

B(t): The amount of data in the buffer memory at time t.

$B_{max}$: Buffer memory size.

$B_F$: The minimum amount of data in the buffer memory to set a preallocation area to be registered as an unused extent.

p: The maximum number of preallocation areas already registered as unused extents.

Step 1 . . . Search of unallocated areas.

Unallocated areas (unused areas) physically connected are searched for by reference to the space bit map descriptor. At this time, the physical allocation data indicating the zone boundary and defective ECC blocks/sectors is also referred to. The unallocated area whose start logical number and length are an integral multiple of 16 logical sectors is regarded as preallocated area.

Even if some preallocated areas have not been used in recording real-time data, unallocated areas are searched for, provided that the total size of unallocated areas is large enough for the preset size of recording data. The space bit map descriptor is updated to reserve all the preallocated areas.

Step 2 . . . Calculate the read time and access time.

Using data rate $V_{in}$, the read time $T_{Ri}$ for each preallocated area Ai is calculated. The access time Ti,I+1 based on access operation is calculated.

Step 3 . . . Calculate the amount of data B(t) at the end of read operation.

The amount of data B(t) is calculated at the last time when the data is read from area Ai.

$$B(t_{2i-1}) = B(t_{2i-2}) + (V\text{in} - V\text{out}) \times T_{Ri}.$$

After the data has been read from area Ai, the overflowing state of the buffer memory is checked.

If the amount of data $B(t_{2i-1})$ has exceeded the size Bmax of the buffer memory, $B(t_{2i-1})$ is corrected to be $B(t_{2i-1})-k\times Tk$ (k is a positive integer). This is a value smaller than Bmax.

Next, the total size of preallocated areas is checked. If the total size of preallocated areas Aj (from j=1 to 0) has exceeded the predetermined size (=Vout×recording time) of recording data, the preallocated areas Aj (from j=P+1 to i) are registered as unused extents Ej (from j=p+1 to i). Then, control proceeds to step 5 explained later.

Next, the amount of data B(t) at the end of the read time for area Ai is checked. If the amount of data $B(t_{2i-1})$ has exceeded the minimum amount of data $B_F$ (=Vout×$T_L$), the preallocated areas Aj (from j=P+1 to i) are registered as unused extents Ej (from j=p+1 to i), which are numbered from p to i.

Step 4 . . . Calculate the amount of data B(t) at the start of read operation.

The amount of data B(t) at the start of reading data from area Ai+1 is calculated.

$$B(t_{2i})=B(t_{2i-1})-(Vout\times T_{i,i+1}).$$

Next, after the data has been read, the buffer memory is checked for underflow. If the amount of data $B(t_{2i})$ is less than 0, the following subroutine will operate.

Aj (from j=p+1 to i+1) is searched for the most effective preallocated area Ak. The purpose for this is to reduce the amount of data in the buffer memory. Aj is searched for, while comparison is being made as seen in value $(B(t_{2j-3})-B(t_{2j-1}))$ where j=p+1 to i+1).

From preallocated areas Ai+1, Ai*(i=k, k+1, k+2, . . . ) are specified again. On the accessing process, access time $T_{k-1, k+1}$ is calculated and set as $T_{k-1,k^*}$.

From access time $T_{i-2,i+2}$, $T_{i, i+1}$ is specified again. From read times TRi+1, TRi*(i k, k+2, k+2,) are specified again. Then, i is set to p and control goes to step 4, otherwise i is incremented by +1 and control goes to step 3.

Step 5 . . . Record real-time data.

In this step, real-time data (AV data) is recorded in the unused extent registered in step 3. When the recording is ended in the middle of the preallocated area, the preallocated area is divided into a real-time extent, an unused extent, an unrecorded area. This is because data is recorded in ECC block units at a variable data rate.

Step 6 . . . Record the file structure.

In this step, an information control block (ICB) is created. In the block, a real-time extent (recorded section) and unused (empty) extent are shown. To release the preallocated area not used for a real-time file, the space bit map is updated.

The management information about the unused extent and that about the information length, and further the setting of the unused extent are the same as explained earlier.

Figure 70:
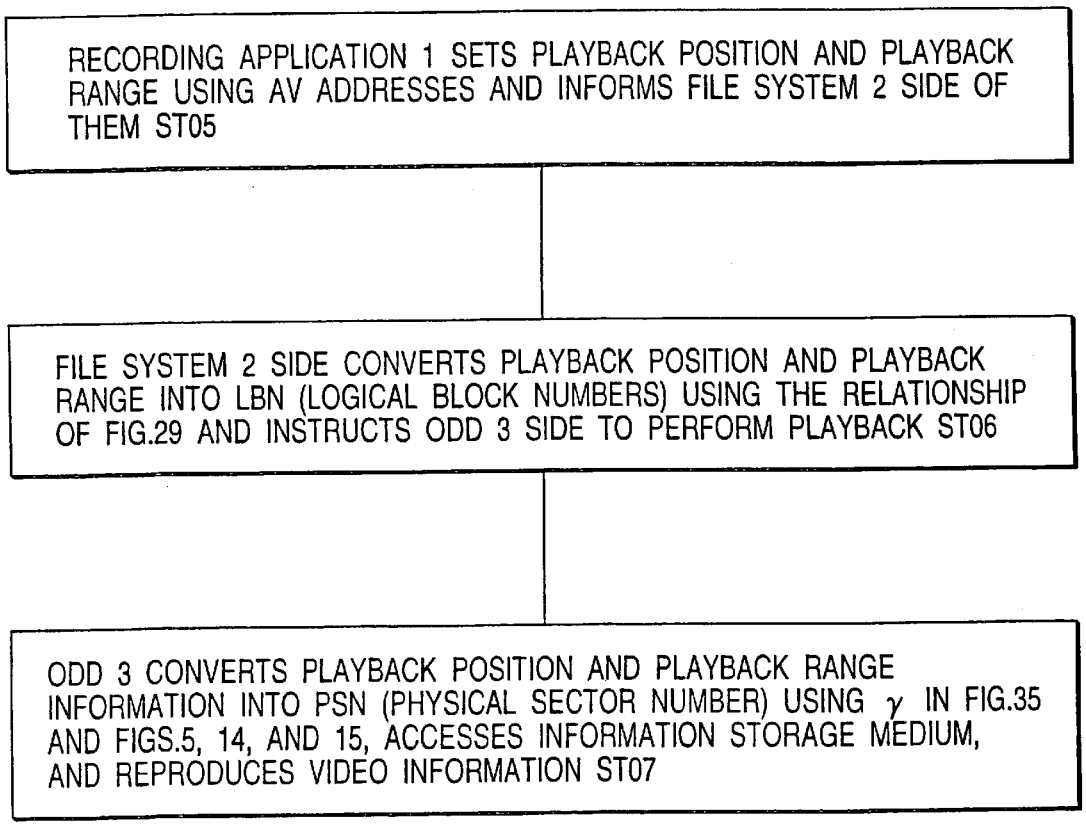
FIG. 70 shows the procedure for reproducing video information by the information recording method according to the present invention.

The procedure for reproducing the video information in an AV file by reference to FIG. 70 shows the following:

The recording/reproducing application 1 uses AV addresses as address information to be managed and further uses AV addresses to set addresses in SDKAPI command 4 issued to the file system 2.

The file system 2 uses LBN (or LSN depending on the situation) as address information to be managed and further uses LBN to set addresses in DDK Interface command 5 issued to the information recording and reproducing device 3.

The information recording and reproducing device 3 manages addresses using PSN.

Therefore, when the recording/reproducing application 1 determines the place to be reproduced and issues a read file command, then the file system 2 performs "AV address→LBN conversion" (ST06 in FIG. 70) and the information recording and reproducing device 3 performs "LBN→PSN conversion" (ST07).

Figure 71:
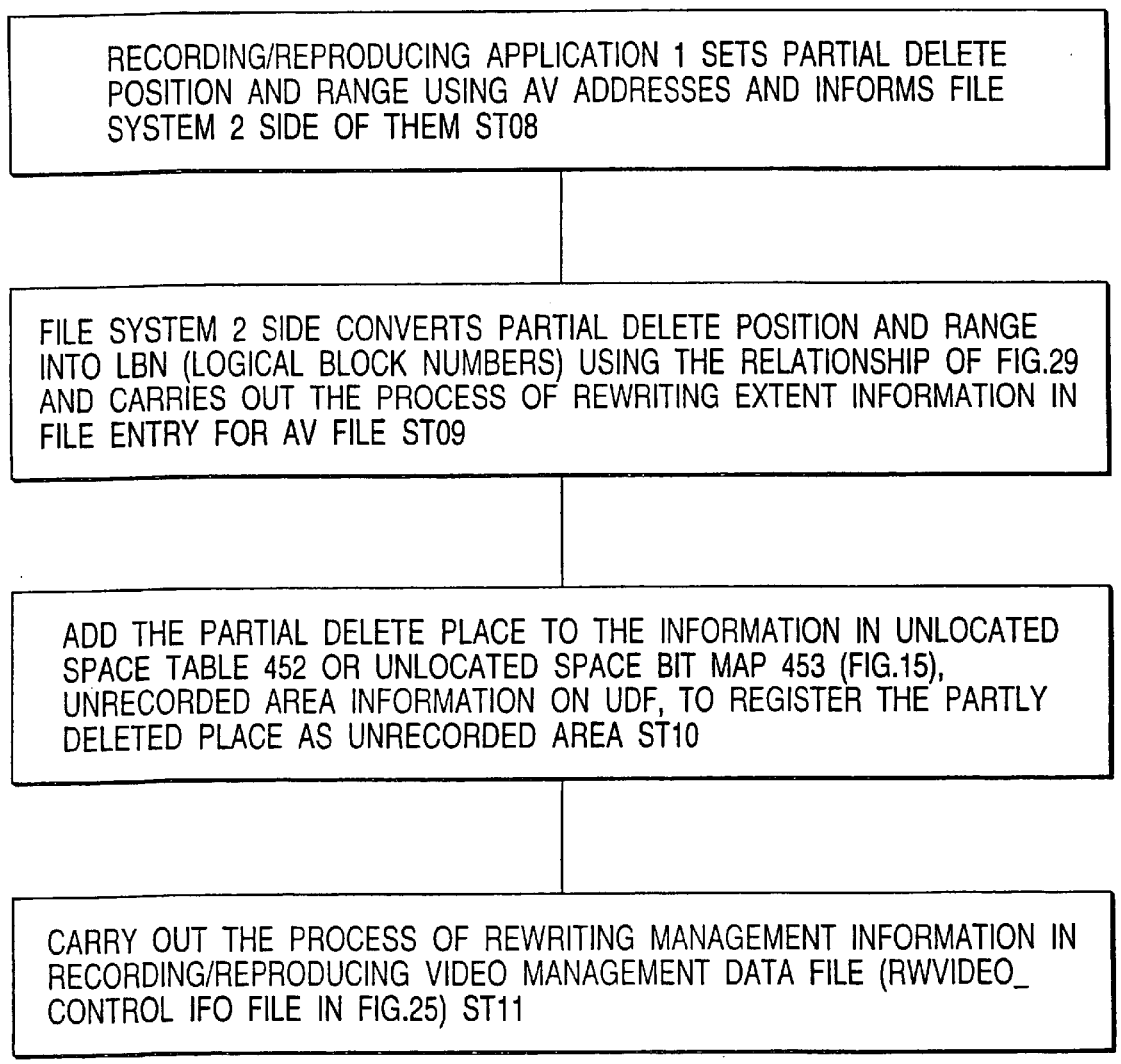
FIG. 71 shows the procedure for deleting part of an AV file in the information recording method and reproducing method according to the present invention.

In the method of deleting part of an AV file, the AV information recorded on the information storage medium is not processed at all as shown in FIG. 71 and only two things are performed: the file entry information on the file system 2 is rewritten (ST09 in FIG. 71) and information about UDF is changed.

Then, to register the partly deleted place as an unrecorded area, the partly deleted place is added to the information in the unallocated space table 452 or unallocated space bit map 435, the unrecorded area information on UDF (ST10). Finally, the management information about the video-recording video management data file is rewritten (ST11).

Of the embodiments listed in Table 4, the following management is performed in LBN/ODD-PS.

Figure 72:
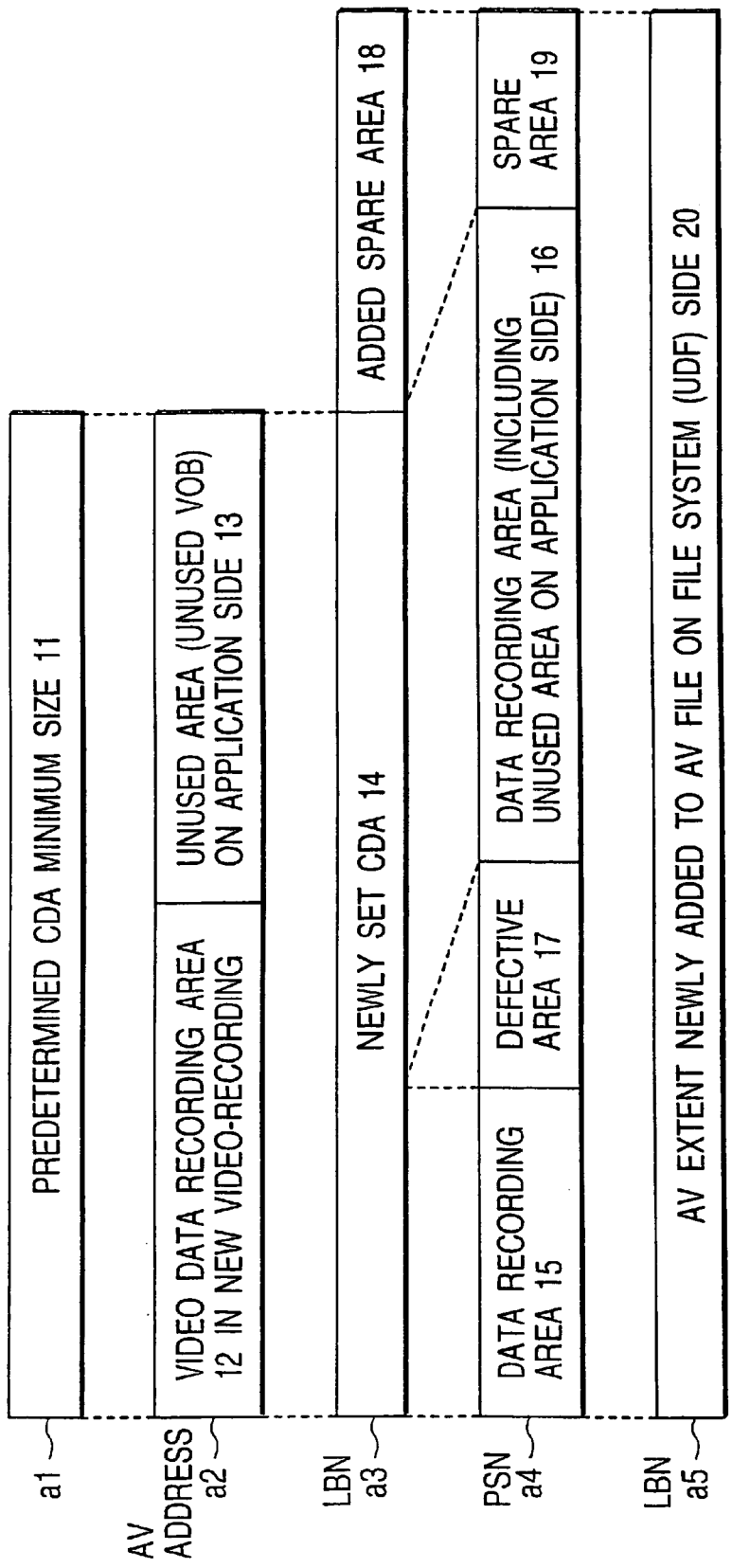
FIG. 72 is a diagram to help explain a recording and deleting method viewed from a video recording/reproducing application in an embodiment of the information recording method and reproducing method according to the present invention.

It is assumed that a video data recording area 12 and an unused area 13 have appeared as a result of new video-recording in the case of the contiguous data area minimum size 11 previously set as shown in FIG. 72. Then, at the LBN level, a contiguous data area 14 is newly set and a spare area 18 is added to this area. Next, at the PSN level, data recording areas 15, 16, and a defective area 17, if any, are set, and further a spare area 19 is secured. Then, All of these are set as a new AV extent 20 at LBN level.

Figure 69:
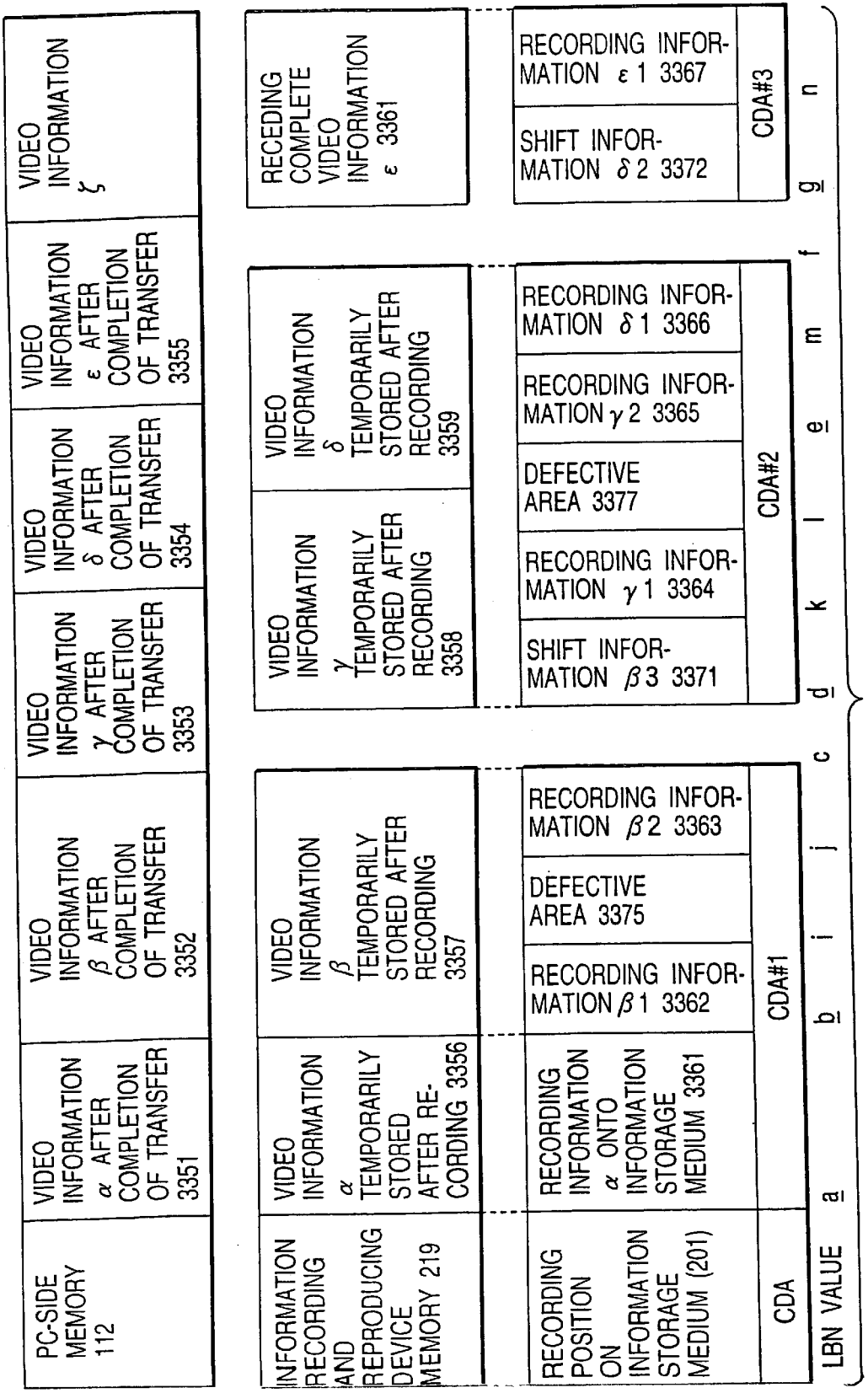
FIG. 69 is a diagram to help explain a method of recording information onto an information storage medium according to an embodiment of the present invention.

FIG. 69 is a diagram to help explain a method of recording information onto an information storage medium according to an embodiment of the present invention.

Specifically, a spare area 18 is added automatically to each contiguous data area, thereby forming an AV extent 20 as shown in FIG. 72. LBN is also set in the added spare area 18. Similarly, LBN is also set in the defective area 17. The defective area 17 on the information storage medium 17 is subjected to the skipping replacement algorithm. Then, an LBN setting method as indicated by γ in FIG. 35 is carried out. The difference from the other embodiments is that the file system 2 side is not informed of the location of the defective area, although LBN has been allocated to the defective area, and only the information recording and reproducing device manages the location of the defective area 17. When the file system 2 side is required to reproduce information, an AV read command issued to the information recording and reproducing device specifies LBN indicating the start position of an AV extent 20 serving as a reference, the effective playback start position counted from the start position (excluding the defective area), and the real size of data to be reproduced (on the assumption that skipping is done at the defective spot). This enables the information recording and reproducing device side to reproduce the information, avoiding the defective area 17 automatically, and gives a replay to the file system 2 side.

Figure 73:
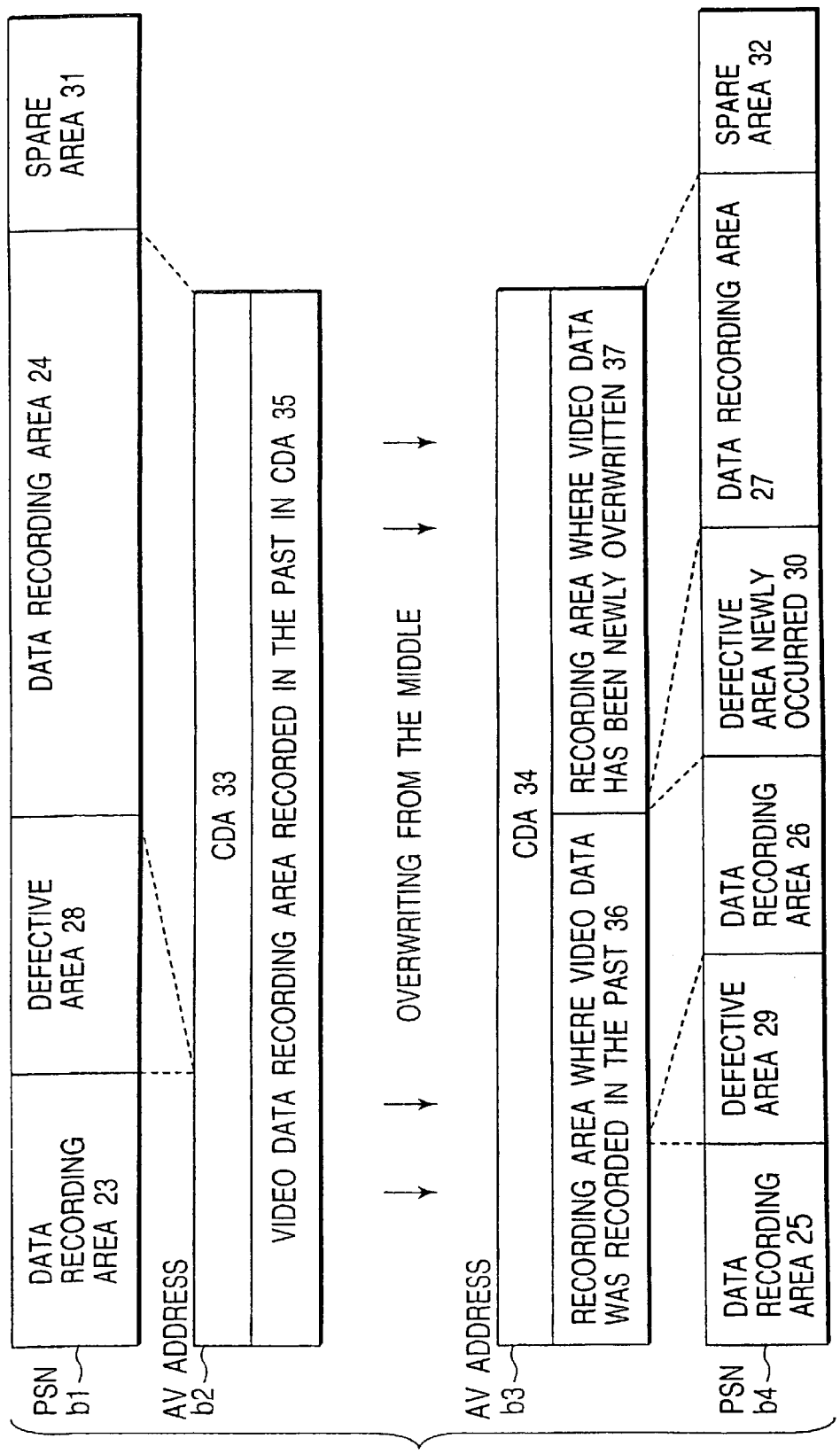
FIG. 73 is a diagram to help explain a case where new information is recorded in such a manner that it is overwritten from the middle of the existing contiguous data area in the information recording method according to the present invention.

FIG. 73 shows a management form in writing information over part of the already recorded information. In this case, information is allowed to be written only over from the middle to the end of the contiguous data area 34. Specifically, a video data recording area 35 recorded in the past includes a data recording area 23 and a defective area 28, if any. A spare area 31 is added to these. When overwriting is done in the middle, the contiguous data area 34 is set. The contiguous data area 34 includes a video data area 36 recorded in the past and a video data recording area 37 newly overwritten (AV address level).

At the PSN level, data recording areas 25, 26, 27 and defective areas 29, 30 are managed. In addition, a spare area 32 is set.

FIG. 74 shows two management forms when overwriting is stopped halfway. In this case, the information already recorded after that in the same contiguous data area (CDA) is treated as invalid. (a) A case where overwriting is done from the beginning of the CDA and (b) a case where overwriting is done from the middle of the CDA are shown.

Figure 75:
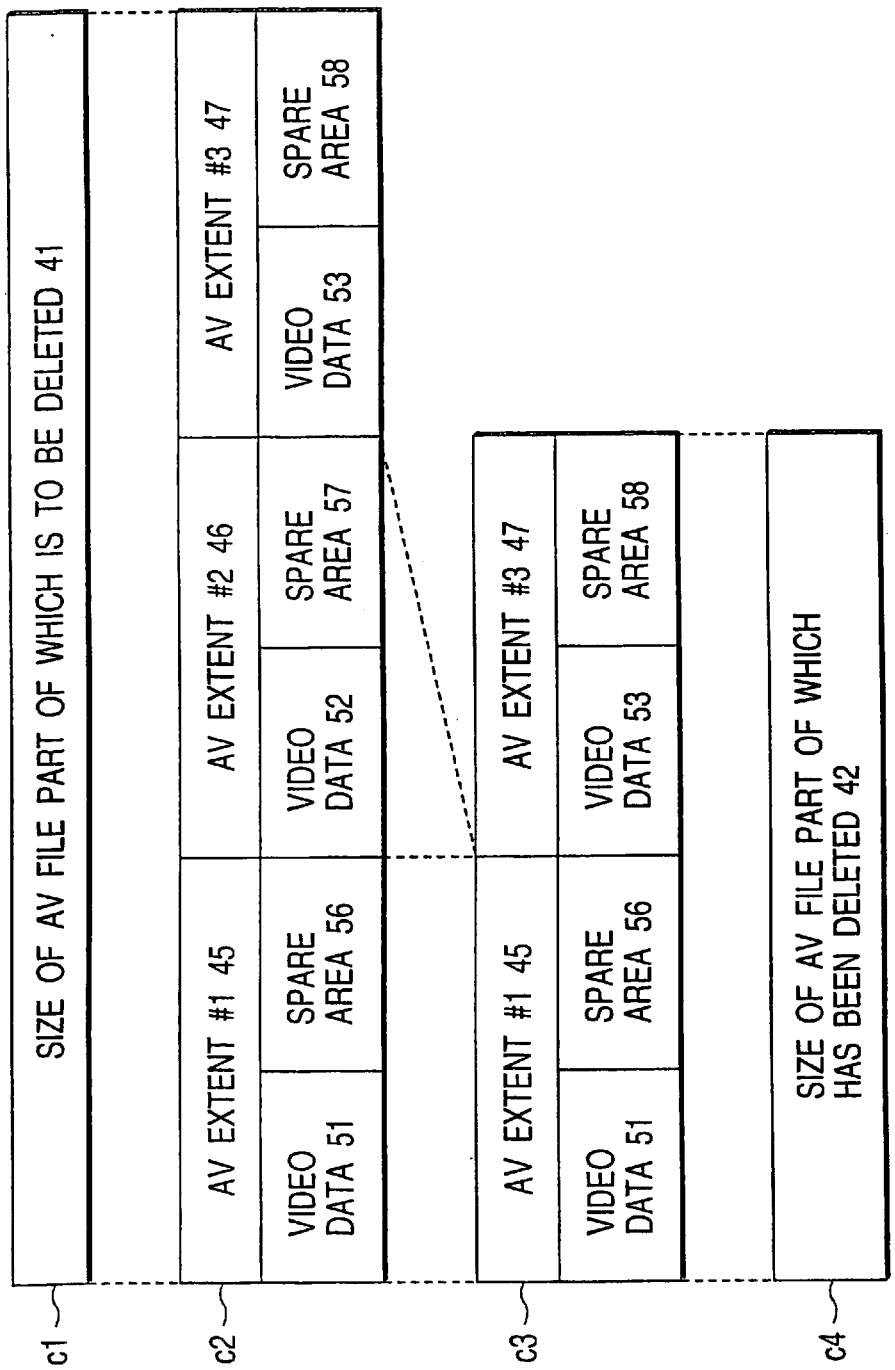
FIG. 75 is a diagram to help explain a case where part of an AV file is deleted in contiguous data area units in the information recording method according to the present invention.

FIG. 75 shows a management form in deleting part of an AV file. In this case, a decision is made to effect partial deleting in units of contiguous data area (e.g., AV extent #2 46).

Table 11 to Table 14 show the parameters for the commands related to recording and playback in the embodiment LBN/ODD-PS and the contents of the commands.

Table 11 relates to a write command from the recording/reproducing application to the file system. Table 12 relates to a read command. Table 13 relates to a write command from the file system to the recording and reproducing device. Table 14 relates to a read command.

Figure 76:
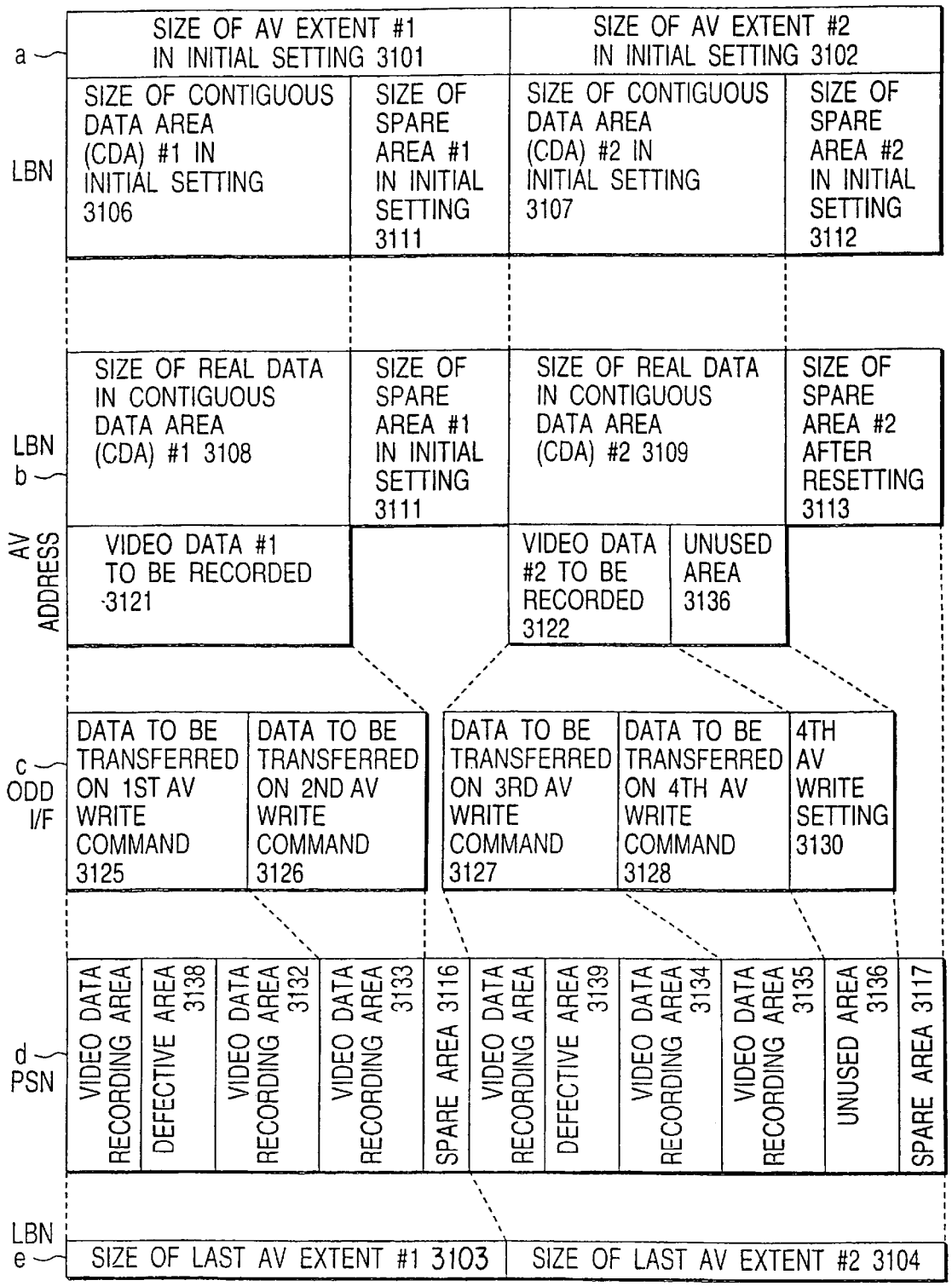
FIG. 76 is a diagram to help explain the process of recording video data in an embodiment of the information recording method according to the present invention.

FIGS. 76, 77, and 78 show the process of recording video data in the embodiment LBN/ODD-PS and the corresponding flowcharts. FIGS. 77 and 78 give a description of the way of processing video data #1 and video data #2 to be recorded as shown in FIG. 76.

The embodiment of the present invention is characterized in that the skipping replacement process is completed in each AV extent using spare areas 3111, 3112 added to each of AV extent #1 3101 and AV extent #2 3102.

Hereinafter, each step will be described as follow:

Set the size of contiguous data area #1 3106 initially on the recording/reproducing application 1 side (ST21).

Inquire recommended (spare area size)/(contiguous data area size) value from ODD (information recording and reproducing device) 3 (ST22).

Set the size of AV extent #1 3101 initially (set spare area size #1) (ST23).

... Spare area size #1 3111 is set on the "recording/reproducing 1 side" or "file system 2 side."

Transfer video data 3125 to the ODD 3 side using a first AV write command (ST24).

Execute the skipping process in ODD 3, when a defective area 3138 has been found in recording information on the information storage medium (ST25).

Transfer video data 3126 to the ODD 3 side using a second AV write command (ST26).

... The last recording in AV extent #1 3101 is known in the second AV write command (using the last flag of the contiguous data area flag).

Put together the information in the last AV extent #1 3103 on the file system 2 side and store the result temporarily in the buffer memory on the file system 2 side (ST27).

Set the size of contiguous data area #2 3102 initially on the recording and reproducing application 1 side (ST28).

Set the size of AV extent #2 3102 initially (set spare area size #2) (ST29).

... Spare area size #2 3112 is set on the "recording/reproducing 1 side" or "file system 2 side."

Transfer video data 3127 to the ODD 3 side using a third AV write command (ST30).

Execute the skipping process in ODD 3, when a defective area 3139 has been found in recording information on the information storage medium (ST31).

The user presses the video-recording end button (ST32).

Determine the unused area size 3136 according to the contiguous data area (CDA) minimum size 11 determined previously on the recording/reproducing application side (ST33).

Reconsider the size 3113 of spare area #2 according to the actual data size 3109 of contiguous data area #2 (St34).

Transfer video data 3128 to the ODD 3 side using a fourth AV write command (ST35).

At the same time, an untransferred area in the LBN space is secured from the unused area information (the number n of byte reservations and the space hold length).

The last recording in AV extent #2 3104 is known in the fourth AV write command (using the end flag of the contiguous data area flag).

Put together the information in the last AV extent(#2) 3104 on the file system 2 side and store the result temporarily in the buffer memory on the file system 2 side (ST36).

Additionally write the necessary information in the directory management area of the file system 2 (ST37).

FIGS. 79 and 80 show a method of creating a replacement-only file 3501 and another embodiment of the invention related to the process of replacing a defective area by this method.

In the above embodiments, the information recording and reproducing device 3 carries out most of the process of replacing a defective area using the method of creating the replacement-only file 3501. In contrast, the embodiment of FIGS. 79 and 80 is characterized in that the file system 2 carries out most of such a process.

In FIG. 79, the method of creating the replacement-only file 3501 will be explained.

After an information storage medium has been installed in the information recording and reproducing device (step ST41) and the information recording and reproducing device 3 has been prepared for processing, the file system 2 issues a command (Get Spare Area Space Command) to the information recording and reproducing device 3 and causes the information recording and reproducing device to determine the empty area size in the spare area from DMA information 663, 691 on the information storage medium (step ST53).

Receiving the Get Spare Area Space Command, the information recording and reproducing device 3 determines the empty area size in the spare area from DMA information 663, 691 on the information storage medium and reports the result to the file system 2 side (step ST54). Receiving the empty area size, the file system 2 side judges whether there is a sufficient replacement area left in the spare area on the information storage medium (step ST43).

When there is a sufficient replacement area left (YES in step ST43), the file system 2 issues a command (SET DEFECT MANAGEMENT Command) to the information recording and reproducing device 3 side and instructs the information recording and reproducing device 3 side to manage defects on the information storage medium and record the defect management information in the DMA areas 663, 691 on the information storage medium (step ST52).

When there is no replacement area left (NO in step ST43), the file system judges whether the replacement-only file 3501 has existed already (step ST55). If the existing replacement-only file 3501 is present (YES in step ST55), the file system judges whether there is a sufficient empty storage capacity in the existing replacement-only file (step ST56).

The file system 2 senses the empty storage capacity in the replacement-only file 3501 from the replacement information recorded in a secondary defect map SDM 3471 created on information storage medium.

If there is a sufficient empty storage capacity in the existing replacement-only file 3501 (YES in step ST56), a new replacement-only file 3501 is not created. If the existing replacement-only file 3501 is not present (NO in step ST55), or if the empty storage capacity in the existing replacement-only file 3501 is insufficient (NO in step ST56), it is judged whether as enough an empty storage capacity as enables the replacement-only file 3501 to be registered newly is left on the information storage medium (step ST556).

If as enough an empty storage capacity as enables the replacement-only file 3501 to be registered newly is left on the information storage medium (YES in step ST556), the file system 2 side creates a replacement-only file 3501 newly and registers the new file (step ST58).

When the information storage medium is a disk with a large storage capacity of 4.7 gigabytes or more, a single replacement-only file can be made to have a relatively large storage capacity of about 32 megabytes.

If there is no empty storage capacity on the information storage medium in which a new replacement-only file 3501 can be registered (NO in step ST556), error processing, such as outputting a message to prompt the user to replace the medium, is done (step ST558).

When the file system side creates the replacement-only file 3501 in the process in step ST58, the file is taken as a hidden file and added to the directory.

The identification information about the replacement-only file 3501 is recorded in a replacement-only file flag (replacement area setting file flag) 3371 in the file identification descriptor 3364. Specifically, in the case of the replacement-only file 3501, the bit of the replacement area setting flag 3371 is made "1." As another example of identification information about the replacement-only file 3501, a replacement-only file flag (replacement area setting file flag) 3372 may be provided in the ICB tag 418 in the file entry 3520 provided in the disk.

Next, the process of replacing a defective area carried out mainly by the file system 2 using the replacement-only file 3501 created through the procedure of FIG. 79 will be explained by reference to FIGS. 80 and 81.

Figure 81:
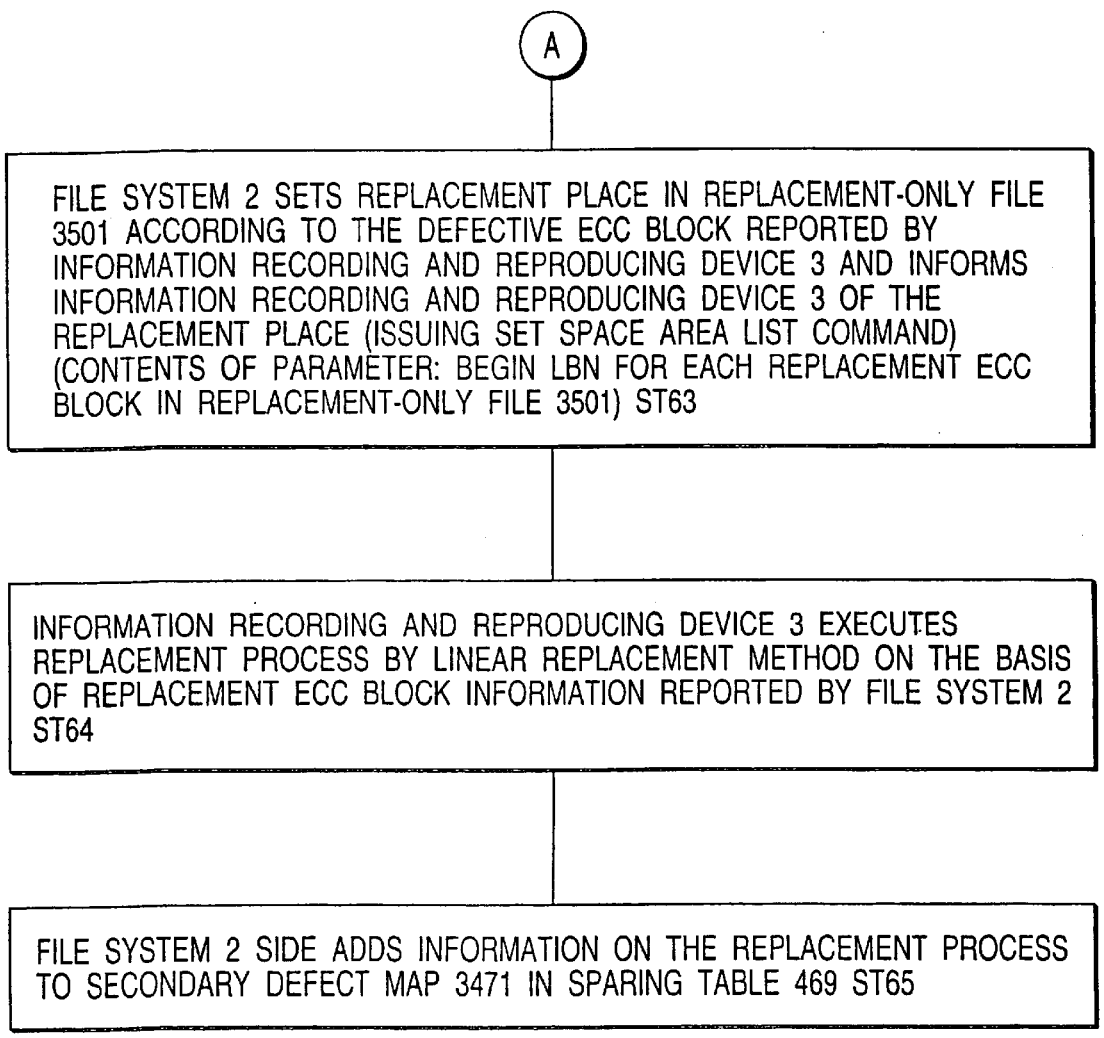
FIG. 81 shows the remaining part of the flowchart of FIG. 80.

In FIGS. 80 and 81, after an information storage medium has been installed in the information recording and reproducing device and the information recording and reproducing device 3 side has been prepared to write information, the file system 2 side issues a command (GET SPARE ARE SPACE Command) to the information recording and reproducing device 3 side and causes the information recording and reproducing device to determine the empty area size in the spare area from DMA information 663, 681 on the information storage medium (step ST53).

Receiving the command, the information recording and reproducing device 3 determines the empty area size in the spare area from DMA information 663, 691 on the information storage medium and reports the result to the file system 2 side (step ST54).

Receiving the result, the file system 2 side judges whether there is a sufficient replacement area left in the spare area on the information storage medium (step ST43).

If there is a sufficient replacement area left, the file system 2 side issues a command (SET DEFECT MANAGEMENT Command) to the information recording and reproducing device 3 side and instructs the information recording and reproducing device 3 side to manage defects on the information storage medium and record the defect management information in the DMA areas 663, 691 on the information storage medium (step ST52).

When there is no sufficient replacement area left in the spare area, the file system 2 decides the use of the replacement-only file 3501 created by the aforementioned processing procedure.

When information is recorded on the information storage medium, the file system 2 side issues a write command (WRITE Command) to the information recording and reproducing device 3 and instructs the information recording and reproducing device to record PC information (step ST59).

The information recording and reproducing device 3 records the PC information in the place on the information storage medium specified by the file system 2 using the write command and, when encountering a defective ECC block, temporarily stores information about the begin LBN of the defective ECC block and the information to have been recorded in the defective ECC block into the buffer memory 219 in the information recording and reproducing device 3 (step ST60).

The present embodiment is characterized in that the information recording and reproducing device 3 temporarily stores information about the begin LBN of the defective ECC block and the information to have been recorded in the defective ECC block into the buffer memory 219 in the information recording and reproducing device 3, without informing the file system of the found defect each time a defective ECC block is encountered.

After the series of recording process has been completed, the file system 2 issues a command (GE DEFECT LIST Command) to the information recording and reproducing device 3 and asks the information recording and reproducing device for information about the position of the defect (step ST61). The contents of the replay to the command given by the information recording and reproducing device 3 to the file system 2 include (1) the number of defective ECC blocks and (2) information about the begin LBN of each ECC block (step ST62).

Receiving the reply from the information recording and reproducing device 3, the file system 2 sets a replacement place for the defective ECC block in the replacement-only file 3501 and issues a command (SET SPARE AREA LIST Command) to the information recording and reproducing device 3 to inform the information recording and reproducing device of LBN for the replacement area for each defective area (step ST63).

The parameter for the command (SET SPARE AREA LIST Command) is each begin LBN of the replacement ECC block in the replacement-only file 3501.

As a result, on the basis of the replacement ECC block reported from the file system 2, the information recording and reproducing device 3 carries out the replacement process using the linear replacement algorithm (step ST64).

After the information recording and reproducing device side has completed the replacement process, the file system 2 side adds the aforementioned replacement process information to the secondary defect map (SDM) 3471 in the sparing table 469 (step ST65).

If in step ST60, the information recording and reproducing device informed the file system 2 of the occurrence of a defect each time it encountered a defective ECC block during recording, it would take time for the information recording and reproducing device 3 to exchange commands with the file system 2 side. Since the time required to exchange commands accounts for a relatively large proportion of the time required for actual recording, it is needed to decrease the processing time by reducing exchanges of commands in recording as much as possible.

For this reason, in the embodiment of the present invention, the information recording and reproducing device does not inform the file system 2 of the defect each time it has encountered a defective ECC block. Instead, the information recording and reproducing device temporarily stores "the defective ECC block position information" and "the information to have been recorded in the defective ECC block" one after another into the buffer memory 219 in the information recording and reproducing device. After the series of recording processes has been completed, the information recording and reproducing device carries out the replacement process at a time by exchanging only two commands (GET DEFECT LIST Command and SET SPARE AREA LIST Command). This reduces the number of exchanges of commands between the information recording and reproducing device 3 and the file system 2 remarkably, thereby decreasing the overall processing time remarkably.

In the embodiment of FIGS. 80 and 81, the replacement process (ST52) using the spare area 724 and the replacement process (ST59 to ST65) using the replacement-only file 3501 are carried out independently. Namely, the replacement process (ST52) using the spare area and the replacement process using the replacement-only file 1 are not carried out at the same time.

When the spare area has been used up, it was impossible to subject PC information to the replacement process in the conventional equivalent. In the above embodiment, however, since there is a replacement-only file even when the spare area has been used up, it is possible to subject PC information to the replacement process.

Furthermore, even when each replacement-only file (for example, with a storage capacity of about 32 megabytes) has been used up, another replacement-only file can be added newly, as long as there is a sufficient empty storage capacity left on the medium. By adding a replacement-only file, if necessary, the replacement process can be continued even when many defects have occurred on the medium being used, which enables the information to be recorded continuously without interruption.

As another embodiment of the present invention, a method of recording and managing still another defective management information and unused area information will be explained.

In the example of FIG. 82, to additionally write VOB #2 3618 of a small data size in contiguous data area #β 3602, an unused area extent 3613 is set for the deficiency in contiguous data area #β 3602. When video information or AV information is recorded additionally in an AV file 3620 next time, recording will be started from the begin position (h+g in LBN and k+g in PSN) of the unused area extent 3613.

Although not shown, VOB #3 existed in the past in such a manner that it extends over part of contiguous data area #α3601 and part of contiguous data area #β 3602 between VOB #1 3617 and VOB #2 3618. As a result of VOB #3 being partly deleted, the part of VOB #3 extending over contiguous data area #α 3601 and contiguous data area #β 3602 is subjected to the process explained in FIG. 46. An unused area extent 3611 and an unused area extent 3612 are set on the file system 2 side. Because a defect in ECC blocks in the range from "h+a" to "h+b−1" in LBN has been found in recording VOB #1, video information or AV information is not recorded there and that place has been set as a defective area extent 3609.

As described above, in contiguous data area #α 3601 and contiguous data area #β 3602, recording area extent 3605, defective area extent 3609, recording area extent 3606, unused area extent 3611, unused area extent 3612, recording area extent 3607, and unused area extent 3613 are arranged side by side. All of these are considered to be part to the AV file 3620. As the allocation descriptors in the file entry to the AV file 3620, all the extents are registered.

In the file entry, AD (a, h: recording), AD (b−a, h+a: defect), AD (c−b, h+b: recording), AD (d−c, h+c: unused), AD (f−e, h+e: unused), AD (g−f, h+f: recording), and AD (j+g, h+g: unused) are registered. The contents of an allocation descriptor include AD (extent size, extent begin position, extent attribute).

The most noticeable characteristic in FIG. 82 is that only information about the defective area extent 3609 registered in the file entry serves as defect management information without a defect management table organized independently, such as the tertiary defect map (TDM) 3472 in the defect management information area (DMA). The attribute identification information about each extent in the allocation descriptor in the file entry to the AV file 3620 has been recorded in Implementation Use 3528 indicated by f in FIG. 83.

Figure 83:
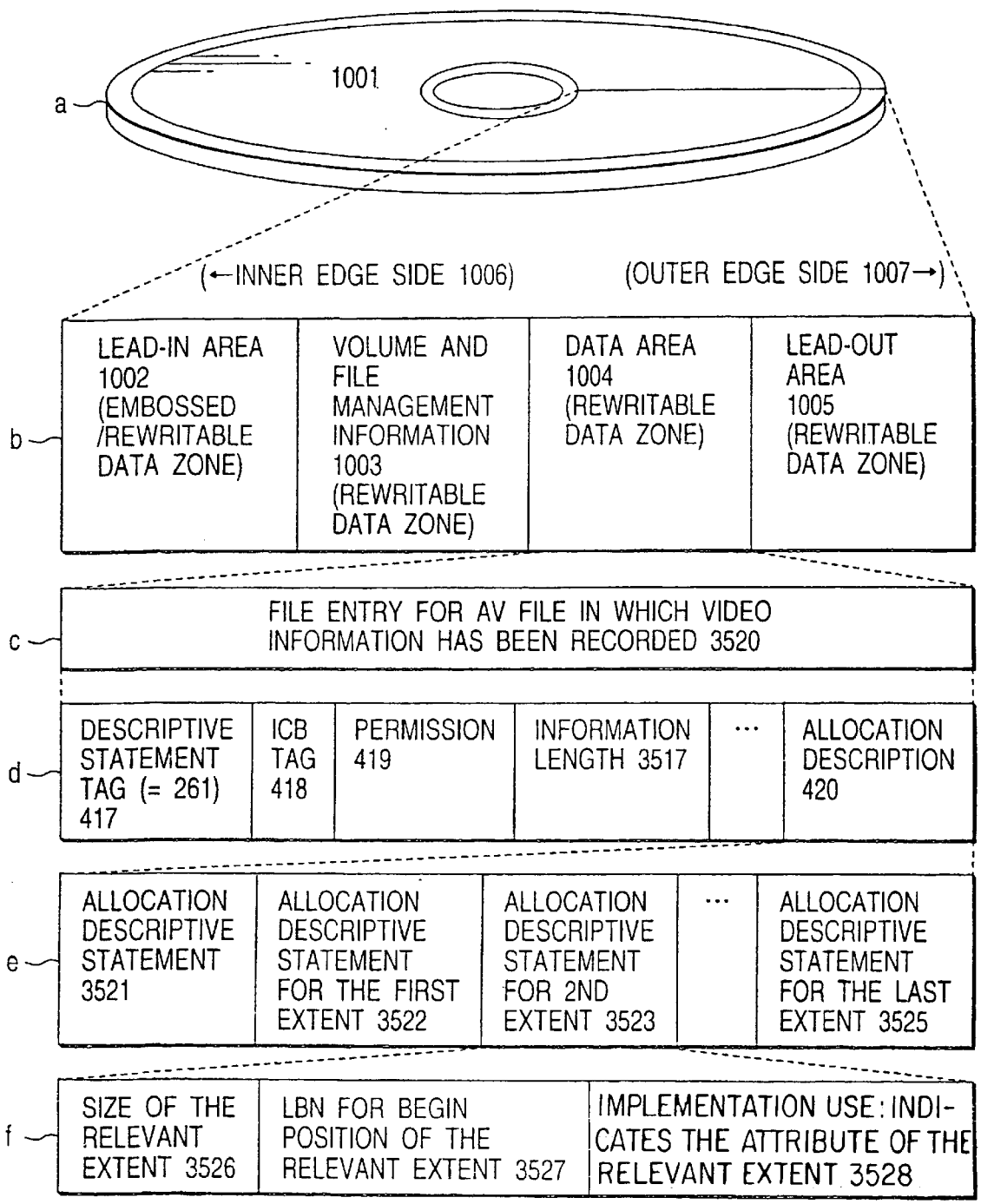
FIG. 83 shows another embodiment of the extent attribute information recording method in the information recording method according to the present invention.

In FIG. 83, the describing system for long allocation descriptors is employed as a method of describing allocation descriptors. When the value of Implementation Use 3528 is "0h," this means "the extent for a recording area." When the value is "Ah," this means "the extent for a defective area." When the value is "Fh," this means "the extent for a defective area." Although in the official standard of UDF, Implementation Use has to be written in 6 bytes, only the low-order 4 bits are shown to simplify explanation in FIG. 83. In FIG. 82, LBN and PSN are set for both a defective area and an unused area. All LBN and PSN take the values of parallel translation. Specifically, the embodiment of the present invention is characterized by preventing LBN from skipping with respect to PSN as found in the result of the linear replacement algorithm. AV addresses are allocated only to the places where recording extents 3605, 3606, 3607 exist. The AV addresses are such that all the sectors excluding the defective area extent 3609, unused area extents 3611, 3612, 3613 in the AV file 3620 are assigned numbers in the order in which allocation descriptors are written in the file entry. Specifically, in the first sector in recording area extent 3605, LBN is set to "h," PSN is set to "k," and AV address is set to "0." In the first sector in recording area extent 3607, LBN is set to "h+f," PSN is set to "k+f," and AV address is set to "a+c−b."

On a DVD-RAM disk, information is recorded in units of ECC block 502. Therefore, in the embodiment of the present invention of FIG. 82, the file system 2 side performs management in such a manner that recording is done in ECC blocks. Specifically, the file system 2 performs control in such a manner that recording is done in ECC blocks by setting extents. A concrete explanation will be given as follows. All of "a," "b," "d," "e," and "j" are so set that they are a multiple of 16. In addition, the start positions of contiguous data area #α 3601 and contiguous data area #β 3602 become the begin position of an ECC block, and the end positions of the former become the end position of the ECC block.

Since a defective area is processed in ECC blocks, the start and end positions of the defect area extent 3609 coincide with the start and end positions in the ECC block. Each of VOB #1 3616, 3617 and VOB #2 3618 size are not necessarily recorded in units of 16 sectors. The overflow from the partial ECC blocks in VOB #1 3616, 3617 and VOB #2 3618 is corrected using the size of the unused area extents 3611, 3612, 3613.

The method of recording video information or AV information in the embodiment of FIG. 82 is the same as that of FIG. 54 except that the recording of information into the Tertiary Defect List (TDL) 3414 in the DMA area is unnecessary in ST4-01 of FIG. 58 and the defective extent 3609 and unused area extents 3611, 3612, 2613 are added to the extent information in ST4-04.

The present method is characterized in that, although "AV address→LBN conversion→PSN conversion" is caused in the procedure for playback, the attribute for each extent is sensed from the allocation descriptor in the file entry during "AV address→LBN conversion" and only the recording area extents 3605, 2606, 3607 are to be reproduced (the process of making a selection from the defective extent 3609 and unused area extents 3611, 3612, 2613).

Even in deleting part of a file, the process of inserting an unused area extent is necessary, taking into account the contiguous data area size and ECC block boundary area place, in the process of rewriting the extent information in the file entry to an AV file (ST09).

Figure 84:
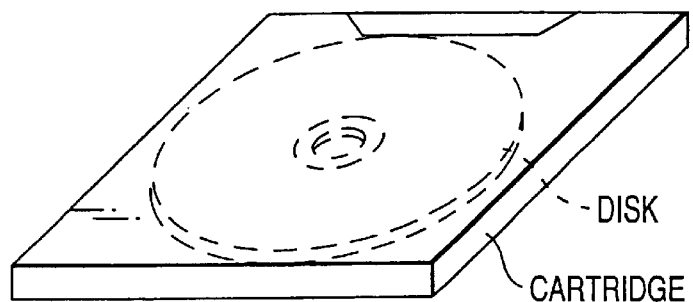
FIG. 84 shows a package of a disk according to the present invention.

A disk produced as described above is packed as shown in FIG. 84 and shipped. Specifically, the disk body is housed in a cartridge and further wrapped with a wrapping sheet.

The processes ranging from manufacturing optical to shipping the finished products will be explained briefly. Disks (which enables recording and reproducing by the phase change method and are composed of a single layer, or two layers or more laminated together) are manufactured. In each disk, physical sector numbers (PSN) have been set and embossed zones have been recorded beforehand. Next, the disk is initialized. At this time, the disk is formatted, which records rewritable zones on the disk. At this time, the areas including DMA1, DMA2, DMA3, DMA4 are formed. In addition, the areas PDL, SDL, and TDL (the defect management areas for the skipping process) are formed.

Next, the disk front surface is subjected to the Certify process. In the Certify process, specific data is recorded on all the surfaces and the front surface is reproduced to find defects. At this time, when the disk is designed to be capable of recording and reproducing PC data too, defective spots are recorded in PDL.

When the disk is designed to record only AV data, defective places are recorded as defect management information in TDL.

The above processes enable logical block numbers (LBN) to be set on the disk. This is because the drive unit side can create a PNL→LBN conversion table using DMA (defect management areas: PDL, SDL, TDL).

Next, conditions are set on the disk so that UDF may be used for a file system. Specifically, the volume recognition procedure (volume recognition sequence) 444, the main volume describing procedure (main volume descriptor sequence) 449, a first anchor point 456, a second anchor point 457, and the reserve volume describing procedure (reserve volume descriptor sequence) 467 are recorded on the disk.

Next, places in which AV data can be recorded are formed:
- (a) A root directory 1450 is formed in the recording area (LBN space) on the disk.
- (b) A management file (RWVIDEO_CONTROL.IFO) in which AV data can be recorded is created.
- (c) A file in which moving pictures/still pictures, sound, and thumbnails can be recorded is created.
- (d) In each file 1401, management information on the basis of AV addresses is recorded in (RWVIDEO_CONTROL.IFO). At this time, information about the recording position of each file (allocation descriptor in the file entry) is recorded in logical block numbers (LBN).

Finally, the process of aligning data in recording information in the above system will be explained further.

Figure 85:
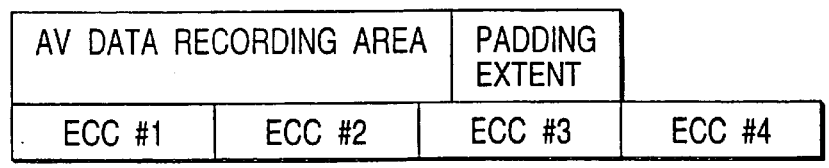
FIG. 85 is an explanatory diagram showing the relationship between the AV data recording area and ECC blocks recorded by the information recording method according to the present invention.

FIG. 85 shows an example of the relationship between the AV data recording areas recorded by the recording method of the present invention and ECC blocks #1 to #4. When AV data has been recorded, the boundary between EEC block units does not always coincide with the end position of the AV data. Therefore, in the recording method of the present invention, when there is a gap between the ECC block (in the example shown, #3) and the end of the AV data, a padding extent is created and recorded in that part. Namely, the end of the AV data recording area is always designed to maintain the boundary between ECC blocks.

In this situation, when AV data or other data is written next time, the data can be written from the beginning of the next ECC block, making it easier to process data.

An embodiment that does not insert the padding extent is possible.

Figure 86:
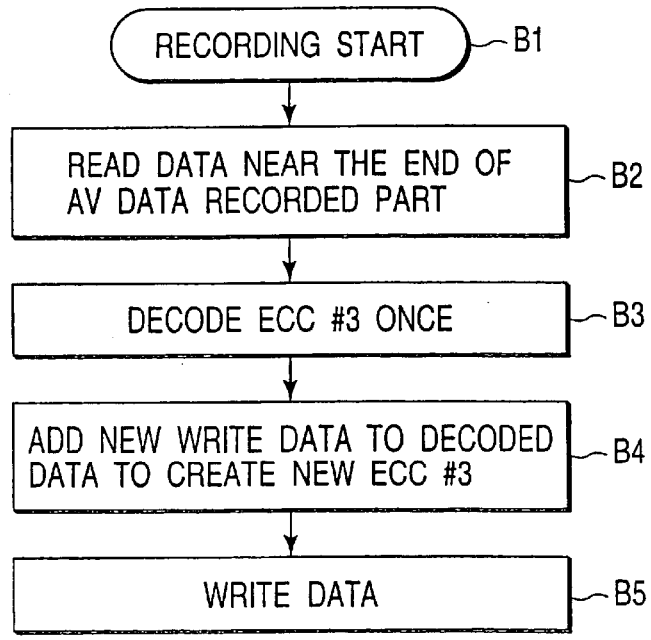
FIG. 86 shows an example of the information recording method according to the present invention, specifically an example of data processing at the beginning of writing.

Specifically, if the padding extent of FIG. 85 does not exist, when AV data is written next time, processing is done in ECC blocks through the procedure as shown in FIG. 86.

As shown in FIG. 86, when an instruction to start recording is given, the data near the end of the data area already recorded is first read (steps B1, B2). This causes the recording/reproducing application to recognize that the data has been recorded up to part of ECC block #3. In this case, the ECC block #3 is read and the data to be written next is concatenated to the read data, thereby creating ECC block #3, which is then recorded. Specifically, the read data is decoded once (step B3) and the data to be written next is concatenated to the decoded data to create new ECC block #3 (step B4). Thereafter, data is written in ECC blocks (step B5).

The characteristics of the present invention are summarized as follows:

Point 1: LBN are set for both of the defective areas set by the skipping process and the replacement areas for the defective areas. These areas are included in the user area.

Point 2: The replacement areas (places immediately after the skipping process) can be set arbitrarily on the LBN space. Specifically, the replacement areas can be set arbitrarily in a first area (user area) in which the user can record information.

Point 3: In the same location on the disk, an AV address (a first address) and LBN (a second address) are set. Specifically, both a first address number and a second address number are allocated to the same location in the recording area on the information storage medium.

Point 4: The AV addresses do not include the defect/replacement area and the LBN space includes the defect/replacement area. Specifically, the first address number and the second address number are assigned to the replacement area and only the first address number is assigned to a defective area (the second address number is not assigned to the defective area).

Point 5: VOB_I:AV address management information and file entry: LBN management information are recorded in parallel. Specifically, a first information management recording area having the management information managed using the first address number and a second management information recording area having the management information managed using the second address number are provided on the same information storage medium.

Point 6: The recording/reproducing application performs management using AV addresses and the OS side causes AV address→LBN conversion. Specifically, there are provided a section (recording/reproducing application) that manages information using the second management information and an address conversion section that causes conversion between the second address number and the first address number.

Point 7: At least one file is recorded. The identification information for an AV file is recorded in at least one of the recorded files.

Point 8: There is further provided identification means for judging whether the file recorded on the information storage medium is an AV file. The method of recording the relevant file can be changed, depending on whether the recorded file is an AV file.

In point 1, all the recording areas on the information storage medium are given the first address 20 numbers, logical block numbers (LBN) and both the defective area 3452 and replacement area 3456 are assigned LBN, as γ indicated by in FIG. 35. This makes it possible to leave defect management to the file system 2 side, not to the recording/reproducing 25 application software 1, which enables the recording/reproducing application software 1 to concentrate on video information management without being bothered with defect management. Differently from the linear replacement algorithm indicated by β in FIG. 35, setting the replacement area 3456 in the first area, user area 723 where the user can record information, enables the replacement area 3456 to be placed near the defective area 3452 occurring in the user area 723, making it unnecessary for the optical head to access the defective area 3452 in the replacement process, which assures continuous recording.

In point 2, by making it possible to set the replacement area 3456 in any position in the first area or user area 723, the replacement area 3456 can be placed just behind the defective area 3452. As a result, the replacement process can be carried out without causing the optical head to access the defective area at all, which assures more stable continuous recording.

In point 3, by allocating the first address, LBN managed by the file system 2 as shown in FIG. 29, and the second address, AV address managed by the recording/reproducing application software 1, to the same location on the information storage medium, the recording/reproducing application software 1 and file system 2 can perform information management independently, which enables the recording/reproducing application software 1 and file system 2 to concentrate on their roles.

In point 4, as compared with the linear replacement algorithm indicated by β in FIG. 35, the embodiment of the present invention indicated by γ in FIG. 35 allocates LBN, the first address number, even to the defective area 3452, thereby allowing the file system 2 to manage defects on the information storage medium. As seen from b in FIG. 29 and from FIG. 50A, because an AV address, the second address number, is not allocated to the defective area, the recording/reproducing application software 1 does not perform defect management at all and can concentrate on video information management.

In point 5, by allocating the management information corresponding to LBN managed by the file system 2 to the file entry of FIG. 29 and recording the video object control information, management information corresponding to AV addresses managed by the recording/reproducing application software 1, separately on the information storage medium, the recording/reproducing application software 1 and file system 2 can carry out information management independently and therefore concentrate on their roles.

In point 6, the file system 2 side causes conversion between LBN indicated by a and b in FIG. 29 and AV addresses. This makes it unnecessary for the recording/reproducing application software 1 to cause address conversion, which enables the recording/reproducing application software 1 to concentrate video information management.

In point 7 and point 8, an AV flag that can be identified on the file system is set in an AV file in advance. The file system 2 either identifies the AV flag added to the AV file or judges whether the file to be recorded into is an AV file, on the basis of the specification by the recording/reproducing application 1 (or the file attribute audio video (FILE_ATTRIBUTE_AUDIO_VIDEO) flag for a created file). Then, the file system 2 changes the recording method.

Carrying out the above process assures the continuity of the AV file in recording reliably.

Furthermore, characteristics of the method of the present invention will be explained.

<Not only is a logical address set for a defective area, but also an extent is set avoiding the defective area.>

This enables the file system 2 side to recognize the defective area and set an extent, avoiding the defective area 3452. By setting the extent allocated avoiding the defective area in an file entry, the file system 2 side can carry out such a process of directly accessing the place to be reproduced, according to the information recorded in the file entry without referring to the defect management information (TDM 3472).

<Skipping is done on a defective area in recording AV information and an extent is set, avoiding the defective area, after the recording has been completed.>

When information is recorded, the skipping replacement algorithm is executed in subsequent recording, avoiding the defective area 3452 on the information storage medium. After the recording has been completed, an extent can be set, avoiding the defective area, as shown in steps ST04 and ST4-04 explained in the operation flow.

The place in which video information is recorded and the place in which the file entry information has been recorded are separate from each other. When the extent layout information is recorded each time a small amount of video information is recorded, the accessing of the optical head is needed each time. In contrast, when the extent layout is temporarily stored in the semiconductor memory 219 and all the file entry information is rewritten after the recording of the whole video information has been completed, this reduces the frequency of accessing of the optical head.

<A contiguous data area is set in such a manner that it extends over a defective area and another existing file recording area.>

When extent #1 3571, extent #2 3572, extent #3 3573 are set, avoiding the defective area 3566, the LBN address allocated to the defective area 3566 after the setting is subjected to the linear replacement process, which might permit a PC file to be put in the defective area. There is a strong possibility that PC files will be recorded in the defective area in such a manner that they are interspersed in the defective area. Once the condition for setting contiguous data areas has been so determined that the addresses in the contiguous data area should be always consecutive, if a PC file has been already put in the defective area, it is impossible to secure a contiguous data area, even when an attempt is made to delete extent #1, extent #2, and extent #3 and record AV information again.

In the present invention, however, even when a PC file subjected to the linear replacement process has been put in the defective area, a contiguous data area can be set again after the extents have been deleted, which enables the area on the information storage medium to be used effectively.

<As a general rule, although AV information is recorded on the information storage medium in units of contiguous data area #1 3505, #2 3506, or #3 3506, when the data size of pieces of video information 3513, 3514 additionally recorded is smaller than the contiguous data size, unused areas 3515, 3516 are defined (FIG. 43).>

Then, by setting the subsequent recording information so that it may be recorded from the unused area, short-time pictures are video-recorded one after another as, for example, "one-shot recording" and later the information can be reproduced continuously.

<The write command and the defect processing method are changed according to the type of information.>

It is judged whether a file to be processed is a PC file or an AV file. It is then decided whether WRITE command (linear replacement as the defect processing method) or AV WRITE command (skipping replacement as the defect processing method). In the case of a PC file, extents are set, taking no account of contiguous data areas. In the case of an AV file, AV information is recorded in units of a contiguous data area and an unused area is set for the fractions of the recording information in the contiguous data area. This enables AV information to be recorded continuously and the recording area on the storage medium to be used effectively.

<The size of a contiguous data area is limited to a specific size or less.>

This enables AV information to be recorded continuously and stably.

<The unused size is managed on the file system.>

Let {total extent size (or file size)−information length}= unused area size: then, unused areas 3515, 3516 can be managed by a simple method without changing the UDF standard.

<An unused area is treated as an unused VOB and managed on the recording/reproducing application side.>

Management information about unused VOB 3552, 3553 is recorded in the video object control information. This enables the recording/reproducing application 1 side recognize the contents of the AV information to manage the unused areas, assuring fine unused area management.

<Recording is done form the start position of the unused area in a file in re-recording (additional recording).>

By defining unused areas 3515, 3516 and doing setting so that the information to be recorded next may be recorded from the start position of the unused area, short-time moving pictures are recorded in sequence as one-shot video-recording and later the information can be reproduced continuously.

<When part of the information is deleted, the information is deleted in units of a contiguous data area (CDA). There are two methods of leaving an unused area.>

One is setting an unused VOB in FIG. 46, and the other is setting an unused extent in FIG. 47. When part of an AV file is deleted, the remaining part is left as unused area, which enables another AV information to be recorded. At this time, because the information has been deleted in units of CDA, a new CDA is easy to set in that place and can be set.

<The recording places after presetting/continuous recording/recording are registered.>

The process in step ST02 is the process of searching for the place in which information is to be recorded on the information storage medium. The process in step ST03 is the process of recording information actually.

For example, when a television program is recorded, the recording time might not be estimated. To overcome this problem, in the system, the recording/reproducing application 1 side sets the estimated maximum amount of recording for continuous recording and informs the file system 2 side of the amount using a Set Unrecorded Area command. Then, according to the size received, the file system 2 side sets the scheduled recording place on the information storage medium in advance and, if recording is interrupted halfway, opens the scheduled recording place. This enables not only AV information to be recorded stably and continuously but also the data are to be used effectively.

<Extent information about the scheduled recording place can be recorded in the allocation descriptor in the file entry to an AV file.>

With the information recording and reproducing device connected to IEEE 1394 or the like, while the first device is recording video information on the information storage medium, PC information might have to be recorded on the information storage medium according to an instruction given by another device. In this case, as in step ST-06, the file system 2 pre-records the extent information about the scheduled recording place for AV information into the allocation descriptor in the file entry to the relevant AV file, which prevents another PC information from being recorded in the scheduled recording place for video information.

<File partial delete command for API command>

A first recording process layer composed of a recording and reproducing device that records information on an information storage medium means the recording/reproducing application 1. A second recording process layer controlling the first recording process layer composed of a file system part controlling the place where information is to be recorded means the file system 2. A third recording process layer existing as an application layer that gives a command to the second recording process layer to control the latter means the information recording and reproducing device 3.

The command to delete only part of a file the third recording process layer gives to the second recording process layer is "Delete Part Of File Command."

AV information and audio information have a large file size. Thus, use of a method of dealing with the whole file to delete part of the file and re-recording the whole file only part of which has been deleted on the information storage medium requires a tremendous length of recording time. In contrast, use of a partial delete command enables the desired part to be deleted in a short time.

<Command (SEND PRESET EXTENT ALLOCATION MAP COMMAND)>

Before the first recording process layer records information, the second recording process layer not only sets in advance the place where information is to be recorded, but also gives the first recording process layer the command "SEND PRESET EXTENT ALLOCATION MAP COMMAND" to inform the first recording process layer of the set information.

When a defective area is encountered in the course of recording information, the skipping replacement algorithm is executed. Although overflow information is created here, if the information recording and reproducing side has been informed of the extent allocation table as the scheduled recording places beforehand, the overflow information can be recorded continuously in the next scheduled recording place, which prevents continuous recording from being interrupted.

<Command (GET WRITE STATUS COMMAND)>

A command to instruct the first recording process layer to report its recording state to the second recording process layer is the command (GET WRITE STATUS COMMAND). When many defective areas take place on the information storage medium, the information temporarily stored in the buffer memory 219 in the information recording and reproducing device gets saturated, which prevents video information from being recorded continuously. Then, the command (GET WRITE STATUS COMMAND) is issued to monitor the status of the buffer memory 219. The file system 2 side then performs control so that the memory 219 may not get saturated.

<Defect management information about PC information and that about AV information are separated.>

This facilitates defect management. Recording the respective types of information separately facilities the management and setting of contiguous data areas. The most suitable defect management can be performed on each of PC information and AV information.

<Defect management information>

FIG. 87 is an explanatory diagram showing an example of description of the file structure using extents in a file descriptive statement related to the information recording method according to the present invention.

Figure 88:
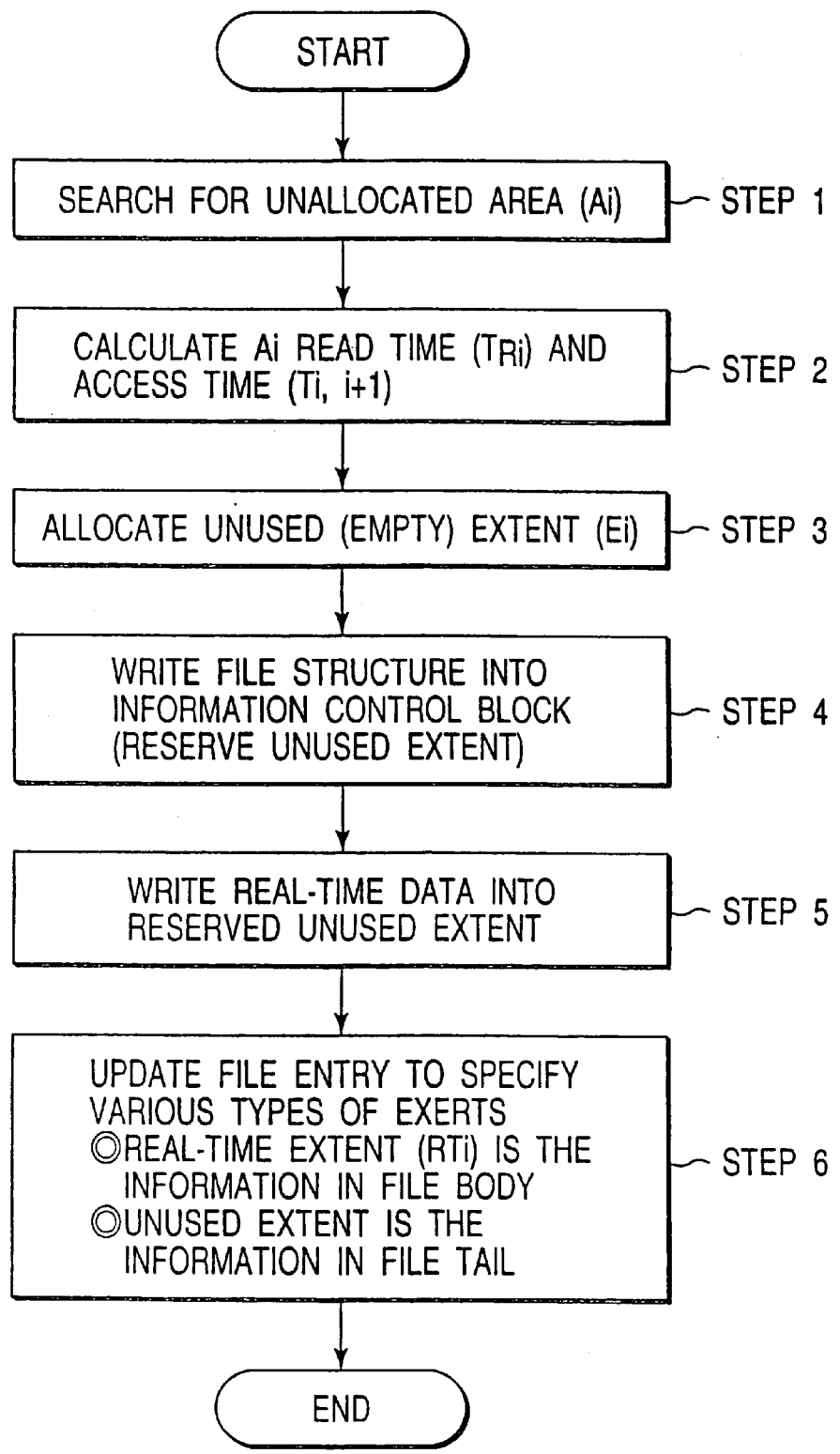
FIG. 88 is an explanatory diagram showing a method of allocating extents to an unrecorded area by the information recording method according to the present invention.

FIG. 88 is an explanatory diagram showing a method of allocating extents to an unrecorded area by the information recording method according to the present invention.

The replacement methods include a first replacement (slipping) method, a second replacement (linear replacement) method, and a third replacement (skipping) method. Defect management information related to the first replacement method is represented by PDL 3412, defect management information related to the second replacement method is represented by SDL 3413 or SDL 3471, and defect management information related to the third replacement method is represented by TDL 3414 or SDL 3472.

That the defect management information related to the third replacement method is written as physical address information means that it is recorded as defect management information TDL 3414 and that the information recording and reproducing device performs defect management. This enables the file system to concentrate on the management of the recording places on the LBN space without being bothered with troublesome defect management.

That the defect management information related to the third replacement method is written as physical address information means that it is recorded as defect management information TDL 3472 and that the file system 2 side performs defect management. The defect management by the file system 2 side enables fine defect management, which facilitates the management and setting of contiguous data areas 3593.

As described above, according to the present invention, there are provided not only a recording method which enables stable continuous recording without being affected by the existence of many defective areas on an information storage medium but also an information recording and reproducing device which uses the recording method. There is further provided an information storage medium (as well as the data structure of the information recorded on the medium) on which information has been recorded in the most suitable form for the stable continuous recording.

Furthermore, there is provided an environment setting method (specifically, a video information recording/reproducing/editing system) which assures stable video information management without imposing a burden on the recording/reproducing application software layer (or without causing the recording/reproducing application software layer to perform defect management), even when many defective areas are present on the information storage medium.

While in the above explanation, the optical head has recorded and reproduced the information onto and from the optical disk, the present invention is not limited to this. For instance, the present invention may be applied to a case where a magnetic head accesses the information on a magnetic disk or a hard disk.

The present invention is applicable to an information storage medium, such as an optical disk, its data structure, an information recording method, an information recording device, and a playback device.

TABLE 1

LIST OF FUNCTIONS (EFFECTS OF EMBODIMENTS OF THE PRESENT INVENTION)
NECESSARY IN RECORDING AND REPRODUCING VIDEO INFORMATION
(LIST OF EFFECTS PRODUCED BY VIDEO INFORMATION RECORDING
AND REPRODUCING DEVICE OF THE PRESENT INVENTION)

| EFFECT AND FUNCTION | REQUEST SIDE OF EFFECT AND FUNCTION | DESCRIPTION OF REQUESTED FUNCTIONS (EFFECTS) AND SUPPLEMENTARY EXPLANATION |
|---|---|---|
| ESSENTIAL FUNCTIONS (EFFECTS) | APPLICATION SIDE'S REQUEST TO VIDEO INFORMATION | BOTH AV FILES AND PC FILES ARE ALLOWED TO EXIST ON INFORMATION STORAGE MEDIUM. <br> . . . AV FILES AND PC FILES ARE DISTINGUISHED AND HANDLED ON FILE SYSTEM. <br> AV FILE SIZE IS ALLOWED TO EXPAND. <br> . . . AV FILE EXTENTS ARE ADDITIONALLY SECURED IN EMPTY AREA ON INFORMATION STORAGE MEDIUM. <br> AV FILE SIZE IS ALLOWED TO BE DECREASED. <br> . . . PART OF AV FILE IS ALLOWED TO BE DELETED. <br> CONTINUITY OF RECORDING IS SECURED (REAL-TIME RECORDING) <br> . . . RECORDING IN CONTIGUOUS DATA AREA UNITS, SLIPPING PROCESS IN DEFECTIVE SPOT <br> CONTINUOUS PLAYBACK IS SECURED (E.G., CONTINUOUS PLAYBACK OF ADDITIONAL PICTURES AFTER SEQUENTIAL ADDITION OF SHORT-TIME RECORDING PICTURES) <br> . . . SHORT-TIME ONE-SHOT RECORDING IS ALSO DONE IN CONTIGUOUS DATA AREAS AND NEXT SHORT-TIME RECORDING PICTURES ARE ADDITIONALLY RECORDED IN UNUSED AREA IN CONTIGUOUS DATA AREA. <br> . . . CONTINUOUS PLAYBACK ACCORDING TO ORIGINAL PGC (DIRECTLY AFTER RECORDING) IS GUARANTEED. <br> PROCESS OF DELETING PART OF SPECIFIC RANGE (IN CONTIGUOUS DATA AREAS) IN AV FILE <br> RELIABILITY OF VIDEO DATA IN VIDEO-RECORDING (RECORDING)/PLAYBACK IS SECURED. <br> . . . DEFECTIVE PLACE ON INFORMATION STORAGE MEDIUM IS REPLACED IN VIDEO-RECORDING (RECORDING). |

TABLE 1-continued

LIST OF FUNCTIONS (EFFECTS OF EMBODIMENTS OF THE PRESENT INVENTION)
NECESSARY IN RECORDING AND REPRODUCING VIDEO INFORMATION
(LIST OF EFFECTS PRODUCED BY VIDEO INFORMATION RECORDING
AND REPRODUCING DEVICE OF THE PRESENT INVENTION)

| EFFECT AND FUNCTION | REQUEST SIDE OF EFFECT AND FUNCTION | DESCRIPTION OF REQUESTED FUNCTIONS (EFFECTS) AND SUPPLEMENTARY EXPLANATION |
|---|---|---|
| REQUESTED FUNCTIONS (EFFECTS) | | ARRANGEMENT OF VOB IS ALLOWED TO BE CHANGED ON ORIGINAL PGC<br>VIDEO DATA UP TO THE MIDDLE IS ALIVE EVEN IF POWER SUPPLY IS TURNED OFF IN THE COURSE OF VIDEO RECORDING<br>WHEN VIDEO DATA IS RECORDED OR REPRODUCED, ONLY REAL DATA IS INPUTTED OR OUTPUTTED.<br>... WHEN VIDEO DATA IS RECORDED OR REPRODUCED, "RECORDING/REPRODUCING APPLICATION" SIDE IS UNWILLING TO PERFORM THE ADDING/DELETING OF ADDITIONAL INFORMATION OR THE SECURING OF RESERVE SPARE AREA AS A RESULT OF REPLACEMENT.<br>... IT IS HOPED THAT MANAGEMENT OF ADDITIONAL INFORMATION EXCEPT FOR REAL DATA IS ELIMINATED AND ADDRESS MANAGEMENT OF REAL DATA IN AV FILE IS SIMPLIFIED (CORRESPONDENCE TO LBN IS SIMPLIFIED).<br>"RECORDING/REPRODUCING APPLICATION" SIDE DOES NOT MANAGE DEFECTS ON INFORMATION STORAGE MEDIUM<br>"RECORDING/REPRODUCING APPLICATION" SIDE DOES NOT MANAGE CONTIGUOUS DATA AREAS<br>"RECORDING/REPRODUCING APPLICATION" SIDE HAS AS LITTLE ADDRESS MANAGEMENT INFORMATION AS POSSIBLE |

TABLE 2

| EFFECT AND FUNCTION | REQUEST SIDE OF EFFECT AND FUNCTION | DESCRIPTION OF REQUESTED FUNCTIONS (EFFECTS) AND SUPPLEMENTARY EXPLANATION |
|---|---|---|
| REQUESTED FUNCTIONS (EFFECTS) | FILE SYSTEM (OS) SIDE'S REQUEST | ANOTHER PIECE OF VIDEO INFORMATION CAN BE RECORDED/USED AGAIN IN PARTLY DELETED PLACE IN AV FILE.<br>... ON USER I/F, THIS MEANS THAT ANOTHER PICTURE IS ALLOWED TO BE WRITTEN OVER THE RECORDED PLACE IN AV FILE WHEN THE REMAINDER IS SMALL.<br>... IT IS NECESSARY TO SECURE CONTIGUOUS DATA AREA SIZE IN RE-RECORDING ANOTHER PICTURE.<br>RECORDABLE AREA (REMAINDER) AFTER THE REPETITION OF RECORDING/PARTIAL DELETING IS SECURED.<br>... GARBAGE COLLECTION/DEFRAGMENTATION IS TO BE EXECUTED.<br>API COMMAND BETWEEN APPLICATION SOFTWARE IS UNWILLING TO BE CHANGED.<br>... IT IS HOPED THAT MEASURES ARE TAKEN BY CHANGING ONLY LOW LEVELS OF HIERARCHY OF OS/FS WITHOUT CHANGING HIGH LEVELS OF HIERARCHY.<br>PROCESS ADAPTED AS MUCH TO EXISTING COMMAND IDEAS AS POSSIBLE IS CARRIED OUT.<br>... SOFTWARE DEVELOPMENT IS FACILITATED WITHOUT GIVING SOFTWARE DEVELOPER A SENSE OF INCONGRUITY.<br>TRANSPLANTATION AND INTERCHANGEABLITY OF RECORDING/REPRODUCING DVD DATA TO ANOTHER MEDIUM (E.G., HDD) ARE IMPROVED<br>COMPATIBILITY WITH DVD-ROM VIDEO IS IMPROVED<br>EXISTING 2.6-GB DVD-RAM STANDARD PART 2 IS NOT CHANGED<br>NO ITEM IS ADDED TO EXISTING MANAGEMENT INFORMATION MANAGED BY UDF SIDE.<br>... REPLACEMENT TABLE FOR DEFECTIVE SPOTS, RESERVE SPARE AREA ADDRESS TABLE, AND OTHERS<br>CHANGES IN UDF CONTROL SOFTWARE COMPATIBLE WITH EXISTING DVD-RAM ARE FEW.<br>... DEFECT MANAGEMENT OF INFORMATION STORAGE MEDIUM IS NOT PERFORMED ON UDF CONTROL SOFTWARE. |
| | ODD SIDE'S REQUEST | CONTINUOUS RECORDING IS NOT INTERRUPTED AS A RESULT OF COMMAND PROCESSING AT THE OCCURRENCE OF DEFECT<br>NEITHER INTERRUPTION OF CONTINUOUS RECORDING NOR LOSS OF VIDEO DATA TAKES PLACE WHEN MANY CONSECUTIVE DEFECTS HAVE OCCURRED<br>INFORMATION ABOUT DEFECT DISTRIBUTION OVER INFORMATION STORAGE MEDIUM IS PREVENTED FROM GOING OUT OF ODD<br>CORRELATION BETWEEN PSN AND LBN IS CLEAR EVEN AFTER REWRITING IS DONE REPEATEDLY<br>AS LARGE A RECORDABLE AREA (RECORDING CAPACITY) ON INFORMATION STORAGE MEDIUM IS SECURED AS POSSIBLE [LARGER STORAGE CAPACITY].<br>... INITIAL SPARE AREA SIZE IS MADE SMALLER.<br>... WASTE OF RECORDING AREA (UNUSED AREA BECAUSE OF SPARE AREA) IS ELIMINATED.<br>THE AMOUNT OF INFORMATION IN DMA (DEFECT MANAGEMENT INFORMATION) IS DECREASED<br>DEFECT MANAGEMENT (E.G., REPLACEMENT) CONTROL OF ODD IS SIMPLIFIED |

TABLE 3

THE RELATIONSHIP BETWEEN THE PROGRAM SOFTWARE HIERARCHICAL STRUCTURE AND
THE ADDRESS SPACE USED AT EACH LEVEL OF HIERARCHY ON PC WHEN VIDEO INFORMATION
IS RECORDED AND REPRODUCED ON PC USING RECORDING/REPRODUCING APPLICATION SOFTWARE

| CONTROL LAYER | INTERFACE | ADDRESS NUMBER NAME | DESCRIPTION OF ADDRESS SPACE |
|---|---|---|---|
| VIDEO PLAYBACK APPLICATION SOFTWARE (RECORDING/REPRODUCING APPLICATION) 1 | | RELATIVE ADDRESS IN AV FILE (AV ADDRESS) | CONTINUOUS ADDRESS NUMBERS IN AV FILE, WITH BEGIN POSITION OF AV FILE BEING ADDRESS "0" |
| | SDK API COMMAND 4 | | |
| FS: FILE SYSTEM (E.G., UDF) 2 | | LSN LBN | BOTH ARE ASSIGNED LOGICAL CONSECUTIVE NUMBERS IN UNITS OF 2 KB |
| | DDK INTERFACE COMMAND 5 | | |
| 0DD: OPTICAL DISK DRIVER 3 (INFORMATION RECORDING AND REPRODUCING DEVICE) | | PSN: Physical Sector Number | EACH SECTOR ON INFORMATION STORAGE MEDIUM (OPTICAL DISK) HAS BEEN ASSIGNED PHYSICAL NUMBER BEFOREHAND |

LSN: LOGICAL SECTOR NUMBER; LBN: LOGICAL BLOCK NUMBER

TABLE 4

DEFECT MANAGEMENT ON INFORMATION STORAGE MEDIUM AND UNUSED AREAS IN AV FILE
TABLE SHOWING COMPARISON BETWEEN EMBODIMENTS OF THE PRESENT INVENTION ABOUT MANAGEMENT

| | | RESERVE SPARE AREA IS NOT SECURED BEFOREHAND IN CREATING CONTIGUOUS DATA AREA. | RESERVE SPARE AREA IS SECURED IN CREATING CONTIGUOUS DATA AREA (PS: PRE-SPARE) | MANAGEMENT PLACE AND MANAGEMENT METHOD OF UNUSED AREAS IN AV FILE |
|---|---|---|---|---|
| LBN ARE NOT SET FOR DEFECTIVE PLACES AND SPARE AREAS. INFORMATION ABOUT DEFECTS IS IN DMA. | | XX PSN FOR LBN IS SHIFTED EACH TIME DEFECT OCCURS. REAL DATA SIZE = EXTENT SIZE | XX-PS PSN SHIFT OF DEFECT + RESERVE SPARE IS EFFECTED ON LBN IN UNITS OF CDA. | RECORDING/REPRODUC- ING APPLICATION 1 SIDE MANAGES UNUSED AREA INFORMATION IN AV FILE AS "UNUSED VOB." |
| LBN ARE SET FOR DEFECTIVE PLACES. | DEFECT INFORMATION IS RECORDED IN DMA AND MANAGEMENT FILE SYSTEM 2 SIDE HAS NOTHING TO DO WITH DEFECTIVE INFORMATION IN CONNECTION WITH ODD3. | LBN/0DD DEFECTIVE PLACE IS INCLUDED IN EXTENT. IN PLAYBACK, RECORDING/REPRODUCING APPLICATION REQUESTS REPLY ONLY ABOUT REAL DATA FROM ODD3. (UDF SIDE ACTS AS INTERMEDIARY) RECORDING/REPRODUCING APPLICATION 1 SIDE MANAGES CDA BOUNDARY POSITION. | LBN/0DD-PS DEFECTIVE PLACES AND RESERVE SPARE AREAS ARE INCLUDED IN EXTENT. ODD3 MANAGES THE POSITION AND SIZE OF RESERVE SPARE AREAS. FILE SYSTEM SIDE HAS NOTHING TO DO WITH THE MANAGEMENT. THE REMAINING PROCESSES ARE THE SAME AS THOSE OF LBN/ODD. | THE UNUSED VOB INFORMATION IS RECORDED IN VIDEO OBJECT CONTROL INFORMATION 1107 IN CONTROL INFORMATION 1011. |
| | FS2 SIDE ALSO DEALS WITH PROCESSES RELATED TO DEFECT INFORMATION. DEFECT MANAGEMENT INFORMATION IS RECORDED IN DEFECT MANAGEMENT INFORMATION RECORDING POSITION ON FS2 SIDE. | LBN/UDF DEFECTIVE PLACES ARE INCLUDED IN EXTENT. CDA SIZE IS MADE VARIABLE. THERE IS NO CDA BOUNDARY POSITION MANAGEMENT. ONLY REAL DATA IS TRANSFERRED TO RECORDING/REPRODUCING APPLICATION 1 SIDE IN PLAYBACK. LBN/UDF-CDAFix CDA SIZE AND BOUNDARY POSI- TION ARE FIXED IN ADVANCE. THE REMAINING PROCESSES ARE THE SAME AS THOSE OF LBN/UDF. | LBN/UDF-PS DEFECTIVE PLACES AND RESERVE SPARE AREAS ARE INCLUDED IN EXTENT. FS2 SIDE MANAGES THE POSITION AND SIZE OF RESERVE SPARE AREAS. THE REMAINING PROCESSES ARE THE SAME AS THOSE OF LBN/UDF. | THE SIZE OF RECORDED AREA FROM BEGIN POSITION OF AV FILE IS RECORDED IN INFORMATION LENGTH IN FILE ENTRY INFORMATION. FILE SYSTEM 2 SIDE (UDF) MANAGES UNUSED AREAS IN AV FILE. ADDITIONAL RECORDING INFORMATION IS RECORDED FROM THE BEGIN POSITION OF UNUSED AREA IN AV FILE. |
| | EXTENT IS SET, AVOIDING DEFECTIVE AREA → DEFECT INFORMATION IN DMA. | LBN/XXX INFORMATION ABOUT DEFECTIVE PLACES ARE KNOWN ODD3 IN RECORDING AND REMOVED FROM EXTENT. THE REMAINING PROCESSES ARE THE SAME AS THOSE OF LBN/UDF. | LBN/XXX-PS DEFECTIVE AREAS ARE REMOVED FROM EXTENT. FS MANAGES RESERVE SPARE AREAS IN EXTENT. | |

LBN: LOGICAL BLOCK NUMBER; CDA: CONTIGUOUS DATA AREA
PSN: PHYSICAL SECTOR NUMBER

TABLE 5

TABLE LISTING THE EFFECTS OF EMBODIMENTS OF THE PRESENT INVENTION

| FUNCTIONS (EFFECTS) | PLACE REQUESTING FUNCTIONS AND EFFECTS | DESCRIPTION OF VARIOUS REQUESTED FUNCTIONS (EFFECTS) | DEGREE OF IMPORTANCE OF REQUESTED FUNCTIONS AND EFFECTS | XX | XX-PS | LBN/ ODD | LBN/ ODD-PS | LBN/ UDF | LBN/ UDF-PS | LBN/ XXX | LBN/ XXX-PS |
|---|---|---|---|---|---|---|---|---|---|---|---|
| ESSENTIAL EFFECTS | RECORDING/ REPRODUCING APPLICATION SIDE'S REQUEST | AV FILE AND PC FILE ARE ALLOWED TO BE PRESENT AT THE SAME PLACE | ☆ | ☆ | ☆ | ☆ | ☆ | ☆ | ☆ | ☆ | ☆ |
| | | AV FILE SIZE CAN BE INCREASED | ☆ | ☆ | ☆ | ☆ | ☆ | ☆ | ☆ | ☆ | ☆ |
| | | AV FILE SIZE CAN BE DECREASED | ☆ | ☆ | ☆ | ☆ | ☆ | ☆ | ☆ | ☆ | ☆ |
| | | CONTINUITY IN RECORDING IS SECURED | ☆ | ☆ | ☆ | ☆ | ☆ | ☆ | ☆ | ☆ | ☆ |
| | | CONTINUOUS PLAYBACK (AFTER ADDITION OF SHORT-TIME RECORDED PICTURES) | ☆ | ☆ | ☆ | ☆ | ☆ | ☆ | ☆ | ☆ | ☆ |
| | | PROCESS OF DELETING PART OF AV FILE | ☆ | ☆ | ☆ | ☆ | ☆ | ☆ | ☆ | ☆ | ☆ |
| | | RELIABILITY OF DATA IN RECORDING/REPRODUCING | ☆ | ☆ | ☆ | ☆ | ☆ | ☆ | ☆ | ☆ | ☆ |
| REQUESTED FUNCTIONS (EFFECTS) | | CHANGE OF VOB ARRANGEMENT IN ORIGINAL PGC | ⊙ | ○ | ○ | ○ | ○ | ○ | ○ | ○ | ○ |
| | | VIDEO-RECORDING DATA IS ALIVE WHEN POWER SUPPLY IS TURNED OFF | ○ | △ | △ | △ | △ | △ | △ | △ | △ |
| | | I/O PROCESS OF ONLY REAL DATA | ○ | ○ | ○ | ○ | ○ | ○ | ○ | ○ | ○ |
| | | RECORDING/REPRODUCING APPLICATION DOES NOT MANAGE DEFECTS | △ | △ | △ | △ | △ | △ | △ | △ | △ |
| | | RECORDING/REPRODUCING APPLICATION SIDE DOES NOT PERFORM C.D.A MANAGEMENT | △ | ▽ | ▽ | ▽ | ▽ | △ | △ | ▽ | ▽ |
| | | AS LITTLE ADDRESS MANAGEMENT INFORMATION AS POSSIBLE | △ | ▽ | ▽ | ▽ | ▽ | △ | △ | ▽ | ▽ |
| | FS SIDE'S REQUEST | PARTLY DELETED PART CAN BE RE-RECORDED OR REUSED | ⊙ | △ | △ | △ | △ | △ | △ | ▽ | ▽ |
| | | REMAINDER IS SECURED AFTER REPETITION OF RECORDING OR DELETING | ⊙ | △ | △ | △ | △ | △ | △ | ▽ | ▽ |
| | | API COMMAND IS UNWILLING TO BE CHANGED | ○ | △ | ▽ | △ | ▽ | △ | △ | △ | △ |
| | | PROCESS ADAPTED TO EXISTING COMMAND IDEAS | ○ | △ | △ | ▽ | ▽ | △ | ▽ | △ | ▽ |
| | | TRANSPLANTATION (INTERCHANGEABLITY) OF DATA TO ANOTHER MEDIUM | △ | △ | ▽ | △ | ▽ | ▽ | ▽ | △ | △ |
| | | COMPATIBILITY WITH DVD-ROM VIDEO | △ | △ | △ | △ | △ | △ | ▽ | △ | ▽ |
| | | DVD-RAM STANDARD PART 2 IS NOT CHANGED | △ | △ | △ | △ | △ | ▽ | ▽ | △ | △ |
| | | NO ITEM IS ADDED TO MANAGEMENT INFORMATION ON UDF | △ | △ | △ | △ | △ | ▽ | ▽ | △ | △ |
| | | MINOR CHANGE IN DVD-RAM UDF SOFTWARE | △ | △ | △ | △ | △ | ▽ | ▽ | ▽ | ▽ |
| | ODD SIDE'S REQUEST | CONTINUOUS RECORDING IS NOT INTERRUPTED BY COMMAND PROCESS | ⊙ | X | ⊙ | X | ⊙ | X | ⊙ | X | ⊙ |
| | | MEASURES CAN BE TAKEN WHEN MANY CONSECUTIVE DEFECTS HAVE OCCURRED | ⊙ | X | ▼ | X | ▼ | X | ▼ | X | ▼ |
| | | INFORMATION ABOUT DEFECT DISTRIBUTION OVER INFORMATION IS PREVENTED FROM | ⊙ | ○ | ○ | ○ | ○ | ▼ | ▼ | ▼ | ▼ |

TABLE 5-continued

TABLE LISTING THE EFFECTS OF EMBODIMENTS OF THE PRESENT INVENTION

| FUNCTIONS (EFFECTS) | PLACE REQUESTING FUNCTIONS AND EFFECTS | DESCRIPTION OF VARIOUS REQUESTED FUNCTIONS (EFFECTS) | DEGREE OF IMPORTANCE OF REQUESTED FUNCTIONS AND EFFECTS | XX | XX-PS | LBN/ODD | LBN/ODD-PS | LBN/UDF | LBN/UDF-PS | LBN/XXX | LBN/XXX-PS |
|---|---|---|---|---|---|---|---|---|---|---|---|
| | | GOING OUT OF ODD CORRELATION BETWEEN PSN AND LBN IS CLEAR | ⊚ | X | X | ○ | ○ | ○ | ○ | ○ | ○ |
| | | WASTE OF RECORDING AREA IS ELIMINATED | ○ | ○ | ▼ | ○ | ▼ | ○ | ▼ | ○ | ▼ |
| | | THE AMOUNT OF INFORMATION IN DMA IS DECREASED | Δ | ▽ | ▽ | ▽ | ▽ | Δ | Δ | ▽ | ▽ |
| | | DEFECT MANAGEMENT CONTROL OF ODD IS SIMPLIFIED | Δ | ▼ | ▼ | ▽ | ▽ | Δ | Δ | ▽ | ▽ |

⊚: IMPORTANT EFFECT, ○: GREAT EFFECT, Δ: LESS EFFECT, ▽: MINOR DRAWBACK, ▼: MAJOR DRAWBACK, X: SERIOUS DRAWBACK

TABLE 6

DATA STRUCTURE OF ALLOCATION MAP TABLE WHEN RECORDING/REPRODUCING APPLICATION MANAGES THE BOUNDARY POSITION OF CONTIGUOUS DATA AREA IN THE EMBODIMENTS LBN/ODD, LBN/ODD-PS, XX, AND XX-PS [CONTIGUOUS DATA AREA BOUNDARY INFORMATION IN AV ADDRESS]

| INFORMATION ABOUT ALLOCATION MAP TABLE | EXAMPLE OF VALUE IN USING THE EMBODIMENT OF FIG. 36 |
|---|---|
| NUMBER OF CONTIGUOUS DATA AREAS IN AV FILE | 3 (NOTE: EXTENT # δ, EXTENT # γ, EXTENT # α) |
| THE LAST AV ADDRESS IN THE FIRST CONTIGUOUS DATA AREA | f − e − 1 |
| THE LAST AV ADDRESS IN THE SECOND CONTIGUOUS DATA AREA | f − e + d − c − 1 |
| THE LAST AV ADDRESS IN THE THIRD CONTIGUOUS DATA AREA | f − e + d − c + b − a − 1 |

TABLE 7

TABLE HELP TO EXPLAIN OTHER EMBODIMENTS RELATED TO A METHOD OF RECORDING DEFECT MANAGEMENT INFORMATION MANAGED BY FILE SYSTEM 2 SIDE

| METHOD NO. | DESCRIPTION | RELATION WITH EXTENT | ADVANTAGE AND EFFECT |
|---|---|---|---|
| ① | HIDDEN FILE IS CREATED AND DEFECT MAP INFORMATION IS WRITTEN IN IT | | CHANGE OF UDF DRIVE WILL DO NUMBER OF CHANGED PLACES IS SMALL |
| ② | LONG ALLOCATION DESCRIPTOR IS USED IN AV FILE AND DEFECT FLAG IS SET IN IMPLEMENTATION | DEFECTIVE AREA IS MADE ANOTHER EXTENT | MINOR CHANGE OF UDF STANDARD WILL DO NUMBER OF CHANGED PLACES IS SMALL |

TABLE 8

TABLE LISTING METHODS OF SETTING UNUSED AREAS
IN EXTENTS EXCEPT FOR THOSE IN FIGS. 43 AND 47

| METHOD NO. | DESCRIPTION | ADVANTAGE AND EFFECT |
|---|---|---|
| ③ | LBN FOR UNUSED AREA START IS WRITTEN IN PADDING AREA IN FILE IDENTIFICATION DESCRIPTOR | MINOR CHANGE OF UDF STANDARD WILL DO |
| ④ | RESERVED SIZE OF FILE ENTRY/ICB TAG IS INCREASED TO 4 BYTES AND UNUSED AREA START LBN IS WRITTEN | MINOR CHANGE OF UDF STANDARD WILL DO |
| ⑤ | HIDDEN FILE IS CREATED AND UNUSED AREA START LBN IS WRITTEN IN THE FILE | ONLY CHANGE OF UDF DRIVE WILL DO |
| ⑥ | LONG ALLOCATION DESCRIPTOR IS USED ONLY IN AV FILE AND UNUSED AREA START LBN IS WRITTEN IN IMPLEMENTATION USE OF THE RELEVANT EXTENT | MINOR CHANGE OF UDF STANDARD WILL DO |

TABLE 9

TABLE LISTING VARIOUS API COMMANDS USED
IN RECORDING VIDEO INFORMATION IN LBN/UDF AND LBN/XX

| COMMAND NAME 3401 | COMMAND OVERVIEW 3402 | COMMAND PARAMETER 3403 | RETURN VALUE 3404 | COMMAND TYPE 3405 |
|---|---|---|---|---|
| Create File | FILE OPEN PROCESS FILE RECORDING START DECLARATION FILE PLAYBACK START DECLARATION | AV FILE ATTRIBUTE FLAG IS ADDED TO EXISTING PARAMETER | EXISTING RETURN VALUE IS USED AS IT IS | NEW MATTER IS ADDED TO EXISTING COMMAND |
| Set Unrecorded Area | SPECIFY UNUSED AREA SIZE IN AV FILE | SETTING START LBN VALUE UNUSED AREA SIZE | INFORMATION RECEPTION COMPLETE OR RECEPTION FAILURE | NEW COMMAND |
| Write File | FILE RECORDING PROCESS | EXISTING PARAMETER | EXISTING RETURN VALUE | EXISTING COMMAND |
| Read File | FILE REPRODUCING PROCESS | EXISTING PARAMETER | EXISTING RETURN VALUE | EXISTING COMMAND |
| Delete Part Of File | DELETE PART OF FILE | DELETE START POINTER DELETED DATA SIZE | PROCESS SUCCESSFUL OR UNSUCCESSFUL | NEW COMMAND |
| Close Handle | END RECORDING/ REPRODUCING PROCESS | EXISTING PARAMETER | EXISTING RETURN VALUE | EXISTING COMMAND |
| Get AV Free Space Size | CHECK UNRECORDED AREA SIZE | CDA SETTING CONDITION | TOTAL UNRECORDED SIZE | NEW COMMAND |
| Change Order | REARRANGE THE ORDER IN FILE | START POINTER BEFORE CHANGE CHANGED PLACE SIZE START POINTER AFTER CHANGE | PROCESS SUCCESSFUL OR UNSUCCESSFUL | NEW COMMAND |
| AV Defrag- mentation | EXPAND CDA AREA THAT CAN BE SET | CDA SETTING CONDITION | PROCESS SUCCESSFUL OR UNSUCCESSFUL | NEW COMMAND |

TABLE 10

TABLE LISTING COMMANDS USED WITH INFORMATION RECORDING
AND REPRODUCING DEVICE CORRESPONDING TO LBN/UDF, LBN/XXX

| COMMAND NAME 3341 | COMMAND OVERVIEW 3342 | COMMAND PARAMETER 2243 | RETURN VALUE (STATUS) 3344 |
|---|---|---|---|
| AV WRITE | VIDEO INFORMATION RECORDING PROCESS COMMAND RELATED TO AV FILES | RECORDING START POSITION (LBN SPECIFICATION OR PRESENT POSITION) DATA SIZE (NO. OF SECTORS) END POSITION OF RELEVANT EXTENT START POSITION OF NEXT EXTENT END POSITION OF NEXT EXTENT SLOT_ID (SLOT ID) AV WRITE NUMBER | INFORMATION AS TO WHETHER COMMAND HAS BEEN RECEIVED |
| GET WRITE STATUS | REQUEST THE AMOUNT OF ROOM IN BUFFER MEMORY 219 IN INFORMATION | START LBN VALUE OF SPECIFIED RANGE | AMOUNT OF ROOM IN BUFFER MEMORY 219 (NO. OF BYTES) NUMBER OF DEFECTIVE ECC |

TABLE 10-continued

TABLE LISTING COMMANDS USED WITH INFORMATION RECORDING AND REPRODUCING DEVICE CORRESPONDING TO LBN/UDF, LBN/XXX

| COMMAND NAME 3341 | COMMAND OVERVIEW 3342 | COMMAND PARAMETER 2243 | RETURN VALUE (STATUS) 3344 |
|---|---|---|---|
| | RECORDING AND REPRODUCING DEVICE AT PRESENT AND LBN VALUE AT EACH DEFECTIVE ECC BLOCK BEGIN POSITION IN SPECIFIED RANGE BY LBN | SIZE OF SPECIFIED RANGE (NO. OF SECTORS) | BLOCKS FIRST ECC BLOCK LBN SECOND ECC BLOCK . . . |
| DISCARD PRECEDING COMMAND | DISCARD PRECEDING COMMAND RECORDED ON INFORMATION RECORDING AND REPRODUCING DEVICE SIDE ADJUST THE AMOUNT OF TRANSFERRED DATA ACCORDING TO THE NUMBER OF DEFECTS ON INFORMATION STORAGE | NUMBER OF PRECEDING COMMANDS FIRST DELETED COMMAND NO. SECOND DELETED COMMAND NO. . . . | INFORMATION AS TO WHETHER COMMAND HAS BEEN RECEIVED |
| READ | PLAYBACK PROCESS COMMAND FOR AV FILES AND PC FILES | PLAYBACK START POSITION (LBN) DATA SIZE (NO. OF SECTORS) | DATA SIZE (NO. OF SECTORS) REPRODUCED DATA |
| GET PERFORMANCE | REQUEST ZONE BOUNDARY POSITION INFORMATION ON INFORMATION STORAGE MEDIUM AND DMA INFORMATION (LBN CONVERSION) | START LBN VALUE OF SPECIFIED RANGE SIZE OF SPECIFIED RANGE (NO. OF SECTORS) | ZONE BOUNDARY POSITION IN SPECIFIED RANGE AND DMA INFORMATION (VALUE AFTER LBN CONVERSION) |
| SEND PRESENT EXTENT ALLOCATION MAP | REPORT LOCATION INFORMATION ABOUT VIDEO INFORMATION RECORDING EXTENT SET BEFOREHAND ON THE BASIS OF ZONE BOUNDARY POSITION INFORMATION AND DMA INFORMATION RECEIVED FROM INFORMATION RECORDING AND REPRODUCING DEVICE BEFORE RECORDING OF VIDEO INFORMATION | NUMBER OF SET EXTENTS FIRST EXTENT BEGIN POSITION FIRST EXTENT SIZE SECOND EXTENT BEGIN POSITION SECOND EXTENT SIZE . . . | INFORMATION AS TO WHETHER COMMAND HAS BEEN RECEIVED |
| GET FREE SLOT_ID | A SERIES OF AV WRITE START DECLARATION (INSTRUCT ODD3 TO ISSUE SLOT_ID) AND END DECLARATION (CANCEL SLOT_ID) | AV WRITE START FLAG AV WRITE END FLAG | SLOT_ID TO ISSUE ODD3 INFORMATION AS TO WHETHER COMMAND HAS BEEN RECEIVED |

TABLE 11

TABLE LISTING PARAMETERS AND RETURN VALUES FOR WRITE AV FILE COMMAND ON API IN LBN/ODD-PS WRITE AV FILE COMMAND (API)

| TYPE | PARAMETER NAME 71 | DESCRIPTION OF PARAMETERS 72 |
|---|---|---|
| COMMAND PARAMETER 76 | h File | NAME OF FILE TO BE RECORDED (SPECIFY FILE HANDLE) |
| | Ip Buffer | SPECIFY POINTER TO BUFFER WHICH STORES DATA TO BE WRITTEN INTO FILE |
| | n Contiguous Data Area | SPECIFY CONTIGUOUS DATA AREA NUMBER IN FILE . . . PARALLEL RECORDING INTO MULTIPLE C.D.A. CAN BE DONE IN TIME-DIVISION. a) WHEN THE NUMBER IS ALREADY PRESENT IN FILE, THIS MEANS "PARTIAL OVERWRITING IN THE SAME CONTIGUOUS DATA AREA." b) WHEN THE NUMBER IS NOT PRESENT IN FILE, THIS MEANS "CREATING NEW CONTIGUOUS DATA AREA AND RECORDING NEW DATA." |
| | Ip Contiguous Data Area | SPECIFY POINTER TO VARIABLE THAT RECEIVES THE CONTIGUOUS DATA AREA NUMBER |
| | n Max Number Of Bytes For-Contiguous Data Area | INDICATE THE MAXIMUM RECORDING DATA SIZE IN CONTIGUOUS DATA AREA TO BE RECORDED. a) WHEN TARGET C.D.A IS EXISTING PLACE, THIS MEANS THE DATA SIZE OF ITS C.D.A. b) WHEN TARGET C.D.A IS NEWLY CREATED CONTIGUOUS DATA AREA, VIDEO DATA EQUAL TO OR LESS THAN THE MAXIMUM VALUE IS RECORDED. . . . FILE SYSTEM SIDE USES THE PARAMETER IN SETTING ALLOCATION. |

TABLE 11-continued

TABLE LISTING PARAMETERS AND RETURN VALUES FOR WRITE AV FILE COMMAND ON API IN LBN/ODD-PS
WRITE AV FILE COMMAND (API)

| TYPE | PARAMETER NAME 71 | DESCRIPTION OF PARAMETERS 72 |
|---|---|---|
| | Ip Max Number-C.D.A | SPECIFY POINTER TO VARIABLE THAT RECEIVES THE MAXIMUM RECORDING DATA SIZE |
| | n Number Of Bytes To Write | VIDEO DATA SIZE TO BE WRITTEN INTO CONTIGUOUS DATA AREA IN FILE |
| | Ip Number Of Bytes Written | SPECIFY POINTER THAT RECEIVES THE VIDEO DATA SIZE |
| | n Number Of Bytes Reserve | UNUSED AREA SIZE ON RECORDING/REPRODUCING APPLICATION SIDE THAT WRITES DATA IN CONTIGUOUS DATA AREA.<br>. . . WHEN VIDEO DATA HAS RUN OUT, IT IS ADDED TO THE END OF CONTIGUOUS DATA AREA. L.B.N IS ALLOCATED FORMALLY. AT POSITIONS OTHER THAN THE END POSITION OF CONTIGUOUS DATA AREA, THE VALUE TAKES "0." |
| | Ip Number Of Bytes Reserved | SPECIFY POINTER TO VARIABLE THAT RECEIVES THE UNUSED AREA SIZE |
| | Ip Over Lapped | SPECIFY RECORDING START POSITION POINTER IN THE RELEVANT CONTIGUOUS DATA AREA.<br>. . . RELATIVE ADDRESS FROM THE RELEVANT CONTIGUOUS DATA AREA BEGIN POSITION. |
| | End Flag Of Contiguous D.A | RELEVANT WRITE COMMAND SHOWS LAST RECORDING IN CONTIGUOUS DATA AREA.<br>a) FLAG = 1: INDICATES THE LAST RECORDING IN CONTIGUOUS DATA AREA. THE ACCUMULATED VALUE OF ALL THE PRECEDING DATA BECOMES THE ACTUAL DATA SIZE IN CONTIGUOUS DATA AREA AND IS REGISTERED ON FILE SYSTEM SIDE.<br>b) FLAG = 0: INDICATES THAT IT IS FOLLOWED BY RECORDING DATA IN THE SAME CONTIGUOUS DATA AREA. |
| RETURN VALUE 77 | n Number Of Bytes Written | SIZE OF REAL DATA ACTUALLY RECORDED ON INFORMATION STORAGE MEDIUM<br>a) REAL DATA SIZE COINCIDES WITH VIDEO DATA + UNUSED SIZE → RECORDING IS COMPLETE WITHOUT PROBLEM<br>b) REAL DATA SIZE IS SMALLER THAN VIDEO DATA + UNUSED SIZE, THIS MEANS OVERFLOW OF DEFICIENCY HAS BEEN CAUSED BY DEFECTS ON INFORMATION STORAGE MEDIUM.<br>. . . THE DEFICIENCY WILL START TO BE RECORDED WHEN WRITE COMMAND IS EXECUTED NEXT TIME. |

NOTE: WHEN RECORDING/REPRODUCING APPLICATION SIDE SPECIFIES "SPARE AREA SIZE," NOT ONLY THE ABOVE PARAMETER BUT ALSO "N NUMBER OF BYTES FOR SPARE AREA: SPARE SIZE SPECIFIED ON RECORDING/REPRODUCING APPLICATION SIDE" ARE NEEDED.

TABLE 12

TABLE LISTING PARAMETERS AND RETURN VALUES FOR READ AV FILE COMMAND ON API IN LBN/ODD-PS
READ AV FILE COMMAND (API)

| TYPE | PARAMETER NAME 71 | DESCRIPTION OF PARAMETERS 72 |
|---|---|---|
| COMMAND PARAMETER 76 | h File | NAME OF FILE TO BE RECORDED (SPECIFY FILE HANDLE) |
| | Ip Buffer | SPECIFY POINTER TO BUFFER THAT STORES DATA TO BE READ FROM FILE |
| | n Contiguous Data Area | INDICATE CONTIGUOUS DATA AREA NUMBER IN FILE |
| | Ipm Contiguous Data Area | SPECIFY POINTER TO VARIABLE THAT RECEIVES THE CONTIGUOUS DATA AREA NUMBER |
| | dw Number Of Bytes To Read | SIZE OF REAL DATA REPRODUCED FROM CONTIGUOUS DATA AREA IN FILE<br>. . . DATA IS REPRODUCED IN SUCH A MANNER THAT DEFECTIVE PLACES IN EXTENT AND DATA IN RESERVE SPARE AREA ARE REMOVED FROM THE OBJECTS TO BE REPRODUCED AND SKIPPED. |
| | Idpw Number Of Bytes To Read | SPECIFY POINTER TO VARIABLE THAT RECEIVES THE VIDEO DATA SIZE |
| | Ip Over Lapped | SPECIFY PLAYBACK START POSITION POINTER TO "REAL DATA" IN THE RELEVANT CONTIGUOUS DATA AREA [DEFECTIVE PLACES ARE NOT COUNTED].<br>. . . RELATIVE ADDRESS FROM THE RELEVANT CONTIGUOUS DATA AREA BEGIN POSITION |
| RETURN VALUE | BOOL | a) RETURN TRUE WHEN PLAYBACK IS SUCCESSFUL.<br>b) RETURN FALSE WHEN PLAYBACK IS UNSUCCESSFUL. |

TABLE 13

TABLE LISTING PARAMETERS AND RETURN VALUES FOR AV WRITE COMMAND TO ODD IN LBN/ODD-PS

| TYPE | PARAMETER NAME 81 | DESCRIPTION OF PARAMETERS 82 |
|---|---|---|
| PARAMETER | Initial LBN | LOGICAL BLOCK NUMBER OF THE BEGIN POSITION OF AV EXTENT TO BE RECORDED |
| | Start Address | SPECIFY RECORDING START POSITION IN RELATIVE ADDRESS FROM AV EXTENT BEGIN POSITION |
| | Data Length | SIZE OF REAL DATA TO BE RECORDED |
| | Space Keep Length | SIZE OF DATA AREA SECURED . . . IT CORRESPONDS TO "UNUSED AREA" ON RECORDING/REPRODUCING APPLICATION SIDE. ALTHOUGH NEITHER RECORDING OF REAL DATA NOR REPLACEMENT OF DEFECTS IS NOT DONE, ONLY PLACE IS SECURED. |
| | Restrictive End LBN | ALLOWED LAST LBN IN RECORDING → SPECIFY THE UPPER LIMIT OF TIMES OF SKIPPING |
| RETURN VALUE | Recorded Data Length | SIZE OF REAL DATA ACTUALLY RECORDED |

TABLE 14

TABLE LISTING PARAMETERS AND RETURN VALUES FOR AV READ COMMAND TO ODD IN LBN/ODD-PS

| TYPE | PARAMETER NAME 81 | DESCRIPTION OF PARAMETERS 82 |
|---|---|---|
| PARAMETER | Initial LBN | LOGICAL BLOCK NUMBER FOR THE BEGIN POSITION OF AV EXTENT TO BE REPRODUCED |
| | Start Address | SPECIFY PLAYBACK START POSITION IN RELATIVE ADDRESS FROM AV EXTENT BEGIN POSITION |
| | Data Length | SIZE OF REAL DATA TO BE REPRODUCED → ASSUMING THAT DEFECTIVE PLACES ARE SKIPPED |
| RETURN VALUE | Recorded Data Length | SIZE OF REAL DATA ACTUALLY RECORDED |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium, comprising:
a lead-in area;
a data area; and
a lead-out area, wherein,
the information storage medium is configured to store control information, an AV file and file management information for managing at least the AV file and for including file entry information in the data area,
AV data is stored in the AV file, the file management information manages a position of the AV file, the file entry information includes a file type of the AV file and an allocation descriptor indicating a position of an extent,
an application layer sets an information processing method with respect to the AV file,
the application layer uses an AV address as address information,
a file system layer uses a logical block number and a logical sector number as address information, a disk drive layer or a physical layer uses a physical sector number as address information, the logical block number and the logical sector number are associated with each other, and the logical sector number and the physical sector number are associated with each other,
the AV data in the AV file is distributed physically in each of a plurality of extents,
the distributed AV data is managed using the AV address in a contiguous order, a start address of the AV file is set as "0",
the control information manages a video object including the AV data by using the AV address, and the control information includes a plurality of program chain information which control a reproducing order of the video object, and
the plurality of program chain information include a plurality of cell information defined by a plurality of cells, each of the cells represents a playback period of the video object, and different cells belonging to different program chains, respectively, partially refer to the portion of the video object representing the playback period.

2. An information recording method for recording information on an information storage medium, the information storage medium comprising:
a lead-in area,
a data area, and
a lead-out area, wherein,
the information storage medium is configured to store control information,
an AV file and file management information for managing at least the AV file and for including file entry information in the data area,
AV data is stored in the AV file, the file management information manages a position of the AV file, the file entry information includes a file type of the AV file and an allocation descriptor indicating a position of an extent,
an application layer sets an information processing method with respect to the AV file,
the application layer uses an AV address as address information,
a file system layer uses a logical block number and a logical sector number as address information, a disk drive layer or a physical layer uses a physical sector number as address information, the logical block number and the logical sector number are associated with each other, the logical sector number and the physical sector number are associated with each other,
the AV data in the AV file is distributed physically in each of a plurality of extents,
the distributed AV data is managed using the AV address in a contiguous order, a start address of the AV file is set as "0", and
the control information manages a video object including the AV data by using the AV address, and the control information includes a plurality of program chain information which control a reproducing order of the video object, the information recording method comprising:
recording or rewriting the AV data in the AV file; and
recording or rewriting the control information.

3. An information reproducing method for reproducing information on an information storage medium, the information storage medium comprising:

a lead-in area, a data area, and a lead-out area, wherein, the information storage medium is configured to store control information, an AV file and file management information for managing at least the AV file and for including file entry information in the data area, AV data is stored in the AV file, the file management information manages a position of the AV file, the file entry information includes a file type of the AV file and an allocation descriptor indicating a position of an extent, an application layer sets an information processing method with respect to the AV file, the application layer uses an AV address as address information, a file system layer uses a logical block number and a logical sector number as address information, a disk drive layer or a physical layer uses a physical sector number as address information, the logical block number and the logical sector number are associated with each other, the logical sector number and the physical sector number are associated with each other, the AV data in the AV file is distributed physically in each of a plurality of extents, the distributed AV data is managed using the AV address in a contiguous order, a start address of the AV file is set as "0", the control information manages a video object including the AV data by using the AV address, and the control information includes a plurality of program chain information which control a reproducing order of the video object, and the plurality of program chain information include a plurality of cell information defined by a plurality of cells, each of the cells represents a playback period of the video object, and different cells belonging to different program chains, respectively, partially refer to the portion of the video object representing the playback period, the information reproducing method comprising:
reproducing the control information and the AV data; and
decoding the AV data.

4. An information reproducing apparatus for reproducing information on an information storage medium, the information storage medium comprising:

a lead-in area, a data area, and a lead-out area, wherein, the information storage medium is configured to store control information, an AV file and file management information for managing at least the AV file and for including file entry information in the data area, AV data is stored in the AV file, the file management information manages a position of the AV file, the file entry information includes a file type of the AV file and an allocation descriptor indicating a position of an extent, an application layer sets an information processing method with respect to the AV file, the application layer uses an AV address as address information, a file system layer uses a logical block number and a logical sector number as address information, a disk drive layer or a physical layer uses a physical sector number as address information, the logical block number and the logical sector number are associated with each other, the logical sector number and the physical sector number are associated with each other, the AV data in the AV file is distributed physically in each of a plurality of extents, the distributed AV data is managed using the AV address in a contiguous order, a start address of the AV file is set as "0", the control information manages a video object including the AV data by using the AV address, and the control information includes a plurality of program chain information which control a reproducing order of the video object, and the plurality of program chain information include a plurality of cell information defined by a plurality of cells, each of the cells represents a play back period of the video object, and different cells belonging different program chains, respectively, partially refer to the portion of the video object representing the playback period, the information reproducing apparatus comprising:
a reproducer for reproducing the control information and AV data; and
a decoder for decoding the AV data in the AV file.

* * * * *